United States Patent [19]

Puccini

[11] 3,737,873

[45] June 5, 1973

[54] DATA PROCESSOR WITH CYCLIC SEQUENTIAL ACCESS TO MULTIPLEXED LOGIC AND MEMORY

[75] Inventor: Sergio E. Puccini, Wood Dale, Ill.

[73] Assignee: GTE Automatic Electric Laboratories Incorporated, Northlake, Del.

[22] Filed: Nov. 24, 1971

[21] Appl. No.: 201,851

[52] U.S. Cl. ............................340/172.5, 179/18 EB

[51] Int. Cl. ............................G06f 9/18

[58] Field of Search............................340/172.5; 179/18 EB

[56] References Cited

UNITED STATES PATENTS

| | | | |
|---|---|---|---|
| 3,299,214 | 1/1967 | Prescher et al. | 179/18 EB |
| 3,374,461 | 3/1968 | Anderholm et al. | 340/172.5 X |
| 3,533,073 | 10/1970 | Wirsing et al. | 340/172.5 |

*Primary Examiner*—Raulfe B. Zache
*Attorney*—K. Mullerheim, B. E. Franz and Theodore C. Jay, Jr.

[57] ABSTRACT

The register-sender subsystem of a telephone switching system is of the type having common logic circuits including a wired program shared during cyclically recurring time slots by a plurality of registers, with each register comprising a block of a common memory and having an associated register junctor serving as a peripheral unit for connection via a switching network to a calling line or incoming trunk. The memory block for each register comprises a plurality of sets of storage elements including control sets and data sets which are accessed during sub-time slots, each of the control sets having two sub-time slots, one occurring before the other after the data sub-time slots. Each set of storage elements is organized as two memory words which during a sub-time slot, are read in sequence, the information processed by the common logic circuits, and then written back into memory. A carry buffer provides for storage of information from some of the sub-time slots for use during other sub-time slots, and is cleared at the end of the complete time slot. A stored program main processor also is provided with random access to the register-sender memory. The register-sender is provided with mode control to skip data sub-time slots, with a normal mode in which called digits are received via a register junctor and stored into memory into called number word stores, while sub-time slots for calling number storage are skipped; and an automatic-number-identification mode in which the called number sub-time slots are skipped and sub-time slots for calling number storage occur instead. A maintenance mode provides for scanning all sub-time slots of a selected time slot.

39 Claims, 39 Drawing Figures

RS MEMORY LAYOUT

PATENTED JUN 5 1973 3,737,873

SHEET 17 OF 39

MISC. CALL PROCESSING PSS=3

DIGIT RETRIEVAL FOR SENDING
(RIC)

DATA PROCESSOR WITH CYCLIC SEQUENTIAL ACCESS TO MULTIPLEXED LOGIC AND MEMORY

BACKGROUND OF THE INVENTION

1. Field of the Invention

This invention relates to a data processor subsystem in which a plurality of peripheral units each have individual storage areas in a memory, and common logic circuits are shared on a time division multiplex basis, with cyclically recurring time slots providing sequential access to the memory and to the peripheral units for processing information relating thereto; and more particularly to such an arrangement in a register-sender sub-system of a communication switching system.

2. Description of the Prior Art

Telephone switching systems with time division multiplex arrangement using cyclically recurring time slots are well known, both for sharing of a common transmission path between lines for several calls, and also for the sharing of common logic circuits for control functions by a plurality of units such as registers. Such systems use a memory in which each unit such as a line, a trunk, a call, or a register has an individual word store accessed during its individual time slot of each cycle.

An arrangement in which each register has an individual storage area in memory comprising a plurality of word stores or rows is disclosed in U.S. Pat. No. 3,299,214 issued Jan. 17, 1967 to K. E. Prescher and J. G. Van Bosse for a COMMUNICATION SWITCHING SYSTEM COMMON CONTROL ARRANGEMENT. Dividing the storage requirements of a register into several rows allows a more efficient use of the memory drive and sense circuitry, and the other electronic apparatus of a register group. To permit processing in the common logic circuits based on information from different rows assigned to a register, a carry buffer register is provided in which information read from one row during its sub-time slot is stored for use in logical processing along with information read from other rows. At least one of the rows for each register stores a control word which has information used to control the processing of information in the other rows, and in turn needs to be updated in accordance with the information relating to the other rows. Therefore for each register during its time slot there is provided a plurality of sub-time slots, with each row read, the information processed, and rewritten during its sub-time slot, and with the control row having two sub-time slots assigned thereto one at the beginning and one at the end of the time slot. This arrangement has a distinct advantage in permitting a large amount of information to be stored and processed for each register, with efficient use of the memory and logic circuits, and permits a number of registers to share the same logic circuits using the time division multiplex. However the requirements for sampling of the incoming information such as dialed digits requires that the time for each recurring cycle be limited to, for example, 10 milliseconds. Therefore the number of registers which can be accommodated with the same common logic circuits, is determined by the number of rows of storage used for each, and the time required to read, process and rewrite the information from each row. Memory and logic circuit speeds are limited by the state of the art.

SUMMARY OF THE INVENTION

The object of this invention is to provide a time division multiplex data processing arrangement in which the number of units, such as registers, and the amount of information stored in the memory for each, may be substantially increased.

According to the invention, an arrangement in which each of a plurality of peripheral units (such as registers) share common logic circuits on a time division multiplex basis in recurring time slots, each having a plurality of word stores, including some for control words and others for data words, the word stores being accessed during sub-time slots, with the control word stores accessed during sub-time slots both at the beginning and the end of the time slot, is improved by providing mode control in which access to certain data word stores may be skipped during each occurrence of a time slot for each unit, the word stores skipped being dependent upon the type of information being currently processed by that unit. By skipping access to some of the data word stores, the duration of the time slots may be decreased for a given amount of information storage, thereby increasing the number of units which may share the same logic circuits. The mode control includes a store in the carry buffer register which is selectively set during each time slot of each cycle in accordance with information from a control word relating to the type of information being currently processed. The mode control store comprises at least one bistable device. The state of this bistable device is used in the memory address circuits to control the selection of sub-time slots to be accessed during each time slot. In addition to the normal processing modes there also may be a special mode controlled for example by maintenance circuits, which in the preferred embodiment disclosed herein comprises accessing all of the sub-time slots, which produces a longer than normal time slot.

Other features of the invention relate to the manner of storing data digits into the data word stores of memory. Digits received via the peripheral units (register junctors) are directed into given positions of the particular word stores in a predefined order. The correct position for each received digit to be stored is determined by the logic circuits determining whether each position has information already stored therein or is empty, and selecting the first empty position in the prescribed order. In addition to digits received via the peripheral units, digits may also be placed in the memory by direct random access from another data processing unit subsystem, in which case the common logic circuits are arranged to shift the digits to pack them into the required positions in the prescribed order.

CROSS-REFERENCES TO RELATED APPLICATIONS AND TO INVENTIONS DISCLOSED HEREIN

The preferred embodiment of the invention is incorporated in a PROCESSOR CONTROLLED COMMUNICATION SWITCHING SYSTEM, U.S. Pat. application Ser. No. 130,133 filed Apr. 1, 1971 by K.E. Prescher, R.E. Schauer and F.B. Sikorski, this application being hereinafter referred to as the SYSTEM application.

The memory access, and the priority and interrupt circuits for the register-sender subsystem are covered by U.S. Pat. application Ser. No. 139,480 filed May 3, 1971 by C.K. Buedel for a DIGITAL PROCESSING SYSTEM, hereinafter referred to as the REGISTER-SENDER MEMORY CONTROL patent application. The marker for the system is disclosed in the U.S. Pat. application Ser. No. 130,418 filed Apr. 1, 1971 by J.W. Eddy, H.G. Fitch, W.F. Mui and A.M. VALENTE for a MARKER FOR COMMUNICATION SWITCHING SYSTEM, hereinafter referred to as the MARKER patent application. U.S. Pat. 3,492,613 issued Jan. 27, 1970 by H.W. Van Husen for REED RELAYS HAVING AIDING COILS TO COUPLE HIGHLY INDUCTIVE OPERATING COILS TO REED BLADES, is hereinafter referred to as the BATTERY FEED RELAY patent.

In addition to the invention claimed herein, there is disclosed several other inventions relating to the register-sender subsystem and its interface with other subsystems of the switching system, by inventive entities including one or more of the following and possibly others: C.K. Buedel, J.E. Busch, J.P. Caputo, J.W. Eddy, P.R. Harrington, G. O'Toole, S.E. Puccini, and F.A. Weber. These inventions include but are not limited to sender timing control from the common logic circuits via the multiplex for both dial pulse and multifrequency sending; dual usage of certain conductors via the multiplex path from the common logic to the register junctor using a transfer relay in the register junctor; party and coin detection including shunting of a polar relay in the register junctor; assignment of senders and receivers using a combination of software selection and the common logic and multiplex circuits; traffic monitor to determine whether fast or slow timing should be used in the time permitted for dialed digits; a dial pulse receiving arrangement which counts break and make periods in a particular manner; maintenance features including the snap shot, data gathering, freeze bit, recycling and the use of a third copy on the drum; intersystem control transfer involving orginating calls for seizure of a register junctor; intersystem control transfer involving terminating phases of a call using the SD relay of the register junctor to verify the connection; and an arrangement using the service bit of memory and maintenance features related thereto. These inventions were disclosed to the applicant during the design of the register-sender subsystem, and are included herein as part of the disclosure of this subsystem.

OUTLINE

I. GENERALIZED EMBODIMENT
II. DESCRIPTION OF THE PREFERRED EMBODIMENT
A. GENERAL SYSTEM DESCRIPTION
B. TYPICAL CALLS
B1. Local Line-to-Local Line Call
B2. Local Line-to-Outgoing Trunk Call
B3. Incoming Trunk-to-Local Line Call
C. REGISTER-SENDER SUBSYSTEM
C1. Register Timing Generator
D. REGISTER-SENDER MEMORY LAYOUT
E. SYMBOLISM FOR GATES AND BISTABLE DEVICES
F. REGISTOR JUNCTOR AND ORIGINATING PATH
G. MULTIPLEX TO REGISTER JUNCTORS
H. MULTIPLEX TO SENDERS AND RECEIVERS
J. REGISTER CENTRAL CONTROL
K. EQUATIONS FOR REGISTER CONTROL
K1. Process Controller (RPC) Equations
K1*a*. RPC Basic Internal Equations
K1*b*. RPC Combined Internal Equations
K1*c*. RPC Output Equations to RWT
K1*d*. RPC Output Equations to RCB
K2. Register Controller (RRC) Equations
K2*a*. RRC Basic Internal Equations
K2*b*. RRC Combined Internal Equations
K2*c*. RRC Output Equations to RWT
K2*d*. RRC Output Equations to RCB
K3. Sender Controller (RSC) Equations
K3*a*. RSC Basic Internal Equations
K3*b*. RSC Combined Internal Equations
K3*c*. RSC Output Equations to RWT
K3*d*. RSC Output Equations to RCB
K4. Information Storage Controller (RIC) Equations
K4*a*. RIC Basic Internal Equations
K4*b*. RIC Combined Internal Equations
K4*c*. RIC Output Equations to RWT
K4*d*. RIC Output Equations to RCB
K5. Carry Buffer (RCB) Set Equations
L. OPERATION FOR CALL PROCESSING
M. SUMMARY FOR MODE CONTROL AND DIGIT STORAGE

I. GENERALIZED EMBODIMENT

Figure 1:
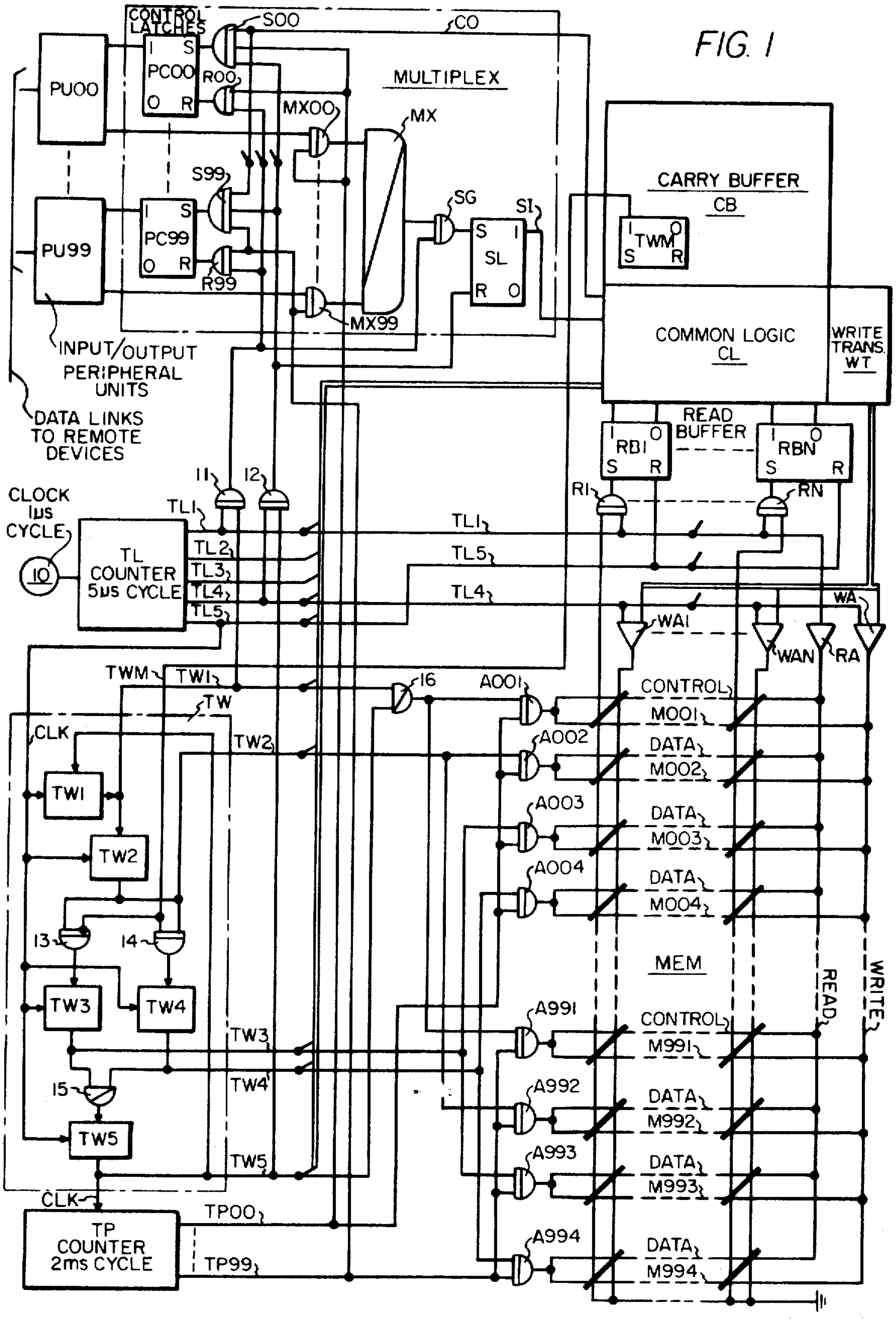
FIG. 1 is a block and schematic diagram of a system incorporating a generalized embodiment of the invention.

FIG. 1 is a symbolic block diagram of a simple generalized embodiment of a time division multiplex control arrangement embodying the invention. The arrangement comprises common logic circuits CL which are shared by a number of remote units during sequential time slots, which also includes access to a common memory MEM. Peripheral units are connected via data links to the remote devices for input of information signals and output of control signals. In the arrangement of FIG. 1 there are 100 peripheral units of which the first, PU00, and the last, PU99 are shown. The data links may be either permanently, individually connected to particular remote units, or may be connected selectively via a switching arrangement. Each of the peripheral units is assigned a part of the memory for storing incoming information signals and intermediate states of control signals associated with the logic CL. As shown in FIG. 1 the memory MEM comprises 400 word stores of which the first four M001–M004 associated with peripheral unit PU00, and the last four M991–M994 associated with peripheral unit PU99 are shown. The sequential timing is determined by timing generator comprising a clock 10 and three cyclic counters TL, TW, and TP. The clock may, for example, have a cycle of one microsecond, arranged to produce a short pulse once during each of the 1 microsecond cycles. The counter TL is shown as having a 5 microsecond cycle comprising five steps producing a pulse on each step on successive ones of the output leads TL1-TL5, the cycles being repetitive so that following the step on which a pulse is produced on TL5 there is a step on which pulse is produced on TL1. The counter may comprise flip-flops or other bistable devices arranged to step each time an input pulse is received. The counter TW is shown in more detail as comprising bistable devices TW1–TW5. An input clock pulse is provided each time a pulse appears on lead TL5 from counter TL and supplies an input to the CLK inputs of each of the bistable devices. This counter is arranged so that the first clock pulse sets device TW1, then on the next pulse device TW2 is set and TW1 reset. The next step is determined by the signal on lead TWM. Normally this signal will be in the false or zero state so that AND gate 13 is enabled and gate 14 is inhibited so that the signal from device TW2 enables the input of device TW3; therefore the next clock pulse sets device TW3 and resets device TW2. The output of device TW3 via OR gate 15 enables TW5 so that the next clock pulse sets device TW5 and resets device TW3; and finally the output of device TW5 enables TW1 so that the next clock pulse resets TW5 and sets TW1. Similarly counter TP is shown as a 100-step counter having 100 outputs TP00–TP99 and receives a clock pulse input each time the signal on lead TW5 is true; so that the counter TP has a 2 millisecond cycle. The outputs from counter TP are the time slot pulses individually associated with the peripheral units, for example, the output on TP00 being associated with peripheral unit PU00 and the output on lead TP99 being associated with peripheral unit PU99.

The peripheral units are effectively coupled to the common logic circuit CL via a multiplex arrangement comprising a plurality of gates and latches. For input from the peripheral units to the common logic there are 100 AND gates MX00–MX99 each having one input individually connected from its corresponding peripheral unit, and another input connected from its corresponding output of the counter TP, lead TP00 being connected to gate MX00 and lead TP99 being connected to gate MX99. The outputs of these gates are connected to a 100 input OR gate arrangement MX, the output of which is connected to an input of an AND gate SG. Another input of this gate is enabled during conincidence of signals on leads TL1 and TW1 via AND gate 11. The output of gate SG when true sets a scan latch SL. One or both of the outputs of this scan latch are connected to the common logic circuit CL. Although only one scan latch is shown in FIG. 1, there may be a plurality each having its own set of gate inputs and corresponding leads from the peripheral units, so that a plurality of information signals may be supplied from the peripheral units to the common logic circuits during their respective time slots. The scan latch is reset at the end of each time slot via a signal from gate 12 enabled in coincidence to signals on leads TL4 and TW5, in preparation for receiving a signal from another peripheral unit during the next time slot. Thus it is seen that if the input signal from a peripheral unit is true then the scan latch SL will be in the set state during most of the time slot and the signal condition will be available to the common logic circuits CL.

Output from the common logic circuits to the peripheral units is via control latches there being 100 latches for each signal of which PC00 having an output connected to peripheral unit PU00 and latch PC99 having an output connected to peripheral unit PU99 are shown. Each control latch has two input gates such as S00 and R00 for a set and reset respectively of latch PC00; and gates S99 and R99 for latch PC99. There may be a plurality of sets of control latches and gating arrangements each for one output control signal from the common logic circuits; in FIG. 1 only one such output lead CO is shown, which is connected from the common logic circuit CL to inputs of the 100 control gates S00–S99. Each of the pair of input gates for control latch has a signal input from its time slot select lead, for example, the gates S00 and R00 have inputs connected to lead TP00 and gates S99 and R99 have inputs connected to lead TP99. The reset gates all have a common input from gate 11, and the set gates all have a common input from gate 12. Therefore, during each time slot the corresponding control latch is reset during coincidence of the signals on leads TL1 and TW1 at the beginning of the time slot, and toward the end of the time slot if the signal on control lead CO is true the latch is set during coincidence of signals on leads TL4 and TW5. Thus as long as the common logic circuits supply a true signal on lead CO during each recurring time slot of a particular peripheral unit that latch will be reset at the beginning of the time slot and set at the end of its time slot so that it will be in the set condition during most of the cycle. Thus the output of the control latch supplies to its peripheral unit a signal which is true except for a short interval which is one per cent of each cycle. If the signal from the control latch is connected to a relay in the peripheral unit, the relay may be designed such that this short interruption is insignificant so that the relay remains continuously operated; and likewise if an electronic arrangement is used in the peripheral unit a capacitor may be used to that the short interruption is absorbed.

Thus it may be seen that with a multiplex arrangement input signals received at the peripheral units from their remote units may be scanned to supply a signal once each cycle during the corresponding time slot of the common logic circuits, provided the input signals have durations substantially greater than one or preferably two or more cycles which in the example shown means that the input signals must have a duration of substantially more than 2 milliseconds. Similarly output signals are supplied from the peripheral units having a duration determined by the common logic circuits as a multiple of the cycle time of 2 milliseconds.

The common memory MEM is arranged for access during each time slot to read signals for use by the common logic and to receive signals and write them in to selected places of the memory. Only the word stores of memory associated with a particular peripheral unit may be accessed during its time slot. The arrangement shown in FIG. 1 comprises what may be designated a "folded word" memory. In this type of arrangement each peripheral unit has a plurality of word stores assigned thereto which are provided with access during sequential sub-time slots occurring during each time slot. This arrangement permits shorter word length for a given amount of information to be stored, and permits more efficient use of the common logic circuits and associated buffer storage and write control circuits. To permit interaction in the logic processing and control with information from different words, a carry buffer CB comprising a plurality of bistable devices such as latches is provided. These carry buffer latches may be set via the common logic circuit during selected sub-time slots, the outputs used to control the logic and storage of information during other sub-time slot. One such latch TWM is shown in FIG. 1, it being understood that a plurality of other latches are included. The word stores associated with each peripheral unit may be designated as control word stores or data word stores, the arrangement shown in FIG. 1 comprising one control word store such as M001 and three data word stores such as M002, M003 and M004 for peripheral unit PU00, there being a corresponding set of four word stores for each of the other peripheral units. It is desirable that the information from the control word store be available to control the storage and processing of information to and from the data word stores and that in turn the control word be modified in accordance with the information in the data words. Therefore, the control word store is provided with an access twice during each cycle one in a sub-time slot at the beginning of the time slot and in another sub-time slot at the end of the time slot. The sub-time slots are derived from the counter TW, the outputs on leads TW1 and TW5 being used via OR gate 16 to select the control word, and the outputs on the other leads TW2, TW3 and TW4 being used to select the data words. The input addressing also includes the leads from the time slot counter TP; the lead TP00 being connected to the four AND gates A001–A004, the others each being connected to corresponding four AND gates. The other inputs of the AND gates are from counter TW. Thus coincidence of a time alot and a sub-time slot timing signal are required for access to any word store of memory.

The timing arrangement is such that each word store of memory during coincidence of its time slot and sub-time slot is read at the beginning of the sub-time slot into a read buffer, and information is selectively written back into the word store at the end of the sub-time slot, and then the read buffer and common logic circuits are cleared. The carry buffer is cleared at the end of a complete time slot. Each word of memory is shown as comprising N bits of which bit 1 and bit N are shown in FIG. 1. The reading and writing are shown in simplified form in FIG. 1 with read control circuits RA enabled via the signal TL1 to enable a read winding of the word being addressed; and the signal on lead TL1 also being used to select the reading gates R1–RN, each of which has an input from a sense winding from a corresponding bit of all of the words of memory, the output of the read gate being connected to set inputs of corresponding ones of the read buffer latches RB1–RBN. Thus the information from the selected word is placed in the read buffer and is available during the sub-time slot to the common logic circuit CL. The signal on lead TL4 enables circuits for writing information into the memory shown here in simplified form as enabling a common write amplifier WA to all of the write windings of the memory, and to write amplifiers having outputs to the corresponding write windings through all the word stores of memory for the corresponding bit. Each of the write amplifiers WA1–WAN has inputs for corresponding signals from write transfer circuit WT interfacing with the common logic circuit CL. Thus during interval TL4 the selected information from the common logic circuit is written into the word of memory corresponding to the sub-time slot. At the end of the sub-time slot the signal on lead TL5 resets all of the latches of the read buffer in preparation for receiving information during the next sub-time slot.

In summary it may be seen that the time division multiplex arrangement provides that the common logic circuit CL during each sub-time slot receives information via the multiplex scanning arrangement from the one peripheral unit whose time slot is then occurring, and during successive sub-time slots receive information via the read buffer from the memory, that the common logic processes this information, which in turn is stored back into the words of the memory, and used via the multiplex arrangement and the control latches to supply output signals to the peripheral unit.

The arrangement shown in FIG. 1 includes a further feature which permits an increase of the amount of data which may be handled in relation to each peripheral unit without increasing the overall time of a multiplex cycle. In accordance with this feature one or more of the words of data associated with each peripheral unit may be omitted in the access during each cycle. This is accomplished by providing a mode control latch designated TWM in the carry buffer CB. The information to be stored may be divided into categories, and the control arranged such that one or more categories are not required during a particular cycle. This is determined by control signals stored in the control word store which is used to selectively set or not set the latch TWM. In the arrangement shown here the output of the latch is used in control of the counter TW to determine during each cycle whether device TW3 or device TW4 will be set. Thus if TWM is in the normal or reset condition then gate 13 is enabled and gate 14 is not enabled so that device TW3 is set during the cycle following TW2; and if the mode control latch TWM is in the set condition then gate 14 is enabled and gate 13 is inhibited so that device TW4 is set following the step in which TW2 had been set. Thus during each cycle the control word is always selected via the output from device TW1, and then the data word store such as M002 is selected in response to the output of device TW2. Then one of the other data word stores is accessed depending on whether TW3 or TW4 has been set. For example, during the time slot TP00, either data word store M003 or M004 is selected. The following sub-time slot TW5 again selects the control word M001. Thus the cycle time of counter TW is only 20 microseconds even though there are five possible sub-time slots to select from, each of which has a duration of 5 microseconds. Thus for a given overall multiplex cycle time, the amount of word stores, or the number of peripheral units may be increased.

II. DESCRIPTION OF THE PREFERRED EMBODIMENT

Figure 2:
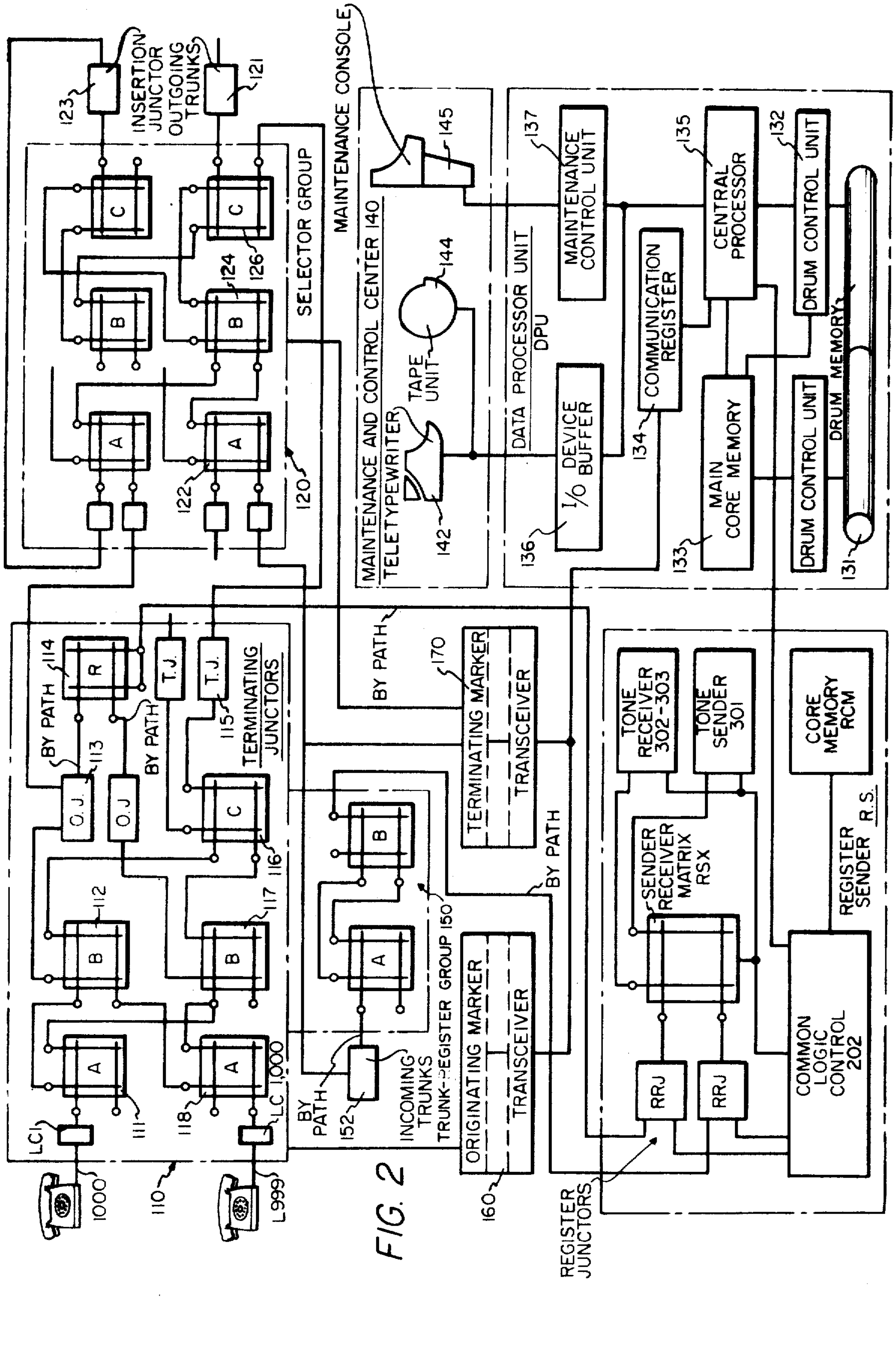
FIG. 2 is a block diagram of a communication switching system incorporating the preferred embodiment of the invention.

The preferred embodiment of the invention is incorporated in a register-sender subsystem of a telephone switching system as shown in FIG. 2. The register-sender sybsystem RS includes common logic control circuits 202 which are shared on a time division multiplex basis by a plurality of register junctors RRJ. The register junctors serve as peripheral units to receive incoming data information in the form of dialed digits, and output information in the form of certain digital control signals and digits for outpulsing to other offices. The register-sender subsystem includes a core memory RCM which has 16 word stores individually assigned to each register junctor. Timing control signals are supplied from a timing generator in repetitive cycles, with each register junctor having one time slot per cycle, the time slot timing signals being designated by a prefix Z followed by the junctor number. The time slots are divided into sub-time slots designated by a Y prefix; there being eleven sub-time slot signals designated Y1 through Y11. The memory access arrangement is such that two words are read during a sub-time slot, the information is processed by the common logic circuits, and then these two words are rewritten. The combination of two word stores of memory which are accessed during the same sub-time slot are designated herein as a row of memory. The area of memory comprising eight rows (16 words) individually assigned to one register junctor is referred to as a block of memory.

Figure 8:
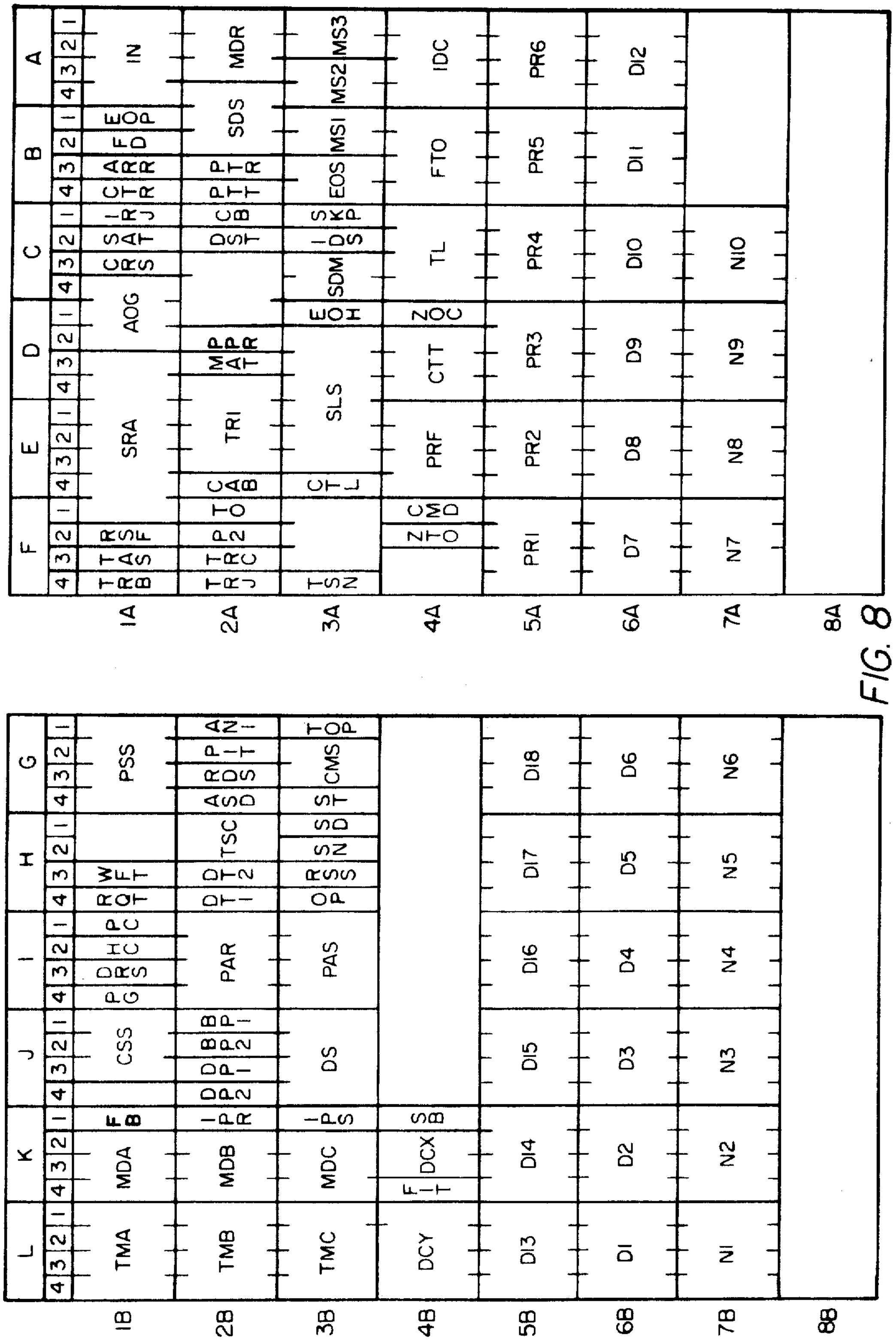
FIG. 8 is a layout diagram of the storage area in memory for one register.

The memory layout for one block is shown in FIG. 8. Each word store of the memory comprises 26 cores of which 25 are used for bits of call information. As shown in FIG. 8 the two word stores for each row are designated A on the right and B on the left respectively, and each is divided into six positions of four bits each, the positions being designated A-F in word A and G-L in word B, with the bits numbered 1–4 in each position. Row 1 is used for process control information, row 2 for register control information, row 3 for sending control information, row 4 for translation control and miscellaneous information, rows 5 and 6 for prefix and called number digits, row 7 for calling number digits, and row 8 is a spare.

The scan organization provides for three different modes of scanning. In each mode the first three rows are control rows which are accessed twice during each time slot, row 1 being accessed during sub-time slots Y1 and Y9, row 2 during sub-time slots Y2 and Y10, and row 3 during sub-time slots Y3 and Y11. Row 4 is accessed in every mode during sub-time slot Y4. In mode A rows 5 and 6 are accessed during sub-time slots Y5 and Y6, and then the scan jumps to Y9. In mode B the scan of rows 5 and 6 is skipped so that rows 7 and 8 are accessed with sub-time slots Y7 and Y8 following sub-time slot Y4. Mode C is used for maintenance purposes and uses all 11 of the sub-time slots in sequence, thereby providing a longer than normal time slot interval.

Mode A is the normal mode used while receiving or sending called number digits, and mode B is used for receiving or sending calling number identification digits for the processing of a call. This arrangement using different scan modes for calling and called numbers permits the time required for processing each register junctor during each cycle to be reduced, thereby permitting more register junctors to share the same common logic circuits, while retaining a cycle time of 10 milliseconds. This cycle time is desirable for adequate sampling of digits.

A. GENERAL SYSTEM DESCRIPTION

The telephone switching system is shown in FIG. 2. The system is disclosed in said system patent application, and also in said REGISTER-SENDER MEMORY CONTROL patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 160 control the switching networks of the selector group 120 for establishing connections therethrough; and if a call is to be terminated at a local customer's line in the office then the terminating marker sets up a connection through both the selector group 120 and the line group 120 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

B. TYPICAL CALLS

This part presents a simplified explanation of how three basic call types are processed by the system. The following call types are covered in the order listed: (1) call from a local party served by one switching unit to another local party served by the same switching unit, (2) call from a local party served by a switching unit destined for a party served by a distant office, via an outgoing trunk, and (3) call coming into the office via an incoming trunk, and terminating at a local customer's line served by the switching unit.

In the following presentations, reed relays are referred to as correeds. Not all of the data processing operations which take place are included.

B1. Local Line-to-Local Line Call

When a customer goes off-hook, the D.C. line loop is closed, causing the line cooreed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register junctor. The closed loop from te calling station operates the register junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the core memories of both the register-sender and the data processor, and is used to identify the call as it is processed by the remaining call processing programs.

Once the register junctor identity is known, the data frame is stored in the data processor's call history table (addressed by register junctor number), and the register-sender is notified that an origination has been processed to the specified register junctor.

Upon detecting the pulsing highway and a notification from the data processor that an origination has been processed to the specified register junctor, the central control circuits of the register-sender sets up a hold ground in the register junctor. The marker, after observing the register junctor hold ground and that the network is holding, disconnects from the matrix. The entire marker operation takes approximately 75 milliseconds.

Following the register junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register junctor.

Before the transfer of data to the register-sender memory takes place, the class-of-service information is first analyzed to see if special action is required (e.g., non-dial lines or blocked originations). The register junctor is informed of any special services the call it is handling must have. This is accomplished by the data processor loading the results of the class-of-service translation into the register-sender memory words associated with the register junctor.

After a tone receiver connection (if required), the register junctor returns dial tone and the customer proceeds to key (touch calling telephone sets) or dial the directory number of the desired party. (Party test on ANI lines is performed at this time.)

The register junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g., ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, the call is forwarded to the called party and terminated.

A check is made of the idle state of the data processor communication register, and a terminating marker. If both are idle, the data processor writes into register-sender core memory that this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory slot and releases itself from the call. The dedicated call history table (for that register) in the data processor core memory is returned to idle.

B2. Local Line-to-Outgoing Trunk Call

The processing of a call originated by a local customer, but destined for a distant office, is handled the same as previously described for a "local-to-local" call up to the point where a three-digit translation has occurred. The digits are analyzed and it is determined that the call destination is not a local line. Operation from this point forward is described in subsequent paragraphs.

For this example, the call is originating from a rotary dial line. The customer is making a seven-digit EAS (extended area service) call requiring tandem switching through the connecting office. The connecting office is equipped for wink-start pulsing. The trunk to the connecting office is an E and M trunk requiring D.C. pulsing.

The routing information and the class of the calling party allows the data processor to determine all register-sender instructions necessary to forward this call toward its destination.

The data processor writes the sending requirements into the register-sender core memory fields. These include the following information and instructions for this example: (a) early outpulsing of all digits received, (EOP field is set), (b) when seven digits are received, dialing is finished (TL field is set equal to seven), (c) close terminating loop in the register junctor, and (d) working with the terminating marker. There are also other instructions relating to start signals, send mode, etc.

The network switching instruction is sent to the terminating marker via the communication register. The marker then makes various tests, selects a selector outlet, and completes a path thereto. When the marker recognizes that the path has been connected properly, it clears from the matrix and sends a message to the data processor indicating successful call completion, and the identity of the trunk that was used.

The data processor will place this information in the call history table and write into register-sender core memory that outpulsing may proceed when start signals have been received. When the distant office is prepared to receive digits, it will return an off-hook signal of approximately 150 milliseconds which the outgoing trunk converts to a ground on the S lead. This causes the stop dial (SD) relay in the register junctor to operate. At the end of the 150-millisecond period, the SD relay restores and outpulsing begins.

The register-sender will outpulse the digits accumulated at this point (early outpulsing) and will outpulse each additional digit as it is received from the customer (no digits are deleted or prefixed in this example). When seven digits have been accumulated and sent, the register-sender will signal the originating junctor to switch through.

The register junctor will release itself from the call, releasing the R matrix. The register-sender memory is cleared, and the call history table in the data processor is reset. The calling party now controls the outgoing trunk. When the called party served by the connecting office answers, they may begin to converse. The calling line is now connected to the connecting office via the line matrix, originating junctor, selector matrix, and outgoing trunk.

When the calling party disconnects, the outgoing trunk releases the selector matrix, releasing the originating junctor and line matrix. Release of the line cutoff correed idles the customer's line for future calls.

The outgoing trunk remains busy for a short time to insure release of the connecting office. It then returns to idle.

B3. Incoming Trunk-to-Local Line Call

For purposes of explanation, it is assumed that a call has been placed by a customer served by a distant office, and the call is a locally terminating EAS call. The signaling mode is dial pulse, and the trunk is arranged for loop seizure. It is further assumed that the local office has one central office code with less than 10,000 directory numbers, and the ABC digits of the called number have been absorbed by preceding equipment.

When the incoming trunk is seized from the distant end, the trunk-register matrix inlet lead is marked with resistance battery, denoting a call-for-service request.

An idle originating marker is assigned to this call. A scan of the inlet leads identifies the trunk calling for service. One idle register junctor is selected.

The calling trunk number identity (TNI) and the selected B outlet information are loaded into the marker communication register and sent to the data processor. The data processor enters the originating phase of the call processing function and executes a core translation of the data frame information which indicated the section, matrix, B unit, and B unit outlet selected. This translation yields the register junctor identity, which specifies the unique cell of storage in the core memories of both the register-sender and the data processor.

Once the register junctor identity is known, the data frame is stored in the data processor's call history table (addressed by register junctor number).

The data processor also writes into the specified register-sender core memory location that an origination has been processed.

While sending the TNI and path data to the data processor, the originating marker operates the path from the incoming trunk to the register junctor.

The incoming trunk loop, assisted by marker circuitry, seizes the A correed in the register junctor. Operation of the register junctor's A correed indicates a completed line loop to the register-sender common logic. Upon detection of the completed line loop, a hold is set in the register junctor. The marker, observing that the register junctor is busy and the network is holding, disconnects from the matrix.

Following the register junctor translation, the data processor performs a class-of-service translation as previously described for a local-to-local call. In the case of the incoming trunk call, the drum search is keyed on the trunk number identity (TNI). For a call now being processed, the class-of-service translation will indicate the mode of start signaling, mode of receiving, quantity and numerical value of previously absorbed digits, digit pattern to be expected, and the total number of digits to receive before requesting a translation. These instructions are written into the register-sender core memory of the proper register junctor.

When the register-sender has accumulated a total of four digits, it requests the data processor to perform a translation.

A check is made for an idle communication register and an idle terminating marker in the incoming selector section. When they are idle, the data processor writes into register-sender core memory that the register is working with the terminating marker.

Operation proceeds as previously described for a local-to-local call. The terminating marker, upon completing a path, returns a data transmission to the data processor indicating successful completion and the selected selector outlet of the incoming selector section. Control of the path is left to the register junctor.

The data processor performs a drum look-up to obtain the local selector section inlet identity of the intermediate junctor. If not previously performed, the data processor also performs a drum look-up of the terminating list to determine class-of-service and switching digits of the called line. To obtain the grouping digits of terminating junctors in the called matrix, the data processor executes a core table look-up. All the switching information is sent to a terminating marker in the office section.

The terminating marker processes the call as a normal local termination. When hold is returned to the selector by the terminating junctor, the intermediate junctor switches the supervisory lead through and the register junctor controls the entire path.

Switch-through of the incoming trunk is accomplished by the register-sender in the manner described for local calls, via originating junctors. When the called party answers, ground is returned from the terminating junctor to the incoming trunk via the S lead. The incoming trunk then returns answer supervision to the distant office.

C. REGISTER-SENDER SUBSYSTEM

Figure 3:
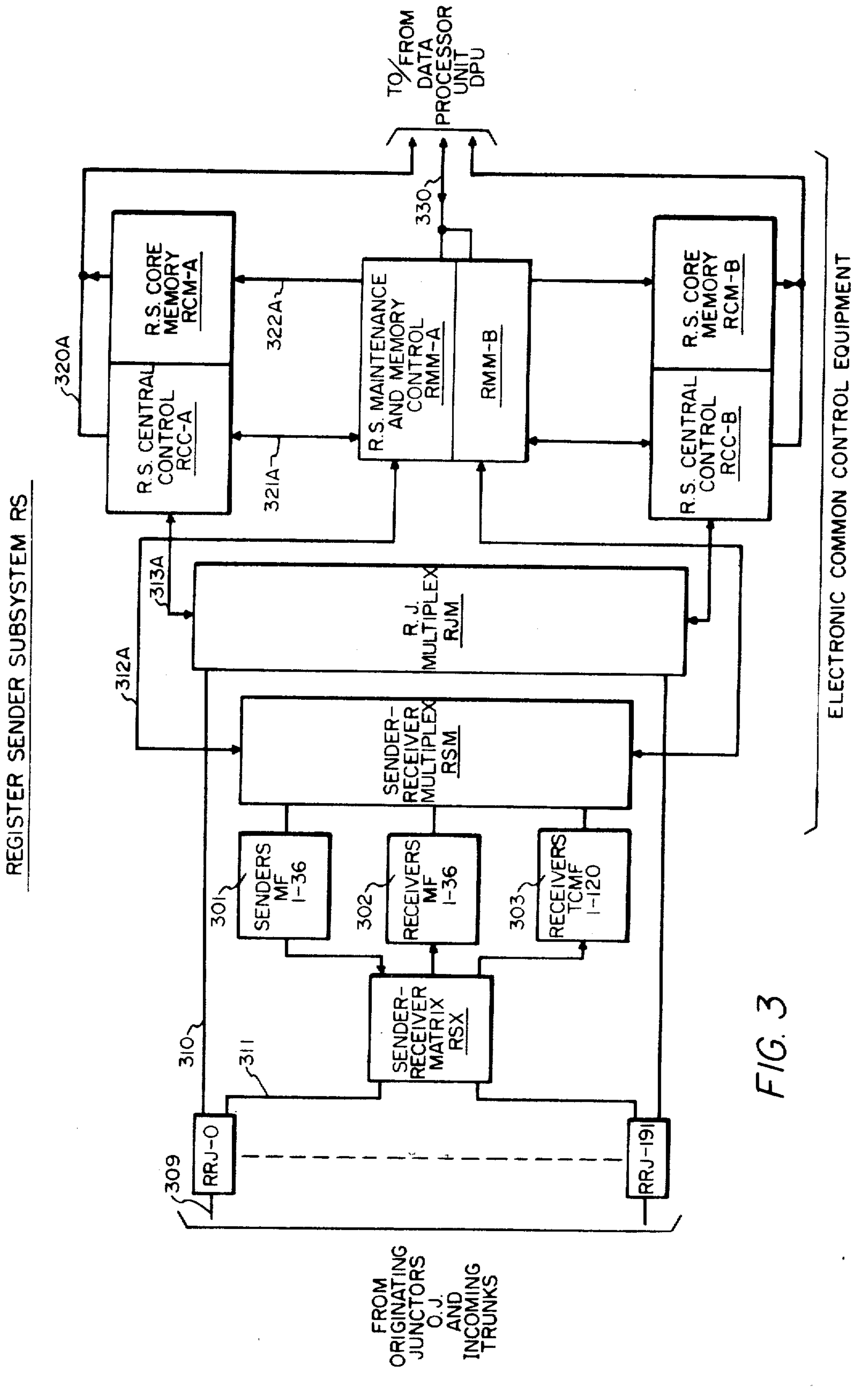
FIG. 3 is a block diagram of the register-sender subsystem.

Referring to FIGS. 2 and 3, the register-sender RS is a time-shared common control unit with the ability to register and process 192 calls simultaneously from local lines or incoming trunks. The register-sender RS provides the electronic time-shared register apparatus for receiving and storing incoming digits, and pulse generating sender circuitry to forward a call toward its destination. In this regard, the register-sender RS generally includes a plurality of register junctors RRJO-RRJ191 which are space-divided electromechanical access circuits for providing an interface between the switching matrices of the system and the time-shared register apparatus, which includes the electronic logic of a common logic control 202, a ferrite-core memory RCM to store digits to be received and sent via the register junctors RRJ, and supervisory information pertaining to the call under the control of the common logic control 202. A sender-receiver matrix RSX selectively connects a plurality of tone receivers and senders 301–303 to the register junctors RRJ for signaling modes other than the dial pulse mode which is provided for by the register junctors RRJ.

The time-shared common logic control 202 of the register-sender is duplicated and runs identical operations in synchronism with one another. Under normal conditions, both sets of time-shared equipment are partially active, one set serving one-half of the register junctors RRJ and the other set serving the remaining half of the register junctors RRJ. In case of equipment faults, either set of time-shared equipment can serve all of the register junctors RRJ.

The space-divided equipment of the register-sender includes the register junctors RRJ, the senders and receivers, and the sender-receiver matrix RSX. The register junctors RRJ with their associated multiplex equipment RJM provide an interface between the space-divided matrix outlets connected to the register junctors RRJ and the time-shared common logic control 202. The sender-receiver matrix RSX provides a metallic path from the register junctors RRJ to the tone senders and receivers under the control of the common logic control 202. The senders 301 provide for sending in the multifrequency mode, and the receivers provide for receiving in either the touch-calling multifrequency mode from the local lines or the multifrequency mode from the incoming trunks 152.

The register junctors RRJ are the entry and exit point of the register-sender for information transferred between the switching network and the register-sender. The register junctors enable the register sender to provide the following features: dial pulse receiving and sending, coin and party testing, line busy, dial tone, and reorder tone application. The incoming and outgoing matrix paths are held by the register junctors RRJ during call processing. The register junctors comprise electromechanical components for compatibility with lines, trunks, and switching network circuits, however they also include electronic interfacing circuits which are similar to those in the markers for compatability with the electronic common logic control 202. Signals from lines, trunks, and network circuits are received by the register junctors and forwarded to the common logic control for processing.

The common logic control 202 contains the control logic for call processing by the register sender 200. The purpose of the common logic control 202 is to perform all functions associated with receiving, sending, and timing of digits, and to control processing of calls by generating commands for other circuits in the register-sender and for the switching network. Since the common logic control 202 operates on a time-shared basis to store call processing information in the memory RCM, the common logic control 202 has the ability to register and process 192 similtaneous calls. The common logic control works closely with the core memory RCM which together form the register apparatus of the present invention, and which provides storage of information concerning the calls in progress and information relating to the data processor unit 130.

The core memory RCM is a conventional ferrite core memory, which need not be disclosed in detail. The memory RCM automatically restores the information in the same cores after a read operation, and it likewise automatically clears the information from the cores immediately prior to writing information into them. It is to be understood that the memory RCM could also be any suitable type of non-destructive read-out memory.

The common logic control 202 of FIG. 2 includes duplicated pairs of electronic logic units. As shown in FIG. 3 the common logic comprises a duplicated pair of central control units RCC-A and RCC-B, duplicated core memories RCM-A and RCM-B, and a maintenance and memory control which comprises a duplicated pair of units RMM-A and RMM-B. The units are provided in duplicate for reliability purposes, and each of the duplicated units functions independently as described hereinafter in greater detail. The central control units are connected to the register junctors via an RJ multiplex unit RJM, and the senders and receivers 301–303 are connected to the maintenance and memory control unit via sender-receiver multiplex unit RSM. The central control unit RCC-A along with core memory RCM-A comprises one frame of equipment, and similarly the units RCC-B and RCM-B are another frame of equipment, while the maintenance control units RMM-A and RMM-B together comprise a frame. The multiplex units each comprise several frames of equipment. The different frames are interconnected via cables which together with driver and receiver circuits terminating them form DC links between the frames.

Figure 4:
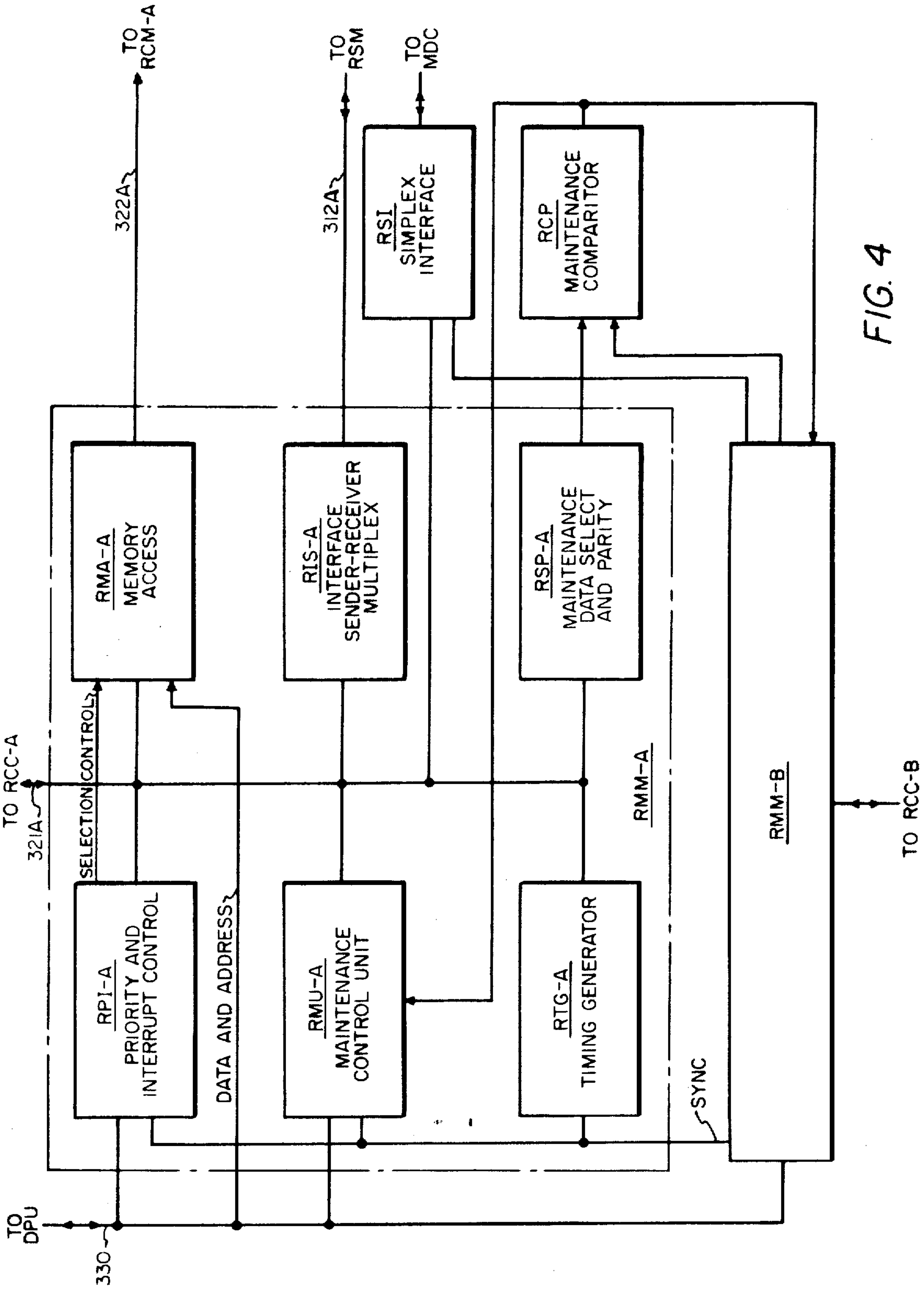
FIGS. 4 and 5 are more detailed block diagram of portions of the register-sender subsystem.

As shown in the block diagram of FIG. 4, the RMM frame comprises some maintenance circuits and some of the common logic circuits for call processing. The maintenance circuits consist of a maintenance control unit RMU, a maintenance data selector and parity generator RSP, and a maintenance comparator RCP. The purpose of the maintenance circuits is to supervise overall operation of the common logic circuits of the register-sender subsystem and to accomplish certain maintenance routines under hardware control and direction of the data processing unit.

The maintenance control unit RMU controls the overall operation of maintenance functions with one of the common logic units and is therefore duplexed, comprising unit RMU-A for operation with the common logic A units, and a corresponding unit as part of RMM-B.

The duplexed maintenance data selector and parity circuits RSP-A and the corresponding unit in block RMM-B has several functions. It selects which data is to be compared during the cycle and gates it to comparison gates, and gates maintenance signals that have to be stored in memory. The unit RSP also generates parity for data and address information going to memory.

The maintenance comparator RCP is a simplex unit which compares the data sent to it from the duplicated RSP units.

The main purpose of the simplex interface circuit RSI is to provide interface between the register sender subsystem and a maintenance unit MCC not shown. In addition to this interface purpose, the circuit also controls the selection of timing signals depending upon the number of register junctors which are busy, for fast or slow time out.

The register timing generator comprising unit RTG-A and a corresponding unit in block RMM-B supplies timing pulses for the multiplex operation of the register sender subsystem.

The unit RIS-A and a corresponding unit in block RMM-B operate with the sender receiver multiplex circuit RSM to provide the multiplex functions between the common logic and the senders and receivers.

The memory access circuit RMA-A and the corresponding duplex unit in block RMM-B provides the access to core memory on a multiplex basis. It provides data multiplex, address multiplex and command multiplex (start read/start write). Output to the register core memory RCM is on a data bus, address bus and command bus shown as cable 322A. Multiplex commands are controlled by the RPI circuit.

The duplexed priority interrupt circuit RPI-A and the corresponding unit in block RMM-B has the basic control of memory during all operations except maintenance. On a priority basis it determines which source of data and address will be allowed to access memory, generates the read and write commands for call processing, controls writing hardware programs, and provides cross write controls and controls interrupts sent to the data processing unit. All of these functions are duplexed and checked by the maintenance circuits.

The prirority interrupt circuit RPI and the memory access circuit RMA are described in detail in said REGISTER-SENDER MEMORY CONTROL patent application.

Figure 5:
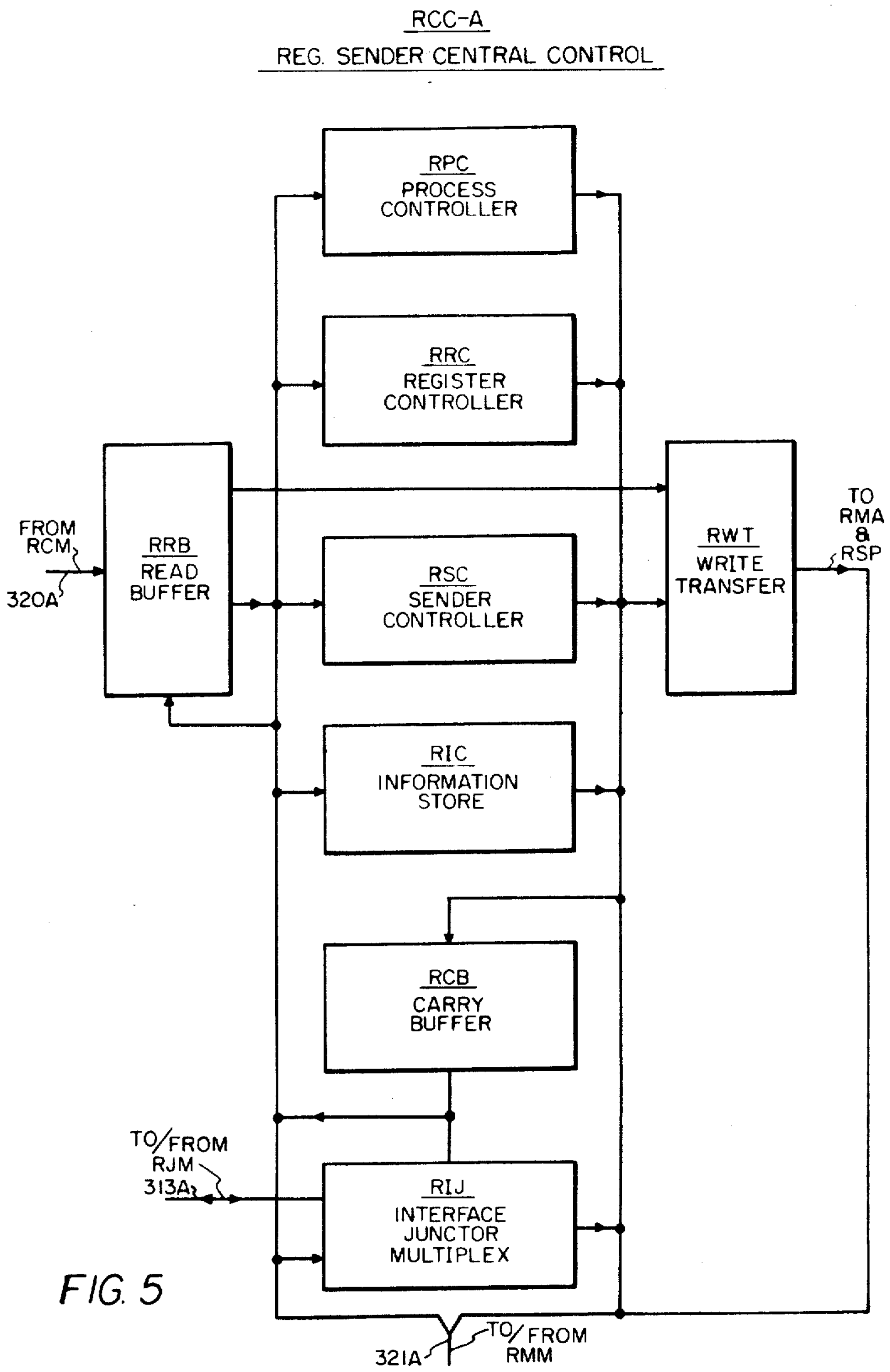

The circuits of the frame RCC-A are shown in block diagram of FIG. 5.

The read buffer RRB is a 52-bit register. This circuit is used for temporary storage of two words from a row of the register core memory. The registers are latch circuits that make the data available to the controller circuits, the carry buffer circuits, and the write transfer circuits. The latches correspond to the positions of memory, and are designated RRB-A1 through RRB-L4.

The write transfer circuit RWT comprises 48 bit selective input devices. There are eight pairs of inputs and a clear memory circuit used to present data to the memory access circuits RMA. The write transfer circuits RWT can have as its source the different controllers shown in FIG. 5, the read buffer, and for clear memory the carry buffer RCB. The outputs from the write transfer circuit RWT are multiplexed with other sources by circuit RMA for writing into the core memories RCM.

The process controller RPC is used to control the process of a call. This unit takes information from the first row of a core memory block and information from the register junctors via the multiplex circuit RJM and RIJ. The controller RPC furnishes much of its data to the carry buffer RCB for controlling other memory word operations. Changes of this processing information are restored to the memory during sub-time slot Y9. The RPC processor also generates the call processing interrupts to the data processing unit.

The register controller RRC is used to manipulate register junctor information, primarily for call origination functions. This unit takes its information from row two of the memory or from the carry buffer RCB. The processor RRC controls the dial tone application, party testing, digit reception, and start dial signal controls. The results of the data from the RRC processor are used for manipulation in other controllers via the carry buffer RCB, for origination identification from the register junctors via the multiplex circuits RJM, via the multiplex circuits for digit reception, or is written back into memory for storage and later use.

The sender controller RSC is used to manipulate register junctor information primarily for call termination and sending functions. The processor RSC deals with information found in row 3 of the memory. This controller contains information as to start dial signals, method of digit sending, the digit being sent and the pulse count that has been sent of pulse digit; and the sequence of digit sending as to prefix digits, called number and calling number information.

The information storage controller RIC is used for data manipulation in rows 4, 5, 6, 7, and possibly 8 of the memory. The information that is handled consists of digit loading, shifting, retrieval and pattern recognition to and from appropriate places in core memory. Further data is used to set up special actions when particular conditions are recognized.

The carry buffer RCB is a series of latch circuits. There are 60 carry buffer latches. The majority of these latches are used to transfer bits of information from one call processing controller to another controller during different sub-time slots of a time slot period. The normal carry buffer information is not carried over from one time slot to another with exception of the BY latch, which indicates that a sender or receiver connection is in progress and prevents any other from attempting a connection until completion of the first.

The interface junctor multiplex unit RIJ operates with the junctor multiplex circuits RJM of FIG. 3 for multiplex to and from the register junctors.

C1. Register Timing Generator

Figure 6:
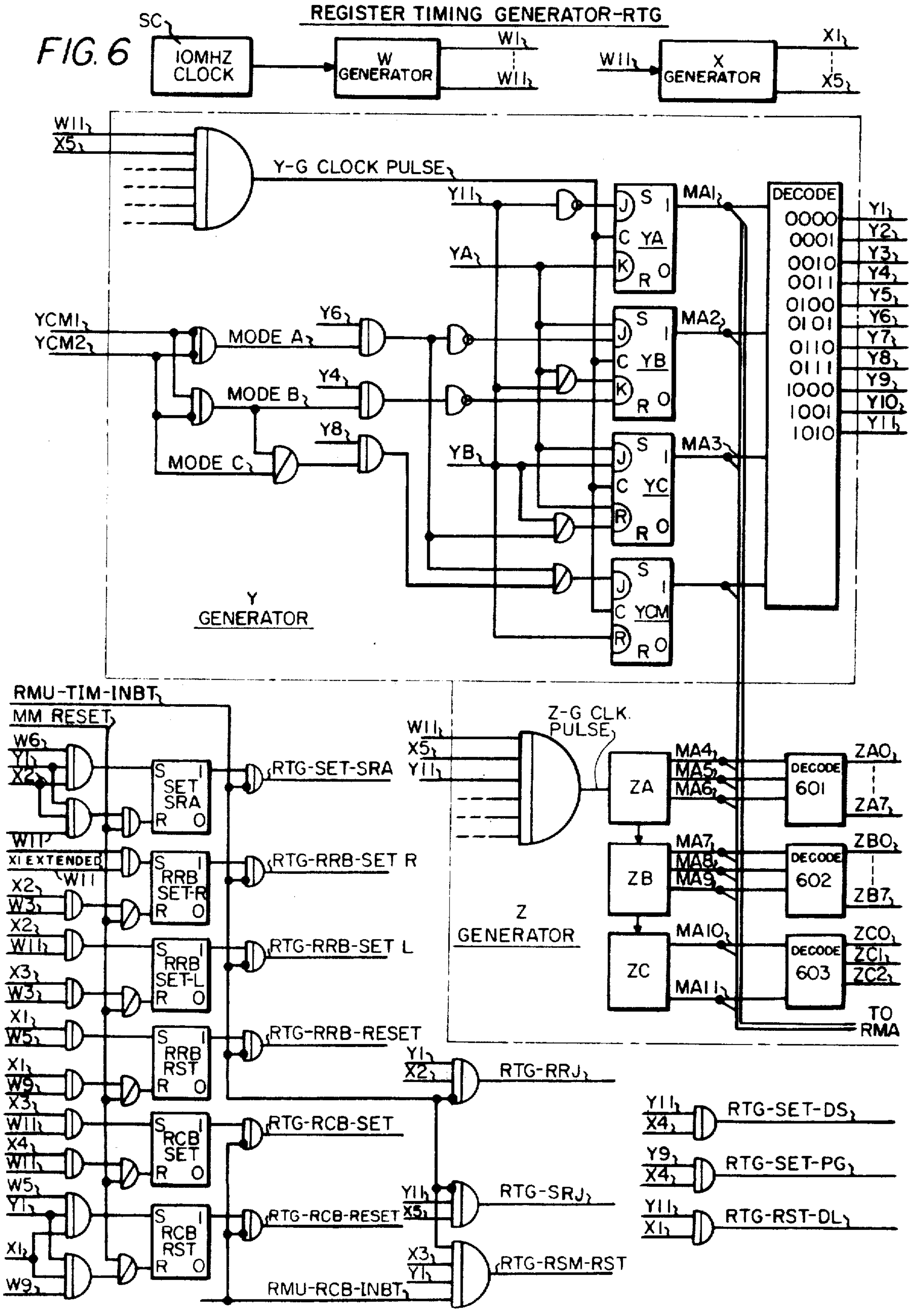
FIG. 6 is a functional block diagram of the register timing generator.

The register timing generator RTG is shown by a functional block diagram in FIG. 6.

A 10-megahertz system clock SC is used for the register sender subsystem as the source for timing pulses. The system clock SC consists of two identical circuits which are wired for redundant operation, so that if one fails the other will continue operation. One circuit functions as the main system clock while the other functions as a standby clock. Both circuits operate continuously but the output of the standby clock is inhibited as long as the main system clock is functioning properly. The system clock that is providing the output pulses furnishes timing pulses to the duplexed register sender common logic units.

A W generator shown as a single block in FIG. 6 is an 11-flip-flop ring counter, having respective outputs W1 through W11. The W generator uses the 10-megahertz clock SC for its source. Each output pulse from the W generator has a duration of 100 nanoseconds and a cycle rate of 1.1 microseconds.

An X generator shown as a single block in FIG. 6 is a five-flip-flop ring counter, having respective outputs X1 through X5. The X generator uses the 10-megahertz clock output and the signal on lead W11 combined via an AND gate as its source. Each output pulse has a duration of 1.1 microseconds with a cycle rate of 5.5 microseconds.

A Y generator shown in FIG. 6 with more detailed functional blocks comprises three-flip-flops YA, YB and YC, and a separate count modification flip-flop YCM. The Y generator can operate in three count modes. Mode A allows decodes of signals on output leads Y1 through Y6 and Y9 through Y11, mode B permits decodes on output leads Y1 through Y4 and then Y7 through Y11, and mode C provides decoder outputs on Y1 through Y11. The drive circuit for the Y generator is derived from the signals on leads X5, W11, and the clock. The mode of the Y counter is determined by the common logic and maintenance unit circuits. The direct outputs of the flip-flops YA, YB and YC provide signals on the memory address leads MA1, MA2 and MA3 respectively.

A Z generator is an eight-flip-flop binary counter shown in FIG. 6 by three blocks with three-flip-flops in blocks ZA, three-flip-flops in block ZB, and two-flip-flops in block ZC. These flip-flops have respective outputs connected to memory address leads MA4 through MA11. The outputs from the ZA block are decoded as signals on leads ZA0 through ZA7, those from block ZB on the outputs ZB0 through ZB7, and those from ZC on leads ZC0, ZC1 and ZC2. The Z counter is advanced by the output of an AND gate having inputs on leads Y11, X5, W11, and the clock. There are 202 steps of the Z generator 0 through 201, and the cycle time is basically 10 milliseconds.

The timing generator RTG also includes several latches shown in FIG. 6 for supplying set and reset control signals to other latches of the common logic and multiplex circuits.

The timing generator also includes a 100 millisecond timer ITT and a second timer LTT not shown in FIG. 6. The timer ITT is a four-flip-flop binary counter, clocked by the decode of output 201 from the Z generator and upon reaching a binary count of 10 is reset. The one second timer LTT is a four-flip-flop binary counter which is clocked by the decode of output 10 from the 100 millisecond timer and upon reaching a count of 10, resets itself.

Figure 7:
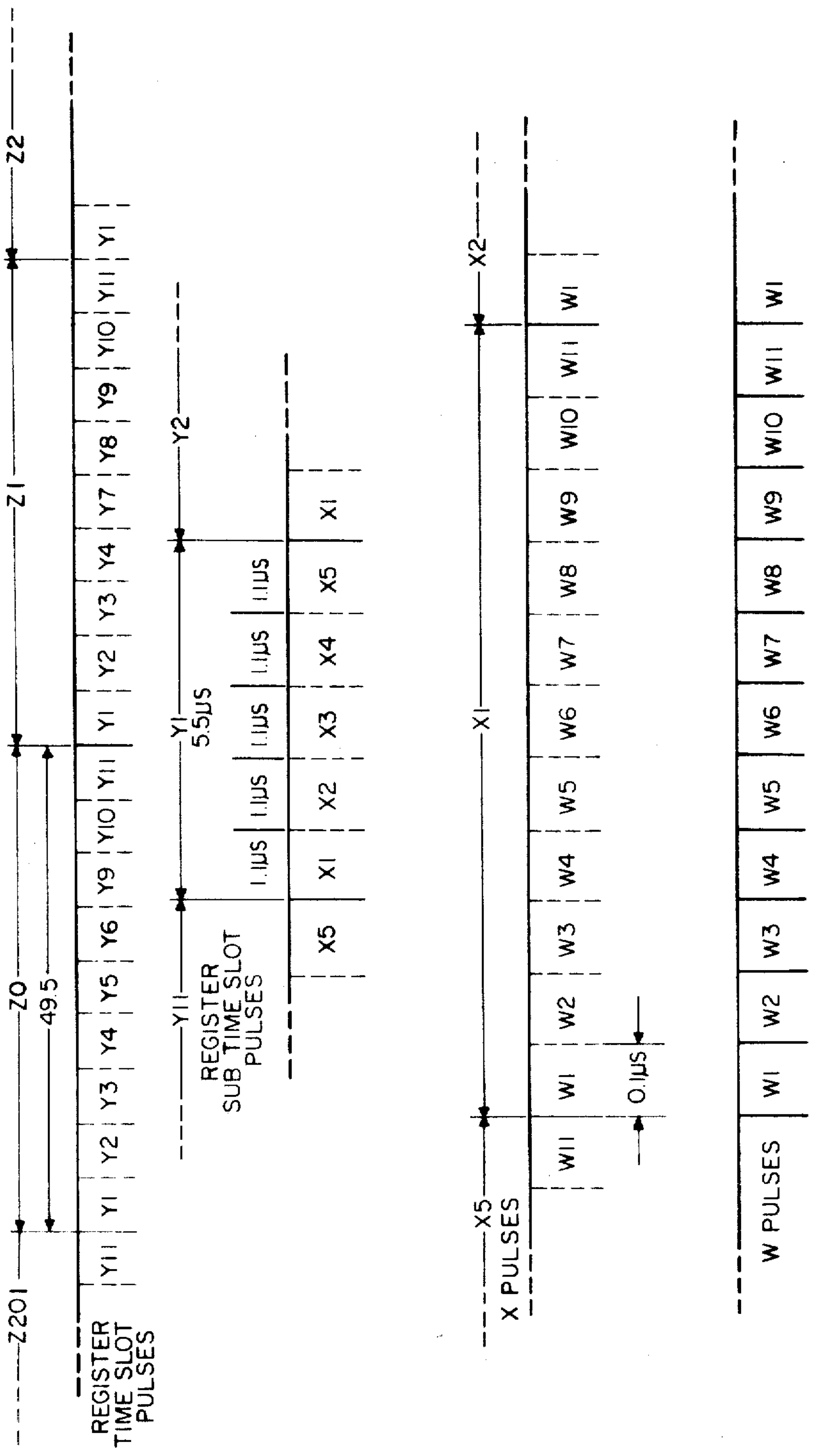
FIG. 7 is a timing chart for the register timing generator.

The timing relationship of the outputs of the register timing generator are shown in graphical form in FIG. 7. The timing can be summarized as follows:

a. A 10-millisecond system cycle time;

b. The overall cycle (10ms) divided into 202 time slots pulses Z0–Z201 (49.5 microseconds each), 192 of which are used for call processing and 10 of which are reserved for maintenance purposes;

c. Each time slot pulse divided into 11 sub-time slot pulses Y1–Y11 (5.5 microseconds each) nine of which are utilized during each time slot pulse of normal call processing, mode A being shown on the chart for time slot Z0, and mode B being shown for time slot Z1;

d. Each sub-time slot pulse divided into 55 pulses (0.1 microseconds each) comprising five pulses X1–X5 of 1.1 microseconds each, each divided into one W pulses W1–W11 of 0.1 microseconds each. The 55 combinations of X and W timing pulses can be utilized for accessing the memory and different logic circuits during various different times of a single sub-time slot.

Note that the memory address comprises 12 bits of which bits MA4–MA11 designate the Z time slot corresponding to a particular register junctor, bits MA1, MA2 and MA3 designate a particular row of memory of the eight rows assigned to a register junctor and the right or left hand word store of a row is determined by a bit MA0 which is obtained from a flip-flop in the register priority and interrupt circuit RPI. Note from the sub-time slot decoding arrangement that sub-time slots Y9, Y10 and Y11 have the same memory addresses respectively as sub-time slots Y1, Y2 and Y3; and that the decoded outputs are differentiated by the fact that flip-flop YCM is in the set condition for sub-time slots Y9, Y10 and Y11. The binary designation in the decoding block shows the least significant bit MA1 on the right, and the state of YCM on the left.

D. REGISTER-SENDER MEMORY LAYOUT

The layout of FIG. 8 designates the storage of information in the 16 word stores of a block assigned to one register junctor. This section describes the individual fields, using mnemonic headings as shown in FIG. 8. They are explained in the following manner under each mnemonic:

1. Name corresponding to the mnemonic symbol
2. Location in the memory by word designation and bit position
3. Functional description
4. Control
5. Timing
6. Cross reference and inter-related fields
7. Comments In this description the designation DP refers to the data processing unit, and the designation RS refers to the register-sender subsystem. Note that the control by the DP means that the data processing unit by direct access to the register-sender core memory RCM writes information into a particular word store of a particular register junctor, while control from the RS means that processing in the register-sender common logic circuit provides information stored into the memory during the regular multiplex cycle. The information from the data processing unit is supplied on a random access basis to the memory, with an interlock arrangement to prevent the informaiton being supplied during the time slot for the corresponding register junctor. The data processing unit also reads information by direct random access to the register core memory in response to interrupt signals from the register-sender subsystem. This section may be skipped over in reading the description without loss of continuity, and used for reference in reading the subsequent Boolean logic equations and operational description. The mnemonics appear in alphabetical order.

ANI 1.0 Name
Automatic Number Identification 2.0 Location
Word 2B
Bit Position G1

3.0 Functional Description
The ANI is an internal RS field indicating that the RS is in the process of receiving (or has received) the calling number. The ANI field is set as a function of SDS = 5 being set by the DP, receiver being connected (if necessary) and the ANI - Start Identification signal (change to off-hook) being returned to the originating trunk.

4.0 Control
4.1 Set by RS (RRC equation 39)
4.2 Reset by RS at disconnect time 5.0 Timing
None 6.0 Cross Reference
SDS, N1–1ϕ, EOH

AOG 1.0 Name
Assigned Matrix Outlet Group 2.0 Location
Word 1A
Bit position C4, D1, D2

3.0 Functional Description
The AOG is used by the DP to specify to the RS the type of unit on the outlet of the Sender-Receiver Matrix that is to be connected to the RRJ for sending or receiving. The values of the AOG field are:
AOG = 0 – No connection needed
AOG = 1 – TCMF receiver
AOG=2 – MF receiver
OAG,B2A 3 – Spare
AOG=4 – MF sender
AOG=5, 6, 7 Spare
The AOG field will also be used to specify the length of timing for unit selection and attachment time-out. The AOG field will be generated by the DP as a function of the MDR and the MS1 to MS3 fields.

4.0 Control
4.1 Set by the DP
4.2 Reset by DP or by RS as part of normal disconnect.

5.0 Timing
5.1 The AOG field and the Start Assignment Timing field (SAT) must be written in RS memory prior to the writing of IN = 2 for attaching a unit (receiver) for receiving the called number. The DP can write the CRS and SRA fields at the same time or any time before the assignment time-out (5 to 50 sec).
5.2 The AOG and SAT fields must be written in the RS memory after the entire called number is received, attaching a receiver to receive the calling number. The DP should not write FD until the entire calling number is received. Once an idle unit is selected, the DP must write the CRS and SRA fields in RS memory.
5.3 The AOG and SAT fields must be written in the RS memory prior to or at the same time as FD for attaching a sender. Once an idle unit is selected, the DP must write CRS and SRA. After the RS attaches the sender it will interupt the DP with TRI = 4 (sender connected). Attachment of a sender to send the prefix digits, the called number, or the calling number will take place before any sending starts.

6.0 Cross Reference
6.1 SRA, CRS, SAT, CTR

ARR 1.0 Name
Alternate Route Retrial 2.0 Location
Word 1A

Bit Position B3

3.0 Functional Description

The ARR field indicates to the RS that a change in mode of sending is required but no terminating path disconnection is necessary. The ARR field is set only by the DP. The DP will use the ARR field when an alternate route requires a sender disconnection and either no terminating path was established, or the established path need not be released. IN=14 shall also be stored in RS memory in the above case. The DP will also use the ARR field when an alternate route requires a sender connection and no terminating path is established. If a section of the terminating path was pulled and a sender connection is required, IN=6 would be used instead of ARR. The DP will use the ARR field when, for the case of early outpulsing, the disconnection of a receiver is necessary becasue the alternate route requires a sender and either no terminating path was established, or the established path need not be released. IN=14 shall also be stored in RS memory in the above case. The ARR field is also used when a busy tone timeout occurs (TRI=5) and the establishment of a terminating path is required. The ARR field is reset by the RS after completion of the required connection or disconnection.

4.0 Control 4.1 Set by DP 4.2 Reset by RS 5.0 Timing 5.1 The IN=14 instruction shall be stored in the RS memory either prior to or at the same time as ARR if a disconnection is required.

5.2 The SAT or CRS field must be stored in the RS memory either prior to or at the same time as ARR if a sender connection is required.

ASD 1.0 Name

Apply Start Dial 2.0 Location

Word 2B

Bit Position G4

3.0 Functional Description

The ASD is an internal RS field used to control the JC3 lead thru the RRJ to the Trunk circuit. The ASD is used to:

1. Return a Wink Start Pulse Signal to the originating office.

2. Remove Stop Dial (Reverse battery) signal on a Stop and Start trunk to the originating office.

3. Return ANI-Start signal (change to off-hook) to originating office.

4.0 Control 4.1 Set by RS (RRC equations 20, 21, 42). 4.2 Reset by RS (RRC equations 22 or 43).

5.0 Timing None 6.0 Cross Reference 6.1 SDS

BP1, BP2

1.0 Name Break Period 1 and 2

2.0 Location

Word 2B

Bit Position

BP1 - J1

BP1 - J2

3.0 Functional Description

The two RS internal control fields, along with DP1 and DP2, are used by the RS to register a valid dial pulse in the dial pulse mode of receiving, BP1 indicates at least one break condition of the line has been recorded while PB2 indicates that a break condition has been recorded twice, each break condition lasting 10 ms.

4.0 Control 4.1 Set by RS BP1(RCC -equation 1) BP2 (RCC -equation 2)

4.2 Reset by RS (RCC -equation 6)

5.0 Timing

None 6.0 Cross Reference

DP1, DP2, PAR, IPR, PIT, MDR 7.0 Comments

Refer to digit receiption, section 6.

CAB 1.0 Name

Call Abandoned 2.0 Location

Word 2A

Bit Position E4

3.0 Functional Description

The CAB field, along with the TRI & TO fields, are used by the RS to indicate the cause of a Translation interrupt. The CAB bit is set whenever the RS determines the subscriber has abandoned the call (on hook condition for more than 150ms). The CAB bit is set by the RS whenever the abandoned condition is recognized, however, the RS will only initiate a Translation interrupt if WFT and RQT are reset i.e., no previous translations in process (See section 3) If WFT and RQT are reset, the RS will initiate a Translation Interrupt and the CAB field will be written in the Translation Interrupt word when the interrupt is idle.

4.0 Control 4.1 Set by RS (RCC-equation 5)

4.2 Reset by DP.

5.0 Timing

The CAB interrupt must be of high priority since the originating subscriber has not been released and therefore may not re-originate. The most common response of the DP to a CAB interrupt will be an IN = 11. However, different actions may be required for particular cases e.g. IN = 7 on a call from a coin line or no instruction (other than resetting CAB and setting CTR) on a reverting call (depending on the reverting call arrangement for the office) to prevent release on a premature disconnect. No action that will cause the RS to begin disconnection shall be initiated by the DP on a CAB interrupt while the Terminating Marker is setting up a connection. The CAB field must always be reset by the DP prior to setting the CTR bit in order to avoid a new CAB interrupt.

6.0 Cross Reference 6.1 TRI, TO 6.2 Section 3

CB 1.0 Name

Coin Box 2.0 Location

Word 2A

Bit Position C1

3.0 Functional Description

This one bit control field is used by the DP to indicate that the call is from a coin telephone and that a coin test is required. For a call originated from a dial coin telephone, the RS will make a coin test at the first interdigital period; if a coin is not detected it will repeat the test during the second interdigital period and similarly if the coin is not detected will test at the third interdigital period. For calls originated from touch calling coin telephones the RS will make the coin test as soon as the DP gives the RS and IN = 14. The result of the coin test is written in the Party 2 (P2) field by the RS after the test is complete.

4.0 Control 4.1 Set by DP as a function of class of service translation 4.2 Reset by RS after completion of test 5.0 Timing 5.1 CB must be written in the RS memory prior to the writing of IN = 2 (originating frame translation complete)

6.0 Cross Reference 6.1 P2, IN = 14, TSC, MDR = 1

CMD 1.0 Name

Conditional Matrix Disconnect 2.0 Location

Word 4A

Bit Position F1

3.0 Functional Description

The CMD field is a one-bit instruction field used by the DP to instruct the RS to disconnect the receiver if a digit greater than 11 is received in the MF mode of receiving or a match is found between TL and IDC. If either or both of these conditions are met (and CMD is set) the RS will disconnect the receiver prior to initiating a Translation interrupt. This instruction eliminates the need for an extra interrupt for disconnecting the receiver, and as such, should be used whenever possible.

4.0 Control 4.1 Set by DP 4.2 Reset by RS at RJ disconnect time if not reset sooner by the DP 5.0 Timing 5.1 The CMD instruction should be written in RS memory at the same time the instruction to return for the final digit translation is given.

6.0 Cross Reference 6.1 DRS, TRI, IDC, TL 7.0 Comments 7.1 The RS will set DRS if the disconnection conditions are met.

7.2 The RS will return with TRI = 1 or 3 when CMD is given (not TRI = 7).

7.3 The CMD instruction should not be used for calls originated from coin telephones.

CMS 1.0 Name

Current Mode of Sending 2.0 Location

Word 3B

Bit Positions G2, G3

3.0 Functional Description

The CMS field is an internal RS field used during sending to indicate the current mode of sending for that particular group of digits, either DP or MF. The CMS field is set (or modified) by the RS in the starting states (SLS = 1, 16, 48) equal to one of the MS1 to MS3 fields.

4.0 Control 4.1 Set by RS (RSC-equations 19, 22, 25)

4.2 Reset by RS 5.0 Timing

None 6.0 Cross Reference 6.1 SLS 6.2 MS1, MS2, MS3

7.0 Comments

CMS may change states several times during the course of sending. The status of CMS is strictly dependent upon the class of trunk.

CRS 1.0 Name

Connect Receiver or Sender 2.0 Location

Word 1A

Bit Position C3

3.0 Functional Description

The CRS field is used by the DP to instruct the RS to attach a particular unit (sender or receiver) on the outlet of the Sender-Receiver Matrix to the RRJ. The unit type is specified by the AOG field and the unit number (address) is specified by the SRA field.

4.0 Control 4.1 Set by DP 4.2 Reset by RS after unit is attached (RPC-equation 18)

5.0 Timing 5.1 The CRS and SRA fields are written in RS memory after the DP has selected an idle unit of the type specified by the AOG. The AOG field is written in the RS memory prior to the CRS to allow the RS to time the selection and attachment function.

5.2 There will be no DP interrupt for attaching a receiver for receiving the called or calling number.

5.3 The RS will interrupt the DP after all sender attachments.

5.4 Unless the SAT field is used, the CRS field must be stored in the RS memory prior to or at the same time as the IN = 2, SDS = 5, or FD fields.

5.5 If an IN = 6 instruction is used, the CRS field must not be stored in the RS memory until a TRI = 8 interrupt is generated by the RS.

6.0 Cross Reference 6.1 AOG, SRA, SAT 7.0 Comments 7.1 The CRS field will not be reset by the RS if an assignment time out occurs.

CSS 1.0 Name

Connect Sequence State 2.0 Location

Word 1B

Bit Position – J1, J2, J3

3.0 Functional Description

The CSS field is an internal RS counter field used to sequence the operation of the Sender-Receiver Matrix connection function.

4.0 Control 4.1 Set by RS (RPS equations 10, 12)

4.2 Reset by RS (RPC E)

5.0 Timing 5.1 After starting operation the CSS is incremented every 10ms.

5.2 If CSS = $\phi$ within 70ms, a timeout will occur.

6.0 Cross Reference
AOG, SRA, CRS, PG
7.0 Comments
Only one memory block's CSS field may be operating at any given time.

CTL
1.0 Name
Close Terminating Loop
2.0 Location
Word 3A
Bit Position E4
3.0 Functional Description
The CTL field is used by the DP to instruct the RS to close the Terminating Loop as soon as the IN = 4 (Working with TM - last path) instruction is stored in the RS memory. It will operate the OP relay so that the TM can make continuity checks.
4.0 Control
4.1 Set by DP
4.2 Reset by RS at disconnect time (final clearing of memory).
5.0 Timing
The CTL field must be written in the RS memory either prior to or at the same time as IN = 4.
6.0 Cross Reference
6.1 IN, OP, SD, ST
7.0 Comments
7.1 The RS will close the terminating loop if CTL is set or if sending is required (EOS ≠ 0).

CTR
1.0 Name
Completed Translation Request
2.0 Location
Word 1A
Bit Position B4
3.0 Functional Description
The CTR field is used to indicate (to the RS) the completion of a translation. This bit is set by the DP after the translation is completed and the results of the translation are written in the RS memory. The CTR is also used to stop the RS timing of the Terminating Marker operation and initiate a 5 second timing for the updating of the IN field. (see IN).
4.0 Control
4.1 Set by the DP to indicate translation complete.
4.2 Reset by RS. If WFT is set when CTR is set, the RS will reset both at the same time.
5.0 Timing
5.1 The CTR bit should not be written until the entire results of the translation are written in the RS memory.
6.0 Cross Reference
6.1 Section 3
6.2 WFT, RQT, IN CTT
1.0 Name
Cut-Through Type
2.0 Location
Word 4A
Bit Position D2, D3, D4
3.0 Functional Description
The three bit CTT field is used by the DP to specify the manner in which the call should be cut through in either the incoming trunk or the originating junctor. The CTT field is also used when IN = 7 (lockout instruction) is given. The CTT field will be specified by the DP as a function of the originating and terminating class of service. The RS will use the CTT in setting the three junctor control leads, JCl-3 at cut-through or lockout time.
D2 - Busy
D3 - Regular
D4 - Impedance match
4.0 Control
4.1 Set by DP
4.2 Reset by RS at disconnect time
5.0 Timing
5.1 CTT must be written in RS memory prior to the writing of IN = 10.
6.0 Cross-Reference
6.1 JC1 to JC3, IN = 7.

DCX
1.0 Name
Data Collection X time
2.0 Location
Word 4B
Bit Positions K2, K3
3.0 Functional Description
The DCX field is a maintenance field used by maintenance programs to indicate to the RS maintenance hardware the proper X time slot in which the data collection sequence is to be initiated. The Y time slot is indicated by DCY. This information is stored in the memory block of the RRJ which is scanned just before the RRJ time slot in which data collection is to take place.
DCX = ϕ indicates that no data collection is to take place.
DCX = 1 indicates X3, DCX = 2 indicates X4, and DCX = 3 indicates X5.
4.0 Control
4.1 Set by DP
4.2 Reset by RS on the next scan of that memory word.
5.0 Timing
The DCX field must be written at the same time as the DCY field.
6.0 Cross Reference
DCY See maintenance section of RS A size book
FB
SB DCY
1.0 Name
Data Colllection Y time
2.0 Location
Word 4B
Bit Positions L1, L2, L3, L4
3.0 Functional Description
The DCY field is a maintenance field used by maintenance soft-ware programs to indicate to the RS maintenance hardware the Y time slot in which the data collection sequence is to be initiated. The X time slot is indicated by DCX. This information is stored in the memory block of the RRJ which is scanned just before the RRJ time slot in which data collection is to take place. DCY values ϕ through 1ϕ are used to respresent Y values 1 through 11. DCY values 11 through 15 are not used.
4.0 Control
4.1 Set by DP
4.2 Reset by RS on the next scan of the memory word.
5.0 Timing The DCY field must be written at the same time as the DCX field.
6.0 Cross Reference
DCX, FB, SB, see mantenance section of RS A size book DP1, DP2
1.0 Name
Dead Periods 1 and 2
2.0 Location
Word 2B
Bit Position
DP1 - J3
DP2 - J4
3.0 Functional Description
These two RS internal control fields, along with BP1 and BP2, are used by the RS to register a valid dial pulse in the dial pulse mode of receiving. These two bits inhibit the recording of the loop condition for 20ms after a break condition has been recorded twice.
4.0 Control
4.1 Set by RS DP1(RCC-equation 3), DP2(RRC-equation 4)
4.2 Reset by RS (RRC-equation 6)
5.0 Timing
None
6.0 Cross Reference
BP1, BP2, PAR, IPR, PIT DRS
1.0 Name
Disconnect Receiver - Sender
2.0 Location
Word 1B
Bit Position I3
3.0 Functional Description
The DRS field is an internal RS control field used to control the disconnection of a unit on the Sender-Receiver Matrix from RRJ. The DRS field is set as a function of, IN = 14 (disconnect sender or receiver), or as a function of the Conditional Matrix Disconnect (CMD) and the conditions of IDC = TL or reception of the ST digit in the MF mode of receiving, or as a function of a permanent or interdigital timeout (TO).
4.0 Control
4.1 Set by RS (RPC-equation 43 or RCB-DRSC)
4.2 Reset by RS after successful disconnection. (RPC-equations 21, 46, 48, 49, 50)
5.0 Timing
5.1 DRS must be written to advance to PSS = 4.
5.2 DRS must be cleared to exit PSS = 4 & PSS = 10. .
6.0 Cross Reference
SRA, AOG, IN, TL, CMD, TO DS
1.0 Name
Digit Storage
2.0 Location
Word 3B
Bit Position J1, J2, J3, J4
3.0 Functional Description
This is an internal RS buffer field used to store the digit that is currently being sent. Based on the SLS the RS places the digit to be sent in the DS field prior to transferring it to an MF sender or prior to the start of dial pulsing of that digit.
4.0 Control
4.1 Set by RS (RSC-equation 40)
4.2 Reset by RS (RSC-equations 12, 16)
5.0 Timing
5.1 The digit is loaded into DS during Y11 Time.
6.0 Cross Reference
PAS, Row's, 5, 6, 7, CMS, section 7

DST
1.0 Name
Direct Switched Trunk
2.0 Location
Word 2A
Bit Position C2
3.0 Functional Description
The DST field is used by the DP to indicate to the RS that the call originated from a trunk that was switched during an interdigital pause and therefore that interdigital timeout values shall be used rather than permanent timeout values. (Stop and Go Trunk). The DST field also indicates that if digits or pulses were received prior to the completion of the class of service translations, such digits or pulses shall be accepted by the RS and no system trouble indication shall be generated.
4.0 Control
4.1 Set by DP
4.2 Reset by RS at disconnect time
5.0 Timing
The DST field must be stored in the RS memory either prior to or at the same time as IN = 2.
6.0 Cross Reference
PAR, BP1, BP2, DP1, DP2, section 6.

DT1
1.0 Name
Dial tone 1
2.0 Location
Word 2B
Bit Position H4
3.0 Functional Description
This is an internal control field used by the RS to control the application of dial tone in the RRJ. The DT1 bit will be set by the RS as a function of SDS = 3 (Dial tone 1) and internal RS timing.
4.0 Control
4.1 Set by RS (RRC-equation 32)
4.2 Reset by RS (RRC-equation 33)
5.0 Timing
5.1 DT1 causes BD1 to be set in the carry buffer during every Y10 time.
5.2 BD1 in the RCB causes the BD1 relay (K10 ) to be operated in the RRJ.
6.0 Cross Reference
SDS = 3, RRJ
7.0 Comments
Dial tone is two superimposed frequencies 350Hz and 440 Hz.

DT2
1.0 Name
Dial Tone 2 (Distinctive Dial Tone)
2.0 Location
Word 2B
Bit Position H3
3.0 Functional Description This is an internal RS field used to control the application of Distinctive dial tone in the RRJ. The DT2 field is set by the RS as a function of SDS = 4 and internal RS timing.
4.0 Control
4.1 Set by RS (RRC-equation 35)

4.2 Reset by RS (RRC-equation 36)
5.0 Timing
5.1 See DT1
6.0 Cross Reference
SDS = 4, RRJ
7.0 Comments
Distinctive dial tone is dial tone interrupted 120 times per minute.

D1 thru D18
1.0 Name
Called Number Digit Storage Cells
2.0 Location
Word
D1 thru D6 — 6B
D7 thru D12 — 6A
D13 thru D18 — 5B
Bit Position - All bits of the word are used in groups of four.
3.0 Functional Description
These 18 — 4 bit fields are used to store a maximum of 18 digits of called number. The procedure for digit reception in the RS is described in section 6. The manipulation of D1 to D18 for sending is described in section 7.
4.0 Control
4.1 Set by RS and DP
4.2 Modified by RS (shifting) Modified by DP
4.3 Reset by the RS at disconnect time
5.0 Timing
5.1 Any formatting of these 18 digits for sending must be completed before writing IN = 4 in the RS memory.
6.0 Cross Reference
6.1 TL, PAR, PAS, DS, TOP EOH
1.0 Name
Expect Off-Hook
2.0 Location
Word 3A
Bit Position D1
3.0 Functional Description
The EOH field is used by the DP to instruct the RS to wait until a change to off-hook signal (ANI - start identification) is received from a distant office before sending the calling number. The two values of EOH are:
EOH = 1 — wait for off-hook signal
EOH = 0 — off-hook signal is not expected.
4.0 Control
4.1 Set by the DP
4.2 Modified by DP for alternate routes
4.3 Reset by RS as part of normal disconnect.
5.0 Timing
5.1 The EOH field must be written in the RS memory prior to the writing of IN = 4.
6.0 Cross Reference
None EPO
1.0 Name
Early Outpulsing
2.0 Location
Word 1A
Bit Position B1
3.0 Functional Description
This 1 bit field is an instruction to the RS to continue receiving digits and to enter the termination mode. Early Outpulsing is a condition where sending and receiving overlap in time. For Early Outpulsing the EOP field is used instead of the FD field to indicate the start of termination. When Early Outpulsing is used, the RS sets FD based on the TL and FTO instruction fields set by the DP (see FD).
4.0 Control
4.1 Set by the DP after sufficient digits have been received.
4.2 Reset by RS when conditions for setting FD occur.
5.0 Timing
5.1 EOP is set prior to or at the same time as IN = 3 or 4 (DP working with TM).
6.0 Cross Reference
6.1 FD, TL, IDC, FTO
7.0 Comments
The Early Outpulsing function (EOP) can be used only if sending in the dial pulse mode (no sender connection necessary) and receiving in the dial pulse or TCMF mode. When EOP is used and a TCMF receiver is connected, the TCMF receiver will not be disconnected until sending is completed. EOP should not be used when receiving in the TCMF mode from a coin telephone.

EOS
1.0 Name
End of Send
2.0 Location
Word 3A
Bit Position B3, B4
3.0 Functional Description
The EOS field is used by the DP to instruct the RS on when to stop in the sending sequence. There are three different points in the sequence where the sending sequence can be terminated, i.e., after sending the prefix digits, the called number, or the calling number. The coding of the EOS field is as follows:
EOS = 0 - There is no sending required (local call)
EOS = 1 - Stop in Sender Loading Sequence State = 13 (SLS = 13) (for stopping after the prefix digits have been sent)
EOS = 2 - Stop in SLS = 39 (for stopping after the called number has been sent)
EOS = 3 - Stop in SLS = 59 (for stopping after the calling number has been sent)
The End of Send field is set whenever sending is required.
A blank End of Send field will indicate to the RS that no sending is required. (local termination)
4.0 Control
4.1 Set by the DP
4.2 Modified by DP for Alternate routes (retrials)
4.3 Reset by RS as part of normal disconnect.
5.0 Timing
5.1 The EOS field must be written in RS memory prior to or at the same time as IN = 4.
6.0 Cross Reference
6.1 Section 7 SLS, MS1-3
6.2 EOP, FD FB
1.0 Name
Freeze Bit
2.0 Location
Word 1B
Bit Position K1
3.0 Functional Description The FB bit instructs the RS maintenance hardware to inhibit the RS Call Processing hardware from writing into the 16 word memory block dedicated to the junctor being scanned.

4.0 Control
4.1 Set by RS or DP.
4.2 Reset by DP only.
5.0 Timing
None
6.0 Cross Reference
None. See maintenance section of RS A size book.

FD
1.0 Name
Finish Dialing
2.0 Location
Word 1A
Bit Position(s) B2
3.0 Functional Description
This 1-bit field is used to indicate to the RS that all digits have been received. Finish dial is normally set by the DP when it is determined that all digits have been received. The only exception to the above is the case of Early Outpulsing, under which case the RS will set FD based on instructions from the DP. The DP will set the TL field equal to the number of digits expected. Upon a match between the TL and the Incoming Digit Counter (IDC) the RS sets FD. If there are two possible quantities of digits, the TL will be set to the largest quantity and the FTO field will be set to the smaller quantity. This will cause an interdigital time-out if the smaller quantity is received, and this condition will also set FD.
4.0 Control
4.1 Set by DP when it has determined all digits are dialed.
4.2 Set by RS as a function and a match between TL and IDC or an interdigital timeout condition (RCB-FDC).
4.3 Reset by RS as part of normal disconnect.
4.4 Set by DP as a result of the originating class translations indicating a non-dial or hot line (instead of IN = 2).
5.0 Timing
5.1 If a receiver is used on the call, the DP shall not set FD before the receiver has been disconnected.
5.2 If a sender is required the AOG, and SAT fields must be stored in the RS memory either prior to or at the same time as FD.
5.3 If no sender connection is required, the DP may initiate termination of the call (requesting the TM) after loading FD in the RS memory.
6.0 Cross Reference
6.1 Section 7
6.2 EOP FIT
1.0 Name
Fast Interdigital Timing
2.0 Location
Word 4B
Bit Position K4
3.0 Functional Description
The FIT field is an internal RS control field used to specify that fast interdigital timing (4 seconds) should take place for registering the next incoming digit. If an interdigital time out (fast or slow) takes place, the RS will set the TO field and initiate a Translation interrupt. The FIT field is set by the RS as a function of a match between the FTO and TL fields or a zero received and the ZTO field being set.
4.0 Control
4.1 Set by RS
4.2 Reset by RS
5.0 Timing
None
6.0 Cross Reference
FTO, TL, IDC, ZTO FTO
1.0 Name
Fast Time Out
2.0 Location
Word 4A
Bit Position B1, B2, B3, B4
3.0 Functional Description
The Fast Time Out field is used by the DP to instruct the RS to perform one of the following:
3.1 Apply fast timing after the number of digits specified by FTO are received. If an interdigital time out occurs the RS will initiate a Translation interrupt. If the interdigital time out doesn't occur, namely another digit is received, the RS will switch back to normal interdigital timing and will use a different criteria to determine when it should initiate a Translation interrupt. The range of the FTO for this mode of operation is 1 to 14.
3.2 Apply fast timing after every digit received. If an interdigital time out occurs, the RS will initiate a Translation interrupt. The value of FTO for this mode of operation is 15 (fifteen).
4.0 Control
4.1 Set by DP prior to or while digits are being received.
4.2 Modified or Reset by DP as a function of digit processing in DP.
5.0 Timing
5.1 The FTO instruction field should be written in the RS memory prior to the anticipated arrival of the digit specified in the FTO field.
6.0 Cross Reference
FIT, ZTO, IDC, PRF
7.0 Comments
7.1 FTO can be used in conjunction with ZOC, TL, ZTO, and PRF in requesting the RS to initiate a Request for Translation interrupt during the RS digit receiving mode.
7.2 The DP should reset FTO if digits are deleted on the translation following the setting of FTO.
7.3 General accepted use of FTO will be when area codes go to any three digits. When this happens, the DPU will not be able to tell from the first three digits whether an office or area code is being dialed, so the DPU will set FTO to seven and TL to 10.

HC
1.0 Name
Hold Check
2.0 Location
Word 1B
Bit Position I2
3.0 Functional Description
The field is a maintenance trouble indicator field used to indicate an abnormal condition of the Sender-Receiver Matrix during connection or disconnection of a unit. This field will be used for localization of the trouble condition. This field or PC may be set whenever the trouble in Assignment TAS field is set. The timing associated with the connection checking is controlled by the Connection Sequence State (CSS) field.

4.0 Control
4.1 Set by RS (RPC-equations 11, 22, 45)
4.2 Reset by RS 5.0 Timing
None 6.0 Cross Reference
TAS, CSS, DRS

IDC 1.0 Name
Incoming Digit Counter 2.0 Location
Word 4A
Bit Position A1, A2, A3, A4

3.0 Functional Description
This four bit field is used to indicate the number of digits currently in the RS memory. This field is compared with TL and FTO in order to perform the functions detailed in the explanation of the above fields and of ZOC and ZTO. The IDC is initially zero and is incremented one count for each digit received. When digits are deleted (by DP) the number of digits deleted (one to six) will be subtracted from the IDC by the DP.

4.0 Control
4.1 The IDC is initially zero prior to receiving digits, however, it can be set to a starting value by the DP.
4.2 This field is modified (decremented) by the DP for digit deletion.
4.3 This field is re-initialized by the DP whenever there is a change from receiving called number to receiving calling number and vice versa.
4.4 Incremented by RS (RRC-equations 7, 12 - set SPAR)
4.5 Except for 4.3 above, this field is not reset until the normal RS disconnect.

5.0 Timing
None 6.0 Cross Reference
6.1 ANI, TL, PAR, RCB-SPAR
6.2 Section 7

IDS 1.0 Name
Interdigital Speed (sending)

2.0 Location
Word 3A
Bit Position C2

3.0 Functional Description
The IDS field is used by the DP to specify the length of the interdigital pause for sending in the dial pulse mode. The two values of IDS are as follows:
IDS = 1 - 300msec
IDS = 0 - 600msec or 700msec (strappable)

4.0 Control
4.1 Set by the DP
4.2 Modified by the DP for alternate routes
4.3 Reset by RS as part of normal disconnect 5.0 Timing
5.1 The IDS field must be written in RS memory prior to the writing of IN = 4.

6.0 Cross Reference
6.1 Section 7

7.0 Comments
If information is being sent to a direct progressive office 600ms is required, but if the receiving office is register progressive, 300ms is acceptable.

IN 1.0 Name
Instruction 2.0 Location
Word 1A
Bit Position A1, A2, A3, A4

3.0 Functional Description
The 4 bit IN field is an instruction field used by the DP to instruct the RS to perform a certain function. The present list of instruction is given below:

IN = 0 — This instruction is a no operation instruction.
This instruction should be used after the first code translation when the TL field is used to control the return of the RS to the DP for processing. It is also used (in conjunction with CTR) following an IN = 3 to instruct the RS to stop timing the terminating marker operation and wait for another instruction.

IN = 1 — Start Junctor Operation.
This instruction indicates to the RS that the RRJ identity has been determined by the RRJ translation and the RS can begin processing that RRJ. When IN = 1 it can only be modified to only a non zero value.

IN = 2 — Originating Frame (class of service) Translation Complete.
This instruction indicates that the results of the class of service translation have been written in the RS memory. If a receiver is required, IN = 2 indicates that SRA and AOG are also in memory. This instruction will always be given to the RS after an IN of 1, unless IN = 7, IN = 9, IN = 11, or FD (non-dial line) is given. For the non-dial case IN = 3 or 4 can be given immediately (less than 10ms after giving FD) or at a later time.

IN = 3 — DP Working with Terminating Marker — First and Intermediate Paths.
This instruction indicates to the RS that the DP has seized an Idle Communication Register and Terminating Marker and is about to transmit the terminating frame. This instruction is given on all uses of the TM except the last.

IN = 4 — DP Working with Terminating Marker — Final Path.
This instruction is the same as IN = 3 except that it indicates the last request for the Terminating Marker.

IN = 5 — Retrial 1
This instructs the RS to initiate a terminating retrial. Retrial 1 is used when the retrial doesn't require the disconnection or attachment of a sender. With this instruction the RS will drop the path back to the register junctor. Any insertion or section junctor in the path at the time IN = 5 is given will be dropped, and as such, must be reconnected on the retrial.

IN = 6 — Retrial 2.
This instruction is the same as IN = 5 with the exception of sender attachment or disconnection. IN = 6 should be given when a retrial with a sender disconnection or attachment is required. IN = 6 also drops the entire terminating path to the RJ.

IN = 7 — Lock Out

This instruction indicates to the RS to lock out the line or trunk in the originating junctor or trunk. IN = 7 should not be reset until the next RS interrupt. When the RS interrupt after an IN = 7 is given, the TRI field will be a 6 (RS has disconnected from the network). When the IN = 7 is used, the type of lock out (or other) command shall be stored in the CTT field either prior to or at the same time as IN = 7.

IN = 8 — Return Line Busy Tone

This instruction is used to request the RS to return line busy tone. When this instruction is given, the RS will return with a TRI = 5 or CAB. If the RS times out on the application of line busy tone, it will interrupt the DP with TRI = 5. If the subscriber hangs up before the tone time out, the RS will return with CAB. This instruction whould remain set until this interrupt occurs.

IN = 9 — Return Reorder Tone

This instruction is used to request the RS to return reorder tone to the originator from the RRJ. The response of the RS to this instruction is similar to that for IN = 8. This instruction shall be used only when reorder tone is to be applied from the register junctor. If reorder tone must be returned from the incoming trunk, IN = 7 and the CCT field must be used.

IN = 10 — Terminating Marker Completed

This instruction is used to inform the RS that the Terminating Marker has performed its function. The RS, upon seeing IN = 10, will perform the cut-thru function for local terminating or will begin sending for an outgoing call. The RS will interrupt the DP with a TRI = 6 after cut-thru for local termination and after sending, sender disconnection, and cut-thru for trunk termination.

IN = 11 — Disconnect the RRJ

This instruction is used by the DP to request the RS to disconnect the RRJ from the network. If a sender or receiver is connected the RS will also drop the S/R matrix connection. IN = 11 may be set by the DP in RS memory at any time during the process of a call. When an IN = 11 instruction is received, the RS will interrupt the DP with a TRI = 6 (unless a trouble condition occurs).

IN = 12 — Clear Memory

This instruction is used to request the RS to set the RRJ to the idle state and clear its associated 16 word block of memory. IN = 12 shall be given to the RS only after a TRI = 6 interrupt.

IN = 13 — Clear Memory and take RRJ Off Line

This instruction is used to request the RS to clear its memory and go in an off line state. In this state the idle test lead for that RRJ is kept busy. An RRJ can be removed from this state and put in a normal idle state by resetting the PSS field to zero. IN = 13 shall be given to the RS only after a TRI = 6 interrupt.

IN = 14 — Disconnect Sender or Receiver

This instruction is used to request the RS to disconnect the Receiver or Sender. For calls originated from touch calling coin telephones, IN = 14, together with the CB bit, is used to instruct the RS to make a coin test prior to disconnecting the receiver. The RS will interrupt the DP with a TRI of 7 following an IN = 14.

IN = 15 — Terminating Marker Complete - Trouble or busy condition encountered. This instruction causes the RS to stop timing the TM operation and wait for another instruction.

4.0 Control 4.1 All instructions are set by the DP.

4.2 The RS will reset the IN field when it equals 5, 6, 12, and 13. For the remaining values, the DP will either modify or reset the IN field.

5.0 Timing 5.1 IN = 2 This instruction should be given as soon as possible after giving the IN = 1. The DP can modify the IN field from 1 to 2 without the RS observing the IN = 1. The RS only looks for an IN field greater than zero to exit the idle state.

IN = 3 & 4 These instructions should be given just prior to sending the terminating frame to the TM. It should only be given after both a Communication Register or Terminating Marker are seized. The sender instruction and formatting of sending digits must also take place prior to the writing of IN = 4.

IN = 5 & 6 When IN = 5 or IN = 6 is given the RS will release the complete terminating path and will generate a TRI = 8 interrupt after 450msec (time required to release the path). The RS will reset the IN field when the TRI = 8 interrupt is generated. If a sender disconnection is required the RS will delay the TRI = 8 interrupt until the TRI = 7 interrupt has been serviced by the DP. If a sender connection is required the DP must set the SAT field in the RS memory before the TRI = 8 interrupt is generated by the RS. The DP shall not generate more than one retrial due to equipment malfunctions.

IN = 7,8,9,11 These instructions can be given at any time except when the TM is connecting a path for that RRJ.

IN = 10, 15 The timing on the writing of these two instructions is probably more critical than any of the others. When an IN of 3 or 4 is given to the RS, the DP must update the instruction field within 100ms after the response of the Terminating Marker is received. When IN = 15 is used, the DP has a maximum of 5 seconds, to update the IN field. If the 100ms or 5 second timing is not met, the RS will initiate a System Trouble Interrupt. Besides updating the IN field to a 10 or 15 this field can be updated to 5, 6, 7, 8, 9 or 11. The RS need not observe an IN of 15 before one of the six instructions listed above is given to the RS. If the instruction is not updated within this time the RS will initiate a System Trouble interrupt.

IN = 14 When IN = 14 is being used to instruct the RS to make a coin test on a touch calling coin telephone line, IN = 14 should be given to the RS within 200ms after dialing is complete.

6.0 Cross Reference 6.1 TRI, PSS 7.0 Comments 7.1 The following table illustrates the possible TRI responses to the different IN values.

TRI RESPONSES TO DIFFERENT VALUES OF IN

| | TRI= | | | | | | | | |
|---|---|---|---|---|---|---|---|---|---|
| | 0 | 1 | 2 | 3 | 4 | 5 | 6 | 7 | 8 |
| IN=0 | | | X | | | | | | |
| IN=1 | | | | | | | | | |
| IN=2 | X | X | X | | | | | | |
| IN=3 | | | | | | | | | |
| IN=4 | | | | | | | | | |
| IN=5 | | | | | | | | X | |
| IN=6 | | | | | | | X | X | |
| IN=7 | | | | | | X | | | |
| IN=8 | | | | | X | | X | | |
| IN=9 | | | | | X | | X | | |
| IN=10 | | | | | | X | | | |
| IN=11 | | | | | | X | | | |
| IN=12 | | | | | | | | | |
| IN=13 | | | | | | | | | |
| IN=14 | | | | | | | X | | |
| CRS | | | | X | | | | | |
| TL | X | | | | | | | | |
| PRF | | X | | | | | | | |
| IN=15 | | | | | | | | | |

IPR 1.0 Name

Interdigital Pause — Receiving 2.0 Location

Word 2B

Bit Position K1

3.0 Functional Description

The IPR field is an internal RS indicator field used to indicate the presence of interdigital pause during the dial pulse mode of receiving.

4.0 Control 4.1 Set by RS (RRC-equations 7, 16)

4.2 Reset by RS (RCC-equation 2)

5.0 Timing 5.1 IPR is set when a digit has been received and has been or is being stored into memory.

5.2 IPR is cleared when the next digit begins registering.

6.0 Cross Reference

BP1, BP2, PAR

IPS 1.0 Name

Interdigital Pause — Sending 2.0 Location

Word 3B

Bit position K1

3.0 Functional Description

The IPS field is an internal RS indicator field used to indicate an interdigital pause for digit sending in the dial pulse mode.

4.0 Control 4.1 Set by RS (RSC-equation 101, 20, 21, 23)

4.2 Reset by RS (RSC-equation 102, 6, 30)

5.0 Timing 5.1 See IPR Timing 6.0 Cross Reference

DS, PAS, CMS

IRJ 1.0 Name

Incoming Register Junctor 2.0 Location

Word 1A

Bit Position C1

3.0 Functional Description

This one bit field is used by the DP to indicate the type of RRJ that was selected by the Originating Marker.

IRJ = 0 — Local RRJ

IRJ = 1 — Incoming RRJ 4.0 Control 4.1 Set by DP 4.2 Reset by RS at disconnect time 5.0 Timing 5.1 The IRJ field should be written in RS memory at the same time as IN = 1.

6.0 Cross Reference

JC1, BD1, IN = 9

7.0 Comments

IRJ causes JC1 to set if busy tone is being returned so that a metallic cut-thru is accomplished back along the trunk.

MAT 1.0 Name

Match 2.0 Location

Word 2A

Bit Position D3

3.0 Functional Description

This is an internal RS field used to indicate when a timer function matches the switch setting on the Maintenance Control Center (MCC). When the timer is no longer equal to the switch setting MAT is reset.

4.0 Control 4.1 Set by RS (RCC equation — 38)

4.2 Reset by RS (RCC equation $\overline{38}$)

5.0 Timing

None 6.0 Cross Reference 6.1 TO 7.0 Comments

When the MAT is set and the DPU comes over and clears the TO bit, the TO will not be set again.

MDA, MDB, MDC 1.0 Name

Mode of counting for Timers A, B & C 2.0 Location

Word 1B, 2B 3B

Bit Positions K2, K3, K4

3.0 Functional Description

The three bit fields are used by the RS to control the rate at which Timers A, B & C (TMA, TMB, TMC) are advanced.

4.0 Control 4.1 Set by RS 4.2 Reset by RS 5.0 Timing 5.1 Varies from instruction to instruction.

6.0 Cross Reference

TMA, TMB, TMC

MDR 1.0 Name

Mode of Receiving 2.0 Location

Word 2A

Bit Position A1, A2, A3

3.0 Functional Description

The three bit Mode of Receiving field is used by the DP to specify the mode under which the RS should receive the called or calling number. This field is initially set by the DP as a function of the class of service translation. It can be modified only once during a call (by DP), namely, to specify a different mode of receiving for receiving the calling number. The following is the assignment of the MDR field.

MDR = 0 — Use dial pulse mode (no sender required)

MDR = 1 — Use TCMF mode

MDR = 2 — Use Multifrequency

MDR = 3–7 Spare modes

When mixed lines (dial pulse and TCMF on same line) are encountered, the DP will set the MDR = 1 and instruct the RD to connect a TCMF receiver. If the RS detects a dial pulse from the subscriber, the TCMF receiver will be dropped, otherwise it will remain attached for the duration of receiving. If the TCMF receiver is disconnected the RS will initiate a Translation interrupt and gives the DP a TRI = 7 (Sender of receiver disconnected).

4.0 Control 4.1 Set by DP as a function of class of service translation.

4.2 Modified by DP when mode of receive for calling number is different than for the called number.

4.3 Reset by RS if dial pulses are received with MDR = 1.

5.0 Timing 5.1 The MDR field must be written in RS memory prior to the writing of IN = 2 (originating frame translation complete). The timing is the same independent of whether a receiver is required. If a receiver is required the RS will provide the timing for attachment.

6.0 Cross Reference 6.1 AOG, SRA

MS1 to MS3

1.0 Name

Mode of Sending 1, 2, 3

2.0 Location

Word 3A

Bit Position

MS1 — B1, B2

MS2 — A3, A4

MS3 — A1, A2

3.0 Functional Description

These three two bit fields are used to specify the mode in which the prefix digits, the called number, and the calling number are to be sent respectively. The possible values of each are:

MSX = 0 — dial pulse

MSX = 1 — multi-frequency

MSX = 2, 3 — spare

X = 1, 2, or 3

MS1 — prefix

MS2 — called

MS3 — calling 4.0 Control 4.1 Set by DP 4.2 Modified by DP for alternate routes 4.3 Reset by RS as part of normal disconnect.

5.0 Timing

None 6.0 Cross Reference 6.1 IN, CMS

N1 to N10

1.0 Name

Calling Number Digit 1 Thru Digit 10

2.0 Location

Word 7A and 7B

Bit Positions All bits of 7B and C1-4, D1-4, E1-4, F1-4 of 7A 3.0 Functional Description These 10 — 4 bit fields are used to store a maximum of 10 digits of calling number. The procedure for digit reception in the RS is described in section 6. The calling directory number will be received on calls from tributaries where ticketing is performed on EAX. The calling directory number will be sent on all EDDD and, if EAX is not equipped with a ticketer, all DDD traffic to a TSPS, Bell CAMA, or SATT for ticketing. The calling directory number will not be sent on ONI calls since it is not obtainable. On locally originated calls that are routed to a ticketing system, the DP will insert the calling directory number. The KP is the standard multifrequency prefix sent or received prior to the transmission of data and shall always be stored (if necessary) in the N1 field. The standard value of KP is 11. The ST is the standard multifrequency suffix sent or received after the transmission of data and shall always be stored in the highest number cell used. The ST may have values of 11, 12, 13, 14 or 15. The most common value of ST is 12. Multifrequency (MF) is the most common mode of sending and receiving the calling number.

4.0 Control 4.1 Set by DP when ticketing is performed in another office 4.2 Set by TS when calling number is received from a tributary 4.3 Reset by RS at disconnect time 4.4 Shifted by RS 5.0 Timing The N1 to N10 fields must be stored in the RS memory prior to writing IN = 4.

6.0 Cross Reference 6.1 Sections 6 & 7

6.2 ANI, SDS, MS3

OP 1.0 Name

Out Pulse 2.0 Location

Word 3B

Bit Position H4

3.0 Functional Description

The OP field is an internal RS control field used to control the operation of the OP relay in the RRJ. The OP relay is used for DC signaling on the Terminating Transmission path (opening and closing loop) e.g., sending in the dial pulse mode, holding Terminating path, seizure of outgoing trunk.

4.0 Control 4.1 Set by RS (RSC-equations 11, 17)

4.2 Reset by RS (RSC-equation 18)

5.0 Timing

See section 7

6.0 Cross Reference

CTL 7.0 Comments 7.1 Refer to relay descriptions

PAR 1.0 Name

Pulse Accumulator - Receiving 2.0 Location

Word 2B

Bit Position(s) I1, I2, I3, I4
3.0 Functional Description
The PAR field is an internal RS counter and buffer field used by the RS to register digits in the dial pulse mode of receiving and as a buffer for digits received in the TCMF or MF modes of receiving. For the dial pulse mode, the PAR field is used to count dial pulses and provide buffer storage prior to placing the dial digit in the called or calling number section of RS memory. For TCMF and MF, the PAR only serves as a buffer prior to transferring the digit to the called or calling number section of memory.
4.0 Control
4.1 Set by RS (RRC-equation 10)
4.2 Reset by RS (RRC-equations 7, 12)
5.0 Timing
See section 6
6.0 Cross Reference
BP1, BP2, DP1, DP2, PIT, IPR
PAS
1.0 Name
Pulse Accumulator — Sending
2.0 Location Word 3B
Bit Position(s) I1, I2, I3, I4
3.0 Functional Description
This is a 4 bit internal RS counter field used to count the number of dial pulses sent. The RS will send the number of pulses specified by the DS field.
4.0 Control
4.1 Set by RS (RSC-equation 18)
4.2 Reset by RS (RSC-equations 12, 16)
5.0 Timing
See section 7
6.0 Cross Reference
DS, IPS
PC
1.0 Name
Pull Check
2.0 Location
Word 1B
Bit Position I1
3.0 Functional Description
This field is a maintenance indicator field used to indicate an abnormal condition of the Sender-Receiver Matrix during connection or disconnection of a unit. PC will be used for localization of the trouble condition. This field or HC may be set whenever the Trouble in Assignment (TAS) field is set. The timing associated with the connection checking is controlled by the Connection Sequence State field (CSS).
4.0 Control
4.1 Set by RS (RPC-equations 11, 22, 45)
4.2 Reset by RS
5.0 Timing
None
6.0 Cross Reference
TAS, CSS, DRS
PG
1.0 Name
Pull Ground
2.0 Location
Word 1B
Bit Position I4
3.0 Functional Description
The PG is an internal RS field used to apply pull ground on the Sender-Receiver Matrix during connection of a unit and also to hold the established matrix connection. The pulling of the Sender-Receiver Matrix provides a metallic path between the RRJ and the particular sender or receiver selected. Pulling of the matrix is accomplished by applying a ground on the unit side of the matrix and a potential on the RRJ side of the matrix.
4.0 Control
4.1 Set by RS (RPC-equation 14)
4.2 Reset by RS (RPC-equations 11, 20, 43)
5.0 Timing
See Connection Sequence States
6.0 Cross Reference
CSS, PC, HC, SRA, AOG, CRS
PIT
1.0 Name
Perform Interdigital Timing
2.0 Location
Word 2B
Bit Position G2
2.0 Functional Description
This one bit indicator field is used by the RS to indicate that at least one digit has been received (or lost) and to perform interdigital timing rather than permanent timing.
4.0 Control
4.1 Set by RS for local lines (RRC-equations 7, 11, 17)
4.2 Set by RS as a result of the DST field being set. If this is not sufficient for lost digit trunks, the DP must set PIT.
4.3 Reset by RS
5.0 Timing
See section 6
6.0 Cross Reference
Section 6, IPS
PPR
1.0 Name
Prevent Pulse Reception
2.0 Location
Word 2A
Bit Position D2
3.0 Functional Description
The PPR bit is an internal control bit used to inhibit the recording of dial pulses. The PPR bit is set at the same time a start dial signal is sent to an incoming trunk. It is reset 70 ms. later. It is also set at the same time an interdigital period is recognized. It is reset 180 ms. later.
4.0 Control
4.1 Set by RS
4.2 Reset by RS
PRF
1.0 Name
Pattern Recognition Field
2.0 Location
Word 4A
Bit Position E1, E2, E3, E4
3.0 Functional Description
This 4-bit field is used by the DP to instruct the RS to look for certain sets of one and two digit codes and initiate a Translation Interrupt if the code(s) is received. This allows the DP to give a general TL and have the RS return on fewer digits if certain 1 and 2 digit codes are dialed. The RS has the capability of recognizing the following codes:

3.1 First digit - zero (10), one, seven, eight, nine and N. N is a digit of value 2 to 9.

3.2 Second digit - zero (10), one, seven, eight, nine and N. There can be a maximum of 15 different sets of one and/or two digit code combinations. A PRF of value zero will indicate that pattern recognition is not in effect.

4.0 Control 4.1 Set by the DP as a function of the class of service translation or digit processing.

4.2 Reset or modified by DP as part of the first translation following the writing of PRF in the RS memory.

5.0 Timing

None 6.0 Cross Reference 6.1 TRI, TL 7.0 Comments 7.1 When a pattern is recognized, the RS will write the TRI, to a value of 2 and initiate a Translation interrupt.

7.2 The PRF should be used with a TL greater than 2 otherwise there will be a conflict on TRI.

7.3 If the PRF is not reset after the results of the PRF translation are written in RS memory, the RS will immediately initiate another Translation interrupt.

7.4 Typical use of PRF is as follows:

a. 00 for coin box b. 11 for local line c. 7, 8 9 for PBX

PR1 to PR6

1.0 Name

Prefix Digits 1 to 6

2.0 Location

Word 5A

Bit Positions All bits of the word in groups of four 3.0 Functional Descriptions The PR1 to PR6 fields are used to store the prefix digits for digit sending. These fields can also be used to store lost digits or prefix digits obtained from the class of service translation.

4.0 Control 4.1 Set by DP 4.2 Modified by DP for alternate routes 4.3 Reset by RS at disconnect time 5.0 Timing 5.1 The PR1 to PR6 field should be set before the writing of IN = 4 for sending.

6.0 Cross Reference

Section 7, SLS, SKP, EOS 7.0 Comments 7.1 When less than six prefix digits are written, they should be left justified. There is no shifting by the RS for these digit positions.

PSS 1.0 Name

Processing Sequence States 2.0 Location

Word 1B

Bit Position(s) G1, G2, G3, G4

3.0 Functional Description

The PSS field is an internal RS counter field used by the RS to control the functions of call processing. The primary functions performed in each state are as follows:

PSS =

0 — Idle state of the RRJ. The RRJ translation is received in state 0 and along with the pulsing highway will cause the RS to exit this state.

1 — Receiver connection, waiting for instructions from DP.

2 — Dial tone, coin, and start dialing control

3 — Receiving digits; digits analysis; requests for translations

4 — Receiver disconnections

5 — Sender Connection

6 — Interworking with terminating marker

7 — Call status analysis

8 — Start dialing analysis

9 — Sending

10 — Sending Disconnection

11 — Application of busy tones

12 — Cur-through control

13 — Register disconnection

14 — Spare

15 — Register off-line 4.0 Control 4.1 Set by the RS 4.2 Reset by the RS 5.0 Timing None 6.0 Cross Reference Everything

PTR 1.0 Name

Party Test (Rotary dial)

2.0 Location

Word 2A

Bit Position B3

3.0 Functional Description

This one bit control field is used by the DP to instruct the RS to perform a rotary dial party test on two party lines. The RS performs the party test during the first break condition of the line. The test consists of monitoring for a ground on the tip side of the loop during the off normal period of the dial. The results of the party test is written in the Party 2 (P2) field by the RS after the test is complete.

4.0 Control 4.1 Set by DP as a function of class of service translation.

4.2 Reset by RS after completion of test. (RRC-equation 24)

5.0 Timing 5.1 PTR must be written in the RS memory prior to the writing of IN = 2 (originating frame translation completed).

6.0 Cross Reference 6.1 P2, TSC

PTT 1.0 Name

Party Test (Touch Calling)

2.0 Location

Word 2A

Bit Position B4

3.0 Functional Description

This one bit control field is used by the DP to instruct the RS to perform a touch calling party test for two party lines. The RS performs the test after connection of the receiver (at the same time as dial tone application). The test consists of monitoring for an inductive ground on the tip side of the line. The results of the party test is written in the Party 2 (P2) field by the RS at the completion of the test.

4.0 Control
4.1 Set by DP as a function of class of service translation.
4.2 Reset by RS after completion of test. (RRC-equation 23)
5.0 Timing
5.1 PTT must be written in the RS memory prior to the writing of IN = 2 (originating frame translation complete).
6.0 Cross Reference
6.1 P2, TSC
7.0 Comments
If a line has a mixture of inductive and off-normal party marks, both PTT and PTR must be used. If the result of the PTT party test indicates a second party condition, the PTR test will not be performed and the RS will reset PTR.

P2
1.0 Name
Party 2
2.0 Location
Word 2A
Bit Position F2
3.0 Functional Description
The P2 field is a dual function indicator field used to indicate party or coin deposit information. For local lines it is used to indicate which party on a 2 party line is originating. For a coin box origination, it is used to indicate coin deposit. The values of P2 are as follows:
Coin Box origination
P2 = 0 no coin deposited
P2 = 1 coin was deposited
Local lines origination
P2 = 0 party 1
P2 = 1 party 2
4.0 Control
4.1 Set by RS (RRC-equation 27)
4.2 Reset by RS as part of normal disconnect
5.0 Timing
None
6.0 Cross Reference
6.1 PTT, PTR, CB, TSC RDS
1.0 Name
Receiver Digit Stored
2.0 Location
Word 2B
Bit Position G3
3.0 Functional Description
The RDS bit is an internal RS field used as an indicator that the digit presented by the receiver on the receiver multiplex has already been recorded in memory.
4.0 Control
4.1 Set by the RS (RRC-equation 11)
4.2 Reset by the RS (RRC-equation 12)
5.0 Timing
See section 6
6.0 Cross Reference
PAR RQT
1.0 Name
Request for Translation
2.0 Location
Word 1B
Bit Position H4
3.0 Functional Description
This one bit field is used by the RS to initiate a Request for Translation Interrupt. The use of this bit is described in detail in section 3 (Functional Description of a Request for Translation Interrupt).
4.0 Control
4.1 Set by RS after it determines a need for DP processing. (RPC-equation 29)
4.2 Reset by RS after updating the Translation Interrupt location and setting the Translation Interrupt (hardware). (RPC-equation 34)
5.0 Timing
None
6.0 Cross Reference
6.1 WFT, CTR
6.2 Section 3

RSF
1.0 Name
Row Six Full
2.0 Location
Word 1A
Bit Position F2
3.0 Functional Description
The RSF field indicates whether the digit cells in row 6 of the RS memory are filled up. This field is used to indicate when a digit received must be stored in Row 5. The RS monitors row six of memory (Y6) and carries the full/not full status to row one of memory (Y9). If the DP during the process of inserting digits fills up row six of the RS memory (D1 to D12), it must set the RSF bit before the next time slot of that Register Junctor occurs.
4.0 Control
4.1 Set by RS (RCB-RSFC)
4.2 Set by DP during digit insertion
4.3 Reset by RS
5.0 Timing
None
6.0 Cross Reference
None RSS
1.0 Name
Received Start (Dialing) Signal
2.0 Location
Word 3B
Bit Position H3
3.0 Functional Description
The RSS bit is an internal RS field which indicates that a Start Dialing Signal, a Wink Start Pulsing signal, or a "Stop and Go" signal has been received.
4.0 Control
4.1 Set by RS (RSC-equation 8)
4.2 Reset by RS at disconnect time
5.0 Timing
None
6.0 Cross Reference
SDS SAT
1.0 Name
Start Assignment Timing
2.0 Location
Word 1A
Bit Position C2

3.0 Functional Description

The SAT field is used by the DP to instruct the RS to start the timing for unit selection and attachment for the assignment function. The length of time for an assignment timeout condition is specified by the AOG field.

4.0 Control 4.1 Set by the DP 4.2 Reset by RS after a successful attachment of a unit (RPC-equation 18)

5.0 Timing 5.1 The SAT field and the AOG fields must be written in RS memory prior to the writing of IN = 2 for attaching a unit (receiver) for receiving the called number. The DP can write the CRS and SRA fields at the same time or any time before the assignment timeout (5 to 50 sec).

5.2 The SAT and AOG fields must be written in the RS memory after the entire called number is received and either prior to or at the same time as SDS = 5 for attaching a receiver to receive the calling number. The DP should not write FD until the entire calling number is received. Once an idle unit is selected, the DP must write the CRS and SRA fields.

5.3 The SAT and AOG fields must be written in the RS memory either prior to or at the same time as FD for attaching a sender. Once an idle unit is selected, the DP must write CRS and SRA. After the RS attaches the sender, it will interrupt the DP with TRI = 4 (sender connected). Attachment of a sender to send the prefix digits, the called number, or the calling number will take place before any sending starts.

5.4 When IN = 6 is given the SAT field must be stored in the RS memory prior to or at the same time as IN = 6 if a sender connection is necessary and no sender is connected. If a new sender is necessary but a sender is already connected, the SAT field shall be loaded in RS memory at the following TRI = 7 interrupt.

6.0 Cross Reference 6.1 SRA, CRS, AOG 7.0 Comments 7.1 The SAT field will remain set if the assignment timeout or trouble occurs.

SB 1.0 Name

Service Bit 2.0 Location

Word 4B

Bit Position K1

3.0 Functional Description

The SB bit is used by maintenance programs to indicate to the RS maintenance hardware that the system trouble interrupt has been generated and serviced for that junctor.

4.0 Control 4.1 Set by DP 4.2 Reset by DP or by RS at disconnect time (final clearing of memory).

5.0 Timing

None 6.0 Cross Reference

TRB See maintenance section of RS A size book

SD 1.0 Name

Stop Dial 2.0 Location

Word 3B

Bit Position H1

3.0 Functional Description

The SD field is an internal RS indicator field used to store the status of the Stop Dial lead from the RRJ for use on the next RRJ scan. This field is used by the RS in determining that a valid stop dial signal has been received.

4.0 Control 4.1 Set by RS (RSC-equation 108)

4.2 Reset by RS 5.0 Timing 5.1 When the TSD lead from the RRJ is activated SD will be written into memory.

5.2 When TSD goes false, SD is cleared.

6.0 Cross Reference

ST, OP, RRJ 7.0 Comments 7.1 See section 7

7.2 Refer to relay descriptions

SDM 1.0 Name

Start Dialing Mode 2.0 Location

Word 3A

Bit Position C3, C4

3.0 Functional Description

This field is used by the DP to specify to the RS the type of start dialing signal it should expect from an outgoing trunk prior to sending. The values of SDM are:

SDM = 0 — No start dialing
SDM = 1 — Wink start pulsing signal
SDM = 2 — Stop & Start dial signals
SDM = 3 — Spare 4.0 Control 4.1 Set by DP 4.2 Modified by DP for alternate routes 4.3 Reset by RS as part of normal disconnect 5.0 Timing 5.1 The SDM field must be written in RS memory prior to the writing of IN = 4 for all routes.

6.0 Cross Reference 6.1 Section 7, RSS

SDS 1.0 Name

Start Dialing Signal 2.0 Location

Word 2A

Bit Position A4, B1, B2

3.0 Functional Description

The SDS field indicates to the RS the type of start dialing signal to be returned to the originator.

SDS = 0 — no signal
1 — start dialing signal (reverse battery after 80ms)
2 — Wink start pulsing (200ms)
3 — Dial tone (350Hz and 440Hz)
4 — Distinctive dial tone (dial tone 120ipm)
5 — ANI Start Identification (change to off hook)
6 — spare
7 — spare SDS is set only by the DP and must be stored in the RS memory prior to IN = 2 the first time the field is used. SDS may be set more than once by the DP.

Before the DP sets SDS for a second dial tone, or distinctive dial tone, it must check that no further digits have been received since the start of the pattern recognition interrupt by the RS, by monitoring either the D1 to D18 fields or the IDC field. SDS = 5 (ANI Start Identification) shall be set in the RS memory after reception of the called number if the calling number is expected from a satellite office for ticketting. The MDR, TL, and FTO fields must be modified and the IDC, ZTO, and ZOC fields must be reset by the DP either prior to or at the same time as SDS = 5 is stored in the RS memory, If a change in the mode of receiving necessitates a receiver disconnection, the DP shall not give SDS = 5 until the receiver is disconnected. If a change in the mode of receiving necessitates a receiver connection, the AOG, SRA, and CRS fields or the AOG and SAT fields must be stored in the RS memory either prior to or at the same time as SDS = 5. The SDS field will be reset by the RS after the start dialing signal has been forwarded to the originator.

4.0 Control
4.1 Set originally by DP as a function of the class of service translation.
4.2 Set to a second value by the DP as a function of a code translation
4.3 Reset by RS after signal has been given. (RSC-equations 20, 22, 32, 35, 39)
5.0 Timing
5.1 The initial SDS field must be written in RS memory prior to the writing of IN = 2 (originating frame translation completed).
5.2 The SDS can be set again after RS resets the field.
5.3 The RS supplies the timing associated with the sequence of attaching a receiver (if required) and the application of the start dial signal in the RRJ. After applying the proper timing the RS sets RRJ control fields based on the SDS field.
5.4 The SDS field is reset after the signal is returned to the originator.
6.0 Cross Reference
6.1 DT1, DT2, ASD SKP
1.0 Name
Skip field
2.0 Location
Word 3A
Bit Position C1
3.0 Functional Description
The Skip field is used by the DP to control the sequence in which the prefix digits, the called number, and the calling number are sent. The use of the SKP is described in detail in section 7.
4.0 Control
4.1 Set by the DP
4.2 Modified by DP for alternate routes
4.3 Reset by RS as part of normal disconnect
5.0 Timing
5.1 The SKP field must be written in the RS memory prior to the writing of IN = 4.
6.0 Cross Reference
6.1 SLS, EOS, section 7

SLS
1.0 Name
Sender Loading Sequence State
2.0 Location
Word 3A
Bit Position D2, D3, D4, E1, E2, E3
3.0 Functional Description
The SLS field is a 6 bit counter used by the RS to control the sending function. The use of the states in controlling the sending function is given below:
a. the six prefix digits will be sent in states 7 to 12 using the mode of sending specified by the MS1 field.
b. The called number will be sent in states 17 to 28 and 33 to 38 using the mode of sending specified by the MS2 field.
c. The calling number will be sent in states 49 to 58 using the mode of sending specified by the MS3 field.
d. Sequence states 0, 16 and 48 are the states from which sending starts and are also the states where the change of sending mode take place.
e. Sequence states 13, 39, and 59 are used as terminating sequence states or as branch points for "skipping" to other states. In these three states, a check will be made for termination before executing a skip.

The only control the KP has over the SLS field is the setting of the initial value as stated in (d). The SLS field is described in detail in section 7.
4.0 Control
4.1 Set by the DP
4.2 Modified by DP for alternate routes
4.3 Modified by RS as information is sent (increment or skip).
4.4 Reset by RS as part of normal disconnect.
5.0 Timing
5.1 The SLS field must be written in the RS memory prior to the writing of IN = 4.
6.0 Cross Reference
6.1 Section 7, EOS, SKP, MS1-3, CMS
7.0 Comments
On a retrial that occurs after sending has begin, it is necessary that the DP resets the SLS field to the original starting value even if the sending instructions need not be modified since the RS modifies the SLS field during sending.

SN
1.0 Name
Operate the SN relay (in the RRJ)
2.0 Location
Word 3B
Bit Position H2
3.0 Functional Description
The SN field is used by the RS to control the operation of the SN relay in the RRJ. The SN relay is used to transfer the Transmission path for the Sender-Receiver Matrix from the receiving to sending path in the RRJ. The SN bit is set during sender and receiver attachments (for checking) and during sending when a sender is required.
4.0 Control
4.1 Set by RS (RSC-equations 21, 24, 28)
4.2 Reset by RS (RSC-equations 14, 20, 23, 27)
5.0 Timing
5.1 Operated during sender/receiver connection to complete pull path.
5.2 Operated during sending to make a metallic connection from sender to trunk.
6.0 Cross Reference CSS, FB-10185, section 7
7.0 Comments
7.1 Refer to relay descriptions.

SRA
1.0 Name
Sender-Receiver Address
2.0 Location
Word 1A
Bit Position(s) D3, D4, E1, E2, E3, E4, F1
3.0 Functional Description
The SRA field is used by the DP to specify to the RS, the Unit address of a sender or receiver for attachment to an RRJ. The range of the SRA field for the different unit types as specified by the AOG field is as follows:

| | | |
|---|---|---|
| AOG = 1 | TCMF receiver | 1 ≤ SRA ≤ 120 |
| AOG = 2 | MF receiver | 1 ≤ SRA ≤ 36 |
| AOG = 4 | MF sender | 1 ≤ SRA ≤ 36 |
| AOG = 3, 5, 6, 7 | spare | SRA ≤ 120 |

4.0 Control
4.1 Set by DP
4.2 Modified by DP
4.3 Reset by DP at disconnect time
5.0 Timing
5.1 The SRA and CRS fields are written in RS memory after the DP has selected an idle unit of the type specified by the AOG. The AOG field is written in the RS memory prior to the CRS to allow the RS to time the selection and attachment function.
5.2 There will be no DP interrupt for attaching a receiver for receiving the called or calling number.
5.3 The RS will interrupt the DP after any sender attachment.
6.0 Cross Reference
6.1 AOG, CRS, SAT
7.0 Comments
If an address is assigned to a non-existent receiver or sender (e.g., MF sender number S1) trouble will be called in PSS = 1.

ST
1.0 Name
S Lead — Terminating
2.0 Location
Word 3B
Bit Position G4
3.0 Functional Description
The ST bit is an internal RS field used to control DC signaling on the terminating S lead through the Selector Matrix to the Terminating Junctor or outgoing trunk. Setting of the ST bit grounds the ST lead in the RRJ through the first winding of the SD relay.
4.0 Control
4.1 Set by RS (RSC-equations 7, 10, 14, 110)
4.2 Reset by RS (RSC-equations 21, 24, 29, 31, 46)
5.0 Timing
5.1 See section 7
6.0 Cross Reference
FB-10185, SD, OP
7.0 Comments
Refer to relay descriptions TAS
1.0 Name
Trouble in Assignment
2.0 Location
Word 1A
Bit Position F3
3.0 Functional Description
The TAS is a maintenance indicator field set by the RS to indicate an error or fault in the assignment process. The TAS bit will be set if the error or fault is detected either during connection or disconnection of a unit on the Sender-Receiver matrix.
4.0 Control
4.1 Set by RS (RPC-equations 11, 22, 45)
4.2 Reset by DP
5.0 Timing
None
6.0 Cross Reference
TRB, CSS, DRS TL
1.0 Name
Totals Instruction
2.0 Location
Word 4A
Bit Position C1, C2, C3, C4
3.0 Functional Description
The Totals Instruction is a four bit field used by the DP to instruct the RS to perform one of the following:
3.1 Request a translation when the value of the incoming digit counter (IDC) is ≥ the value of the TL field and TL ≠ 0. The TL will refer to the called number if ANI is reset and will refer to the calling number if ANI is set (SDS = 5 was given by the DP).
3.2 Set FD when the IDC ≥ the value of the TL field and TL ≠ 0.
The TL s interpreted in this manner when the Early Outpulsing bit (EOP) is set. In this mode the RS will set FD rather than the DP.
The RS used the TL internally as part of the process of initiating a Translation interrupt on three or four digits received based on the value of the first digit received being 2 to 9 or one/zero respectively. If the first digit received is a one or zero and the ZOC bit is set, the RS will force the TL to a value of 4.
4.0 Control
4.1 Set by the DP prior to or while digits are being received.
4.2 Modified by RS as a function of ZOC and the first digit received being a one or zero.
4.3 Reset by DP.
5.0 Timing
None
6.0 Cross Reference
6.1 ZOC, IDE
7.0 Comments
7.1 The TL field can be used in conjunction with the Pattern Recognition Field (PRF), and Zero Time-out field (ZTO), and the Fast Time-out field (FTO) for requesting the RS to initiate a Translation interrupt during the digit receiving mode.

TMA, TMB, TMC
1.0 Name
Timer A, Timer B, Timer C
2.0 Location
Word
1B
2B
3B
Bit Position(s) L1, L2, L3, L4

3.0 Functional Description

The 4 bit fields are internal RS counter fields used to time the function associated with row 1, 2 & 3. Examples of this timing are:

1. timing the Sender-Receiver Matrix connection
2. timing the function of setting a translation interrupt
3. timing the total translation time 4.0 Control 4.1 Set by RS 4.2 Reset by RS 5.0 Timing Incremented every 10ms 6.0 Cross Reference 6.1 MDA, MDB, MDC

TO

1. Name

Time-Out 2.0 Location

Word 2A

Bit Position F1

3.0 Functional Description

This one bit control field, along with the TRI and CAB fields, are used to indicate the cause of a Translation interrupt. The TO bit is set by the RS under the condition of a permanent or interdigital time out. The TO field is one of the three fields that are transferred to the DP via the Translation Interrupt word. As in the case of TRI and CAB, the RS will not initiate a Request for Translation interrupt if a translation is in process.

4.0 Control 4.1 Set by the RS (RRC-equation 38)

4.2 Reset by the DP 5.0 Timing 5.1 The TO field must be reset prior to setting the CTR field in order to avoid a new TO interrupt.

6.0 Cross Reference 6.1 TRI, CAB 6.2 Section 3

TOP 1.0 Name

Tone On Period 2.0 Location

Word 3B

Bit Position G1

3.0 Functional Description

The TOP bit is an internal RS control field used during sending in the multifrequency mode. The TOP bit controls the application of the tones on the line by the MF sender. During MF sending the RS will alternate the status of the TOP bit every 70 milliseconds thus generating the MF pulse train. (exception - KP is 100ms)

4.0 Control 4.1 Set by RS (RSC-equation 15)

4.2 Reset by RS (RSC-equation 16)

5.0 Timing

None 6.0 Cross Reference

DS, CMS

TRB 1.0 Name

System Trouble 2.0 Location

Word 1A

Bit Position F4

3.0 Functional Description

The TRB field is a maintenance indicator field used to indicate a system error or fault has occurred. System trouble consists of all troubles detected in the space divided equipment (Sender, Receivers, RRJ, etc.), network troubles, and intersubsystem troubles. It doesn't include trouble in the Common Logic portion of the RS i.e., a mismatch between Register-Senders. The TRB field is set as a function of other trouble detections. When TRB is set, the memory associated with the RRJ setting TRB is frozen i.e., the memory for that RRJ will be recycled but no modification of data by the RS will take place. A detailed description of the sequence of operations after the TRB field is set is presented in section 4.

4.0 Control 4.1 Set by RS 4.2 Reset by DP 5.0 Timing 5.1 See section 4

6.0 Cross Reference 6.1 TRC, TRJ, TSN, Section 4

TRC 1.0 Name

Trouble in Receiver 2.0 Location

Word 2A

Bit Position F3

3.0 Functional Description

The TRC field is a maintenance indicator field set by the RS to indicate an error or fault in the MF receiver. The setting of TRC will in turn set the general trouble indication, TRB. When the Register-Sender Maintenance Circuit observes the TRB field set, the memory associated with the RRJ setting TRB will be frozen (see TRB).

4.0 Control 4.1 Set by RS 4.2 Reset by DP 5.0 Timing

None 6.0 Cross Reference 6.1 TRJ, TRB, Section 4

TRI 1.0 Name

Translation Instruction 2.0 Location

Word 2A

Bit Positions D4, E1, E2, E3

3.0 Functional Description

This 4 bit field, along with the TO and CAB fields, are used by the RS to indicate the cause of a Translation Interrupt. The TRI field, besides appearing in the RS memory map, is also written by the RS in the Translation Interrupt word.

The values of the TRI field are as follows:

TRI = 1 - The IDC field is greater than or equal to the TL field.

TRI = 2 - A pattern indicated by the PRF field has been recognized.

TRI = 3 - A digit greater than 11 has been received in the MF mode (ST).

TRI = 4 - The sender is connected.

TRI = 5 - A timeout on line busy or reorder tone application has occurred.

TRI = 6 - The RS has disconnected from the network and is ready to clear the memory.

TRI = 7 - The Sender or receiver is disconnected.

TRI = 8 - The retrial timing is completed.

TRI = 11 - TCMF digit > 11 received.

TRI = 9 — 15 — Spare.

The nine conditions for causing a DP interrupt are not mutually exclusive of the TO and the CAB conditions. The RS will set the TRI field to the value corresponding to the first condition (cause) and will not change it until the DP has processed the translation and set the CTR field. Thus if there are two conditions for initiating a translation interrupt, the TRI field will be set to the one that occurred first. After the DP processes that request and sets the CTR field, the RS will set the TRI field to the second condition if it still exists after the updating of the first translation.

4.0 Control 4.1 Set by RS 4.2 Reset by DP. If the TRI field is not reset the RS will again initiate a Translation interrupt after the CTR field is set.

5.0 Timing 5.1 The TRI field must be reset before the CTR field is set.

6.0 Cross Reference 6.1 TO, CAB, IN 7.0 Comments 7.1 The TRI's which can conflict are:

1. TRI = 1, 2, & 3 and
2. TRI = 7 & 8

For case (1) if two or all three conditions occur at the same time the RS will set TRI according to the following priority:

1. TRI = 3
2. TRI = 1
3. TRI = 2

In case (2) the RS will always set TRI = 7 before TRI = 8 if a conflict occurs.

7.2 If a translation interrupt was generated by the TRI field, only the TRI field should be reset after the translation has been completed and not the TO & CAB field since a TO or CAB condition may have occurred while the translation interrupt was in process.

TRJ 1.0 Name

Trouble in the Register Junctor 2.0 Location

Word 2A

Bit Position F4

2.0 Functional Description

The TRJ field is a maintenance indicator set by the RS to indicate an error or fault associated with the RRJ has occurred. TRJ is set as a function of trouble detected in the Junctor Multiplex Circuit, in the receiver multiplex circuit, or timing. The setting of the TRJ field will in turn set the system trouble indicator, TRB.

4.0 Control 4.1 Set by RS 4.2 Reset by DP 5.0 Timing

None 6.0 Cross Reference 6.1 TRB, Section 4

TSC 1.0 Name

Test Sequence Counter 2.0 Location

Word 2B

Bit Position H1, H2

3.0 Functional Description

The TSC field is an internal control field used to control the sequence and operation of relays in the RJ which make the party and coin test. The results of the party or coin test are contained in the P2 field.

4.0 Control 4.1 Set by RS (RRC equations 23, 24, 25, 26)

4.2 Reset by RS at end of count (see below)

5.0 Timing 5.1 Once the timer has been started it counts every 10ms.

6.0 Cross Reference

PT, CT, PTR, PTT, CB 7.0 Comments 7.1 The sequence of count is

| H2 | H1 |
|---|---|
| 0 | 0 |
| 0 | 1 |
| 1 | 0 |
| 1 | 1 |
| 0 | 0 |

TSN 1.0 Name

Trouble in the Sending operation 2.0 Location

Word 3A

Bit Position F4

3.0 Functional Description The TSN field is a maintenance indicator set by the RS to indicate an error or fault associated with the sender or any other aspect of the sending operation has occurred. TSN is set as a function of detection in the sender itself, timing, or improper signals received from the distant office. The setting of TSN will in turn set the general trouble indicator, TRB. When the RS Maintenance Controller observes the TRB field set, the memory associated with the RJ setting TRB will be frozen (see TRB).

4.0 Control 4.1 Set by RS 4.2 Reset by DP 5.0 Timing

None 6.0 Cross Reference 6.1 TRJ, TRB

WFT 1.0 Name

Waiting for translation 2.0 Location

Word 1B

Bit Position H3

3.0 Functional Description

This 1 bit field is used by the RS to indicate that it has set the DP interrupt and is waiting for the translation to be completed. This bit is reset by the RS when the DP has completed a translation and has completed updating the RS memory with the result of the translation. The use of this bit is described in detail in section 3 (Functional Description for Translation Interrupt).

4.0 Control 4.1 Set by RS after it has set the Translation interrupt. (RPC-equation 34)
4.2 Reset by RS after results of requested translation are transferred to RS memory (CTR set by DP). (RPC-equation 30)

5.0 Timing
None 6.0 Cross Reference
6.1 Section 3
6.2 RQT, CTR

ZOC 1.0 Name
Zero One Code 2.0 Location
Word 4A
Bit Position D1

3.0 Functional Description
This one bit instruction field is used by the DP for instructing the RS to initiate a Translation interrupt after four dialed digits are received if the first dialed digit received is a one (1) or zero (10). If the first dialed digit is not a one or zero no special action is taken by the RS. In the latter case the RS will initiate a Translation based on the TL, PRF, or FTO instruction fields.
If the first dialed digit is a one or zero, the RS will set the TL field to a value of four. This will cause RS to initiate a Translation interrupt when four digits are received (see TL).

4.0 Control
4.1 Set by the DP as a function of the class of service translation.
4.2 Reset by DP whenever digit deletion takes place. Otherwise it is reset by RS at disconnect time.

5.0 Timing
None 6.0 Cross Reference
6.1 TL 7.0 Comments
7.1 The DP will know that a zero-one code was the first dialed digit by comparing the TL given to the RS and the TL retrieved from the RS when it receives a Request for Translation interrupt. The TL given to the RS will have a value 3 while the TL retrieved from the RS will have a value 4 if a zero one code was the first digit received and ZOC was set.

ZTO 1.0 Name
Zero Time-Out 2.0 Location
Word 4A
Bit Position F2

3.0 Functional Description
This 1-bit field is used by the DP to instruct the RS to apply fast interdigital timing after the next dialed digit if the next dialed digit is a zero (10). (first digit only)

4.0 Control
4.1 Set by DP as a function of class of service or pattern recognition translations.
4.2 Reset by the RS following the next digit received after the ZTO was written in the RS memory.

5.0 Timing
5.1 ZTO will be reset before the RS initiates a Translation interrupt on PRF (one digit) if PRF and ZTO are both given to the RS at the same time.

6.0 Cross Reference
None 7.0 Comments
7.1 ZTO is used to eliminate a long time-out on calls to the operator.

E. SYMBOLISM FOR GATES AND BISTABLE DEVICES

The common logic circuits of the register-sender subsystem are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the output of each connected to an input of the other, which makes the circuit a bi-stable device. The logic also uses bistable devices in the form of JK flip-flops implemented with integrated circuits, indicated in the drawings by rectangles having the J and K inputs indicated by a small semicircles, a clock input indicated by C, and set and reset inputs indicated by S and R. Not all of the inputs for these devices are shown in the drawings. The J and K inputs are each actually AND gates having three external inputs, but the unused inputs which are actually terminated in some manner are not shown on the drawings.

Relay units such as the register junctors include interface circuits for signals to and from the electronic frames. These interface circuits are relay drivers and test gates as shown for example at the bottom of FIG. 10. These circuits use discrete transistors rather than integrated circuits. Relay drivers shown as triangles function as switches to operate the relays. Those designated MGS are main ground switches comprising two transistors connected so that when a true signal is applied at the input, ground potential from the main battery is connected via the emitter-collector path of the output stage in saturation to a relay; those designated MBS are main battery switches connected so that with a true signal at the input the negative terminal of the main battery is connected via the emitter-collector path of the output stage in saturation to a relay; those designated FRS are fast-release relay switches comprising two transistors such that when a true signal is applied to the input the two output leads from the collectors of two transistors connected to the two sides of the relay winding supply a low impedance path to operate the relay; and those designated LBS for low current battery switch comprise a single transistor which when a true signal is applied at the input supply a low impedance path including the collector-emitter path to operate the relay. The contact test gate designated by CTG is a circuit which when ground is supplied via relay contacts at its input supplies a true signal at its output.

F. REGISTER JUNCTOR AND ORIGINATING PATH

Figure 9:
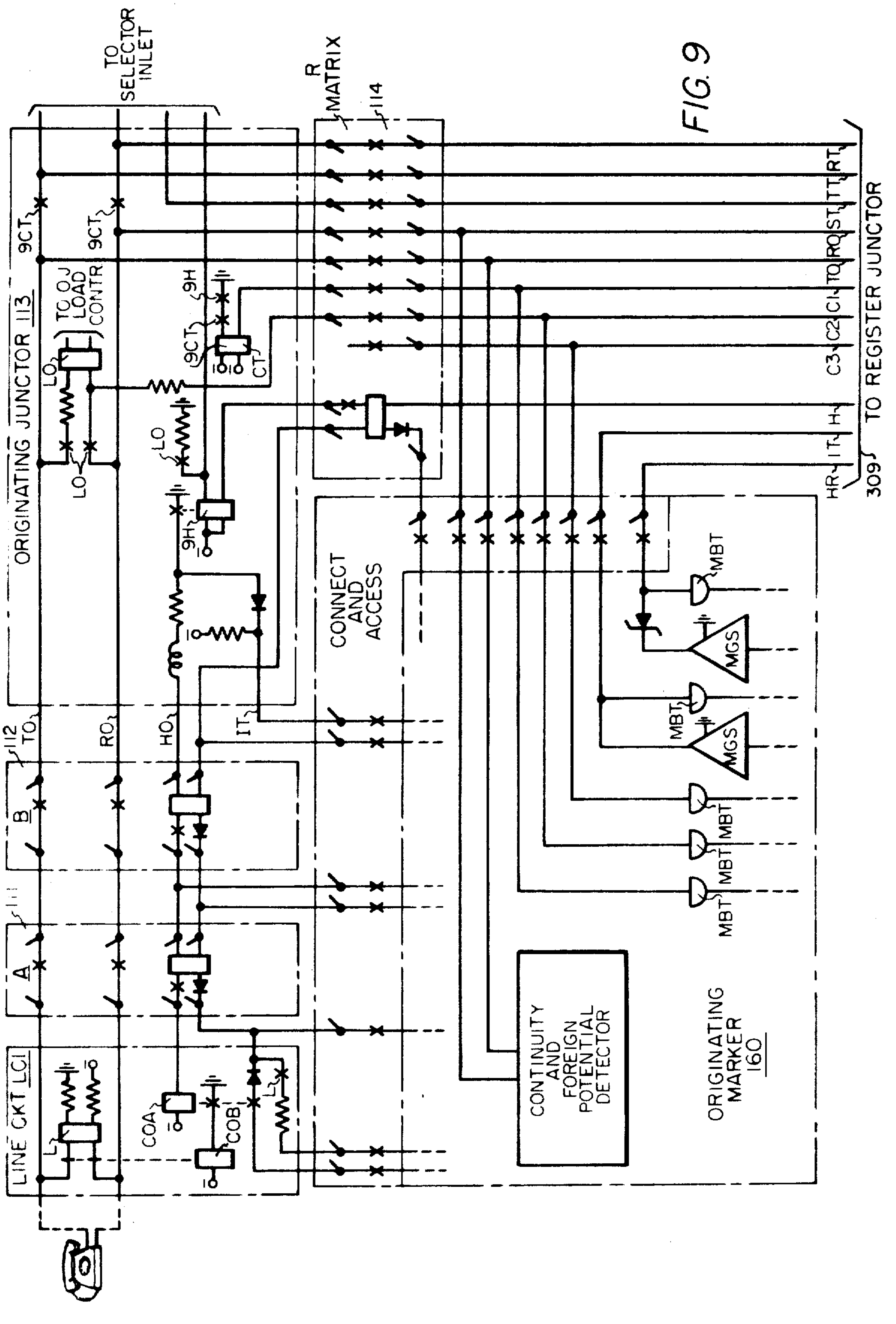
FIG. 9 is a schematic and functional block diagram of a portion of the switching network and originating marker for showing an originating connection.
Figure 10:
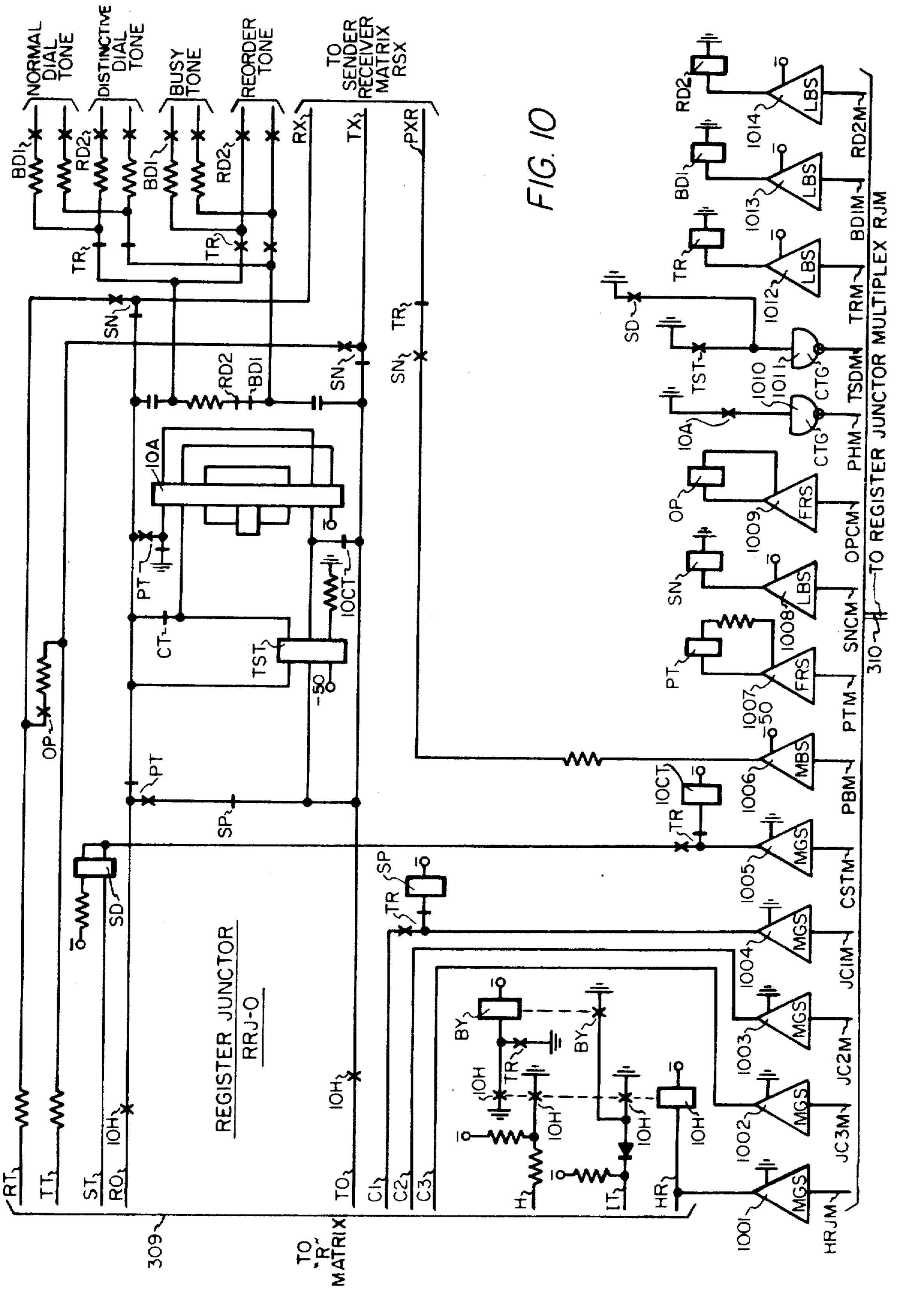
FIG. 10 is a schematic and functional block diagram of a register junctor.

A diagram of a register junctor RRJ-0 is shown in FIG. 10, and an originating path is shown by a diagram of FIG. 9.

FIG. 9 shows a diagram of the path for a connection in a line group between a calling line to a register junctor and to a selector inlet. The path includes one line circuit LC1, one A stage crosspoint 111, one B stage crosspoint 112, an originating junctor 113, and one R matrix crosspoint 114. The originating junctor includes a hold relay 9H, a cut-through relay 9CT, and a lockout relay L0. FIG. 9 also shows a portion of originating marker 160, particularly some circuits interfacing with the register junctor.

The register junctor's function is the interface between the subscriber lines and incoming trunks, and the time-shared circuits of the register-sender. The register junctors are used for digit receiving or sending, tone application, a battery feed device to the calling station, party and coin testing, busy and idle indication to the originating marker, and as a source of hold for the matrix path.

There are two types of register junctors; the local register junctors used with the R stage outlet to subscriber lines and paystations, and incoming register junctors used with incoming trunks and having less complexities than the local register junctors.

The register junctor RRJ-0 shown in FIG. 10 is a local register junctor.

Relay 10H is a reed relay (correed). It is energized by the originating marker applying ground potential to the HR lead. Contacts of this relay connect the tip and ring leads T0 and R0 to relay 10A, close a path to operate relay BY, which in turn has contacts to apply ground to the IT lead and via a path not shown lights a busy lamp. Contacts of relay 10H also supply ground potential to lead H to hold the originating connection. Relay 10H releases after the register-sender receives specific instructions from the data processing unit that the terminating marker has completed its functions which will cause the register junctor to eventually be released.

Relay BY is an HQA relay. This relay is normally operated by ground potential via contacts of the H relay, but can also be operated by a busy switch not shown. When this happens it makes the register junctor busy to the originating marker. Contacts of relay TR will also hold relay BY operated. Relay TR is operated during sequence states PSS=6 to PSS=15 which will be described in the operation of the common logic circuits. Since the relay 10H drops after sequence state PSS=12, relay TR will hold up the relay BY until memory is cleared. Relay BY is slow to release (25 milliseconds) because of a diode not shown across its coil. This makes it the last relay in the register junctor to release.

Relay 10A is a single reed relay with three windings, as disclosed in said BATTERY FEED RELAY patent. Two of the windings are connected in series while the third is not actively used. Relay 10A is operated under the control of the subscriber loop (or trunk) via the tip and ring leads. After relay 10H has operated connecting the register junctor to the subscriber line, with the telephone at the subscriber station off-hook closing the path between the T and R relays, relay 10A operates. Contacts of this relay supply ground to a contact test gate 1010, which generates a true signal on lead PHM (pulsing highway) which via the multiplex circuits is supplied to the register controler RRC (FIG. 5). During the reception of dialed digits relay 10A follows the dial pulses which are therefore repeated via lead PHM to the common logic circuits. Relay A is also used in conjunction with relay TST during a party or coin test, and operates if there is a ground on the tip lead at the subscriber station. When relay 10H releases during sequence states PSS=13, relay 10A is also released.

Relay BD1 is an HQA relay. It may be operated under two sets of circumstances. The first is to return dial tone to the subscriber during sequence state PSS=2 or PSS=3, and the second is to return busy tone to a subscriber line or trunk during sequence state PSS=11, at which time relay TR is operated. This relay is operated via a signal from the multiplex circuits on lead BD1M which operates the relay driver 1013.

Relay RD2 is an HQA relay. It is operated via a signal on lead RD2M operating relay driver 1014 under two sets of circumstances, one being to return distinctive dial tone to a subscriber, and the second being to return reorder tone if relay TR is also operated.

Relay 10CT is a reed relay. This relay is controlled by the TSC (test sequence counter) in memory. It is operated for 10 milliseconds while performing a coin test or party test. While it is operated it includes the TST relay in the test path from the relay 10A and source battery, to the ground provided for the subscriber equipment.

Relay PT shown in FIG. 10 as a single relay actually comprises two mercury wetted reed relays in parallel, operated by the same fast release relay switch 1007 under control of a signal on lead PTM. They are operated for 30 milliseconds for control of the path for coin and party tests.

Relay SP is a reed relay which is used to open a parallel path during coin testing that is possible when testing for coin deposit from a single slot touch calling telephone. Without the path being open a "series" relay (or equivalent) in some (new single slot) coin telephones may not release, thus preventing coin ground from being applied to the tip side of the line. It is operated as a function of the CB bit of memory and TSC having started It is operated for the same 30 milliseconds as PT during coin test.

Relay TST is a mercury wetted reed relay with three windings. This relay is used for coil deposited test and party two identification. When the test is not being made two of the windings are shorted out by contacts of relay 10CT. The third winding is constantly active giving a reverse-bias in the relay so that any contact switch bounce or stray potential will not operate relay TST giving a false indication.

Relay TR is a HQA relay which is activated during sequence states PSS=6 or greater via relay driver 1012. When operated this relay disables the path for dial tone and enables the busy and reorder tone paths, removes relay CT from the circuit and prepares a path for relay SD, removes relay SP from the circuit and prepares a path for lead C1 to the originating trunk circuit, maintains relay BY operated and opens a path from the sender-receiver pull battery switch 1006 via lead PXR to the matrix. This last set of contacts is a protection feature to insure that a multiple path is not pulled in the matrix should the main battery switch 1006 fail.

Relay SD is a mercury wetted reed relay. This relay (start dial) has two functions in the call process. First it recognizes that the terminating marker has seized the outgoing trunk or terminating junctor and it also receives start dialing commands from the distant office. Then the terminating marker seizes an S relay of the trunk or terminating junctor, relay SD is also operated. Contacts of this relay operate a test gate 1011 to send a logic signal to the register-sender central control via lead TSDM. In response thereto a signal on lead CSTM operates relay driver 1005 to relay SD. When the terminating marker releases, relay SD drops, but the S relay of the terminating junctor or trunk is held by the ground from relay driver 1005. When a distant office signals with a start dial (or stop dial if sending is in progress) a ground is received on lead ST causing relay SD to operate. When the distant office causes the start/stop dial to cease, relay SD releases to supply a signal to the register-sender common logic.

Relay Op is a mercury wetted reed relay which has three functions. First it is operated while making a sender or receiver connection. When contacts of relay OP close an A relay in the sender or receiver operates to check continuity of the tip and ring paths. Second, the relay operates during operation of a terminating marker connecting to an outgoing trunk so that the terminating marker can make a continuity check. And lastly this relay is operated and released to send dial pulsing signals. Energizing and releasing the relay causes a path via the tip and ring to alternately short and open.

Relay SN is an HQA relay which has two functions. First it is operated during the connection of a sender or receiver. One set of contacts close to connect the pull relay driver main battery switch 1006 to lead PXR to the matrix during connection. The other purpose is to connect an MF sender to the terminating tip and ring conductors and isolate the originating and teminating tip and ring paths within the register juncter.

An incoming register juncter is similar to the local register juncter described above except that relays TST, 10CT, PT, RD2, and SP are omitted.

G. MULTIPLEX TO REGISTER JUNCTORS

Figure 11:
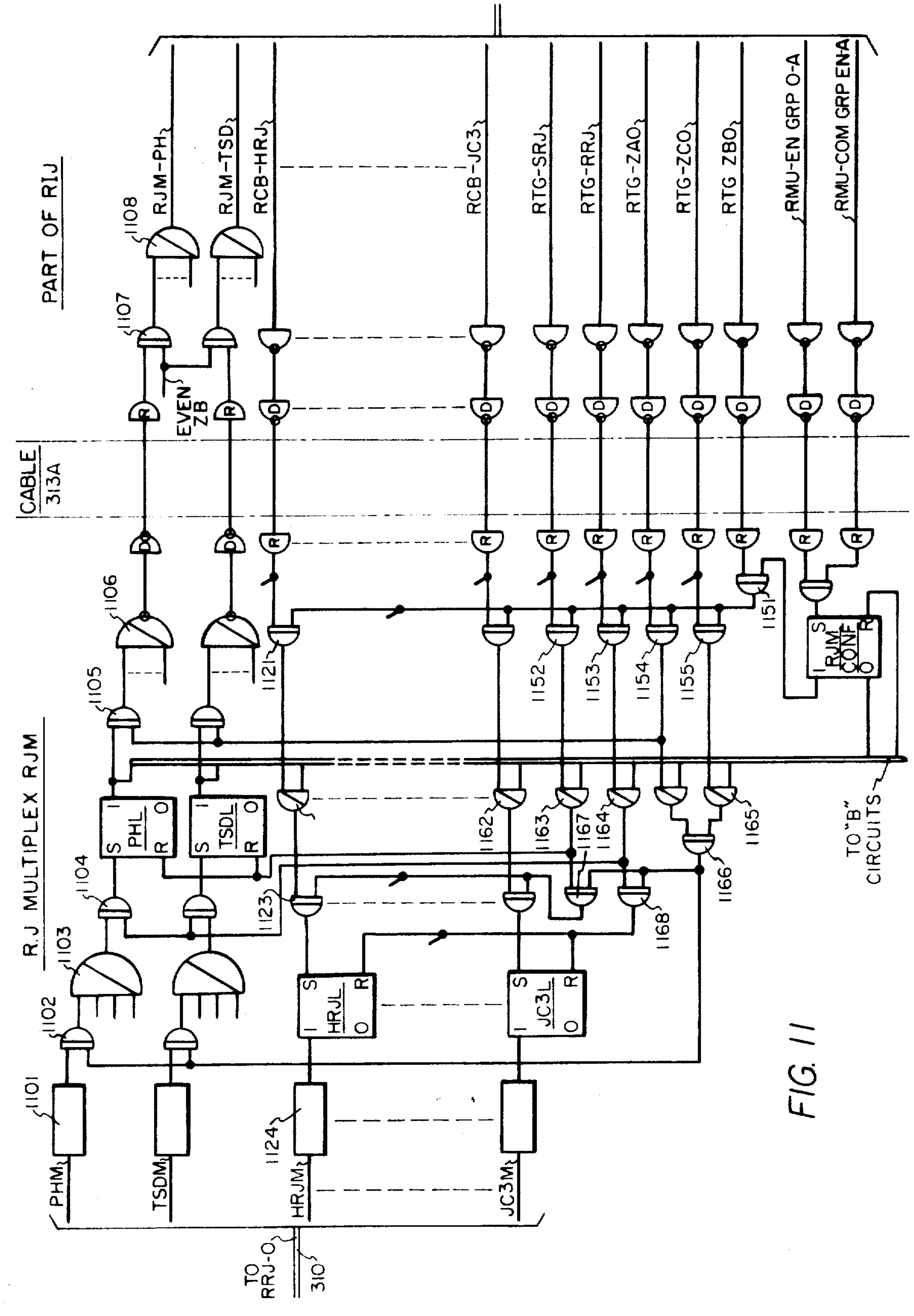
FIG. 11 is a diagram showing the register junctor multiplex circuits.

A portion of the multiplex circuits between the register juncters and frame RCC is shown by a functional block diagram in FIG. 11, which relates to the block diagram shown in FIG. 3. A portion of the multiplex circuits are in the unit RJM shown in FIG. 3, and a portion are in the unit RIJ shown in FIG. 5. In unit RJM the circuits are divided into eight groups designated 0 through 7, each group serving 24 register juncters. The circuits shown in FIG. 11 are a part of group 0 of unit RJM for multiplexing signals to and from the register juncter RRJ-0. The connections between the groups in RJM and the unit RIJ are via conductors in the set of cables 313A, which comprise DC links having cable drivers designated by D at the input end and cable receivers designated by R at the output end, each link being via a twisted pair which includes a ground return conductor not shown. The drivers provide signal inversion, while the receivers do not. Note that some of the signal leads for RIJ are designated with RTG or RMU. These signals actually originate in the units RTG-A and RMU-A shown in FIG. 4 and are repeated through various circuits including conductors of the set of cables 321A. While RJM group 0 normally operates with the common logic circuits of RCC-A and RMM-A, the group also includes circuits for operating with the units RCC-B and RMM-B, under the control of a latch RJM CONF which is controlled by signals from unit RMU. Thus when the signals RMU-EN GRP 0-A and RMU-COM GRP EN-A are both true then the latch RJM CONF is set so that this group operates with the A circuits, and may be reset by similar signals from unit RIJ-B to operate with the B circuits.

The connection between unit RJM and each register juncter includes special interface circuits including electronic devices and chokes, these circuits being shown in FIG. 11 by blocks such as 1101 for scan leads from the register juncter and 1124 for control leads to the register juncter. For each register juncter there are two scan leads PHM and TSDM shown in FIGS. 10 and 11, and a plurality of control leads as shown in FIG. 10 in the set of conductors 310, two of which HRJM and JC3M are shown in FIG. 11. The unit RJM for each group includes the two scan latches PHL and TSDL coupled to the corresponding scan leads PHM and TSDM, these scan latches being common to three register juncters served by the group. There are a plurality of control latches individual to each register juncter one for each of the control leads, control latches HRJL and JC3L being shown in FIG. 11.

Address conductors from the decode circuits 601, 602 and 603 of the register timing generator in FIG. 6 supply the ZA, ZB and ZC signals select the time slots of the register juncters in sequence and control the multiplex circuits accordingly, each register juncter being scanned during its time slot and its control latches selectively set. The signals RTG-SRJ and RTG-RRJ determine the time interval during each time slot at which the latches may be set and reset. As shown by gate circuits in FIG. 6 the signal on lead RTG-RRJ is true during coincidence of the signals Y1 and X2 which occurs near the beginning of a time slot, and the signal on lead RTG-SRJ is true during coincidence of the signals Y11 and X5 which occurs near the end of the time slot. These signals may be inhibitied by the maintenance control unit via lead RMU-TIM-INBT. In FIG. 11 the three conductors RTG-ZAO, RTG-ZBO and RTG-ZCO for addressing the register juncter RRJ-O are shown.

The ZB signal is used for group selection; thus when the signal on lead RTG-ZBO is true and the latch RJM CONF is set for the A circuits, gate 1151 is enabled to supply inputs for selecting gates 1152, 1153, 1154 and 1155 for the other timing generator signals, and the plurality of gates including gate 1121 for all of the control signals from the carry buffer RCB. These timing generator and carry buffer signal leads are also multiplied to the other groups. The outputs of these gates are connected to OR gates such as 1122 for the control signals and 1162–1165 for the timing signals; these OR gates also having corresponding inputs from the B circuits for controlling the group of register juncters when latch RJM CONF is in the reset condition.

When the signals on leads RTG-ZAO and RTG-ZCO are both true during the time that the signal on lead RTG-ZBO is also true, then gate 1166 is enabled, designating the time slot for register juncters RRJ-O. The output of gate 1166 supplies inputs to the scan gates such as 1102, and also to gates 1167 and 1168 for the latch input control signals.

The signal on lead RTG-RRJ near the beginning of the time slot via the cable link and gates 1153, 1163 and 1168 supplies an input to gate 1104. If the signal from the register junctor on lead PHM is true, than via gates 1102 and 1103 another true input is supplied to gate 1104, which causes the latch PHL to be set. The output from latch PHL is supplied to an AND gate 1105, and the signal on RTG-ZAO via the cable link and gate 1154 supplies another input, and the output of this gate is supplies via OR gate 1106, the cable link, and gates 1107 and 1108 in the unit RIJ to lead RJM-PH for use by the common logic circuits. Gate 1106 has eight inputs from different PHL latches in the group, so that 24 register junctors have their PHM signals multiplexed to the output of gate 1106. The signal on lead EVEN-ZB in unit RIJ is true during the time slots for groups 0, 2, 4 and 6. Gate 1108 has eight inputs for the respective eight groups, so that its output represents the multiplexed condition for all 192 register junctors, each controlling the output signal during its own time slot. The signal to lead RJM-TSD is multiplexed in like manner for the signals on lead TSDM from the 192 register junctors. Near the end of each time slot the signal on lead RTG-SRJ via the cable line and gates 1152, 1162 and 1167 resets the scan latches in preparation for scanning in the next time slot.

All of the control latches for a particular register junctor are reset near the beginning of its time slot in response to the signal on lead RTG-RRJ which is supplied via the cable link and gates 1153, 1163 and 1168. The input control signals are from latches in the carry buffer circuit, which are selectively set at various times during the time slot in accordance with the logical processing. If, for example, the latch supplying lead RCB-HRJ has been set during this time slot, then the true signal is supplied via the cable link to the group select gate 1121, and thence via gate 1122 to gate 1123. Near the end of the time slot the signal on lead TRG-SRJ via the cable link and gates 1152, 1162 and 1167 supplies another input to gate 1123 and corresponding gates for the other control latches. The output from gate 1123 sets the latch HRJL, and its output via interface circuit 1124 supplies the signal to lead HRJM, which in the register junctor of FIG. 10 via relay driver 1001 supplies a holding ground for relay 10H. The other control latches and control signals to the register junctor are similarly controlled. Thus it may be seen that if the logical conditions are such that the carry buffer latch is set in successive time slots for a particular register junctor, then the control signal to the register junctor is continuously true except during the time slot itself when the control latch is in the reset condition. This short interruption of the control signal does not affect the relays in the register junctor.

H. MULTIPLEX TO SENDERS AND RECEIVERS

Figure 12:
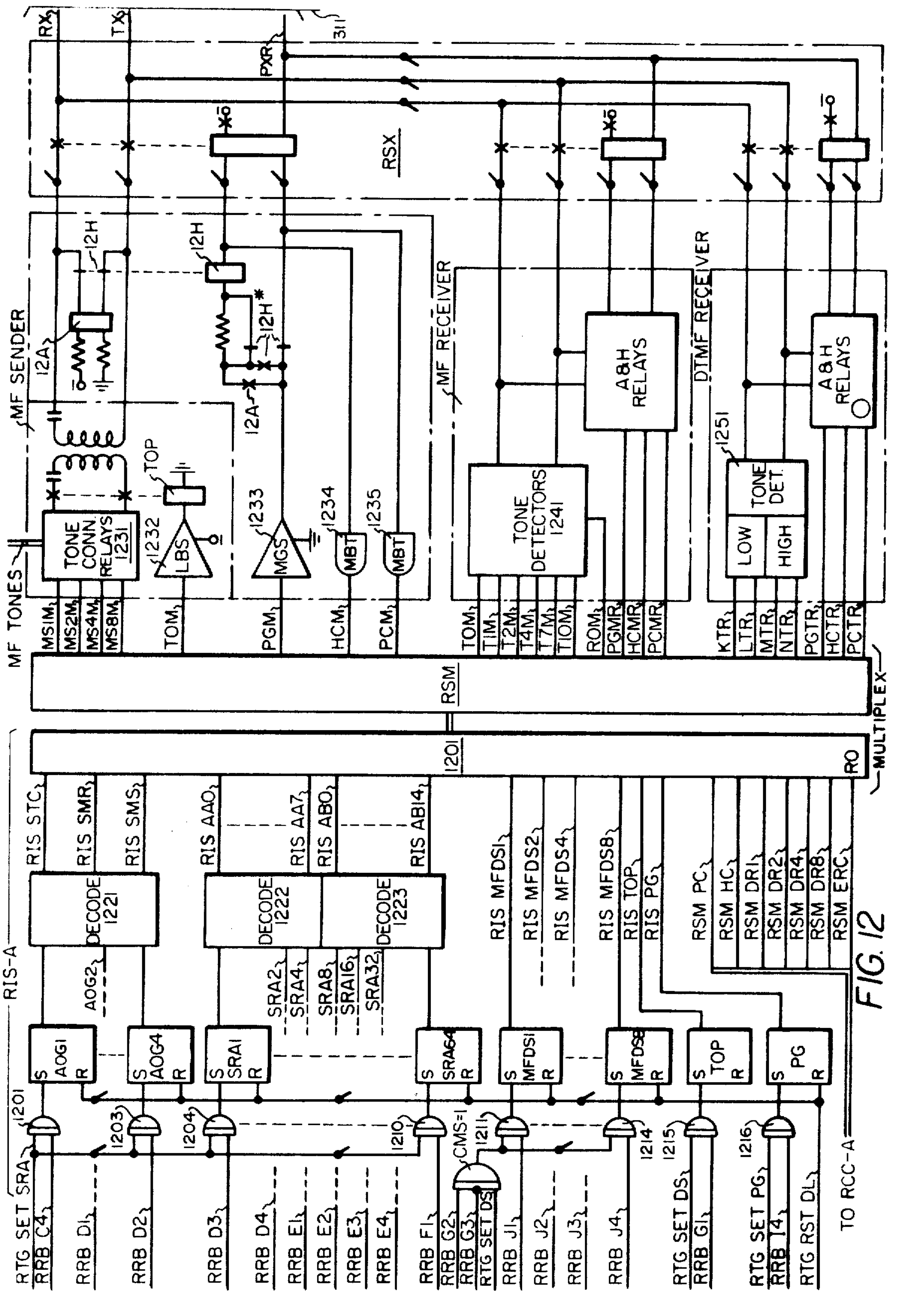
FIG. 12 is a diagram showing the multiplex circuits for the senders and receivers.

The multiplex for senders and receivers and circuits associated therewith are shown in FIG. 12. The multiplex circuits themselves in unit RSM, and block 1201 of unit RIS-A are generally similar to the corresponding circuits of unit RJM and RIJ for the junctor multiplex, and therefore are indicated only by single blocks.

One MF sender out of a maximum of 36, one MF receiver out of a maximum of 36, and one DTMF receiver out of a maximum of 120 are shown in FIG. 12.

The RSX unit is a single stage matrix comprising 24 8 × 10 matrix switches, with three of the cross points of one matrix switch shown in FIG. 12 for connecting the register junctor RRJ-0 respectively to the MF sender, the MF receiver and the DTMF receiver shown. Each crosspoint is a reed relay having a pull winding shown at the bottom, a hold winding at the top, and three sets of make contacts. As indicated each register junctor is connected in multiple to a plurality of crosspoints, and each sender and receiver is also connected in multiple to a plurality of crosspoints.

As shown in detail in the MF sender, there is a relay 12A and a relay 12H. Relay 12A has two windings connected via resistors to the negative and ground terminals of the main battery, the other sides of the windings being connected respectively via break contacts of relay 12H to the tip and ring conductors via the crosspoint to the register junctor leads TX and RX. A signal on lead PGM from the multiplex circuits operates a relay driver 1233 which supplies ground potential initially for pulling the crosspoint relay, and then for holding it. The asterisk indicates make before break contacts for relay 12H. The ground potential drom relay driver 1233 via the lower break contacts of relay 12H, in conjunction with negative battery potential on lead PXR from the register junctor selects and pulls a crosspoint relay. Relay 12A then operates via a path through the operated crosspoint contacts and a path in the register junctor. A path is then completed via the ground from relay 1233, make contacts of relay 12A, break contacts of relay 12H, the winding of relay 12H, and the hold winding of the crosspoint relay and a set of its contacts to battery potential. After the hold relay 12H operates, relay 12A is disconnected, and relay 12H via the ground from relay driver 1233 via its own make contacts and a resistor, holds itself and the crosspoint relay. Gates 1234 and 1235 are main battery test circuits which operate in response to detecting main battery negative potential to supply a true signal on their respective output leads. The use of these circuits is described in the subsequent operational description of the register-sender subsystem. Each of the senders and receivers includes corresponding A and H relays and interface circuits similar to 1233, 1234 and 1235, indicated for the MF receiver and TCMF receiver by blocks.

The MF sender also includes a relay driver 1232 for operating relay TOP for the "time on period" of the tones during sending. The block 1231 indicates a set of relays controlled by relay drivers from the four leads MS1M through MS8M, to apply tones during sending from a tone source. Each digit is received in binary code on the four leads MS1M through MS8M and is converted to a code for applying two out of six tones via contacts of relay TOP and condensors and a transformer to the tip and ring leads, through the crosspoint connection to leads PX and RX at the register junctor.

The MF receivers include tone detectors indicated by block 1241 to supply respective signals to the six leads T0M through T10M. If more than two tones are received for a digit, a signal appears on lead R0M, indicating an error condition.

Dual tone (DTMF) or Touch Calling (TCMF) multifrequency refers to a signaling system for subscriber calling from telephone instruments equipped with sets of puchbuttons, in which each digit is represented by two tones, namely one out of four high frequency tones and one out of four low frequency tones. In the Bell System this is identified as TOUCH TONE service.

The DTMF receivers have tone detectors indicated by block 1251. The code comprises one out of four low frequency tones and one out of four high frequency tones for each digit. The low frequency tone is detected and encoded on the two leads KTR and LTR, while the high frequency tone is detected and encoded on the two leads MTR and NTR.

For sending, the digit in binary coded decimal is received from the read buffer and leads RRB J1 through RRB J4 and used via gates 1211 to 1214 to selectively set the appropriate ones of four latches MFDS1 through MFDS8. The outputs from these latches are coupled through the multiplex circuits of block 1201 and RSM to the four leads MS1M through MS8M of the selected sender. The tone on period is determined by bit G1 as indicated on lead RRB G1, which in conjunction with the timing signal RTG SET DS via gate 1215 sets a latch TOP. The output of this latch via the multiplex circuits supply the signal to lead T0M of the selected sender. The signal RTG SET DS as indicated by the output of a gate in FIG. 6 is true during coincidence of signals on leads Y11 and X4.

The pull ground for selecting the sender or receiver is controlled by bit I4 of word 1B of memory. The signal on lead RTG SET PG is obtained from a gate in FIG. 6 which is enabled during coincidence of signals on leads Y9 and X4, and this signal in coincidence with the signal on lead RRB I4 via gate 1216 sets latch PG in FIG. 12. The output of this latch via the multiplex circuits is supplied to a lead PGM of a selected MF sender, lead PGMR of a selected MF receiver or lead PGTR of a selected DTMF receiver.

The scan signals from the senders and receivers as received from the multiplex circuits are shown at the bottom of block 1201 as signals RSM PC through RSM ERC. The PC and HC signals are from the test gates such as 1234 and 1235 in the sender or corresponding test gates in a receiver. The signal ERC is multiplexed from lead R0M of a selected MF receiver for indicating an error condition. A received digit appears at the output of the multiplex circuits in binary coded decimal form on the four leads RSM DR1 through RSM DR8. Special gates in blocks 1201 are used to convert the code on the six leads from an MF receiver or the four leads from a DTMF receiver into the binary coded decimal form on these four leads.

Whereas the addressing for the register junctor multiplex circuits is determined by the sequentially occurring time slot signals, those for the senders and receivers are determined by an address stored in memory as received from the data processing unit. This address in word 1A comprises a field A0G and SRA. The address appears in the read buffer during sub-time slots Y1 and Y9 of the time slot of the associated register junctor. During sub-time slot Y1 this address is transferred into a set of latches shown in FIG. 12, comprising three latches AOG1 through AOG4, only the output of latch AOG2 being shown; and seven latches SRA1 through SRA64, only the outputs of latches SRA2 through SRA32 being shown. The timing of the transfer is controlled by a latch SET SRA shown in FIG. 6 which is controlled by input gates during coincidence of signals on leads Y1 and X2 to be set in response to the signal on lead W6 and reset in response to the signal on W11. The output of this latch appears via an AND gate to lead RTG SET SRA, which in FIG. 12 supplies as an input to AND gates 1201 through 1210. The latches are then set selectively in accordance with the signals on leads RRB C4 through RRB F1. The output of the three AOG latches is decoded by circuit 1221, with only three of the possible output signals being decoded as RIS STC for selecting a DTMF receiver, RIS SMR for selecting an MF receiver, and RIS SMS for selecting an MF sender. The outputs of the SRA latches are decoded by circuits 1222 and 1223 to provide signals on eight leads RIS AA0 through RIS AA7, and fifteen leads RIS AB0 through RIS AB14 as shown. These signals select a specific sender or receiver within each group.

The latches in unit RIS are reset in response to a signal on lead RTG RST DL which as shown in FIG. 6 at the output of a gate is true during coincidence of signals on leads Y11 and X1.

J. REGISTER CENTRAL CONTROL

Figure 13:
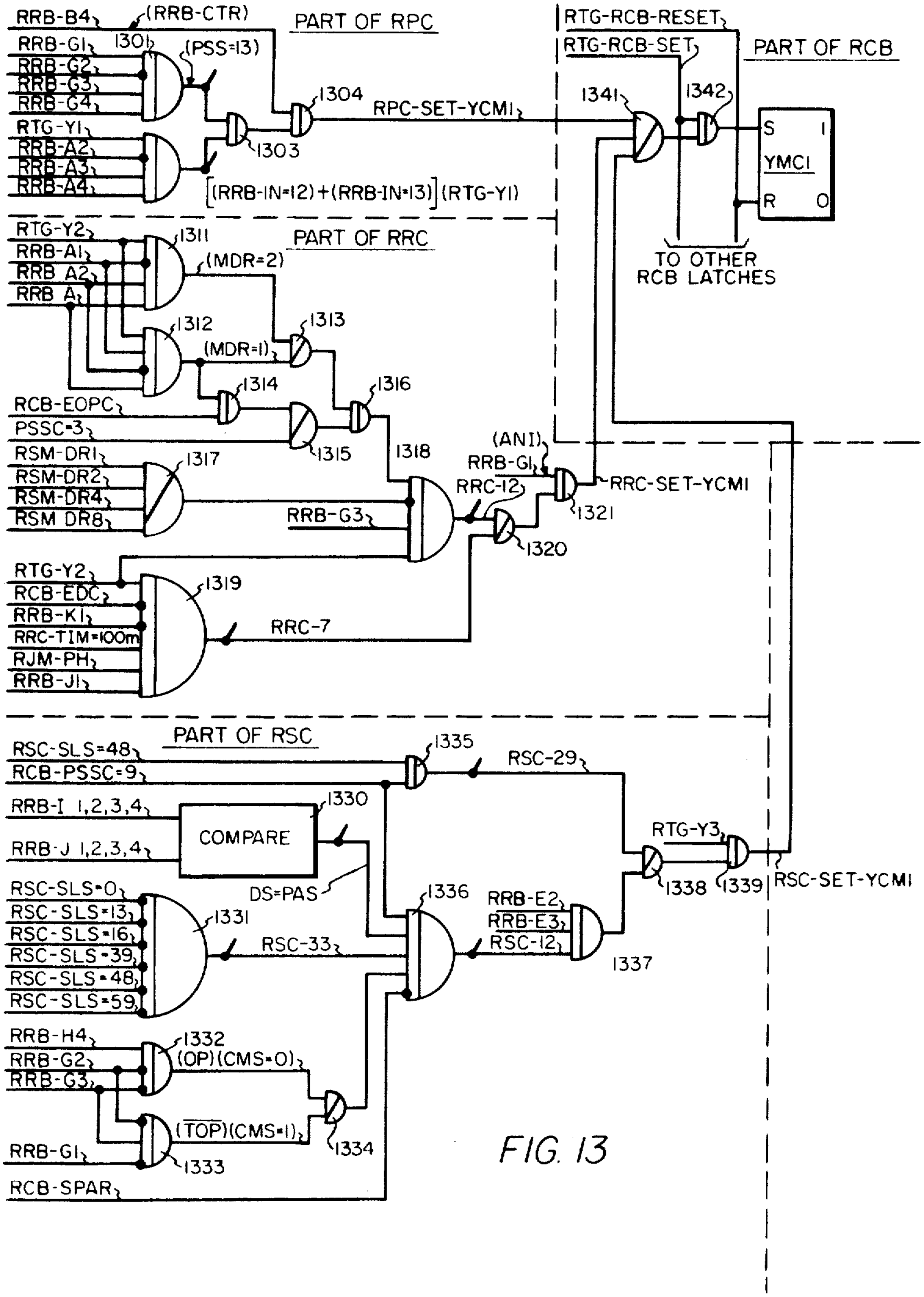
FIG. 13 is a functional block diagram of a portion of the register control circuits.
Figure 14:
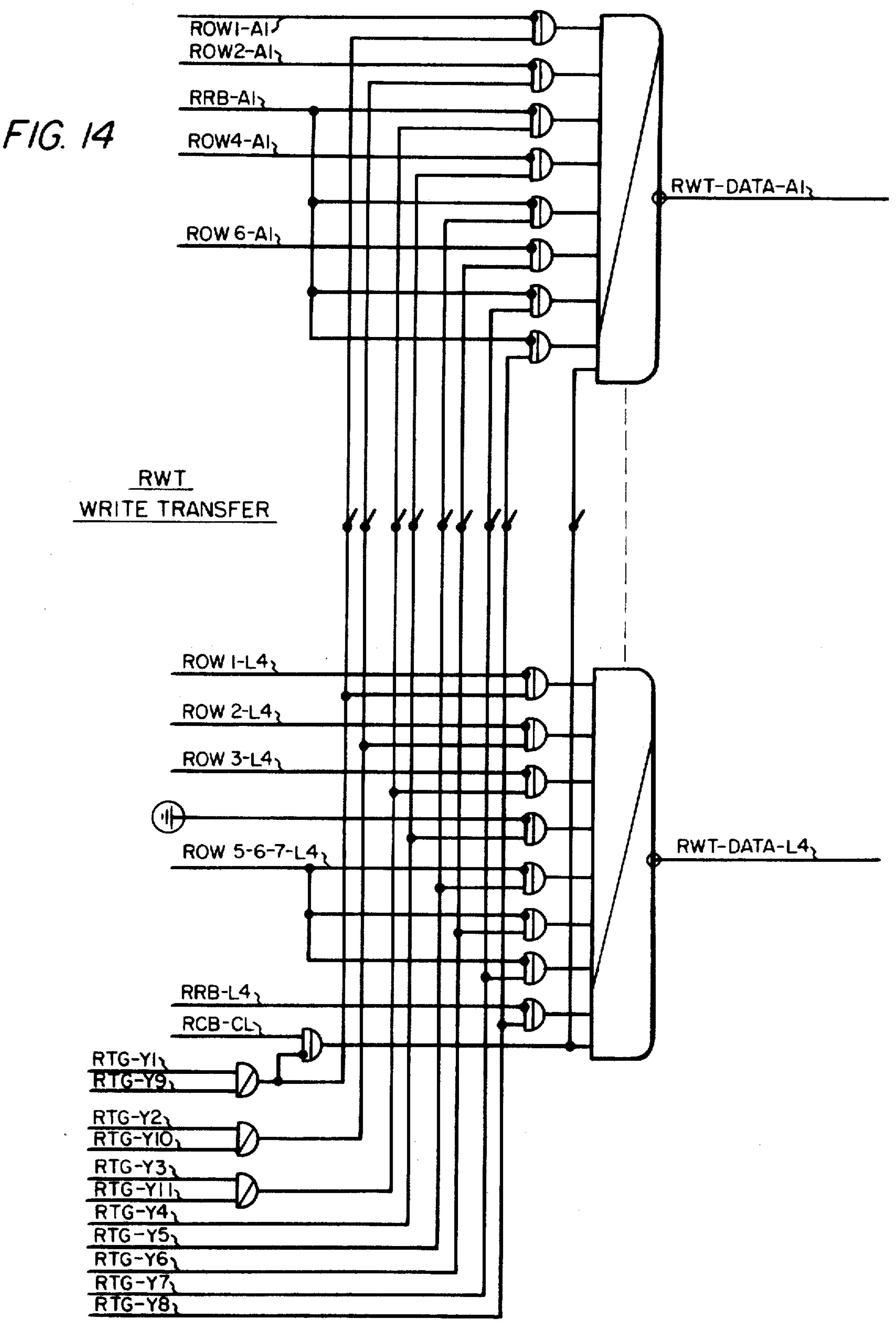
FIG. 14 is a functional block diagram of the write transfer circuits of the register control circuits.

The register central control circuits of FIG. 5 have a few of the functions thereof shown by logic gate drawings in FIGS. 13 and 14; and are more fully described by Boolean equations in section K.

The register read buffer RRB comprises 48 latches RRB A1 through RRB L4 corresponding to the 48 bits of a row of memory. During each sub-time slot the register read buffer latches are first cleared, and then the two words are set therein in sequence. Referring to FIG. 6 the resetting and setting of the latches is controlled by the pulses from latches RRB RST for resetting them, RRB SET-R for setting latches A1 through F4, and RRB SET-L for setting latches G1 through L4. Note that the signal X1 EXTENDED is obtained from an auxiliary latch in the X generator which is set near the end of the X1 time and reset early in the X2 time, which insures an adequate signal for coincidence with the signal on lead W11 in setting the latch RRB SET-R. Note that the output signals from the read buffer may be designated either by the name of the particular latch, or by the corresponding mnemonic in the memory word as shown in FIG. 8. For example, in FIG. 13 at the input of gate 1321 one of the signal leads is RRB-G1, which may alternatively be designated as signal ANI, since the controller RRC relates to row 2 of memory. In general in the equations of section K the memory mnemonic designation such as ANI is used. FIG. 13 shows that part of each of the controllers RPC, RRC and RSC, relating to the control rows 1, 2 and 3 respectively, which are instrumental in setting the carry buffer latch YMC1 for mode control. The signals corresponding to the equations are shown by shortened designations in FIG. 13. For example the output of gate 1319 is designated RRC-7, which corresponds to RRC equation 7.

For the carry buffer RCB, FIG. 13 shows one of the latches YMC1, and the input signals thereto. Each of the carry buffer latches except RCB BY and RCB RQTC is set in response to the output of an AND gate such as gate 1342 which has one input from lead RTG-RCB-SET, and another input from the controllers of the circuits shown in FIG. 5. All of the carry buffer latches except RCB BY are reset in response to a signal on lead RTG-RCB-RESET. These common set and reset signals are from latches shown in FIG. 6, e.g., RCB SET and the RCB RST. Note that the latches may be set during any time slot during the interval beginning with coincidence of X3 and W11 and ending with coincidence of X4 and W11; but are reset only at the beginning of a time slot during the interval with coincidence of Y1 and X1, beginning with W5 and ending with W9.

The designations of all 60 of the carry buffer latches and their functions are shown in the following table, in which (4) indicates a set of four latches, having suffixes -1, -2, -4, -8 for the binary weight of a digit stored therein.

CARRY BUFFER FUNCTIONS

| | |
|---|---|
| PSSC(4) | Processing Sequence State |
| PARC(4) | Pulse Accumulator Receiving |
| YCM1 | Read Rows 7 and 8 |
| INC(4) | Instructions |
| SLSC(4) | Sender Loading Sequence States |
| FITC | Fast Interdigital Timing |
| RQTC | Request a Translation |
| EOPC | Early Outpulsing |
| DSC(4) | Digit to be Sent |
| RSFC | Row Six Full |
| TRIC(4) | Translator Instructions |
| CL | Clear Memory |
| HRJ | Activate H Relay in RRJ |
| OPC | Activate OP Relay in RRJ |
| SNC | Activate SN Relay in RRJ |
| CST | Activate CT or SD Relay in RRJ |
| TR | Activate TR Relay in RRJ |
| PB | Activate PB MBS in RRJ |
| PTC | Activate PT Relay in RRJ |
| BD1 | Activate BD1 Relay in RRJ |
| RD2 | Activate RD2 Relay in RRJ |
| JC1 | Activate JC1 MGS in RRJ |
| JC2 | Activate JC2 MGS in RRJ |
| JC3 | Activate JC3 MGS in RRJ |
| TXD | Transfer Digit from Row 5 to Row 6 |
| BY | A Matrix Connection is in Progress |
| TRBC | System Trouble |
| FDC | Finish Dialing |
| TRR | Request for Translation Interrupt |
| SR5 | Store in Row 5 or Row 7 |
| 3DR | 3 Digits Received |
| DRSC | Disconnect Sender or Receiver |
| NPSS(4) | New Processing Sequence States |
| PRFC(4) | Pattern Recognition Field |
| SPAR | Store PAR |
| RCR | Receiver/Sender Connection Requested |

The write transfer circuits RWT are shown in FIG. 14. The circuit supply 48 signals RWT-DATA-A1 through RWT-DATA-L4 which via the memory access circuits RMA-A of FIG. 4 control writing the data words into the core memory RCM-A. The input signals such as ROW1-A1 are described in the equations of section K. The circuits shown are equivalent to but not identical with the actual implementation of the logic circuits. As shown there is for each data bit a NOR gate having nine inputs eight of which are from AND gates for the eight rows of memory respectively, and the ninth input is for clearing. The first AND gate of each bit is enabled in response to either of the sub-time slot signals RTG-Y1 or RTG-Y9, the second of each is enabled in response to signals RTG-Y2 or RTG-Y10, the third of each is enabled in response to signals RTG-Y3 or RTG-Y11, and the fourth through eighth are enabled in response to the signals RTG-Y4 through RTG-Y8 respectively. The signal on lead RCB-CL from a carry buffer latch is effective to clear any row of memory except row 1, as will be explained in the subsequent operational description.

K. EQUATIONS FOR REGISTER CONTROL

K1. Process Controller (RPC) Equations

K1a. RPC Basic Internal Equations

1) SET RCB-CL - (RPB-PSS=0)(RRB-IN=0$\overline{\text{(RJM-PH)(RTG-Y1}}$)

2) SET RCB-NPSS=1 = (RRB-PSS=0)($\overline{\text{RRB-IN-0}}$(RJM-PH)(RTG-Y1)

SET RCB-HRJ

START TIMER (TIMP*

* THE TIMER (TIM) CONSISTS OF THE TMA AND MDA FIELDS

START TIM MEANS WRITING TMA = 1 and MDS = 0

3A) SET-RCB-TRBC - (RRB-PSS=0)(RTG-Y 1)(RRB-IN=0)(RJM-PH)

(TIM=100MS)

3B) SET-RCB-TRBC = (RRB-PSS=0)(RTG-Y 1)($\overline{\text{RRB-IN=0}}$)($\overline{\text{RJB-PH}}$)

(TIM - 100MS)

4) SET RCB-NPSS=2 = (RRB-PSS=1)(RRB-IN=2)($\overline{\text{RRB-SAT}}$)($\overline{\text{RRB-CRS}}$)

(RTG-Y1)

START TIM

5) START TIM = (RRB-PSS=1)(RRB-IN-2)(RRB-CTR)(RRB-SAT+RRB-CRS)(RTG-Y1)

6) SET RCB-NPSS-5 = (RRB-PSS=1)(RRB-FD)(RRB-SAT+RRB-CRS)
(RTG-Y1)
START TIM

7) SET RCB-NPSS=6 = (RRB-PSS=1)(RRB-FD)($\overline{\text{RRB-SAT}}$)($\overline{\text{RRB-CBS}}$)
(RTG-Y1)

8) SET RCB-TRBC = (RRB-PSS=1)(RRB-IN-2)RRB-FD)(TIM=5 SEC)
(RTG-Y1)

10) WRITE CSS=1 = (RRB-CRS)(RRB-CSS=0)($\overline{\text{RCB-BY}}$)($\overline{\text{RMN-DMC}}$)
(RTG-Y1)(RRB-PSS$\leq$5)
START TIM 11) SET RCB-TRBC = (RTG-Y1)($\overline{\text{CSS=0}}$)(TIM-70MS)+(RRB-CRS)
WRITE HC-RSM-HC (RTG-Y1){[(RRB-CSS=1)(RSM-HC+RSM-PC)]
WRITE PC-RSM-PC +[(RRB-CSS-3)($\overline{\text{RSM-HC}}$+RSM-PC)]+[(RRB-CSS-5)
WRITE TAS ($\overline{\text{RSM-HC}}$+RSM-PC)]+[(RRB-CSS=6)($\overline{\text{RSM HC}}$
RESET RCB-BY +RSM-PC)]}
INHIBIT WRITE PG 12) ADD ONE TO CSS = ($\overline{\text{RRB-CSS=0}}$)($\overline{\text{EQUAT 11}}$)
(WHEN CSS $\geq$ 1)

13) SET RCB-BY = (RRB-CRS)(RRB-CSS=1)($\overline{\text{RRB-TAS}}$)(RTG-Y9)

14) WRITE PG = (RRB-CRS)(RRB-CSS=1)($\overline{\text{RSM-HC}}$))RTG-Y1)

16) SET RCB-PB = (RRB-PG($\overline{\text{RRB-CSS-6}}$)($\overline{\text{RRB-CSS=0}}$)(RTG-Y9)

17) SET RCB-OPC = [(PRB-CSS=4)+(RRB-CSS=5)]($\overline{\text{RRB-TAS}}$)(RRB-CRS)
(RTG-Y9)

18) INHIBIT WRITE CSS = (RRB-CSS=6)(RSM-MC)($\overline{\text{RSM-PC}}$)(RTG-Y1)
INHIBIT WRITE SAT
INHIBIT WRITE CRS
START TIM
RESET RCB-BY 19) SET RCB-TRBC = (RRB-PSS$\leq$5)[(RRB-CRS)+(RRB-SAT)]($\overline{\text{RMN-DIS}}$)
(RTG-Y1)·{[TIM≡MCC-SRTN][(RRB-AOG=1)(MCC-RTC-NL)
+(RRB-AOG=2)($\overline{\text{MCC-RMR-NL}}$)+(RRB-AOG-4)($\overline{\text{MCC-RMS-NL}}$)]
+[TIM≡MCC-SRTL][(RRB-AOG=1)(MCC-RTC-NL)+

(RRB-AOG-2)(MCC-RMR-NL)+(RRB-AOG-4)
(MCC-RMS-NL)]}

20) INHIBIT WRITE PG = (RRB-PSS=4)(RRB-DRS)(RRB-PG)(RTG-Y1)

21) INHIBIT WRITE DRS = (RRB-PSS-4)[($\overline{\text{RRB-DRS}}$)+$\overline{\text{RRB-PG}}$)($\overline{\text{RSM-HC}}$)]
(RTG-Y1)

SET RCB-NPSS=3

22) WRITE HC-RSM-HC = (RRB-PSS=4)(RRB-DRS)($\overline{\text{RRB-PG}}$)(RSM-HC)

WRITE PC-RSM-PC (RTG-Y1)

WRITE TAS

SET RCB-TRBC

23) SET RCB-NPSS=5 = (RRB-PSS=3)(RRB-FD[(RRB-SAT)+(RRB-CRS)]
(RTG-Y1)

24) SET RCB-NPSS=6 = (RRB-PSS=3)[(RRB-FD)($\overline{\text{RRB-SAT}}$)($\overline{\text{RRB-CRS}}$)+
(RRB-EOP)](RTG-Y1)

25) SET RCB-NPSS=4 = (RRB-PSS=3)(RRB-DRS)(RTG-Y1)

27) SET RCB-NPSS=6 = (RRB-PSS-5)($\overline{\text{RRB-SAT}}$)($\overline{\text{RRB-CRS}}$)(RTG-Y1)

SET RCB-TRIC=4

29) WRITE RQT = ($\overline{\text{RRB-WFT}}$)($\overline{\text{RRB-RQT}}$)(RCB-RGTV)(RTG-Y9)

START TIM

30) INHIBIT WRITE WFT = (RRB-WFT)(RRB-CTR)

31) START TIM = (RRB-WFT)(RRB-CTR)($\overline{\text{RRB-PSS-11}}$)

32A) SET-RCB-TRBC = (RRB-WFT)($\overline{\text{RRB-CTR}}$)(TIM-5SEC)(RTG-Y1)

32B) SET-RCB-TRBC = (RRB-RQT)(RPI-TRS)(TIM=20SEC)(RTG-Y1)

33) SET RCB-TRR = (RRB-RQT)($\overline{\text{RPI-TRS}}$)(RRB-DRS)(RTG-Y1)
($\overline{\text{RRB-FB}}$)

34) INHIBIT WRITE RQT = (RRB-RQT)(RPI-TRS)(RCB-TRR)(RTG-Y9)

WRITE WFT

START TIM

35) START TIM = (RRB-CTR)[(RRB-PSS=6)+(RRB-PSS=7)]

36) SET RCB-TRBC = [(RRB-PSS-6)+(RRB-PSS=7)]($\overline{\text{RRB-WFT}}$)($\overline{\text{RRB-RQT}}$)
(RTG-Y1)·($\overline{\text{RRB-IN-1}}$)·{[(RRB-IN=3)+(RRB-IN=4)]
(TIM=1.5SEC)([($\overline{\text{RRB-IN-3}}$)($\overline{\text{RRB-IN=4}}$)](TIM-5SEC)}

37) SET RCB-NPSS=10 = (RRB-PSS=6)(RRB-ARR)(RRB-IN=14(RTG-Y1)
START TIM

38) SET RCB-NPSS=5 = (RRB-PSS=6)(RRB-ARR)($\overline{\text{RRB-IN=14}}$)(RTG-Y1)
INHIBIT WRITE ARR
START TIM
INHIBIT SET RCB-TR 41) SET RCB-NPSS=10 = (RRB-PSS<10)[(RRB-IN=6)+RRB-IN=7)+
START TIM (RRB-IN=8)+(RRB-IN=9)+(RRB-IN=11)](RTG-Y1)

42) SET RCB-NPSS=12 - (RRB-PSS<10)(RRB-IN=5)(RTG-Y1)
START TIM

43) INHIBIT WRITE PG = (RRB-PSS=10)(RRB-PG(RTG-Y1)
WRITE DRS

45) WRITE HC-RSM-HC = (RRB-PSS-10)($\overline{\text{RRB-PG}}$)(RRB-DRS)(RSM-HC)(RTG-Y1)
WRITE PC=RSM-PC
WRITE TAS
SET RCB-TRBC 46) SET RCB-NPSS=12 = (RRB-PSS=10($\overline{\text{RRB-PG}}$)($\overline{\text{RRB-IN-8}}$)($\overline{\text{RRB-IN=9}}$)
[($\overline{\text{RRB-DRS}}$+(RRB-DRS)($\overline{\text{RSM-HC}}$)($\overline{\text{RRB-IN=6}}$)
($\overline{\text{RRB-ARR}}$)](RTG-Y1)

47) SET RCB-NPSS=11 = (RRB-PSS=10($\overline{\text{RRB-PG}}$)($\overline{\text{RRB-DRS}}$)(RTG-Y1)
START TIM [(RRB-IN=8)+(RRB-IN=9)]

48) SET RCB-NPSS-6 = (RRB-PSS=10)($\overline{\text{RRB-PG}}$)(RRB-DRS)($\overline{\text{RSM-HC}}$)
SET RCB-TRIC=7 ($\overline{\text{RRB-IN=6}}$)($\overline{\text{RRB-IN=8}}$)($\overline{\text{RRB-IN=9}}$)(RBB-ARR)·
INHIBIT WRITE ARR ($\overline{\text{RRB-WFT}}$)($\overline{\text{RRB-RQT}}$)(RTG-Y1)
INHIBIT WRITE DRS 49) SET RCB-NPSS=11 = (RRB-PSS=10)($\overline{\text{RRB-PG}}$)(RRB-DRS)($\overline{\text{RSM-HC}}$)
SET RCB-TRIC=8 ($\overline{\text{RRB-WFT}}$)($\overline{\text{RRB-RQT}}$)(RTG-Y1)
INHIBIT WRITE DRS [(RRB-IN=8)+(RRB-IN=9)]

50 SET RCB-NPSS=12 = (RRB-PSS=10)($\overline{\text{RRB-PG}}$)(RRB-DRS)($\overline{\text{RSM-HC}}$)
SET RCB-TRIC=7 (RRB-IN=6)($\overline{\text{RRB-WFT}}$)($\overline{\text{RRB-RQT}}$)(RTG-Y1)
INHIBIT WRITE DRS 51) SET RCB-NPSS=5 = (RRB-PSS=11)(RRB-ARR)[(RRB-SAT)+(RRB-CRS)]
INHIBIT WRITE ARR (RTG-Y1)
START TIM 52) SET RCB-NPSS=6 = (RRB-PSS=11)(RRB-ARR)($\overline{\text{RRB-SAT}}$)($\overline{\text{RRB-CRS}}$)
INHIBIT WRITE ARR (RTG-Y1)
START TIM 53) SET RCB-NPSS=12 = (RRB-PSS-11)($\overline{\text{RRB-ARR}}$)($\overline{\text{RRB-IN=8}}$)($\overline{\text{RRB-IN=9}}$)
START TIM (RTG-Y1)

54) SET RCB-BD1 = (RRB-PSS-11)(RRB-IN=8)(RTG-Y1)

55) SET RCB-RD2 = (RRB-Pss-11)(RRB-IN=9)(RTG-Y1)

56) SET RCB-TRIC=5 = [(EQUAT 54)(EQUAT 55)][(RTM-FT)(TIM≡MCC-BTHT)
+($\overline{\text{RTM-FT}}$)(TIM≡MCC-BTLT)]($\overline{\text{RMN-DIS}}$)[($\overline{\text{RRB-WFT}}$)
($\overline{\text{RRB-RQT}}$)]

57) INHIBIT WRITE IN = (RRB-PSS=12)(RCB-TRIC=8)(RTG-Y9)[(RRB-IN=5)+
(RRB-IN=6)]

58) SET RCB-NPSS=13 = (RRB-PSS=12)(RTG-Y1){[($\overline{\text{RRB-IN=5}}$)($\overline{\text{RRB-IN=6}}$)
START TIM ($\overline{\text{RRB-IN=7}}$)($\overline{\text{RRB-IN=10}}$)]+[(RRB-IN=7)(RRB-IN=10)]
[TIM-40MSEC]}

59) SET RCB-TRIC=6 = (RRB-PSS=13)($\overline{\text{RRB-IN=12}}$)($\overline{\text{RRB-IN-13}}$)($\overline{\text{RRB-WFT}}$)
($\overline{\text{RRB-RQT}}$)(RTG-Y1)

60) SET RCB-YCM1 = (RRB-PSS=13)(RRB-CTR)[(RRB-IN=12)+(RRB-IN-13)]
(RTG-Y1)

61) SET RCB-CL = (RRB-PSS=13)[(RRB-IN-12)+(RRB-IN-13)]
INHIBIT SET RCB-TRBC (RTG-Y1)

62) SET RCB-CL = [(RRB-PSS=15)](RTG-Y1)

63) SET RCB-TRBC = (RRB-PSS=14)(RTG-Y1)

K1b. PRC Combined Basic Internal Equations

START TIME = (2)+(4)+(5)+(6)+7)+(10)+(18)+(29)*(31)+(34)*
+(35)+(38)+(41)+(42)+(46)+(47)+(51)+(52)+(53)
+(58)(37)

WRITE CSS = 1 = (10)

ADD ONE TO CSS = (12)

INHIBIT WRITE CSS = (18)

WRITE PG = (14)

INHIBIT PG = (11)+(20)+(43)

WRITE DRS = (RCB-DRSC)*+(43)

INHIBIT WRITE DRS = (21)+(46)+(48)+(49)+(50)

WRITE HC = (11)+(22)+(45)

WRITE PC = (11)+(22)+(45)

WRITE RQT = (29)*

INHIBIT RQT = (34)*

WRITE WFT = (34)*

INHIBIT WRITE WFT = (30)

WRITE TAS = (11)+(22)+45)

INHIBIT WRITE CRS = (18)

INHIBIT WRITE SAT = (18)

INHIBIT WRITE ARR = (38)+(48)+(51)+(52)

WRITE FD = RCB-FDC*

INHIBIT WRITE EOP = RCB-FDC*

INHIBIT WRITE IN = (57)*

WRITE RSF = (RCB-RSFC)*

SET RCB-NPSS=1 = (2)

2 = (4)

3 = (21)

4 = (25)

5 = (6)+(23)+(38)+(51)

6 = (7)+(24)+(27)+(52)+(48

10 = (37)+(41)

11 = (49)+(47)

12 = (42)+(46)+(50)+53)

13 = (58)

SET RCB-HRJ = (2)+($\overline{\text{RB-PSS=0}}$)(RB-PSS<13)

SET RCB-TRBC = (3)+(8)+(11)+(19)+(22)+(32)+(36)+(45)+(RRB-TRB)+(63)

SET RCB-BY = (13)*

RESET RCB-BY) = (11)+(18)+(RMU-RESET-BY)

SET RCB-PB = (16)*

SET RCB-OPC = (17)*

SET RCB-TRR = (33)

SET RCB-BD1 = (59)

SET RCB-RD2 = (55)

SET RCB-YCM1 = (60)

SET RCB-CL = (1)+(61)+(62)

SET RCB-TRIC=4 = (27)

5 = (56)

6 = (59)

7 = (48)+(49)+(50)

K1c. RPC OUTPUT EQUATIONS - TO RWT

ROW 1-A1 = $\overline{[(\text{RTG-Y9})(\text{RCB-CL})(\overline{\text{RCB-YCM1}})]}\ \overline{[57]}\ [\text{RRB-A1}]$ ROW 1-A2 = $\overline{[(\text{RTG-Y9})(\text{RCB-CL})(\overline{\text{RCB-YCM1}})]}\ \overline{[57]}\ [\text{RRB-A2}]$ ROW 1-A3 = $\overline{[(\text{RTG-Y9})(\text{RCB-CL})(\overline{\text{RCB-YCM1}})]}\ \overline{[57]}\ [\text{RRB-A3}]$ ROW 1-A4 = $\overline{[(\text{RTG-Y9})(\text{RCB-CL})(\overline{\text{RCB-YCM1}})]}\ \overline{[57]}\ [\text{RRB-A4}]$ ROW 1-B1 + $\overline{[(\text{RTG-Y9})(\text{RCB-CL})(\overline{\text{RCB-YCM1}})]}\ \overline{[(\text{RCB-FDC})(\text{RTG-Y9})]}\ [\text{RRB-B1}]$ ROW 1-B2 = $\overline{[(\text{RTG-Y9})(\text{RCB-CL})(\overline{\text{RCB-YCM1}})]}\ [(\text{RRB-B2})+(\text{RCB-FDC})(\text{RTG-Y9})]$ ROW 1-B3 = $\overline{[(\text{RTG-Y9})(\text{RCB-CL})(\overline{\text{RCB-YCM1}})]}\ \overline{[[38]+[48]+[51]+[52]]}\cdot\overline{[\text{RRB-B3}]}$ ROW 1-C1 = $\overline{[(\text{RTG-Y9})(\text{RCB-CL})(\overline{\text{RCB-YCM1}})]}\ [\text{RRB-C1}]$ ROW 1-C2 = $\overline{[(\text{RTG-Y9})(\text{RCB-CL})(\overline{\text{RCB-YCM1}})]}\cdot[18]\cdot[\text{RRB-C2}]$ ROW 1-C3 = $\overline{[(\text{RTG-Y9})(\text{RCB-CL})(\overline{\text{RCB-YCM1}})]}\cdot\overline{[18]}\cdot[\text{RRB-C3}]$ ROW 1-C4 = $\overline{[(\text{RTG-Y9})(\text{RCB-CL})(\overline{\text{RCB-YCM1}})]}\ [\text{RRB-C4}]$ ROW 1-D1 = $\overline{[(\text{RTG-Y9})(\text{RCB-CL})(\overline{\text{RCB-YCM1}})]}\ [\text{RRB-D1}]$ ROW 1-D2 = $\overline{[(\text{RTG-Y9})(\text{RCB-CL})(\overline{\text{RCB-YCM1}})]}\ [\text{RRB-D2}]$ ROW 1-D3 = $\overline{[(\text{RTG-Y9})(\text{RCB-CL})(\overline{\text{RCB-YCM1}})]}\ [\text{RRB-D3}]$ ROW 1-D4 = $\overline{[(\text{RTG-Y9})(\text{RCB-CL})(\overline{\text{RCB-YCM1}})]}\ [\text{RRB-D4}]$

ROW 1-E1 = [(RTG-Y9)(RCB-CL)(RCB-YCMI)][RRB-E1]

ROW 1-E2 = [(RTG-Y9)(RCB-CL)(RCB-YCMI)][RRB-E2]

ROW 1-E3 = [(RTG-Y9)(RCB-CL)(RCB-YCMI)] [RRB-E3]

ROW 1-E4 = [(RTG-Y9)(RCB-CL)(RCB-YCMI)][RRB-E4]

ROW 1-F1 = [(RTG-Y9)(RCB-CL)(RCB-YCMI)][RRB-F1]

ROW 1-F2 = [(RTG-Y9)(RCB-CL)(RCB-YCMI)]·[(RRB-E2)(RTG-Y1)+
(RCB-RSFC)(RTG-Y9)]

ROW 1-F3 = [(RTG-Y9)(RCB-CL)(RCB-YCM1)]· [[11]+[22]+[45]+(RRB-F3)]

ROW 1-F4 = [(RTG-Y9)(RCB-CL)(RCB-YCMI)][(RRB-F4)+(RCB-TRBC)]

ROW 1-G1 = {[(RRB-G1)((RCB-NPSS=0)+(RTG-Y1))]+[RCB-NPSS-1)
(RCB-NPSS=0)(RTG-Y9)]+[WRITE PSS=15]}{RESET PSS}

ROW 1-G2 = {[(RRB-G2)((RCB-NPSS=0)+(RTG-Y1))]+[RCB-NPSS-2)
(RCB-NPSS=0)(RTG-Y9)]+[WRITE PSS=15]}{RESET PSS}

ROW 1-G3 = {[(RRB-G3)((RCB-NPSS=0)+(RTG-Y1))]+[(RCB-NPSS-4)
(RCB-NPSS=0)(RTG-Y9)]+[WRITE PSS=15]}{RESET PSS}

ROW 1-G4 = {[(RRB-G4)((RCB-NPSS=0)+RTG-Y1))]+[(RCB-NPSS-8)
(RCB-NPSS=0)(RTG-Y9)]+[WRITE PSS=15]}{RESET PSS}

(WRITE PSS=15) = (RRB-PSS=13)(RTG-Y9)(RCB-CL)(RCB-YCMI)(RRB-IN=13)

(RESET PSS) = (RRB-PSS=13)(RTG-Y9)(RCB-CL)(RCB-YCMI)(RRB-IN=12)

ROW 1-H3 = [(RTG-Y9)(RCB-CL)(RCB-YCMI)][30]·[(RRB-H3)+[34]]

ROW 1-H4 = [(RTG-Y9)(RCB-CL)(RCB-YCMI)][34]·[(RRB-H4)+[29]]

ROW 1-I1 = [(RTG-Y9)(RCB-CL)(RCB-YCMI)]·{[[11]+[22]+[45]]
[RSM-PC]+[RRB-I1]}

ROW 1-I2 = [(RTG-Y9)(RCB-CL)(RCB-YCMI)]·{[[11]+[22]+[45]
·[RSM-HC]+[RRB-I2]

ROW 1-I3 - [(RTG-Y9(RCB-CL)(RCB-YCMI)]· [([21]+[46]+[48]+[49]+[50])]
·[(RB-J3)+[43]+(RCB-DRSC)(RTG-Y9)]

ROW 1-I4 = [(RTG-Y9)(RCB-CL)(RCB-YCMI)]·[([11]+[20]+[43])]
·[(RB-I4)+[14]]

ROW 1-J1 = [(RTG-Y9)(RCB-CL)(RCB-YCMI)]·[18]·{[ADD 1-CSS][RRB-J1]
+[ADD 1-CSS][RRB-J1]}

ROW 1-J2 = [(RTG-Y9)(RCB-CL)(RCB-YCMI)][18]·{[(ADD 1-CSS)(RRB-J1)]

[RRB-J2] + (ADD 1-CSS)(RRB-J1)] [RRB-J2]}

ROW 1-J3 = [(RTG-Y9)RCB-CL)(RCB-YCM1)] · [18] · {[ADD 1-CSS)(RRB-J1) (RRB-J2)] [RRB-J3] + [ADD 1-CSS)(RRB-J1)(RRB-J2)] [RRB-J3]}

ADD 1-CSS = [102+[12] (RTG-Y1)

ROW 1-K2 = [(RTG-Y9)(RCB-CL)(RCB-YCM1)] [START] {(ADD 1-MDA] [RRB-K2] + [ADD 1-MDA] [RRB-K2]}

ROW 1-K3 = [RTG-Y9)(RCB-CL)(RCB-YCM1)] [START] {[ADD 1-MDA(RRB-K2)] [RRB-K3] + [ADD 1-MDA)(RRB-K2)] [RRB-K3]}

ROW 1-K4 = [(RTG-Y9)(RCB-CL)(RCB-YCM1)] [START] {[(ADD1-MDA)(RRB-K2) (RRB-K3)] [RRB-K4] + [ADD 1-MDA)(RRB-K2)(RRB-K3)] [RRB-K4]}

ROW 1-L1 = [(RTG-Y9)(RCB-CL)(RCB-YCM1)] {(START) + (ADD 1-TMA] [RRB-L1] + [ADD 1-TMA] · [RRB-L1]}

ROW 1-L2 = [(RTG-Y9)(RCB-CL)(RCB-YCM1)] · [START] [ADD 1-MDA)(RRB-K4+ RRB-K2)] · {[ADD 1-TMA)(RRB-L1)] [RRB-L2] + [(ADD 1-TMA) (RRB-L1)] [RRB-L2]}

ROW 1-L3 = [(RTG-Y9)(RCB-CL)(RCB-YCM1)] · [START] [ADD 1-MDA] · {[(ADD 1-TMA)(RRB-L1)(RRB-L2)] [RRB-L3] + [ADD 1-TMA)(RRB-L1)(RRB-L2)] [RRB-L3]}

ROW 1-L4 = [(RTG-Y9)(RCB-CL)(RCB-YCM1)] · [START] [ADD 1-MDA] · {[(ADD 1-TMA)(RRB-L1)(RRB-L3)] [RRB-L4] + [(ADD 1-TMA)(RRB-L1)(RRB-L2)(RRB-L3)] [RRB-L4]}

START = {[2]+[4]+[5]+[6]+[7]+[10]+[18]+[31]+38]+[41]+[42]+[46]+ [47]+[51]+[5]+[53]+[58]+37]+[29]+[34]}

ADD 1-TMA = (RTG-Y1)(RB-TMA=15) [(RRB-K4)(RRB-K3)+(RRB-K4) (RTG-ITT)+(RTG-LTT)]

ADD 1-MDA = (RTG-Y1(RB-TMA-15) [(RRB-K4)(RRB-K3)(RRB-K2)+(RRB-K4) (RTG-ITT)(RRB-K2·RRB-K3+RRB-K2·RRB-K3)+(RTG-LTT)]

K1d. RPC OUTPUT EQUATIONS - TO RCB

RPC-SET-HRJ = [2]+[(RRB-PSS=0)(RRB-PSS-13)(RRB-PSS=14) (RRB-PSS=15)RTG-Y1)]

RPC-SET-OPC = [17]

RPC-SET-PB = [16]

RPC-EQUAT 54 (TO SET RCB-BD1)

RPC EQUAT 55 (TO SET RCB-RD2)

RPC-SET-JC1 = [54](RRB-IRJ)(TIM A<50MS)

RPC-SET-NPSS-1 = [2]+[6]+[21]+[23]+[38]+[47]+[49]+[51]+[58]

RPC-SET-NPSS-2 = [4]+[7]+[21]+[24]+[27]+[37]+[41]+[47]+[49]+[52]+[48]

RPC-SET-NPSS-4 = [6]+[7]+[23]+[24]+[25]+[27]+[38]+[42]+[46]+[48]+[50]+[51]+[52]+[53]+[58]

RPC-SET-NPSS-8 = [37]+[41]+[42]+[46]+[47]+[49][50]+[53]+[58]

RPC-SET-YCM1 = [60]

RPC-SET-TRBC = [3]+[8]+[11]+[19]+[22]+[32]+[36]+[45]+[63]

RPC-SET-TRR = [33]

RPC-SET-TRIC-1 = [48]+[49]+[50]+[56]

RPC-SET-TRIC-2 = [48]+[49]+[50]+[59]

RPC-SET-TRIC-4 = [48]+[49]+[50]+[56]+[59]+[27]

RPC-SET-CL = [1]+[61]+[62]

RPC-SET-BY = [13]

RPC-RESET-BY = [11]+[18]+[RMU-RESET-BY]

RPC-EQUAT-38 = (TO INHIBIT SET RCB-TR)

RPC-EQUAT-61 = (TO INHIBIT SET RCB-TRBC)

K2. Register Controller (RRC) Equations

K2a. RRC Basic Internal Equations

1) WRITE BP1 = ($\overline{\text{RJM-PH}}$)($\overline{\text{RRB-BP1}}$)·(RRB-TSC=0)(RTG-Y2)

START TIMER (TIM)* ($\overline{\text{RRB-PPR}}$)

* THE TIMER (TIM) CONSISTS OF THE TMB AND MDB FIELDS

START TIM MEANS WRITING TMB=1 AND MDB=0

2) WRITE BP2 = ($\overline{\text{RJM-PH}}$)(RRB-BP1)(RTG-Y2)($\overline{\text{RRC-PSSC=0}}$)

INHIBIT WRITE IPR

3) WRITE DP1 = (RRB-BP2)(RTG-Y2)

4) WRITE DP2 = (RRB-DP1)(RTG-Y2)

5) WRITE CAB = ($\overline{\text{RJM-PH}}$)(RRB-DP2)(TIM=150MSEC)(RTG-Y2)(RCB-HRJ)

6) INHIBIT WRITE DP1 = (RJM-PH)(RTG-Y2)[(RRB-DP2)+($\overline{\text{RRB-BP2}}$)
INHIBIT WRITE DP2 (RRB-BP1)]
INHIBIT WRITE BP1
INHIBIT WRITE PB2
START TIM 7) WRITE IPR = (RJM-PH)($\overline{\text{RRB-BP1}}$)($\overline{\text{RCB-FDC}}$)($\overline{\text{RRB-IPR}}$)
WRITE PIT (TIM=100MSEC)(RTG-Y2)
INHIBIT WRITE PAR
SET RCB-PARC=RRB-PAR
SET RCB-SPAR

8) WRITE TRJ = (EQUAT 7)(RRB-PAR>10)
SET RCB-TRBC

9) SET RCB-YCM1 = (EQUAT 7)(RRB-ANI)
SET RCB-SR5

10) ADD 1-PAR = (RJM-PH)(RRB-DP2)($\overline{\text{RCB-FDC}}$)(RRB-MDR=0)(RTG-Y2)

11) WRITE PAR-RSM-DR = [(RCB-PSSC=3)+(RCB-EOPC)(RRB-MDR=1)]
WRITE RDS [(RRB-MDR=1)+(RRB-MDR=2)]($\overline{\text{RSM-DR=0}}$)
WRITE PIT ($\overline{\text{RRB-RDS}}$)(RTG-Y2)
START TIM 12) INHIBIT WRITE RDS = [(RCB-PSSC=3)+(RCB-EOPC)(RRB-MDR=1)]
SET RCB-PARC=RRB-PAR [(RRB-MDR=1)+(RRB-MDR=2)](RSM-DR=0)
SET RCB-SPAR (RRB-RDS)(RTG-Y2)
INHIBIT WRITE PAR

13) SET RCB-YCM1 = (EQUAT 12)(RRB-ANI)
SET RCB-SR5

14) INHIBIT WRITE MDR = (RRB-MDR=1)(RCB-PSSC=3)($\overline{\text{RRB-PIT}}$)(RRB-BP2)
SET RCB-DRSC (RTG-Y2)
SET RCB-TRIC=7

15) WRITE TRC = (RCB-PSSC=3)(RRB-MDR-2)(RSM-ERC)(RTG-Y2)
SET RCB-TRBC

16) WRITE IPR = (PCB-NPSS=1)

17) WRITE PIT = (RCB-PSSC=2)(RRB-DST)

18) WRITE TRJ = (RCB-PSSC=2)($\overline{\text{RRB-DST}}$)(RTG-Y2)[($\overline{\text{RRB-PAR=0}}$)
SET RCB-TRBC +(RRB-PIT)]

19) SET RCB-NPSS=3 - (RCB-PSSC=2)(RRB-SDS=0)($\overline{\text{RRB-PTT}}$)(RTG-Y2)

20) WRITE ASD = (RCB-PSSC=2)(RRB-SDS=1)(RTG-Y2)
INHIBIT WRITE SDS (TIM$\geq$80MSEC)
WRITE PPR
START TIM 21) WRITE ASD = (RCB-PSSC=2)(RRB-SDS=2)($\overline{\text{RRB-ASD}}$)(RTG-Y2)
START TIM
WRITE PPR 22) INHIBIT WRITE ASD = (RCB-PSSC=2)(RRB-SDS=2)(RRB-ASD)(TIM=
START TIM 200MSEC)(RTG-Y2)
INHIBIT WRITE SDS

23) INHIBIT WRITE PTT = (RCB-PSSC=2)(RRB-PTT)(RTG-Y2)
START TSC

24) INHIBIT WRITE PTR = (RRB-PTR)(RRB-BP1)($\overline{\text{RRB-BP2}}$)($\overline{\text{RJM-PH}}$)
START TSC (RTG-Y2)

25) START TSC = (EQUAT 7)(RRB-CB)($\overline{\text{RRB-MDR=1}}$)(RTG-Y2)

26) START TSC = (RRB-MDR=1)(RRB-CB)(RCB-INC-14)(RTG-Y2)

27) WRITE P2 = (RRB-TSC=3)(RJM-TSD)(RTG-Y2)
INHIBIT WRITE PTR
INHIBIT WRITE CB

28) INHIBIT WRITE CB = (RCB-3DR)(RRB-TSC=3)+(RRB-TSC=3)
(RRB-MDR=1)

30) SET RCB-DRSC = (RCB-INC-14)(RCB-PSSC=3)($\overline{\text{RCB-FDC}}$)($\overline{\text{RCB-EOPC}}$)
SET RCB-TRIC=7 (RRB-TSC=0)(RTG-Y2)[($\overline{\text{RRB-CB}}$)+($\overline{\text{RRB-MDR=1}}$)]

32) WRITE DT1 = (RCB-PSSC>1)(RRB-SDS=3)($\overline{\text{RRB-DT1}}$)
INHIBIT WRITE SDS (RRB-PAR=0)(RTG-Y2)

33) INHIBIT WRITE DT1 = (RCB-PSSC>1)(RRB-DT1)($\overline{\text{RRB-PAR=0}}$)(RTG-Y2)

34) WRITE TRJ = (RCB-PSSC>1)(RRB-SDS=3)($\overline{\text{RRB-DT1}}$)($\overline{\text{RRB-PAR=0}}$)
SET RCB-TRBC (RTG-Y2)

35) WRITE DT2 = (RCB-PSSC>1)(RRB-SDS=4)($\overline{\text{RRB-DT2}}$)
INHIBIT WRITE SDS (RRB-PAR=0)(RTG-Y2)

36) INHIBIT WRITE DT2 = (RCB-PSSC>1)(RRB-DT2)($\overline{\text{RRB-PAR=0}}$)(RTG-Y2)

37) WRITE TRJ = (RCB-PSSC>1)(RRB-SDS=4)($\overline{\text{RRB-DT2}}$)($\overline{\text{RRB-PAR=0}}$)
SET RCB-TRBC (RTG-Y2)

38) WRITE MAT = [(RTG-Y2)(RRB-MAT)]+[(RCB=FITC)(TIM=4 SEC)
(RTG-Y10)]+RTG-Y10)($\overline{\text{RRB-PIT}}$)[(RTM-FT)
(TIM≡MCC-PTHT)+($\overline{\text{RTM-FT}}$)(TIM≡MCC-PTLT)]
+(RTG-Y10)(RRB-PIT)[(RTM-FT)(TIM≡MCC-ITLT)
($\overline{\text{RTM-FT}}$)(TIM-ITLT)]

39) WRITE ANI = (RCB-PSSC=3)(RRB-SDS=5)($\overline{\text{RCB-RCR}}$)(RTG-Y2)
INHIBIT WRITE SDS
START TIM
WRITE PPR

40) SET-RCB-TRIC=3 = (RCB-PSSC=3)(RRB-MDR=2)(RRB-PAR>11)
(RTG-Y2)(RSM-DR=∅)

41) WRITE TO - ($\overline{\text{RCB-FDC}}$)($\overline{\text{RMN-DIS}}$)[(RCB-INC<4)+(RCB-EOPC)]
[(EQUAT 38)($\overline{\text{RRB-MAT}}$)+RRB-TO)]

42) WRITE ASD = (EQUAT 39)($\overline{\text{RRB-ASD}}$)

43) INHIBIT WRITE ASD = (EQUAT 39)(RRB-ASD)

44) SET RCB-TRIC=11 = [(RCB-PSSC=3)(RCB-EOPC)](RRB-MDR=1)
(RRB-PAR>11)(RSM-DR= )(RTG-Y2)

45) INHIBIT WRITE PPR = [(RRB-SDS=0)(TIM=70MS)+(RRB-IPR)
(TIM=230MS)](RTG-Y2)

K2b. RRC Combined Basic Internal Equations

START TIM = (1)+(6)+(11)+(21)+(22)+(20)+(39)

WRITE IPR = (7)+(16)

INHIBIT WRITE IPR = (2)

WRITE BP1 = (1)

WRITE BP2 = (2)

WRITE DP1 = (3)

| | |
|---|---|
| WRITE DP2 | = (4) |
| INHIBIT WRITE | = (6) |
| BP1, BP2,DP1, DP2 | |
| ADD 1-PAR | = (10) |
| INHIBIT WRITE PAR | = (7)+(12) |
| WRITE DT1 | = (32) |
| INHIBIT WRITE DT1 | = (33) |
| WRITE DT2 | = (35) |
| INHIBIT WRITE DT2 | = (36) |
| START TSC | = (23)+(24)+(25)+(26) |
| INHIBIT WRITE CB | = (27)+(28) |
| WRITE MAT | = (38) |
| WRITE PPR | = (20+(21)+(39)+(7) |
| INHIBIT WRITE PPR | = (45) |
| WRITE ASD | = (20)+(21)+(42) |
| INHIBIT WRITE ASD | = (22)+(43) |
| WRITE RDS | = (11) |
| INHIBIT WRITE RDS | = (12) |
| WRITE PIT | = (7)+(11)+(17) |
| WRITE ANI | = (39) |
| WRITE TRJ | = (8)+(18)+(34)+(37) |
| WRITE TRC | = (15) |
| WRITE P2 | = (27) |
| WRITE CAB | = (5) |
| WRITE TO | = (41) |
| INHIBIT WRITE PTT | = (23) |
| INHIBIT WRITE PTR | = (24) |
| INHIBIT WRITE SDS | = (20)+(22)+(32)+(35)+(39) |
| INHIBIT WRITE MDR | = (14) |
| WRITE PAR=RSM-DR | = (11) |
| SET RCB-PARC-RRB-PAR | = (7)+(12) |
| SET RCB-YCM1 | = [(7)+(12)](RRB-ANI) |

SET RCB-SR5 = [(7)+(12)][(RRB-ANI)+($\overline{\text{RCB-TXD}}$)]

SET RCB-DRSC = (14)+(30)

SET RCB-TRIC=7 = (14)+(30)

=3 = (40)

SET RCB-NPSS=3 = (19)

SET RCB-TRBC + (WRITE TRJ)+(WRITE TRC)

SET RCB-SPAR = 7(7)+(12)

SET RCB-RQTC = (RRB-TO)+(RRB-CAB)+($\overline{\text{RRB-TRI=0}}$)

($\overline{\text{RCB-TRIC=0}}$)

SET RCB-PTC = ($\overline{\text{RRB-TSC=0}}$), (RRB-TSC=1)(RTG-Y2)

SET RCB-CST = (RRB-TSC=3)

SET RCB-JC1 = ($\overline{\text{RRB-TSC=0}}$)(RRB-CB)

K2c. RRC Output Equations - to RWT

ROW 2-A1 = [$\overline{14}$](RRB-A1)

ROW 2-A2 = [$\overline{14}$] (RRB-A2)

ROW 2-A3 = [$\overline{14}$] (RRB-A3)

ROW 2-A4 = (RRB-A4)[$\overline{20}$] [$\overline{22}$] [$\overline{32}$] [$\overline{35}$] [$\overline{39}$]

ROW 2-B1 = (RRB-B1)[$\overline{20}$] [$\overline{22}$] [$\overline{32}$] [$\overline{35}$] [$\overline{39}$]

ROW 2-B2 = (RRB-B2) [$\overline{20}$] [$\overline{22}$] [$\overline{32}$] [$\overline{35}$] [$\overline{39}$]

ROW 2-B3 = (RRB-B3) [$\overline{24}$]

ROW 2-B4 = [$\overline{23}$](RRB-B4)

ROW 2-C1 = (RRB-C1) [$\overline{27}$] [$\overline{28}$]

ROW 2-C2 = (RRB-C2)

ROW 2-D2 = [$\overline{45}$]{(RRB-D2)+[$\overline{20}$]+[$\overline{21}$]+[$\overline{39}$]+[$\overline{7}$]}

ROW 2-D3 = (38)

ROW 2-D4 = (RRB-D4)+(RCB-TRIC-1)(RTB-Y10)($\overline{\text{RCB-TRIC=0}}$)(RRB-TRI=0)

ROW 2-E1 = (RRB-E1)+(RCB-TRIC-2)(RTG-Y10)($\overline{\text{RCB-TRIC=0}}$)(RRB-TRI=0)

ROW 2-E2 = (RRB-E2)+(RCB-TRIC-4)(RTG-Y10)($\overline{\text{RCB-TRIC=0}}$)(RRB-TRI=0)

ROW 2-E3 = (RRB-E3)+(RCB-TRIC=8)(RTG-Y10)($\overline{\text{RCB-TRIC=0}}$)(RRB-TRJ=0)

ROW-2-E4 = (RRB-E4)+[5]

ROW 2-F1 = (41)

ROW 2=F2 = (RRB-F2)+[27]

ROW 2-F3 = (RRB-F3)+[15]

ROW 2-F4 = (RRB-F4)+[34]+[37]+[7](RRB=PAR>10)+[18]

ROW-2-G1 = (RRB-G1)+[39]

ROW 2-G2 = (RRB-G2)+[7]+[11]+[17]

ROW 2-G3 = [$\overline{12}$][[RRB-G3+[11]]

ROW 2-G4 = [(RRB-G4)+[20]+[21]+[47]]+[$\overline{22}$]+[$\overline{43}$](RCB-HRJ)

ROW 2-H1 - (ADD 1-TSC)($\overline{\text{RRB-H1}}$)+($\overline{\text{ADD 1-TSC}}$)(RRB-H1)

ROW 2-H2 = (ADD 1-TSC)(RRB-H1($\overline{\text{RRB-H2}}$)+($\overline{\text{ADD 1-TSC)(RRB-H1}}$)(RRB-H2)

ROW 2-H3 = [$\overline{36}$] [(RRB-H3)+[35]]

ROW 2-H4 = [$\overline{33}$][(RRB-H4)+[32]]

START TSC = ([23]+[24]+[25]+[26])(RTG-Y2)

ADD 1-TSC = (START TSC+RRB-H1+RRB=H2)(RTG-Y2)

ROW 2-I1 = [$\overline{7}$][$\overline{12}$]{[(RSM-DRI)[11]]+ ADD 1-PAR][$\overline{\text{RRB-I1}}$]
[$\overline{\text{ADD 1-PAR}}$][RRB-I1]}

ROW 2-I2 = [$\overline{7}$][$\overline{12}$]{ [(RSM-DR2)[11]]+[(ADD 1-PAR)(RRB-I1)][$\overline{\text{RRB-I2}}$]
+[$\overline{\text{(ADD 1-PAR)(RRB-I1)}}$][RRB-I2] }

ROW 2-I3 = [$\overline{7}$][$\overline{12}$]{[(RSM-DR4)[11]]+[(ADD 1-PAR)(RRB-I1)(RRB-I2)]
[$\overline{\text{RRB-I3}}$]+[$\overline{\text{(ADD 1-PAR)(RRB-I1)(RRB-I2)}}$][RRB-I3]}

ROW 2-I4 = [$\overline{7}$][$\overline{12}$]{[(RSM-DR8)[11]]+[(ADD 1-PAR)(RRB-I1)(RRB-I2)
(RRB-I3)][$\overline{\text{RRB-I4}}$]+[$\overline{\text{(ADD 1-PAR)(RRB-I1)(RRB-I2)(RRB-I3)}}$]
[RRB-I4]}

ADD 1-PAR = [10]

ROW 2-J1 - [$\overline{6}$][(RRB-J1)+[1]]

ROW 2-J2 = [$\overline{6}$][(RRB-J2)+($\overline{\text{RJM-PH}}$)(RRB-J1)(RT6-Y2)($\overline{\text{RRC-PSSC-Ø}}$)]

ROW 2-J3 = [$\overline{6}$][(RRB-J3)+(RRB-J])(RTG-Y2)]

ROW 2-J4 = [$\overline{6}$][(RRB-J4)+(RRB-J3)(RTG-Y2)]

ROW 2-K1 = [(RRB-K1)+[7]+(RRB-NPAA=1)][$\overline{2}$]

ROW 2-K2 = [$\overline{\text{START}}$]{[ADD 1-MDB][$\overline{\text{RRB-K2}}$]+[$\overline{\text{ADD 1-MDB}}$][RRB-K2]}

ROW 2-K3 = [$\overline{\text{START}}$]{[(ADD 1-MDB)(RRB-K2)][$\overline{\text{RRB-K3}}$]+[($\overline{\text{ADD 1-MDB}}$)
($\overline{\text{RRB-K2}}$)][RRB-K3]}

ROW 2-K4 = [$\overline{\text{START}}$]{[(ADD 1-MDB)(RRB-K2)(RRB-K3)][$\overline{\text{RRB-K4}}$]
+[$\overline{\text{(ADD 1-MDB)(RRB-K2)(RRB-K3)}}$][RRB-K4]}

ROW 2-L1 = [ADD 1-MDB]+[START]+{[ADD 1-THB][$\overline{\text{RRB-L1}}$]+[$\overline{\text{ADD 1-TMB}}$]
[RRB-L1]

ROW 2-L2 = [$\overline{\text{START}}$][$\overline{\text{ADD 1-MDB}}$]{[(ADD 1-TMB)(RRB-L1][$\overline{\text{RRB-L2}}$]
+$\overline{\text{[(ADD 1-TMB)(RRB-L1)]}}$[RRB-L2]}

ROW 2-L3 = [$\overline{\text{START}}$][$\overline{\text{ADD 1-MDB}}$]{[(ADD 1-TMB)(RRB-L1)(RRB-L2)[$\overline{\text{RRB-L3}}$]
+[$\overline{\text{(ADD 1-TMB)(RRB-L1)(RRB-L2)]}}$[RRB-L3]}

ROW 2-L4 = [$\overline{\text{START}}$][$\overline{\text{ADD 1-MDB}}$]}[ADD 1-TMB)(RRB-L1)(RRB-L2)(RRB-L3)
[$\overline{\text{RRB-L4}}$]+[$\overline{\text{(ADD 1-TMB)(RRB-L1)(RRB-L])(RRB-L3)}}$][RRB-L4]}

ADD 1-TMB - ($\overline{\text{RRB-TMB-15}}$)(RTG-Y2)[$\overline{\text{RRB-K4}}$)($\overline{\text{RRB-K3}}$)+(RTG-LTT)]

ADD 1-MDB = (RRB-TMB-15)(RTG-Y2)[$\overline{\text{RRB-K4}}$)($\overline{\text{RRB-K3}}$)($\overline{\text{RRB-K2}}$)+(RTG-LTT)]

START = (RTG-Y2){[1]+[6]+[11]+[21]+[22]+[20]+[39]}

K2d. RRC OUTPUT EQUATIONS - TO RCB

RRC-SET-SPAR = [7]+[12]

RRC-SET-PARC-1 = {[7]+[12]}(RRB-I1)}

RRC-SET-PARC-2 -{[7]+[12]} (RRB-I2)

RRC-SET-PARC-4 = {[7]+[12]}(RRB-I3)

PRC-SET-PARC-8 = {[7]+[12]}(RRB-I4)

RRC-SET-TRIC* = {40]+[14]+[44]+[30]}($\overline{\text{RCB-RQTC}}$)

* RRC-SET-TRIC IS USED IN THE RCB TO SET TRIC-1 and TRIC-2 LATCHES

RRC-SET-DRSC = [14]+[30]

RRC-SET-RGTC+ = (RTG-Y2)[RRB-F1)+(RRB-E4)+($\overline{\text{RRB-TRI=0}}$)+($\overline{\text{RCB=TRIC=0}}$)]

+ RRC-SET-RQTC IS ALS) USED IN THE RCB TO SET TRIC-4 LATCH

RRC-SET-NPSS=3 = [19]

RRC-SET-YCM1 = {[7]+[12]}(RRB-G1)

RRC-SET-TRBC = [(ROW 2-F3)+(RPW 2=F4)](RTG-Y2)

RRC-SET-SR5 = {[7]+[12]}{(RRB-G1)+($\overline{\text{RCB-TXD}}$)}

RRC-SET-TRIC-8 = [44]($\overline{\text{RCB-RQTC}}$)

(RRC-TSC=3) (TO SET RCB-CST)

RRC-SET-JC1 = ($\overline{\text{RRB-TSC=0}}$)(RRB-C1)(RTG-Y10)

($\overline{\text{RRC-TSC=0}}$) (TO SET RCB-PTC)

(RRC-TSC=1)(RTG-Y2) (TO SET RCB-PTC)

K3. SENDER CONTROLLER (RSC) EQUATIONS

K3a. RSC BASIC INTERNAL EQUATIONS

1) SET RCB-TRBC - WRITE RRB-TSN )
2) SET RCB-OFC = RRB-OP·Y11 )
3) SET RCB-CST = RRB-ST·Y11 ) -- DONE IN RCB
4) SET RCB-SNC = RRB-SN·Y11 )

6) INHIBIT WRITE INTS = (RCB-PSSC=8{[RRB-RSS·$\overline{\text{RRB-SD}}$
START TMC & MDC ·(TIM>150MSEC)]}
SET RCB-NPSS=9

7) WRITE ST = [(RCB-PSSC=8)+(RCB-PSSC=7)·($\overline{\text{RRB-EOS=0}}$)]
START TMC & MDS ·[(RRB-IPS)+($\overline{\text{RRB-SDM=0}}$)]·[RJM-TSD)·($\overline{\text{RRB-SD}}$)]

8) WRITE RSS = [(RCB-PSSC=8)+(RCB-PSSC=7)·($\overline{\text{RPB-EOS=0}}$)]
START TMC & MDC ·[(RPB-IPS)+($\overline{\text{RRB-SDM=0}}$)]·[($\overline{\text{RJM-TSD}}$)·(RRB-SD)]

9) SET RCB-NPSS=7 = (RCB-PSSC=6)·($\overline{\text{RJM-TSD}}$)·(RCB-INC=4)·(RRB-SD)
START TMC & MDC

10) WRITE ST = (RCB-PSSC=6)(RJM-TSD)·[(RCB-INC=3)
+(RCB-INC=4)]

11) WRITE OP = (RCB-PSSC=6)·(RCB-INC=4)·[($\overline{\text{RRB-EOS=0}}$)
+(CTL)]

12) SET RCB-SLSC= = (RCB-PSSC=9)·F1·(RRB-DS=RRB-PAS)($\overline{\text{RCB-SPAR}}$)
RRB-SLS ·[(RRB-CMS=0)·(RRB-OP)+(RRB-CMS=1)
INHIBIT WRITE DS ·(RRB-TOP)]
INHIBIT WRITE PAS 14) INHIBIT WRITE SN = [(RRB-SLS-13)•(RRB-EOS=1)+(RRB-SLS=39)
WRITE ST ·(RRB-EOS=2)+(RRB-SLS-59)·(RRB-EOS=3)]
SET RCT-NPSS=10 ·[(RCB-PSSC=9)]

15) WRITE TOP = F1·(RRB-TOP)·(RRB-CMS=1)·(TIM=70MSEC)
START TMC & MDC

16) INHIBIT WRITE TOP = F1·(RRB-TOP)·(RRB-CMS=1)·[(F3
INHIBIT WRITE DS · TIM=100MSEC) + ($\overline{\text{F3}}$ · TIM=7-MSEC)]
INHIBIT WRITE PAS
ADD 1 TO SLS
START TMC & MDC 17) WRITE OP = F1·(RRB-IPS)·(RRB-CMS=0)·($\overline{\text{RRB-OP}}$)

WRITE IPS ·(TIM= 60MSEC)

START TMC & MDC

ADD 1 TO SLS

18) INHIBIT WRITE OP = F1·($\overline{\text{RRB-IPS}}$)·(RRB-CMS=0)·(RRB-O)

START TMC & MDC ·(TIM=40MSEC)

ADD 1 TO PAS

19) WRITE CMS+MS1 = (RCB-PSSC=9)·(RRB-SLS=0)·[(RRB-CMS=RRB-MS1)

START TMC & MDC +(RRB-MS1=0)+RRB-MS1=1).($\overline{\text{RRB-IPS}}$)

WRITE SLS=7 +(RRB-MS1=1)·(RRB-IPS) (TIM≥300MSEC)]

20) WRITE IPS = (RCB-PSSC=9)·(RRB-SLS=0)·($\overline{\text{RRB-CMS=RRB-MS1}}$)

INHIBIT WRITE SN ·(RRB-MS1=0)

21) INHIBIT WRITE IPS = (RCB-PSSC=9)·(RRB-SLS=0)·($\overline{\text{RRB-CMS=RRB-MS1}}$)

WRITE SN ·(RRB-MS1=1)

INHIBIT WRITE ST

22) WRITE CMS-MS2 = (RCB-PSSC=9)·(RRB-SLS=16)[RRB-CMS=RRB-MS2)

START TMC & MDC +(RRB-MS2=0)]+(RRB-MS2=1)·($\overline{\text{RRB-IPS}}$)

ADD 1 to SLS +(RRB-MS2=1)·(RRB-IPS)·(TIM≥300MSEC)]

23) WRITE IPS = (RCB-PSSC=9)·(RRB-SLS=16)·($\overline{\text{RRB-CMS-RRB-MS2}}$)

INHIBIT WRITE SN ·(RRB-MS2=0)

24) INHIBIT WRITE IPS = (RCB-PSSC=9)·(RRB-SLS=16)

WRITE SN ·($\overline{\text{RRB-CMS=RRB-MS2}}$)·(RRB-MS2=1)

INHIBIT WRITE ST

25) WRITE CMS=MS3 = (RCB-PSSC=9)·(RRB=SLS=48)·(TIM 70MSEC)

START TMC & MDC ·[($\overline{\text{RRB-EOH}}$)+(RJM-TSD)·(RRB-SD)]

ADD 1 to SLS ·[(RRB-CMS=MS3)+(RRB-MS3=0)+(RRB-MS3=1)

·(RRB-IPS)+(MS3=1)(RRB-IPS)·(TIM≥300MSEC)]

27) WRITE IPS = (RCB-PSSC=9)·(RRB-SLS=48)·[($\overline{\text{RRB=EOH}}$)

INHIBIT WRITE SN +(RJM-TSD)·(RRB-SD)]·($\overline{\text{RRB-CMS=MS3}}$)

·(RRB-MS3=0)

28) WRITE SN = (RCB-PSSC=9) (RRB-SLS=48)·[($\overline{\text{RRB-EOH}}$)

INHIBIT WRITE IPS +(RJM-TSD)·(RRB-SD)] · ($\overline{\text{RRB-CMS=RRB-MS3}}$)

(RJB-MS3=1)

29) INHIBIT WRITE ST = (RCB-PSSC=9) · (RRB-SLS=48)
SET RC B-YCM1

30) INHIBIT WRITE IPS = (RCB-PSSC=9) · FL · (RRB-CMS=0) · RRB-IPS ·
START TMC & MDC ($\overline{\text{RRB-DS=0}}$) · [(RRB-IDS · TIM=260MSEC) +
($\overline{\text{MCC-IPLS}}$ · TIM-560MSEC) + (TIM≥660)] ·
[($\overline{\text{RJM-TSD}}$) + (RRB-EOH) · (RRB-E2) · (RRB-E3)]

31) INHIBIT WRITE ST = (RCB-PSSC-9) · F1 · (RRB-CMS=0) ·
RRB-IPS · $\overline{\text{RRB-RSS}}$ · (TIM-20MSEC)

32) WRITE ST = [(RCB-PSSC=9) · ($\overline{\text{RRB-EOH}}$ + $\overline{\text{RRB-E2}}$ + $\overline{\text{RRB-E3}}$) ·
SET RCB-NPSS=8 RJM-TSD · RRB-SD] · [($\overline{\text{RRB-RSS}}$) (RRB-CSM=0) ·
(RRB-IPS)] · (TIM≥40 MSEC)]

33) F1 = ($\overline{\text{RRB-SLS=0}}$) · ($\overline{\text{RRB-SLS=13}}$) · ($\overline{\text{RRB-SLS=16}}$) ·
($\overline{\text{RRB-SLS-39}}$) ($\overline{\text{RFB-SLS=48}}$) · ($\overline{\text{RRB-SLS=59}}$)

34) F3 = (RRB-DS=11) · [(RRB-SLS=7) + (RRB-SLS=17) +
(RRB-SLS-49)]

35) WRITE SLS=) = (RRB-SLS-59) · ($\overline{\text{RRB-EOS=3}}$) · ($\overline{\text{RRB-SKP}}$)

36) WRITE SLS=16 = [(RRB-SLS-13) · ($\overline{\text{RRB-EOS=1}}$) · ($\overline{\text{RRB-SKP}}$)] +
[(RRB-SLS=59) · ($\overline{\text{RRB-EOS=3}}$) · ($\overline{\text{RRB-SKP}}$)]

37) WRITE SLS-48 = [(RRB-SLS=13) · ($\overline{\text{RRB-EOS=1}}$) · (RRB-SKP)]
+ [(RRB-SL3=39) · ($\overline{\text{RRB-EOS=2}}$)]

38) WRITE TSN = [(RCB-PSSC=) · ($\overline{\text{RRB-EOH}}$ + $\overline{\text{RRB-E2}}$ + $\overline{\text{RRB-E3}}$) ·
(RJM-TSD) · (RRB-SD)] · [($\overline{\text{RRB-RSS}}$) · ($\overline{\text{RRB-CMS=0}}$)
· $\overline{\text{RRB-IPS}}$] · [TIM≥40MSEC]

39) WRITE TSN = [$\overline{\text{RCB-INC=15}}$] [(RCB-PSSC-8) + (RCB-PSSC=7 · ($\overline{\text{RRB-EOS=0}}$)]
· {[(RRB-RSS) · (RRB-SD)] + [(RRB-SMO=0) · ($\overline{\text{RRB-IPS}}$) ·
RRB-SD)] + [[(RJM − TSD · RRB-SD · RMN-DIS)] ·
[[(RRB-SDM=2) + (RRB-SDM=0) · (RRB-IPS)] · [[TIM≥300MSEC)
+ (RRB-SDM=1) (F2)]] + [[(RJM-TSD) · (RRB-SD) · ($\overline{\text{RMN-DIS}}$)]
· {[(RRB-SDM=2) + (RRB-SDM=0) · (RRB-IPS)] [F2] +
(RRB-SDM=1) · (TIM=5SEC)]}}

F2 = [RTM-FT) · (TIM-MCC-SDHT) + ($\overline{\text{RTM-FT}}$) (TIM=MCC-SDLT)]
· ($\overline{\text{RMN-DIS}}$)

40) WRITE DS=RCB-DSC = ($\overline{\text{RCB-SLSC=0}}$)

41) WRITE SLS-13 = ($\overline{\text{RCB-SLSC=0}}$) · (RCB-DSC=0) . ($\overline{\text{RRB-E3}}$ ·$\overline{\text{RRB-E2}}$)

42) WRITE SLS=39 = ($\overline{\text{RCB-SLSC=0}}$) · ($\overline{\text{RCB-EOPC}}$) . (RCB-DSC=0) ·[(RRB-E3·RRB-E2) · $\overline{\text{(RRB-E3·RRB-E2)}}$]

43) WRITE SLS=39 = ($\overline{\text{RCB-SLSC-0}}$) · ($\overline{\text{RCB-EOPC}}$) · (RCB-DSC=0) · (RRB-E3·RRB-E2)

44) SET RCB-NPSS=8 = (RCB-PSSC-7) · ($\overline{\text{RRB-EOS=0}}$) · (RCB-INC=10)

45) SET RCB-NPSS=12 = (RCB-PSSC-7) · (RRB-EOS=0) · (RCB-INC-10)

46) INHIBIT WRITE ST = (RSC-EQ. 9) · ($\overline{\text{RRB-EOS=0}}$)

47) SET RCB-NPSS=5 = (RC-PSSC-12) ·[(RCB-INC=5) + (RCB-INC-6)]
SET RCB-NPSS=6 · (RCB-RQT) · (TIM>450MSEC)
SET RCB-TRIC=8)

48) START TMC & MDC = ($\overline{\text{RCB-PSSC=12}}$) · [(RCB-INC=5) + (RCB-INC-6)]

49) WRITE TSN = (RCB-PSSC=6) · (RJM-TSD) · ($\overline{\text{RCB-INC=3}}$) · ($\overline{\text{RCB-INC=4}}$)

50) WRITE TSN = (RCB-PSSC=9) · (RRB-SLS-48) · (RRB-EOH) · ($\overline{\text{RJM-TSD}}$) · F2

NOTE: "TIM" IS DECODED FROM THE MDC & TMC FIELDS OF THE RRB

K3b. <u>RSC Combined Basic Internal Equations</u>

101) WRITE RRB-IPS = [(17) · (RRB-DS=RRB-PAS)] +[23] + [27]

102) INHIBIT WRITE RRB-IPS = [(RRB=IPS·TIM≥300MSEC)(21+24+28)] + [30] + [6]

103) WRITE RRB-OP = [11] +[17]

104) INHIBIT WRITE RCB-OP = [18]

105) WRITE RRB-RSS = [8] · (RRB-TMC≥40)

106) WRITE RRB-SN = [21] +[24] +[28]

107) INHIBIT WRITE RRB-SN = [14] +[202 + [23] + [27]

108) WRITE RRB-SD = {(RJM-TSD)(RTG-Y3)} + {(RRB-SD)(RTG-Y11)}

109) WRITE: (RRB-CMS=RRB-MS1) = [19]; (RRB-CMS=RRB-MS2) = [22]; (RRB-CMS=RRB-MS3) = [25]

110) WRITE RRB-ST = [7] + [10] + [14] + [F1 · (RRB-CMS=0) ·
(RRB-IPS]

111) INHIBIT WRITE RRB-ST = [21] + [24] +[29] + [31] + [46]

112) WRITE RRB-TOP = [15]

113) INHIBIT WRITE RRB-TOP = [16]

114) INHIBIT WRITE RRB-DS = [12] + [16]

115) WRITE (RRB-DS=RCB-DSC) = [40] "IN-Y11"

116) INHIBIT WRITE RRB-PAS = [12] + [16]

117) ADD 1 to RRB-PAS = [18]

118) START RRB-TMC & RRB-MDC = [6] + [7] + [8] + [9] + [15] + [16]
+ [18] + [19] + [22] + [25] + 30]
+ [17] + [48]

120) ADD 1 to RRB-SLS = [16] + [(17) · (RRB-DS=RRB-PAS)] +
[22] + [25]

121) WRITE (RRB-SLS= 0) = [35]; 16) = [36[; 48) = [37] "IN Y3"
13) = [41[; 39) = [42]; 59) = @43] "IN Y11"
7) = [19]; 33) =(ADD 1 RRB-SLS)
(RRB-SLS=28) IN Y3"

122) THE FOLLOWING ARE WRITTEN SAME AS RRB:
RRB-EOH, RRB-SOM, RRB-IDS, RRB-SKP, RRB-EOS,
RRB-MS1, RRB-MS2, RRB-MS3

123) CLEAR THE COMPLETE ROW WHEN RCB-CL IS SET (DONE IN RWT
CIRCUIT

124) WHEN RCB-INC=5 + RCB-INC=6 INHIBIT WRITE:
RRB-IPS, RRB-DS, RRB-PAS, RRB-OP, RRB-RSS,
RRB-SN, RRB-ST, RRB-CMS, RRB-TOP, LEAST 4
SIGNIFICANT DIGITS OF RRB-SLS

125) INHIBIT WRITE RRB-OP, RRB-ST, RRB-SN WHEM RRB-PSSC = 13 +
RCB-INC = 8 + RCB-INC = 9 + RCB=INC = 7

1]6) RUN TIMER IN RCB-PSSC=7: RCB=PSSC=8; RCB-PSSC=9; and
RCB-PSSC-12 if RCB-INC=5; + RCB-INC=6

127) SET (RCB-NPSS - 5) = [47] (RCB-RC) )
6) = [47] ($\overline{\text{RCB-RCR}}$) )
7) = [9] )
8) = [32] + [44] )-- "IN Y3"
9) = [6] )
10) = [14] )
12) = [45] )

128) SET RCB-YCM1 = [12] (RRB-E2)(RRB-E3) + [29] "IN Y3"

129) SET (RCB-SLSC-RRB-SLS) = [12] "IN Y3"

(LEAST SIGNIFICANT 4 BITS)

130) SET RCB-TRIC=8 = [47] "IN Y3"

131) SET RCB-SR5 = [12[ ($\overline{\text{RRB-E2}}$ + RRB-E3) "IN Y3"

K3c. <u>RSC Output Equations to - RWT</u>

ROW 3-A1 = RRB-A1 )
ROW 3-A2 = RRB-A2 )
ROW 3-A3 = RRB-A3 )
ROW 3-A4 = RRB-A4 )
ROW 3-B1 = RRB-B1 )
ROW 3-B2 = RRB-B2 )
ROW 3-B3 = RRB-B3 )--RWT EQUATIONS
ROW 3-B4 = RRB-B4 )
ROW 3-C1 = RRB-C1 )
ROW 3-C2 = RRB-C2 )
ROW 3-C3 = RRB-C3 )
ROW 4-C4 = RRB-C4 )

ROW 3-D1 = RRB-E4 RWT EQUATIONS

ADD ONE RRB-SLS = (RTG-Y3) · [(16) + (17· RRB-DS=RRB-PAS) +
(22) + (25]

ROW 3-D2 = ($\overline{\text{RCB-INC=5}}$) · ($\overline{\text{RCB-INC=6}}$) · ($\overline{\text{RTG-Y3·35}}$) . ($\overline{\text{RTG-Y3·36}}$) ·
($\overline{\text{RTG-Y3·37}}$) · {(RTG-Y11·41) + (RTG-Y11·42) +
(RTG-Y11·43) + (RTG-Y3·19) + [ADD ONE RRB-SLS][RRB-D2]
+ [$\overline{\text{ADD ONE RRB-SLS}}$][RRB-D2]}

ROW 3-D3 = (RTG-Y3·37) ·(RCB-INC=5) · (RCB-INC=6) ·(RTG-Y3·35)·
(RTG-Y3·36) ·{[(RTG-Y3·19) + (RTG-Y11·43) +
(RTG-Y11·42) + (RTG-Y11·41) ([(ADD ONE RRB-SLS)
(RRB-D2) · (RRB-D3)] + [(ADD ONE RRB-SLS)(RRB-D2) ·
(RRB-D3)]}

ROW-3-D4 = (RCB-INC=5) · (RCB-INC=6) · (RTG-Y3·35) · (RTG-Y3·36) ·
(RTG-Y3·37) · {(RTG-Y11·41) + (RTG-Y11·42)· (RTG-Y3·19)
+ (RTG-Y11 43) · (RRB-SLS=28 · ADD ONE RRB-SLS RTG-Y3)
· [(RRB-D4) ·{(ADD ONE RRB-SLS) · (RRB-D2) · (RRB-D3)}
= (RBB-D4) · {(ADD ONE RRB-SLS) · (RRB-D2) · (RRB-D3)}]}

ROW 3-E1 = (RCB-INC=5) · (RCB-INC=6)(RTG-Y3·35)(RTG-Y3·36)
(RTG-Y2·37) · {(RTG-Y11·43) + (RTG-Y11·41) +
(RRB-Y11·42)·(RRB-SLS=28·ADD ONE RRB-SLS·RTG-Y3) ·
[(RRB-E1) · {(ADD ONE RRB-SLS)(RRB-D2)(RRB-D3)(RRB-D4)}
+ (RRB-E1) · {(ADD ONE RRB-SLS)(RRB-D2)(RRB-D3)
(RRB-D4)}]}

ROW 3-E2 = {(RTG-Y3·36) + (RTG-Y3·37) + [(RRB-E2)(RTG-Y3·35)
(RTG-Y11·42)(Y3·RRB-SLS-28·ADD ONE RRB-SLS·RTG-Y3)]}

ROW 3-E3 = {(RTG-Y3·37) + (RTG-Y11·42) + (RRB-SLS=28·ADD ONE
RRB-SLS·RTG-Y3) + [(RRB-E3)(RTG-Y3·35)(RTG-Y3·36)]}

ROW 3-E4 = RRB-E4 RWT EQUATIONS

ROW 3-F4 = (RCB-INC=5)(RCB-INC=6)·{(RRB-F4) + (RTG-Y3)
[(38) + (39) + (49) + (50) + (TIM-45SEC)]}

ROW 3-G1 = (RCB-INC=5)(RCB-INC=6) · [(15)(RTG-Y3) + (RRB-G1)
· (16· RTG-Y3)]

ROW 3-G2 = (RCB-INC=5)(RCB-INC=6) · {[(RRB-B1)(19)(RTG-Y3)]
+ [(RRB-A3)(22)(RTG-Y3)] + [(RRB-A1)(25)(RTG-Y3)]
+ (RRB-G2)[(19·RTG-Y3) + (22·RTG-Y3) + (25·RTG-Y3)]}

ROW 3-G3 = (RCB-INC=5)(RCB-INC=6) · {[(RRB-B2)(19)(RTG-Y3)]
+ [(RRB-A4)(22)(RTG-Y3)] +[(RRB-A2)(25)(RTG-Y3)]
+ (RRB-G3)[(19·RTG-Y3) + (22·RTG-Y3) + (25·RTG-Y3)]}

ROW 4-G4 = $(\overline{\text{RCB-INC=5}})(\overline{\text{RCB-INC=6}})(\overline{\text{RCB-INC=8}})(\overline{\text{RCB-INC=9}})$
$(\overline{\text{RCB-PSSC=13}})(\overline{\text{RCB-INC=7}})$ • {(RTG-Y3) • [(7) + (10) +
(14) + [(F1)(RRB-CMS=0)$(\overline{\text{RRC-IPS}})$] +(32) + (RRB-G4)
• [$(\overline{\text{RTG-Y3)(21 + 24 + 29 + 31 + 46}})$]]}

ROW 3-H1 = [(RJM-TSD)(RTG-Y3)] + [(RRB-H1)(RTG-Y11)]

Row 3-H2 = $(\overline{\text{RCB-INC=5}})(\overline{\text{RCB-INC=6}})(\overline{\text{RCB-INC=8}})(\overline{\text{RCB-INC=9}})(\overline{\text{RCB-PSSC=13}})$
$(\overline{\text{RCB-INC=7}})$ • {(RTG-Y3)(21 + 24 + 28) + (RRB-H2)
• [$\overline{\text{RTG-Y3}\cdot\text{(14+ 20 + 23 + 27)}}$]]}

ROW 3-H3 = $(\overline{\text{RCB-INC=5}})(\overline{\text{RCB-INC=6}})$ • {(RRB-H3) + (RTG-Y3)(8)
• [RRB-L3) + (RRB-K2) + (RRB-K3) + (RRB-K4) + (RRB-L4)]}

ROW 3-H4 = $(\overline{\text{RCB-INC=5}})(\overline{\text{RCB-INC=6}})(\overline{\text{RCB-INC=8}})(\overline{\text{RCB-INC=9}})(\overline{\text{RCB-PSSC=13}})$
$(\overline{\text{RCB-INC=7}})$(RCB-TR) • {(RTG-Y3)(11+17) + (RRB-H4)
$(\overline{\text{RRG-Y3+18}})$}

ROW 3-I1 = $(\overline{\text{RCB-INC=3}})(\overline{\text{RCB-INC-6}})$ • [$(\overline{\text{RTG-Y3)(12+16}})$]
• {[(ADD ONE RRB-PAS)$(\overline{\text{RRB-I1}})$ + $(\overline{\text{ADD ONE RRB-PAS}})$
(RRB-I1)]}

ROW 3-I2 = $(\overline{\text{RCB-INC=5}})(\overline{\text{RCB-INC=6}})$ • [$(\overline{\text{RTG-Y3(12+16}})$]
• {[(ADD ONE RRB-PAS)(RRB-I1)$(\overline{\text{RRB-I2}})$]
+ [$(\overline{\text{ADD ONE RRB-PAS)(RRB-I1}})$(RRB-I2)]]}

ROW 3-I3 = $(\overline{\text{RCB-INC=5}})(\overline{\text{RCB-INC-6}})$ • [$(\overline{\text{RTG-Y3)(12+16}})$]
• {[(ADD ONE RRB-PAS)(RRB-I1(RRB-I2)][$\overline{\text{RRR-I3}}$]
+ [$(\overline{\text{ADD ONE RRB-PAS)(RRB-I1)(RRB-I2}})$][RRB-I3]}

ROW 3-I4 = $(\overline{\text{RCB-INC=5}})(\overline{\text{RCB=INC=6}})$ • [$(\overline{\text{RTG-Y3)(12+16}})$]
† {[(ADD ONE RRB-PAS)(RRB-I1)(RRB-I2)(RRB-I3)]
[$(\overline{\text{RRB-I4}})$] + [$(\overline{\text{ADD ONE RRB-PAS)(RRB-I1(RRB-I2)(RRB-I3}})$
[(RRB-I4]}.

ADD ONE RRB-PAS = [18] RTG-Y3

ROW 3-J1 = $(\overline{\text{RCB-INC=5}})(\overline{\text{RCB-INC=6}})$ • {(RRB-J1) • [$(\overline{\text{RTG-Y3)(12+16}})$]
+ (RCB-DSC-1)(40)(RTG-Y11) }

ROW 3-J2 = $(\overline{\text{RCB-INC=5}})(\overline{\text{RCB-INC=6}})$ • {(RRB-J2) • [$(\overline{\text{RTG-Y3)(12+16}})$]
+ (RCB-DSC-2)(40)(RTG-Y11) }

$$\text{ROW 3-J3} = (\overline{\text{RCB-INC=5}})(\overline{\text{RCB-INC=6}})\cdot\{(\text{RRB-J3})\cdot[(\overline{\text{RTG-Y3}})(\overline{12+16})] + (\text{RCB-DSC-4})(40)(\text{RTG-Y11})\}$$

$$\text{ROW 3-J4} = (\overline{\text{RCB-INC=5}})(\overline{\text{RCB-INC=6}})\cdot\{(\text{RRB-J4})\cdot[(\overline{\text{RTG-Y3}})(\overline{12+16})] + (\text{RCB-DSC-8})(40)(\text{RTG-Y11})\}$$

$$\text{ROW 3-K1} = (\overline{\text{RCB-INC=5}})(\overline{\text{RCB-INC=6}})\cdot\{(\text{RTG-Y3})\cdot[(17)(\text{RRB-DS=RRB-PAS}) + (20) + (23) + (27)] + \text{RRB-K1}\cdot[(\overline{\text{RTG-Y3}}) + (\overline{30}) + (\overline{\text{TIM>300MSEC}} + \overline{21}\cdot\overline{24}\cdot\overline{28})\cdot(\overline{6})]\}$$

$$\text{ROW 3-K2} = \overline{\text{START}}\cdot\{[\text{ADD ONE RRB-MDC})\cdot(\overline{\text{RRB-K2}}) + (\overline{\text{ADD ONE RRB-MDC}})\cdot(\text{RRB-K2})]\}$$

$$\text{ROW 3-K3} = \overline{\text{START}}\cdot\{[(\text{ADD ONE RRB-MDC})(\text{RRB-K2})][\overline{\text{RRB-K3}}] + [\overline{(\text{ADD ONE RRB-MDC})(\text{RRB-K2})}][\text{RRB-K3}]\}$$

$$\text{ROW 3-K4} = \overline{\text{START}}\cdot\{[(\text{ADD ONE RPB-MDC})(\text{RRB-K2})(\text{RRB-K3})][\overline{\text{RRB-K4}}] + [\overline{(\text{ADD ONE RRB-MDC})(\text{RRB-K2})(\text{RRB-K3})}][\text{RRB-K4}]\}$$

$$\text{ROW 3-L1} = [(\text{ADD ONE RRB-MDC}) + (\text{START}) + (\text{ADD ONE RRB-TMC})(\overline{\text{RRB-L1}}) + (\overline{\text{ADD ONE RRB-TMC}})(\text{RRB-L1})]$$

$$\text{ROW 3-L2} = (\overline{\text{START}}\cdot(\overline{\text{ADD ONE RRB-MDC}})\cdot\{[(\text{ADD ONE RRB-TMC})(\text{RRB-L1})]\cdot[\overline{\text{RRB-L2}}] + [\overline{(\text{ADD ONE-TMC})(\text{RRB-L1})}][\text{RRB-L2}]\}$$

$$\text{ROW 3-L3} = \overline{\text{START}}\cdot(\overline{\text{ADD ONE RRB-MDC}})\cdot\{[(\text{ADD ONE RRB-TMC})(\text{RRB-L1})(\text{RRB-L2})]\cdot[\overline{\text{RRB-L3}}] + [\overline{(\text{ADD ONE RRB-TMC})(\text{RRB-L1})(\text{RRB-L}_2)}]\cdot[\text{RRB-L}_3]\}$$

$$\text{ROW 3-L4} = \overline{\text{START}}\cdot(\overline{\text{ADD ONE RRB-MDC}})\cdot\{[(\text{ADD ONE RRB-TMC})(\text{RRB-L1})(\text{RRB-L2})(\text{RRB-L3})]\cdot[\overline{\text{RRB-L4}}] + [\overline{(\text{ADD ONE RRB-TMC})(\text{RRB-L1})(\text{RRB-L2})(\text{RRB-L3})}]\cdot[\text{RRB-L4}]\}$$

$$\text{ADD ONE RRB-MDC} = (\text{RRB-TMC=15})\cdot\text{RTG-Y3}\cdot[\overline{\text{RRB-K4}} + \text{RTG-LTT}]$$

$$\text{ADD ONE RRB-TMC} = [(\text{RCB-PSSC=7}) + (\text{RCB-PSSC=8}) + (\text{RCB-PSSC=9}) + (\text{RCB-PSSC=12})\cdot(\text{RCB-INC=5} + \text{RCB-INC=6})](\overline{\text{RRB-K4}} + (\overline{\text{RRB-K2}}\cdot\overline{\text{RRB-K3}}) + \text{RTG-LTT}](\overline{\text{RRB-TMC=15}})\cdot\text{RTG-Y3}$$

$$\text{START} = \text{Y3}\ [(6) + (7) + (8) + (9) + (15) + (16) + (17) + (18) + (19) + (22) + (25) + (30) + 48)]$$

K4. Information Storage Controller (RIC) Equations

K4a. RIC Basic Internal Equations (1A) ($\overline{\text{RCB-YCM1}}$)($\overline{\text{RCB-SR5}}$)(RTG-Y6)

(1B) (RCB-YCM1)(RCB-SR5)(RTG-Y7)

NOTE: (1) = );A)+(1B)

(2) = ($\overline{\text{RCB-YCM1}}$)(RCB-SR5)(RTG-Y5)

(3) = ($\overline{\text{RCB-SPAR}}$)(RCB-TX)(RCB-SLSC=0)($\overline{\text{RCB-SR5}}$)($\overline{\text{RCB-YCM1}}$)
($\overline{\text{RRB-PL=0}}$)*(RTG-Y5)

* PA, PB, ...PL = POSITION A,B, ... L ON THE MEMORY MAP AND INCLUDES FOUR BITS FOUND UNDER THAT PARTICULAR POSITION IN WHATEVER ROW IS ACCESSED (4) SA-B** = [($\overline{\text{RRB-PA=0}}$)($\overline{\text{RTG-Y7}}$)($\overline{\text{RTG-Y5}}$)(RRB-PB=0)] + [SB-C]

** SA-B = SHIFT THE CONTENTS OF PA TO PB (5) SB-C = [($\overline{\text{RRB-PB=0}}$)(RRB-PC=0) + (SC-D)] ($\overline{\text{RTG-Y5}}$)($\overline{\text{RTG-Y7}}$)

(6) SC-D = [($\overline{\text{RRB-PC=0}}$)($\overline{\text{RTG-Y5}}$)(RRB-PD=0)] + [SD=E]

(7) SD-E = [($\overline{\text{RRB-PD=0}}$)($\overline{\text{RTG-Y5}}$)(RRB-PE=0)] +[SE-F]

(8) SE-F = [($\overline{\text{RRB-PE=0}}$)($\overline{\text{RTG-Y5}}$)(RRB-PF=0)] +[SF-G]

(9) SF-G = [($\overline{\text{RRB-PF=0}}$)(RRB-PG=0) + (SG-H)] ($\overline{\text{RTG-Y5}}$)

(10) SG-H = [($\overline{\text{RRB-PG=0}}$)(RRB-PH=0)] + (SH-I]

(11) SH-I = [($\overline{\text{RRB-PH=3}}$)(RRB-PI=0)] + [SI-J]

(12) SI-J = [($\overline{\text{RRB-PI=0}}$)(RRB-PJ=0)] + [SJ-K]

(13) SJ-K = [($\overline{\text{RRB-PJ=0}}$)(RRB-PK=0)] + [SK-L[

(14) SK-L = ($\overline{\text{RRB-PK=0}}$)(RRB-PL=0) + (3)

(15) LPA*** = [($\overline{\text{RCB-YCM1}}$)($\overline{\text{RCB-SR5}}$)(RTG-Y6)][(RRB-PA=0) + (SA-B)]
[$\overline{\text{RRB-PB=0}}$]

*** LPA, LPB ... LPL = LOAD RCB-PARC INTO POSITION A, B, ... L

(16) LPB = ($\overline{\text{RRB-PC=0}}$)(RRB-PA=0)(RRB-PB=0)($\overline{\text{RCB-YCM1}}$)($\overline{\text{RCB-SR5}}$)
(RTG-Y6)

(17) = [(RRB-PC=0)][(RRB-PA=0)(RRB-PB=0)($\overline{\text{RCS-YCM1}}$)($\overline{\text{RCB-SR5}}$)
(RTG-Y6) + RCB-YCM1)(RCB-SR5)(RCB-Y7)]

(18) LPC = (17)($\overline{\text{RRB-PD=0}}$)

(19) LPD = (17)(RRB-PD=0)($\overline{\text{RRB-PE=0}}$)

(20) LPE = (17)(RRB-PD=0)(RRB-PE=0)($\overline{\text{RRB-PF-0}}$)

(21) LPF = (17) (RRB-PD=0)(RRB-PE=0)(RRB-PF=0)($\overline{\text{RRB-PG=0}}$)

(22) = [(RRB-PD=0)(RRB-PE=0)(RRB-PF=0)(17) + ($\overline{\text{RCB-YCM1}}$)
(RCB-SR5)(RTG-Y5)][(RRB-PG=0)]

K4b. <u>RIC Combined Internal Equations</u>

(23) LPG = (22)($\overline{\text{RRB-PH=0}}$)

(24) LPH = (22)(RRB-PH=0)($\overline{\text{RRB-PI=0}}$)

(25) LPI = (22)(RRB-PH=0)(RRB-PI=)($\overline{\text{RRB-PJ=0}}$)

(26) LPJ = (22)(RRB-PH=0)(RRB-PI=0)(RRB-PJ=0)($\overline{\text{RRB=PK=0}}$)

(27) LPK = (22)(RRB-PH=0)(RRB-PI=0)(RRB-PJ=0)(RRB-PK=0)($\overline{\text{RRB=PI=0}}$)

(28) LPL = (22)(RRB-PH=0)(RRB-PI=0)(RRB=PJ=0)(RRB-PK=0)(RRB-PL=0)

(29) RRB-IDC$\geq$RRB-TL = [(RRB-A4)($\overline{\text{RRB-C4}}$) + $\overline{(\overline{\text{RRB-A4}})(\text{RRB-C4})}$(RRB-A3)
($\overline{\text{RRB-C3}}$) + $\overline{(\overline{\text{RRB-A4}})(\text{RRB-C4})}$ $\overline{(\overline{\text{RRB-A3}})(\text{RRB-C3})}$
(RRB-A2)($\overline{\text{RRB-C2}}$) + $\overline{(\overline{\text{RRB-A4}})(\text{RRB-C4})}$
$\overline{(\overline{\text{RRB-A3}})(\text{RRB-C3})}$ $\overline{(\overline{\text{RRB-A2}})(\text{RRB-C2})}$
$\overline{(\overline{\text{RRB-A1}})(\text{RRB-C1})}$][($\overline{\text{RRB-TL=0}}$)]

K4c. <u>RIC Output Equations to RWT</u>

ROW 4-A1 = (RCB-SPAR)($\overline{\text{RRB-A1}}$) + ($\overline{\text{RCB-SPAR}}$)(RRB-A1)

ROW 4-A2 = (RCB-SPAR)(RRB-A1)($\overline{\text{RRB-A2}}$) + ($\overline{\text{RCB-SPAR}}$)($\overline{\text{RRB-A1}}$)
(RRB-A2)

ROW 4-A3 = [(RCB-SPAR)(RRB-A1)(RRB-A2)($\overline{\text{RRB-A3}}$)] +
[($\overline{\text{RCB-SPAR}}$)($\overline{\text{RRB-A1}}$)($\overline{\text{RRB-A2}}$)(RRB-A3)]

ROW 4-A4 = [(RCB-SPAR)(RRB-A1)(RRB-A2)(RRB-A3)($\overline{\text{RRB-A4}}$)] +
[($\overline{\text{RCB-SPAR}}$)($\overline{\text{RRB-A1}}$)($\overline{\text{RRB-A2}}$)($\overline{\text{RRB-A3}}$) · (RRB-A4)]

ROW 4-B1 = RRB-B1

ROW 4-B3 = RRB-B2

ROW 4-B3 = RRB-B3

ROW 4-B4 = RRB-B4

ROW 4-C1 = [RRB-C1)[$\overline{(\text{RRB-D1})(\text{RRB-TL=3})(\text{RRB-IDC=0})(\text{RCB-PARC=1} +}$
$\overline{\text{RCB-PARC=10}}$)]

ROW 4-C2 = [RRB-C2] [$\overline{(\text{RRB-D1})\text{RRB-TL=3})(\text{RRB-IDC=0})(\text{RCB-PARC=1} +}$
$\overline{\text{RCB-PARC=10}}$)]

ROW 4-C3 = [RRB-C3] + [$\overline{\text{(RRB-D1)(RRB-TL=3)(RRB=IDC=0)(RCB-PARC=1 +}}$ $\overline{\text{RCB-PARC=10}}$)]

ROW 4-C4 = [RRB-C4][($\overline{\text{RRB-D1)(RRB-TL=3)(RRB=IDC=0)(RCB-PARC=1 +}}$ $\overline{\text{RCB-PARC=10}}$)]

ROW 4-D1 = RRB-D1

ROW 4-D2 = RRB-D2

ROW 4-D3 = RRB-D3

ROW 4-D4 = RRB-D4

ROW 4-E1 = RRB-E1

ROW 4-E2 = RRB-E2

ROW 4-E3 = RRB-E3

ROW 4-E4 = RRB-E4

ROW 4-F1 = RRB-F1

ROW 4-F2 = (RRB-F2)($\overline{\text{RCB-SPAR}}$)

ROW 4-K4 = [(RRB-K4)($\overline{\text{RCB-SPAR}}$)] + [(RRB-F2)(RCB-PARC=10)]

ROW 5-A1 = RRB-A1

ROW 5-A2 = RRB-A2

ROW 5-A3 = RRB-A3

ROW 5-A4 = RRB-A4

ROW 5-B1 - RRB-B1

ROW 5-B2 = RRB-B2

ROW 5-B3 = RRB-B3

ROW 5-B4 = RRB-B4

ROW 5-C1 = RRB-C1

ROW 5-C2 = RRB-C2

ROW 5-C3 = RRB-C3

ROW 5-C4 = RRB-C4

ROW 5-D1 = RRB-D1

ROW 5-D2 = RRB-D2

ROW 5-D3 = RRB-D3

ROW 5-D4 = RRB-D4

ROW 5-E1 = RRB-E1

ROW 5-E2 = RRB-E2

ROW 5-E3 - RRB-E3

ROW 5-E4 = RRB-E4

ROW 5-F1 = RRB-F1

ROW 5-F2 = RRB-F2

ROW 5-F3 = RRB-F3

ROW 5-F4 = RRB-F4

ROW 6-A1 = (RRB-A1)($\overline{SA-B}$) + (LPA)(RCB-PARC-1) ROW 7 - EMPTY

ROW 6-A2 = (RRB-A2)($\overline{SA-B}$) + (LPA)(RCB-PARC-2) ROW 7 - EMPTY

ROW 6-A3 = (RRB-A3)($\overline{SA-B}$) + (LPA)(RCB-PARC-3) RPW 7 - EMPTY

ROW 6-A4 = (RRB-A4)($\overline{SA-B}$) + (LPA)(RCB-PARC-4) ROW 7 - EMPTY

ROW 6-B1 = (RRB-A1)(SA-B) + (RRB-B1)($\overline{SA-B}$) + (LPB)(RCB-PARC-1)
ROW 7 - EMPTY ROW 6-B2 = (RRB-A2)(SA-B) + (RRB-B2)($\overline{SA-B}$) + (LPB)
(RCB-PARC-2) ROW 7- EMPTY ROW 6-B3 = (RRB-A3)(SA-B) + (RRB-B3)($\overline{SA-B}$) + (LPB)
(RCB-PARC-3) ROW 7 - EMPTY ROW 6-B4 = (RRB-A4)(SA-B) + (RRB-B4)($\overline{SA-B}$) + (LPB)
(RCB-PARC-4) ROW 7 - EMPTY ROW 6 & 7-C1 = (RRB-B1)(SB-C) + (RRB-C1)($\overline{SB-C}$) ($\overline{SC-D}$) +
(RCB-PARC-1)(LPC)

ROW 6 & 7-C2 = (RRB-B2)(SB-C) + (RRB-C2)($\overline{SB-C}$)($\overline{SC-D}$) +
(RCB-PARC-2)(LPC)

ROW 6 & 7-C3 = (RRB-B3)(SB-C) + (RRB-C3)($\overline{SC-C}$)($\overline{SC-D}$) +
(RCB-PARC-2)(LPC)

ROW 6 & 7-C4 = (RRB-B4)(SB-C) + (RRB-C4)($\overline{SB-C}$)($\overline{SC-D}$) +
(RCB-PARC-4)(LPC)

ROW 6 & 7-D1 = (RRB-C1)(SC-D) + (RRB-D1)($\overline{SC-D}$) + (LPD)(RCB-PARC-1)

ROW 6 & 7-D2 = (RRB-C2)(SC-D) + (RRB-D2)($\overline{SC-D}$) + (LPD)(RCB-PARC-2)

ROW 6 & 7-D3 = (RCB-C3)(SC-D) + (RRB-D3)($\overline{SC-D}$) + (LPD)(RCB-PARC-3)

ROW 6 & 7-D4 = (RRB-C4)(SC-D) + (RRB-D4)($\overline{SC-D}$) + (LPD)(RCB-PARC-4)

ROW 6 & 7-E1 = (RRB-D1)(SD-E) + (RRB-E1)($\overline{SD-E}$) + (LPE)(RCB-PARC-1)

ROW 6 & 7-E2 = (RRB-D2)(SD-E) + (RRB-E2)($\overline{SD-E}$) + (LPE)(RCB-PARC-2)

ROW 6 & 7-E3 = (RRB-D3)(SD-E) + (RRB-E3)($\overline{SD-E}$) + (LPE)(RCB-PARC-3)

ROW 6 & 7-E4 = (RRB-D4)(SD-E) + (RRB-E4)($\overline{SD-E}$) + (LPE)(RCB-PARC-4)

ROW 6 & 7-F1 = (RRB-E1)(SE-F) + (RRB-F1)($\overline{SE-F}$) + (LPF)(RCB-PARC-1)

ROW 6 & 7-F2 = (RRB-E2)(SE-F) _ (RRB-F2)($\overline{SF-F}$) + (LPF)(RCB-PARC-2)

ROW 6 & 7-F3 = (RRB-E3)(SE-F) + (RRB-F3)($\overline{SE-F}$) + (LPF)(RCB-PARC-3)

ROW 6 & 7-F4 = (RRB-E4)(SE-F) + (RRB-F4)($\overline{SE-F}$) + (LPF)(RCB-PARC-4)

ROW 5, 6 & 7-G1 = (RRB-F1)(SF-G) + (RRB-G1)($\overline{SF-G}$)($\overline{SG-H}$) + (LPG)
(RCB-PARC-1)

ROW 5, ¢ & 7-G2 = (RRB-F2)(SF-G) + (RRB-G2)($\overline{SF-G}$)($\overline{SG-H}$) + (LPG)
(RCB-PARC-2)

ROW 5, 6 & 7-G3 = (RRB-F3)(SF-G) + (RRB-G3)($\overline{SF-G}$)($\overline{SG-H}$) + (LPG)
(RCB-PARC-3)

ROW 5, 6 & 7-G4 - (RRB-F4)(SF-G) + (RRB-G4)($\overline{SF-G}$)($\overline{SG-H}$) + (LPG)
(RCB-PARC-4)

ROW 5, 6 & 7-H1 = (RRB-G1)(SG-H) + (RRB-H1)($\overline{SG-H}$) + (LPH)
(RCB-PARC-1)

ROW 5, 6 & 7-H2 = (RRB-G2)(SG-H) + (RRB-H2)($\overline{SG-H}$) + (LPH)
(RCB-PARC-2)

ROW 5, 6 & 7-H3 = (RRB-G3)(SG-H) + (RRB-H3)($\overline{SG-H}$) + (LPH)
(RCB-PARC-3)

ROW 5, 6 & 7-H4 = (RRB-G4)(SG-H) + (RRB-H4)($\overline{SG-H}$) + (LPH)
(RCB-PARC-4)

ROW 5, 6 & 7-I1 = (RRB-H1)(SH-I) _ (RRB-I1)($\overline{SH-I}$) + (LPI)
(RCB-PARC-1)

ROW 5, 6 & 7-I2 = (RRB-H2)(SH-I) + (RRB-I2)($\overline{SH-I}$) + (LPI)
(RCB-PARC-2)

ROW 5, 6 & 7-I3 = (RRB-H3)(SH-I) + (RRB-I3)($\overline{SH-I}$) + (LPI)
(RCB-PARC-3)

ROW 5, 6 & 7-I4 = (RRB-H4)(SH-I) + (RRB-I4)($\overline{SH-I}$) + LPI)
(RCB-PARC-4)

ROW 5, 6 & 7-J1 = (RRB-I1)(SI-J) + (RRB-J1)($\overline{SI-J}$) + (LPJ)
(RCB-PARC-1)

ROW 5, 6 & 7-J2 = (RRB-I2)(SI-J) + (RRB-J2)($\overline{\text{SI-J}}$) + (LPJ)
(RCB-PARC-2)

ROW 5, 6 & 7-J3 = (RRB-I3)(SI-J) + (RRB-J3)($\overline{\text{SI-J}}$) + (LPJ)
(RCB-PARC-3)

ROW 5, 6 & 7-J4 = (RRB-I4)(SI-J) + (RRB-J4)($\overline{\text{SI=J}}$) + (LPJ)
(RCB-PARC-4)

ROW 5, 6 & 7-K1 = (RRB-J1)(SJ-K) + (RRB-K1)($\overline{\text{SJ-K}}$) + (LPK)
(RCB-PARC-1)

ROW 5, 6 & 7-K2 = (RRB-J2)(SJ-K) + (RRB-K2)($\overline{\text{SJ-K}}$) + (LPK)
(RCB-PARC-2)

ROW 5, 6 & 7-K3 = (RRB-J3)(SJ-K) + (RRB-K3)($\overline{\text{SJ-K}}$) + LPK)
(RCB-PARC-3)

ROW 5, 6 & 7-K4 = (RRB-J4)(SJ-K) + (RRB-K4)($\overline{\text{SJ-K}}$) + (LPK)
(RCB-PARC-4)

ROW 5, 6 & 7-L1 = (RRB-K1)(SK-L) + (RRB-L1)($\overline{\text{SK-L}}$) + (LPL)
(RCB-PARC-1)

ROW 5, 6 & 7-L2 = (RRB-K2)(SK-L) + (RRB-L2)($\overline{\text{SK-L}}$) + )LPL)
(RCB-PARC-2)

ROW 5, 6 & 7-L3 = (RRB-K3)(SK-L) + (RRB=L3) ($\overline{\text{SK-L}}$) + LPL)
(RCB-PARC-3)

ROW 5, 6 & 7-K4 = (RRB-K4)(SK-L) + (RRB=L4)($\overline{\text{SK-L}}$) + (LPL)
(RCB-PARC-4)

<u>K4d. RIC Output Equations to RCB</u>

SET RCB-PRFC = RRB-PRF (LOGIC IN RCB)

RIC-SET-3DR = RTG-Y4 [(RRB-A4) + (RRB-A3) + (RRB-A2)(RRB-A1)]

RIC-SET-FITC = RTG-Y4 [(RRB-KA) + (RRB-FTO=15) +
(RRB-FO =RRB-IDC)($\overline{\text{RRB-FTO=0}}$)]

RIC-SET-FDC = RTG-Y4 [(RCB-EOPC)(RRB-IDC≥RRB-TL)]

RIC-SET-TRIC-1 = RTG-Y4 [($\overline{\text{RCB-FDC}}$)($\overline{\text{RCB-EOPC}}$)(RRB-IDC≥RRB-TL)
($\overline{\text{RCB-RQTC}}$)($\overline{\text{RCB-PTC}}$)]

RIC-SET-DRSC = RTG-Y4 {[$\overline{\text{(RCB-FDC)}}$ $\overline{\text{(RCB-EOPC)}}$ $\overline{\text{(RCB-RQTC)}}$ (RRB-F1) (RRB-IDC≥RRB-TL)] + [$\overline{\text{(RCB-FDC)}}$ $\overline{\text{(RCB-EOPC)}}$ (RRB-F1) (RCB-PARC-4) (RCB-PARC-8)]}

RIC-SET-JC1 = RTG-Y4 [(RRB-D2) (RCB-PSSC=12)] [(RCB-INC=7) + (RCB-INC=10)] · $\overline{\text{(RMU-RJ∅-191 FREEZE RJ)}}$ RIC-SET-JC2 = RTG-Y4 ([RRB-D3) (RCB-PSSC-12)] [(RBB-INC=7) + (RCB-INC=10)] · $\overline{\text{(RMU-RJ∅-191 . FREEZE RJ)}}$ RIC-SET-JC3 = RTG-Y4 [(RRB-D4) (RCB-PSSC=12)] [(RCB-INC=7) + (RCB-INC-10)] $\overline{\text{(RMU-RJ∅-191·FREEZE RJ)}}$ RIC-SET-RSFC = (RTG-Y6) $\overline{\text{(RRB-PA=0)}}$ $\overline{\text{(SA-B)}}$ RIC-SET-TRIC-2 = (PATTERN RECOGNIZED) (RTG-Y6) $\overline{\text{(RCB-RQTC)}}$

RIC-SET-PARC-1 = (3) (RRB-L1)

RIC-SET-PARC-2 = (3) (RRB-L2)

RIC-SET-PARC-4 = (3) (RRB-L3)

RIC-SET-PARC-8 = (3) (RRB-L4)

RIC-SET-DSC-1 = [(1)+(2)] [(DSLSC=1) (RRB-L1) + (DSLSC=2) (RRB-K1) + (DSLSC=3) (RRB-J1) + (DSLSC=4) (RRB-I1) + (DSLSC=5) (RRB-H1) + (DSLSC=6) (RRB-G1) + (DSLSC=7) (RRB-F1) + (DSLSC=8) (RRB-E1) + (DSLSC=9) (RRB-D1) + (DSLSC=10) (RRB-C1) + (DSLSC-11) (RRB-B1) + (DSLSC=12) (RRB-A1)]

RIC-SET-DSC-2 = [(1)+(2)] [(DSLSC=1) (RRB-L2) + (DSLSC=2) (RRB-K2) + (DSLSC=3) (RRB-J2) + (DSLSC=4) (RRB=I2) (DSLSC=5) (RRB-H2) + (DSLSC=6) (RRB-G2) + (DSLSC=7) (RRB-F2) + (DSLSC=8) (RRB-E2) + (DSLSC=9) (RRB-D2) + (DSLSC=10) (RRB-C2) + (DSLSC=11) (RRB-B2) + (DSLSC=12) (RRB-A2)]

RIC-SET-DSC=4 = [(1)+(2)] [(DSLSC=1) (RRB-L3) + (DSLSC=2) (RRB-K3) + (DSLSC=3) (RRB=J3) + (DSLSC=4) (RRB-I3) + (DSLSC=5) (RRB-H3) + (DSLSC=6) (RRB-G3) + (DSLSC=7) (RRB-F3) + (DSLSC=8) (RRB-E3) + (DSLSC=9) (RRB-D3) + (DSLSC=10) (RRB-C3) +

(DSLSC=11)(RRB-B3) + (DSLSC=12)(RRB-A3)

RIC-SET-DSC-8 = [(1)+(2)](DSLSC=1)(RRB-L4) + (DSLSC=2)(RRB=K4) + (DSLSC=3)(RRB-J4) + (DSLSC=4)(RRB-I4)+ (DSLSC=5) (RRB-H4) + (DSLSC=6)(RRB-G4) + (DSLSC=7)(RRB-F4) + (DSLSC=8)(RRB-E4) + (DSLSC=9)(RRB-D4) + (DSLSC=10)(RRB-C4) + (DSLSC=11)(RRB-B4) + (DSLSC=12)(RRB-A4)]

K5. Carry Buffer (RCB) Set Equations

SET-HRJ = (RPC-SET-HRJ) (RPC-SET-HRJ)

SET-OPC = [(RRB-O)(Y11)] + (RPC-SET-OPC)

SET-SNC = [(RRB-SN)(Y11)] + [(RRB-CRS)(Y9)]

SET-CST = [(RRB-ST)(Y11)] + @(RRC-TSC=3)(Y10)]

SET-TR = {[(RRB-G4) + (RRB-G3)(RRB-G2)](RPC-EQUAT 38)(Y1)}

SET-PB = (RPC-SET-PB)

SET-PTC = [(RRC-TSC=0)(Y10)] + [(RRC-TSC=1)(Y2)]

SET BD1 - [(RRB-DT1)(Y10)] + (RPC-EQUAT 54)

SET RD2 = [(RRB-DT2)(Y10)] + (RPC-EQUAT 55)

SET-JC1 = (RPC-SET-JC1) + (RIC-SET-JC1) + (RRC-SET-JCT)

SET-JC2 = (RIC-SET-JC2)

SET-JC3 = [(RRB-ASD)(Y10)] + (RIC-SET-JC3)

SET-PSSC-1 = [(RRB-G1)(Y1)]

SET-PSSC-2 = [(RRB-G2)(Y1)]

SET-PSSC-2 = [(RRB-G2)(Y1)]

SET-PSSC-4 = [(RRB-G3)(Y1)]

SET-PSSC-8 = [(RRB-G4)(Y1)]

SET-NPSS-1 = (RRC-SET-NPSS=3) + (RSC-SET-NPSS-1) + (RPC-SET-NPSS-1)

SET-NPSS-2 = (RRC-SET-NPSS=3) + (RSC=SET-NPSS-2) + (RPC-SET-NPSS-2)

SET-NPSS-4 = (RSC-SET-NPSS-4) + (RPC-SET-NPSS-4)

SET-NPSS-8 = (RSC-SET-NPSS-8) + (RPC-SET-NPSS-8)

SET-PRFC-1 = [(RRB-E1)(Y4)]

SET-PRFC-2 - [(RRB-E2)(Y4)]

SET-PRFC-4 = [(RRB-E3)(Y4)]

SET-PRFC-8 = [(RRB-E4)(Y4)]

SET-YCM1 = (RRC-SET-YCM1) + (RSC-SET-YCM1) + (RPC-SET-YCM1)

SET-TRBC = {(RRC-SET-TRBC) + [(ROW 3-F4)(RTG-Y3)] + (RPC-SET-TRBC) + [(RRB-TRB)(Y1)]} (RPC-EQUAT 61)

SET-FDC = [(RRB-FD)(Y1)] + (RIC-SET-FDC)

SET-EOPC = [(RRB-EOP)(Y1)]

SET-TRR = (RPC-SET-TRR)

SET-RCR = [(RRB-SAT + RRB-CRS)(Y1)]

SET-SR5 = (RSC-SET-SR5) + (RRC-SET-SR5)

SET-INC-1 = [(RRB-A1)(Y1)]

SET-INC-2 = [(RRB-A2)Y1)]

SET-INC-4 = [(RRB-A3)(Y1)]

SET-INC-8 = [(RRB-A4)(Y1)]

SET-SPAR = (RRC-SET-SPAR)

SET-PARC-1 = (RRC-SET-PARC-1) + (RIC-SET-PARC-1)

SET-PARC-2 = (RRC-SET-PARC-2) + (RIC-SET-PARC-2)

SET-PARC-4 = (RRC-SET-PARC-4) + (RIC-SET-PARC-4)

SET-PARC-8 = (RRC-SET-PARC-8) + (RIC-SET-PARC-8)

SET-TRIC-1 = (RRC-SET-TRJC) + (RPC-SET-TRIC-1) + (RIC-SET-TRIC-1) + [(RCB-INC-1)(RIC-SET-FDC)($\overline{\text{RCB-RQTC}}$)]

SET-TRIC-2 = (RRC-SET-TRIC) + (RPC-SET-TRIC-2) + (RIC-SET-TRIC-2)

SET-TRIC-4 = (RRC-SET-DRSC) + (RPC-SET-TRIC-4)

SET-TRIC-8 = (RSC-SET-TRIC-8) + (RPC-SET-TRIC-8)

SET-SLSC-1 = (RSC-SET-SLSC-1)

SET-SLSC-2 = (RSC-SET-SLSC-2)

SET-SLSC-4 = (RSC-SET-SLSC-4)

SET-SLSC-8 = (RSC-SET-SLSG-8)

SET-DSC-1 = (RIC-SET-DSC-1)

SET-DSC-2 = (RIC-SET-DSC-2)

SET-DSC-4 = (RIC-SET-DSC-4)

SET-DSC-8 = (RIC-SET-DSC-8)

SET-FITC = (RIC-SET-FITC)

SET-RSFC = (RIC-SET-RSFC)

SET-3DR = (RIC-SET-3DR)

SET-DRSC = (RRC-SET-DRSC) + (RIC-SET-DRSC)

SET-TXD = [$\overline{\text{(RRB-RSF)}}$(Y1)($\overline{\text{RPC-PSS=0}}$)]

SET-CL = (RPC-SET-CL)

SET-RQTC = (RRC-SET-RQTC)* + [($\overline{\text{RCB-TRIC=0}}$)]* +

[(RRB-RQT) + (RRB-WFT)($\overline{\text{RRB-CTR}}$)]

SET-BY = (RPC-SET-BY)

**RESET-BY = (RPC-RESET-BY)

* SET WITH RRB-LEFT HALF

** DOES NOT USE COMMON RESET

L. OPERATION FOR CALL PROCESSING

Call processing in the register-sender subsystem is explained in this section with reference to the flow charts of FIGS. 15–39, the equations of section K, and the other figures of the drawings. Reference should also be made to section D as required for definitions and information concerning the memory fields. The outline of the call processing description is based on the processing sequence states defined in section D under "PSS." Numbers in FIGS. 15–39 next to the "Start" boxes are chart numbers comprising the figure number and another digit, and these same numbers next to other boxes or lines are cross references.

Figure 15:
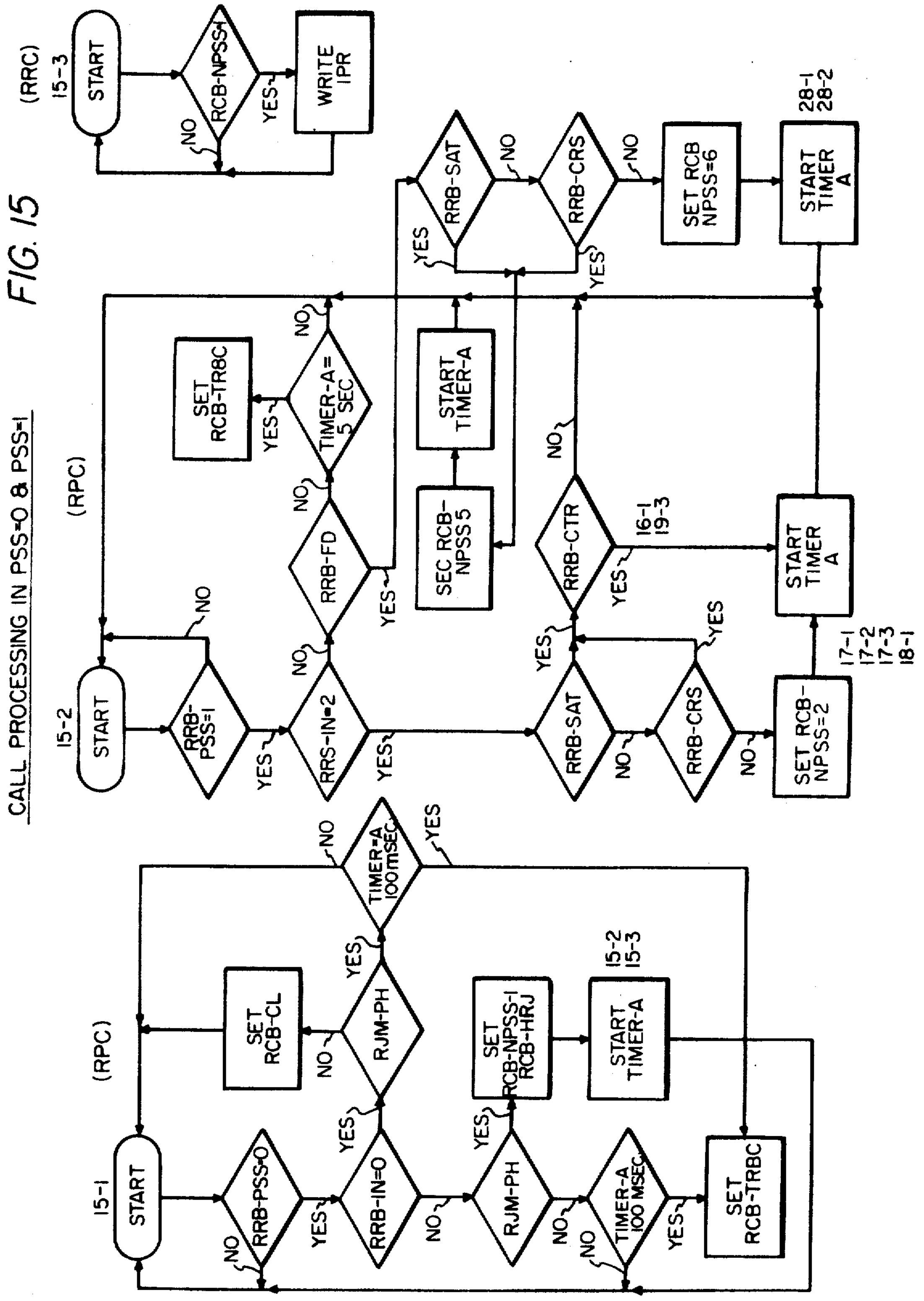
FIGS. 15–39 are flow charts showing the call processing operation of the register-sender subsystem.

L1. Call Processing PSS=0 (FIG. 15)

Call processing during PSS=0 is an idle status, if the IN field and RJM-PH signal are also zero. In the register junctor (FIG. 10) negative potential appears on the IT (idle test) lead to the originating marker. During the register's time slot every 10 milliseconds it is scanned and checked for a signal on the pulsing highway RJM-PH and a change in the IN field. The timer A (see section D, TMA etc.) is normally running, but the complete memory (except rows 7 and 8) for this register including the timer is reset every cycle (RPC equation 1, section K1*a*, SET RCB-CL). If either condition happens, e.g., the instruction field IN is not equal to zero or there is a signal on the pulsing highway RJM-PH, then the timer A is not reset, and therefore times the arrival of the other condition. When both are present together, the sequence state is set to PSS=1 and hold is applied to the register junctor (RPC equation 2). The timer A which consists of the TMA and MDA fields in memory row 1 (position L and bits 2–4 of position K rexpectively. Starting the timer means writing the values of TMA=1 and MDA=0. If for any reason only one of the conditions of a signal on the highway RJM-PH and an instruction IN other than zero occurs then the timer A advances to 100 milliseconds and a trouble condition is recorded by set RCB-TRBC (RPC equation 3A or 3B).

In the register junctor, when it is seized by the originating marker ground potential on lead HR operates relay 10H, which applies ground to the idle test lead IT, and to the hold lead H, and closes the subscriber loop by contacts in leads TO and RO. The relay 10A then operates via the loop and leads RO and TO, and break contacts of relay 10CT. The contacts from relay 10A via a contact test circuit 1010 applies a signal to lead PHM which via the junctor multiplex circuits applies the signal to the pulsing highway RJM-PH in the common logic. When the common logic causes the latch HRJ to be set in the carry buffer RCB, the signal via the multiplex circuits to lead HRJM causes the main ground switch circuit 1001 to operate and hold relay 10H until the register-sender has completed its processing of this call.

With flip-flop NPSS-1 set in the carry buffer, the condition of the PSS field will be updated to the value PSS=1 during time slot Y9.

L2. Call Processing in PSS=1 (FIG. 15)

Call processing during PSS-1 is a waiting time until the data processing unit provides a class of service (COS) translation indicated by In=2. Also during PSS=1 a touch calling or multifrequency receiver is connected, as required. Once the register is ready to receive the dialed digits, the sequence state is advanced to PSS=2. If the data processing units class of service (COS) translation for the call decides that it is from a "non-dial" line the IN field is generally set to IN=4 immediately. A need for a sender is determined and if one is required, the sequence jumps to PSS=5; and if not the jump is to PSS=6. The data processing unit is also timed.

a. With a call from a rotary dial subscriber or a dial pulse trunk, upon the completion of the class of service translation as indicated by IN=2, with SAT and CRS not true, the sequence is advanced to PSS=2 by RPC equation 4 which sets the carry buffdr flip-flops to a value of NPSS=2. This equation also restarts the timer A.

b. If a touch calling or multifrequency receiver is required, the data processing unit finds an idle unit in its tables, and then sets the bit SAT (start assignment timing, bit C2 word 1A), and bit CRS (connect receiver or sender, bit C3 of word 1A). The AOG and SRA fields (word 1A) are also set at the same time to identify the selected unit. If timing is required the bit CTR (bit B4 of word 1A) is true which with RPC equation 5 starts the timer A.

c. With a non-dial line, sender connection requirements are determined followed by a jump to either sequence PSS=5 or PSS=6. The field FD is true (bit B2 of word 1A) as set by the data processing unit, if the field SAT or CRS is also true then the RPC equation 6 will set NPSS=5 to advance to sequence state PSS=5; and if SAT and CRS are both not true, RPC equation 7 sets NPSS=6 to advance the sequence state. Either of these equations also starts the timer A.

d. If the data processing unit takes more than five seconds to return the class of service (COS) after IN=1, then a trouble condition is recorded by setting TRBC using the RPC equation 8.

Also as shown in FIG. 15, chart 15-3, during the cycle in which the carry buffer is set to NPSS=1, the field IPR (interdigital pause-receiving, bit K1 of word 2B) is set to indicate the presence of an interdigital pause. This condition is represented by RRC equation 16.

Figure 16:
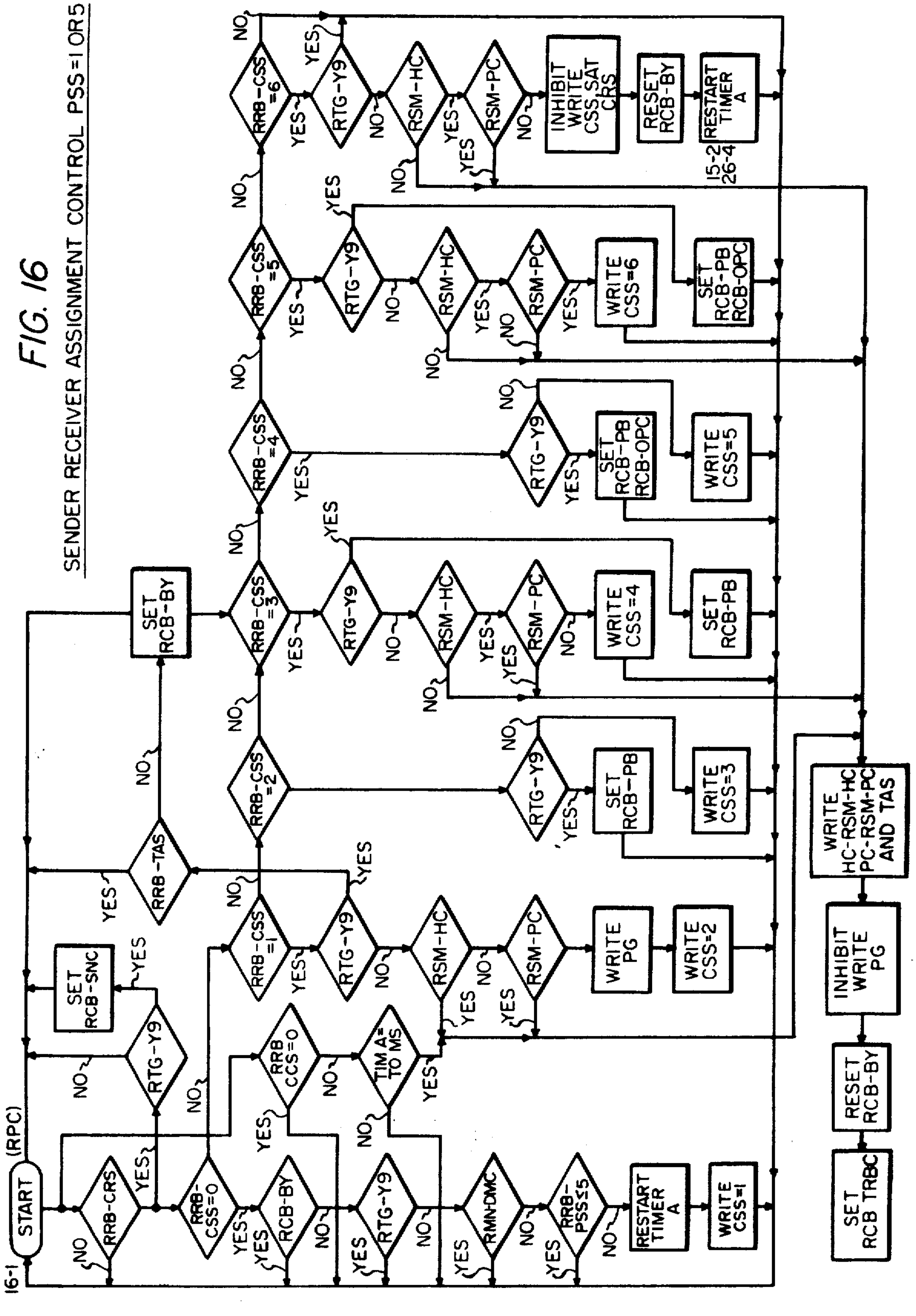

Sender-Receiver Assignment Control (FIG. 16)

The flow chart FIG. 16 is the assignment control for connecting either a receiver or sender. The sequence state counter CSS (connection sequence state, bits J1, J2, J3 of word 1B) is controlled by the successful completion of various conditions.

Although each register memory block has its own CSS counter, only one path may be established through the matrix RSX at any given time. To insure against two or more registers attempting to establish a path simultaneously, in the carry buffer there is a BY latch, for a busy indication. This latch is not reset at the end of a time slot as the other latches, but remains set through the time slots of all of the registers. Once the connection is held and no longer pulling, another connection may be made and the latch BY is reset. Once the connection sequence is started a time of 70 milliseconds is allowed to complete and hold the connection. Initially after CRS becomes true (set by the data processor along with AOG and SRA when an idle unit is found), CSS=0, if BY is in the reset condition, then during sub-time slot Y1 (indicated on the flow chart as $\overline{Y9}$), RMNDMC (disable matrix connection) is not true, and PSS=5, then the RPC equation 10 is used to write CSS=1 and to start timer A.

The writing of the new values of CSS is in accordance with the RPC output equations (section K1*c*) ROW 1-J1, J2 and J3 and the equation add 1-CSS. Note that the new value is written during sub-time slot Y1. After CSS is not 0, it is advanced once each cycle with RPC equation 12.

The RPC equation 11 calls for trouble by setting the carry buffer latch TRBC under various conditions as indicated on the flow chart and in the equation, and writes PC and HC. Note that this equation includes write TAS (trouble in assignment, bit F3 of word 1A).

The assignment sequence state is set to CSS=1 during sub-time slot Y1 and during the same time slot in sub-time slot Y9 the busy latch BY in the carry buffer is set with RPC equation 13.

During the next time slot 10 milliseconds later in sub-time slot Y1 the sequence is still CSS=1. At this time the signals received from the receiver (whose identity is designated by the values of AOG and SRA in bits C4-F1 of word 1A) as received via the multiplex RSM on leads RSM-HC and RSM-PC should both be not true. The RPC equation 14 is now used to write PG (pull ground, bit 14 of word 1B). The sequence advances at the end of sub-time slot Y1 and becomes CSS=2.

During sub-time slot Y9 of the same cycle with CSS=2, RPC equation 16 is used to set the carry buffer latch RCB-PB. The latch PGL in junctor multiplex RSM, and the latch PBL in the multiplex RSM are set and remain set during the entire cycle. So that the main battery switch from lead PBM in the register junctor (FIG. 10) applies negative 50 volts. Note that the carry buffer RCB equation SET-SNC causes latch RCB-SNC to be set in response to the signal condition of CRS true during sub-time slot Y9 of each cycle. Therefore relay SN has also been operated in response to the signal on lead SNCM in the register junctor. Thus the −50 volts extends through make contacts from relay SN and break contacts of relay TR to lead PXR via matrix RSX (FIG. 12) through the pull winding of relay of the selected crosspoint, and then to the selected receiver through break contacts of relay H to ground from the main ground switch controlled by lead PGMR or PGTR from the multiplex.

In the next cycle during sub-time slot Y1 the sequence advances to CSS=3. During sub-time slot Y9 the latch RCB-PB is again set with RPC equation 16.

During sub-time slot Y1 of the next cycle there is a test that signal HC is true and PC is not true as a part of RPC equation 11. This verifies that there is battery potential via the hold winding of the matrix relay M and that ground potential still appears on the receiver side of the pull winding. The sequence advances to CSS=4.

During sub-time slot Y9 of the same cycle latch RCB-PB is again set, and RPC equation 17 sets the carry buffer latch RCB-OPC.

During the next cycle in sub-time slot Y1 the sequence advances to CSS=5, and during sub-time slot Y9 the latches RCB-PB and RCB-OPC are again set. With the latch RCB-OP set the relay OP in the register junctor is operated which connects a path via a resistor across the RT and TT leads which are connected via contacts of relay SN to leads RX and TX extending to the matrix. This causes the relay A of the receiver to operate. With relay A operated its contacts complete a hold path via break contacts and winding of relay H to the hold winding of the matrix crosspoint relay. This will cause the hold relay to operate since the matrix relay has been previously pulled to complete the path via its own contacts to −50 volt source. Contacts of relay H then disconnect relay A, opens the path from the ground switch to the pull lead, and connects a path from the relay driver to a resistor which is in series with the winding of the H relay.

In the next cycle with CSS=5, in sub-time slot Y1 there is a test made that both the signals HC and PC are true, since there should now be battery potential on both of these leads. If so, the sequence advancds to advances 6. During sub-time slot Y9 of this cycle no action occurs. In the next cycle with CSS=6 there is a check made that the signal on lead HC is true and PC is not true. Note in RPC equation 16 that with CSS=6 the latch RCB-PB is no longer set, so there is no battery potential applied via the pull path to be detected on lead PCTR. Thus in the next cycle with CSS=6, the test is for HC true and PC not true. The RPC equation 18 then inhibits writing in the CSS field, inhibits writing of SAT, inhibits writing of CRS, restarts the timer A and resets the carry buffer latch BY. This completes the sender or receiver assignment operation.

Figure 17:
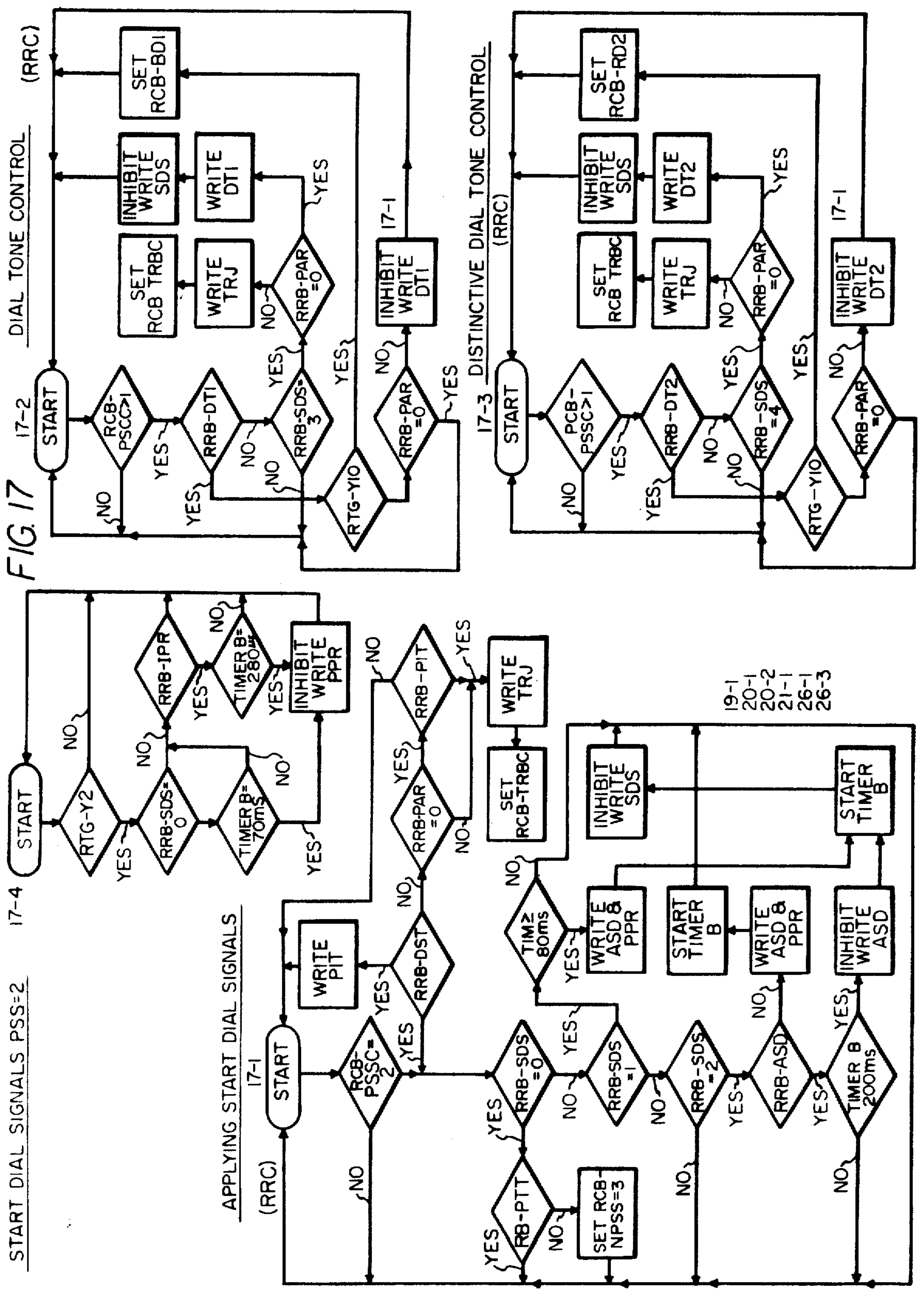
Figure 18:
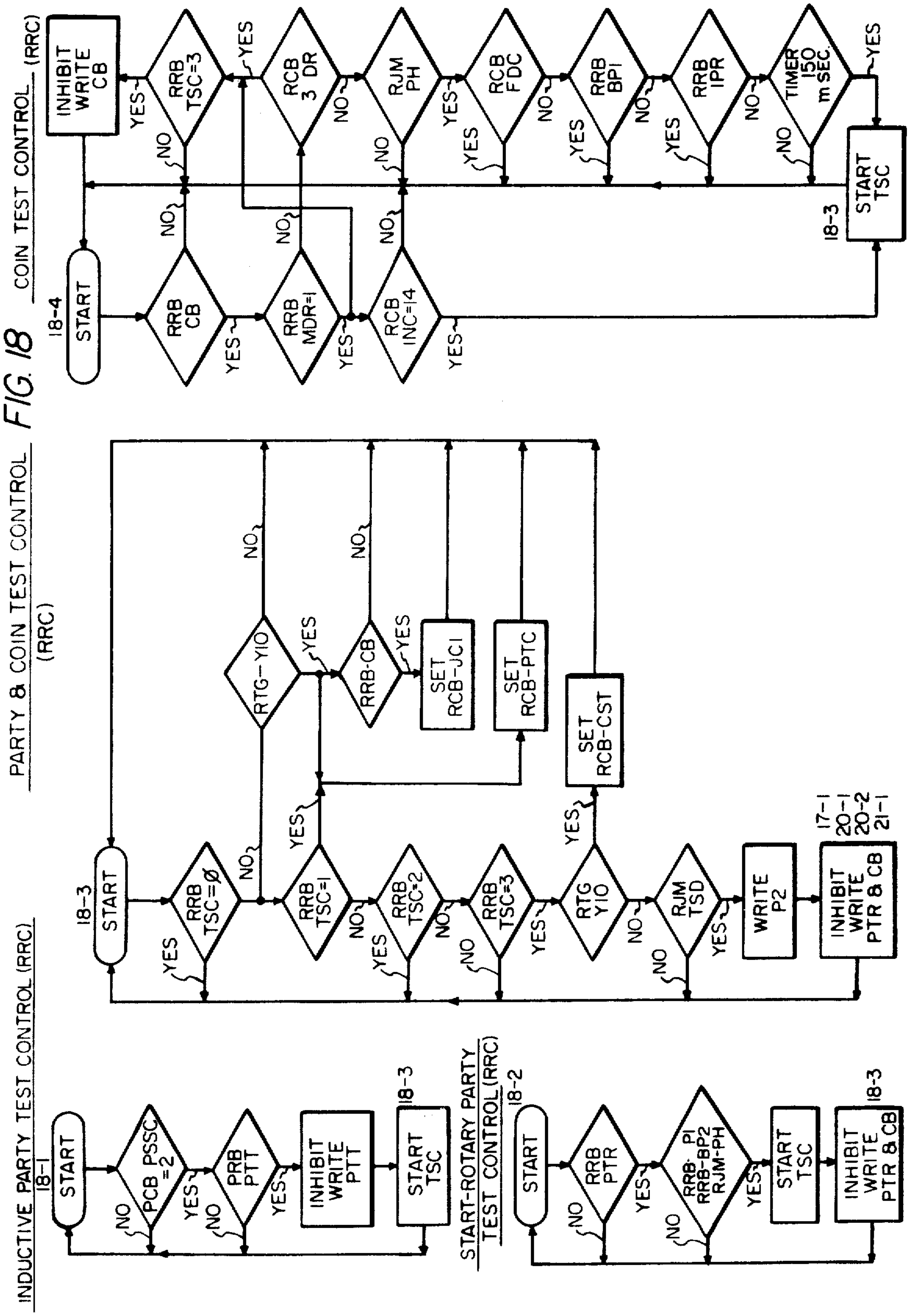
Figure 19:
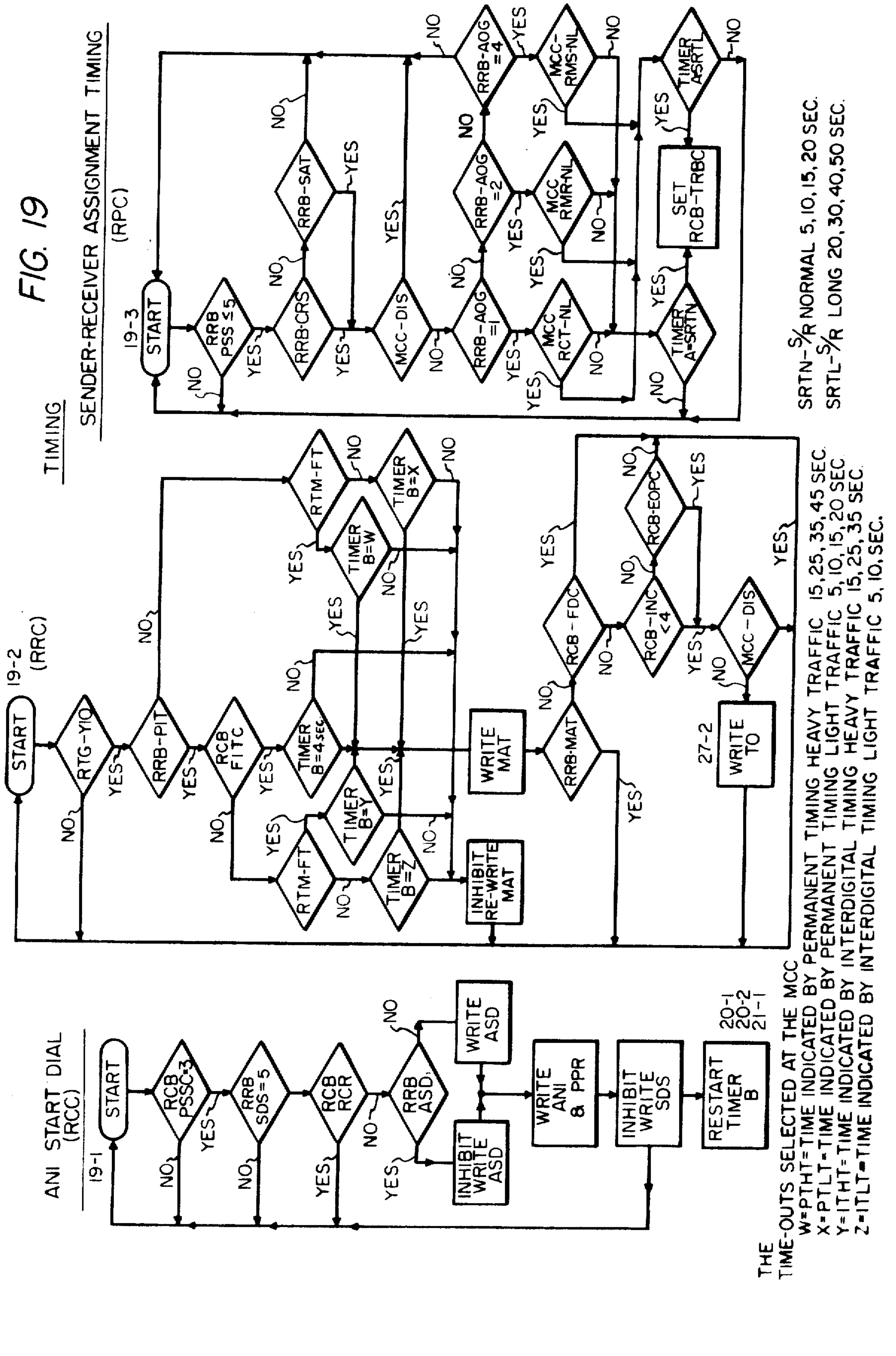
Figure 20:
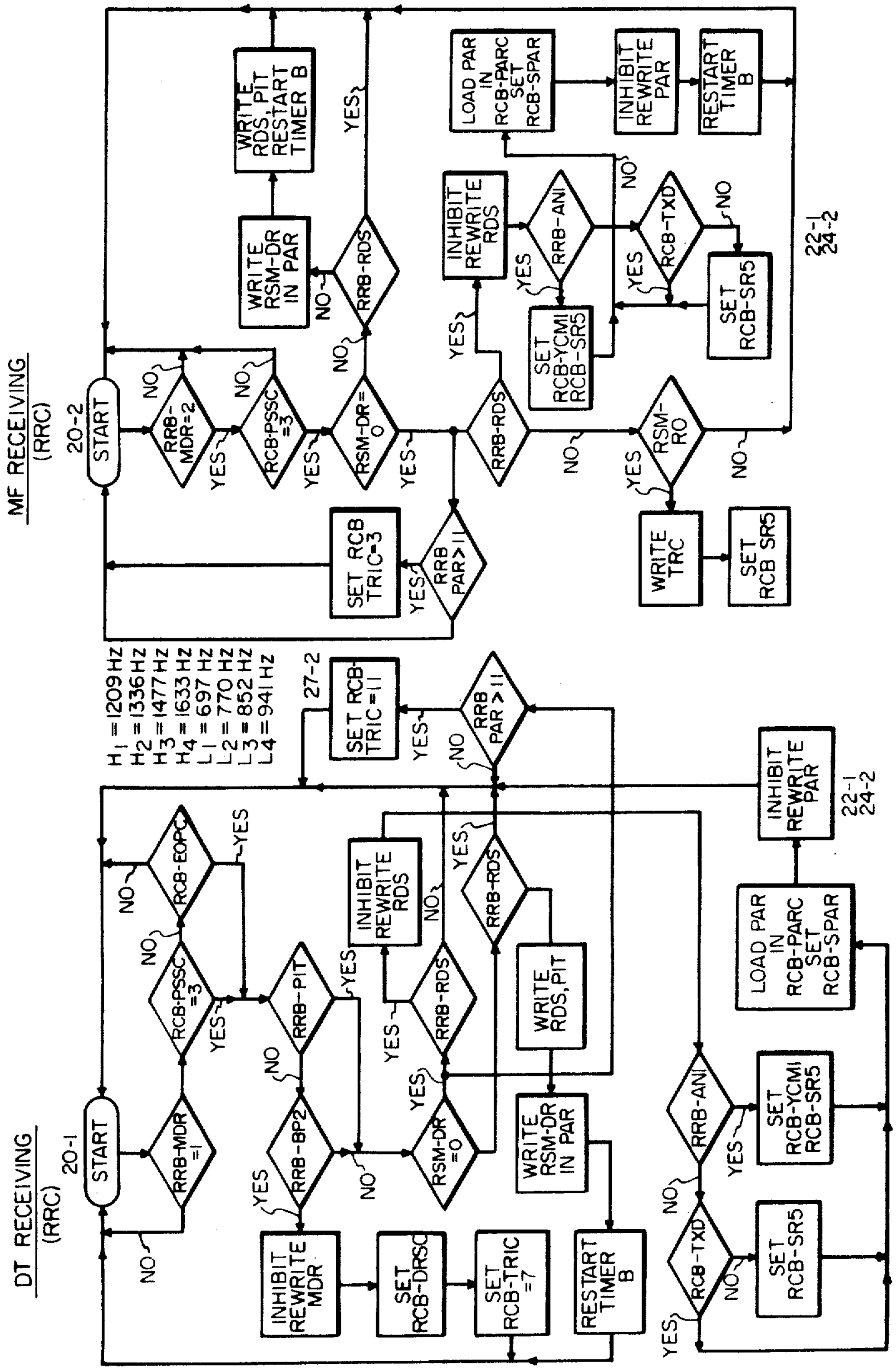

Call Processing During PSS=2 (FIG. 17)

Call processing during sequence state PSS=2 returns the start dialing signals (dial tone for local subscriber line or trunk signal for a trunk line). If a touch calling party line is involved the party identification test is initiated.

a. If the class of service (COS) specifies that the incoming call is from a party line with touch calling, an inductive party test is started as soon as sequence state PSS=2 is stored in the carry buffer.

1. If a party test for touch calling is required the class of service translation has caused PTT to be true (bit B4 of word 2A). The chart 18-1 and RRC equation 23 represent the response to this condition. The RRC equations (section K2c) START TSC, ADD 1-TSC and ROW2-H1 then cause bit H1 in word 2B to be written which makes the TSC field (test sequence counter) to have the value TSC=1. The RRC equations 23 and ROW2-B4 also causes an inhibit of writing PTT.

2. The RRC equations ADD 1-TSC, ROW2-H1, and ROW2-H2 cause the value of the TSC field to be advanced by a count of 1 each cycle every 10 milliseconds.

3. The chart 18-3 shows the party and coin test control. With TSC not zero, the RRC equation SET RCB-PTC (section K2*b*) along with the RCB equation SET-PTC cause the latch PTC of the carry buffer to be set during sub-time slot Y2. Setting of the PTC latch delays generation of a "totals" interrupt for 10 milliseconds for the case of a coin test for a dual tone calling coin box line. This in turn via the register junctor multiplex applies a signal to lead PTM to the register junctor to operate the relay PT.

4. With TSC=3 during sub-time slot Y10 the carry buffer latch CST is set which causes operation of the CT relay in the register junctor.

5. If there is an inductive ground on the subscriber's line relay TST in the register junctor will operate.

6. When relay TST operates the ground potential via its contacts is detected by the CTG circuit to apply a signal to lead TSDM, which makes the signal RJM-TSD true in the common logic. The RRC equation 27 in conjunction with the RRC equation ROW2-F2 then causes the condition P2 to become true (bit F2 or row 2A).

b. The most frequent type of start dial signal is the return of normal dial tone to a local line. Chart 17-2 is the dial tone control chart. With the command return dial tone SDS=3 (start dialing signal, bits A4, B1, B2 of word 2A), with no digits having been received, the RRC equation 32 with equation ROW2-H4 will write the condition DT1 (dial tone 1, bit H4 of word 2B), and with the equations ROW2-A4, ROW2-B1 and ROW2-B2 will inhibit writing in the SDS field. With DT1 set during sub-time slot Y10 the RCB equation SET-BD1 becomes true to set the carry buffer latch BT1, which causes actuation of relay BD1 in the register junctor, to connect normal dial tone via its contacts until the beginning of a digit. After the start of receiving a digit the PAR field (pulse accumulator-receiving, bits I1-4 of word 2B) are not zero, which makes RRC equation 33 true so that with equation ROW2-H4 the writing of DT1 in bit position H4 is inhibited. This causes relay BD1 in the register junctor to release.

Distinctive dial tone control is similar to dial tone control, and is covered by chart 17-3 relating to RRC equations 35, 36 and ROW2-H3. This chart and equations relate to the control of relay RD2 in the register junctor.

c. With SDS-1 delay dial signal is indicated, as shown on chart 17-1 along with the RRC equations 20, ROW2-G4. These equations and chart indicate that after a wait of 80 milliseconds, the fields ASD (apply start dialing, bit G4 of word 2B) and PPR (prevent pulse reception, bit D2 of word 2A) are written, and timer B is restarted. With ASD the carry buffer latch JC3 is set, which causes ground to be applied to lead C3 in the register junctor. This ground extends via the A and B stages of the incoming trunk matrix to the incoming trunk to operate a battery reversing relay.

d. With SDS=2 (wink start) chart 17-1 and RRC equations 21 and 22 are used to control the ASD and PPR fields, which in turn controls the carry buffer latch JC3 to apply ground to the C3 lead in the register junctor. The start dial (a wink start) is applied for 200 milliseconds and then removed and the SDS field cleared.

e. Coin test is divided into two categories, rotary and dual tone (touch) calling. A dual tone calling pay phone involves a modified post-pay operation or modified semi-pre-pay operation, in that the coin test is made after the last digit is detected. As opposed to all the digits being allowed on the touch calling phone, a rotary pay phone is checked for coin deposit up until the third dialed digit (three digits for emergency numbers, etc.). The coin must be deposited by then to terminate. The operation as shown on chart 18-4 starts with RRC equation 26 for a touch calling coin line or equation 25 for a rotary coin line. The condition CB (coin box, bit C1 of word 2A) is set by the data processor as a function of the class of service, and MDR (mode of receiving, bits A1, A2 and A3 of word 2A) has a value of MDR=1 for a dual tone calling line or MDR=0 for a rotary line. The carry buffer latches INC are the carry of the instruction field IN from word 1. The value INC=14 is used to instruct the register-sender to make a coin test hunt on a dual tone calling line, and should be given to the register-sender within 200 milliseconds after dialing is complete. The carry buffer latch 3DR is set after three digits are received. After start TSC, the test proceeds as in the party and coin test control chart 18-3. After the test, RRC equation 28 inhibits the writing of CB condition, and thus prevents any further coin tests.

f. The start dialing signal SDS may have originally been SDS=0; and for other values, after the start dialing signal is sent SDS is inhibited. With SDS=0 the sequence is advanced with RRC equation 19 (chart 17-1) by setting NPSS=3 in the carry buffer.

Call Processing-Digit Receiving

Sequence state PSS=3 is the time during which incoming digits are normally received and stored in memory, but in some cases digits may also be received during other sequence states. The digits are also analyzed to determine if a pattern is recognized or if a zero or one code is present. Translations are requested from the data processing unit as required, and rotary party test and early outpulsing are done if so instructed.

Figure 21:
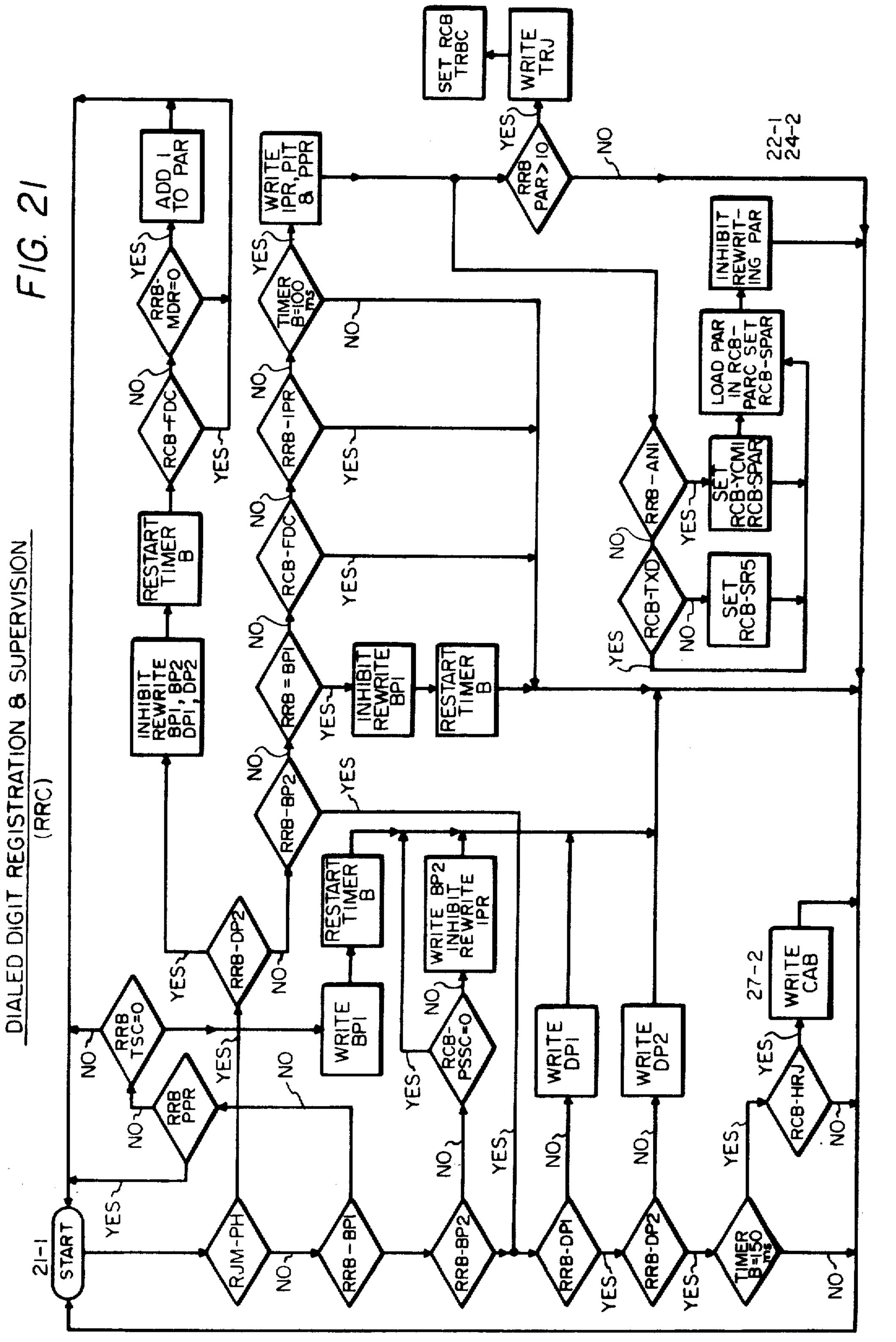

With a rotary dial at a local subscriber station, or incoming dial pulse signaling via a trunk, the line loop to the register junctor via leads RO and TO when closed operates relay 10A, which applies a signal to the lead PHM via the multiplex circuits, detected in the common logic as a true signal RJM-PH. This signal condition is the make period during dialing. When the line loop to the register junctor via leads RO and TO is opened (the break period) relay A releases, and via lead PHM and the multiplex circuits the signal condition RJM-PH in the common logic circuits becomes false. The dialed digit registration and supervision is shown in FIG. 21. As long as the line loop is closed and RJM-PH is true, no action has occurred as may be followed on the flow chart by PH yes, DP2 no, BP2 no, BP1 no, FDC no, IPR no, timer B=100 milliseconds no. At the beginning of a break period the conditions are RJM-PH not true. BP1 not true, and if no coin or party test has been initiated TSC=0 true; which with RRC equation 1 writes the signal BP1 into memory (bit J1 of word 2B) and restarts timer B during sub-time slot Y2. In sub-time slot Y2 of the next cycle the conditions are RJM-PH not true, BP1 true, and BP2 not true, and also PSSC=0 is not true; which with RRC equation 2 writes condition BP2 in memory (bit J2 of word 2A), and inhibits the writing of IPR (bit J1 of word 2B). In sub-time slot Y2 of the next cycle RRC equation 3 causes the writing of condition BPL (bit J3 of word 2B); and in the cycle after that RRC equation 4 causes the writing of condition BP2 (bit J4 of word 2B).

a. Rotary party test is initiated if during the class of service translation the data processor has placed the condition PTR in bit B3 of word 2A. The chart 18-2 entitled Start Rotary Party Test Control corresponds to RRC equation 24. This condition inhibits the writing of condition PTR and starts the party test then proceeds as described previously. The test relay in the register junctor tests for resistance ground, which is applied at the subscriber substation for party two.

b. Returning to FIG. 21, the dial pulses occurring as break intervals of the line loop detected as false periods of RJM-PH are recorded by writing BP1, BP2, DP1 and DP2 in successive cycles. Once DP2 is written indicating at least 30 milliseconds, the timer B is restarted. If RJM-PH does not go true within 50 milliseconds CAB (call abandoned) is written (bit E4 of word 2A), which causes an interrupt, etc.

If PH does go true within the 150 milliseconds, BP1, BP2, DP1 are cleared, timer B is restarted, and the common logic adds 1 to the PAR field (pulse accumulator-receiving, bits I1-4 of word 2B). The writing of BP1 through DP2 during the break period is represented by RRC equations 1 through 4 and ROW2-J1 through J4. Writing call abandoned is represented by RRC equation 5 and ROW2-E4. The clearing of BP1 through DP2 and staring the counter B is represented by RRC equation 6 and ROW2-J1 through J4. Adding 1 to the accumulator is represented by RRC equation 10 and ROW2-I1 through 14.

With RJM-PH true and $\overline{DP2}$ the make period of the dial is timed. If RJM-PH goes false within 100 milliseconds the above steps are repeated for the next pulse. If RJM-PH remains true beyond 100 millisecond interval, IPR (interdigital pause in receiving), and PIT (perform interdigital timing) in bits K1 and G2 are written using RRC equations 7, ROW2-K1 and ROW2-G2.

Once the complete digit has been accumulated two actions are taken. The PAR field is decoded to insure that the digit is not greater than 10. If it is TRJ (trouble in register junctor) is called by writing bit F4 of word 2A using RRC equation 8 and ROW2-F4. The RRC equation RRC-SET-TRBC causes the carry buffer latch TRBC to be set, which in turn during sub-time slot Y9 causes the condition to be written into bit F4 of row 1 using RPC equation ROW1-F4.

The other action upon accumulation of a complete digit is to store the digit into memory. Here a decision is required as to where the digit is to go. If ANI is being received, the digit goes into row 7. If 12 digits have already been received it goes into row 5, if TXD has been set this indicates that the digit should transfer over row 5 and go into row 6. Regardless of which row the digit goes into, RRC equation 7 being true causes the carry buffer latch SPAR to be set, and the four carry buffer latches PARC-1, 2, 4, 8 to be selectively set respectively in accordance with the value of this digit in the PAR field bits I1-4. Also the PAR field is cleared.

Figure 22:
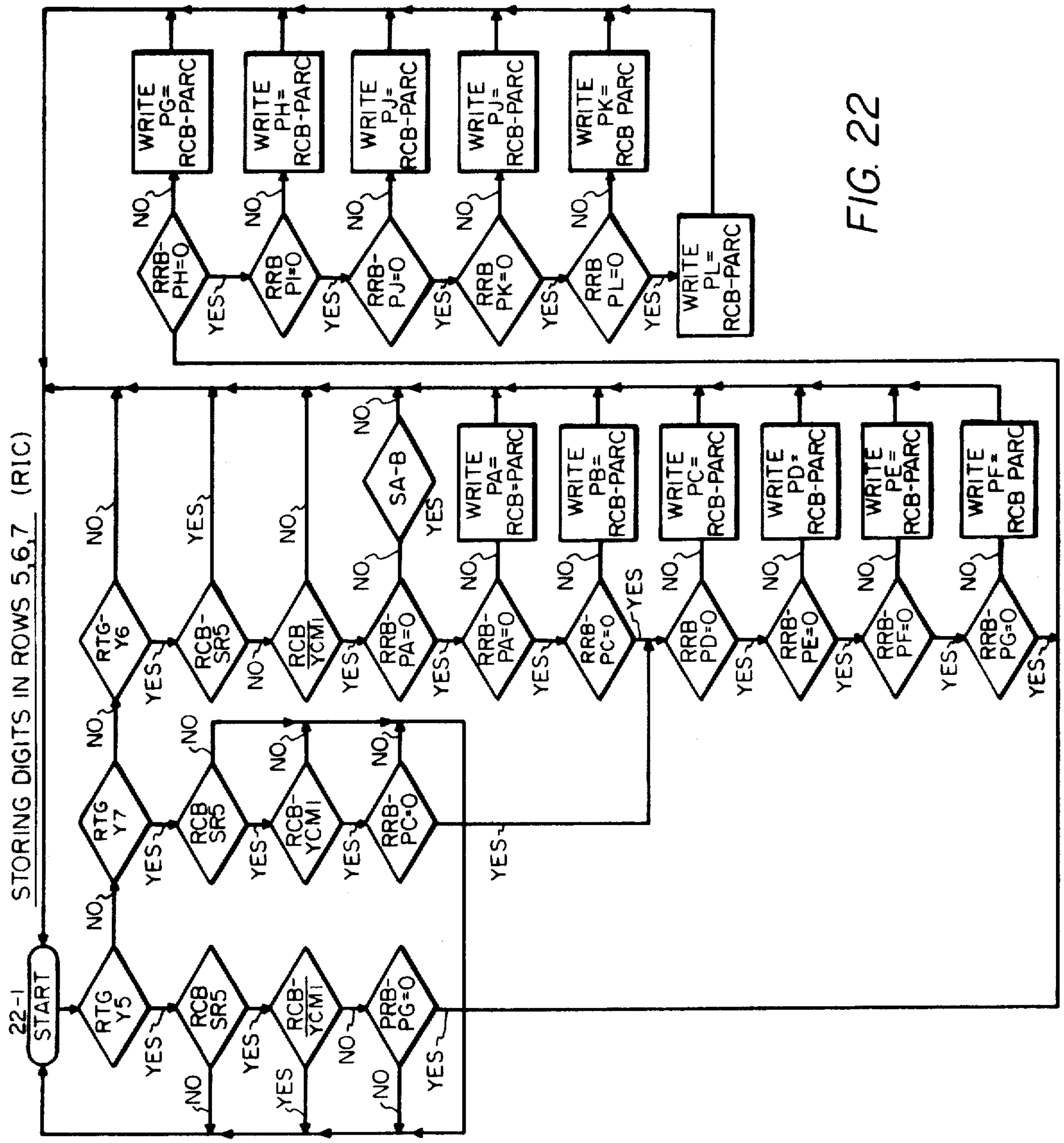
Figure 23:
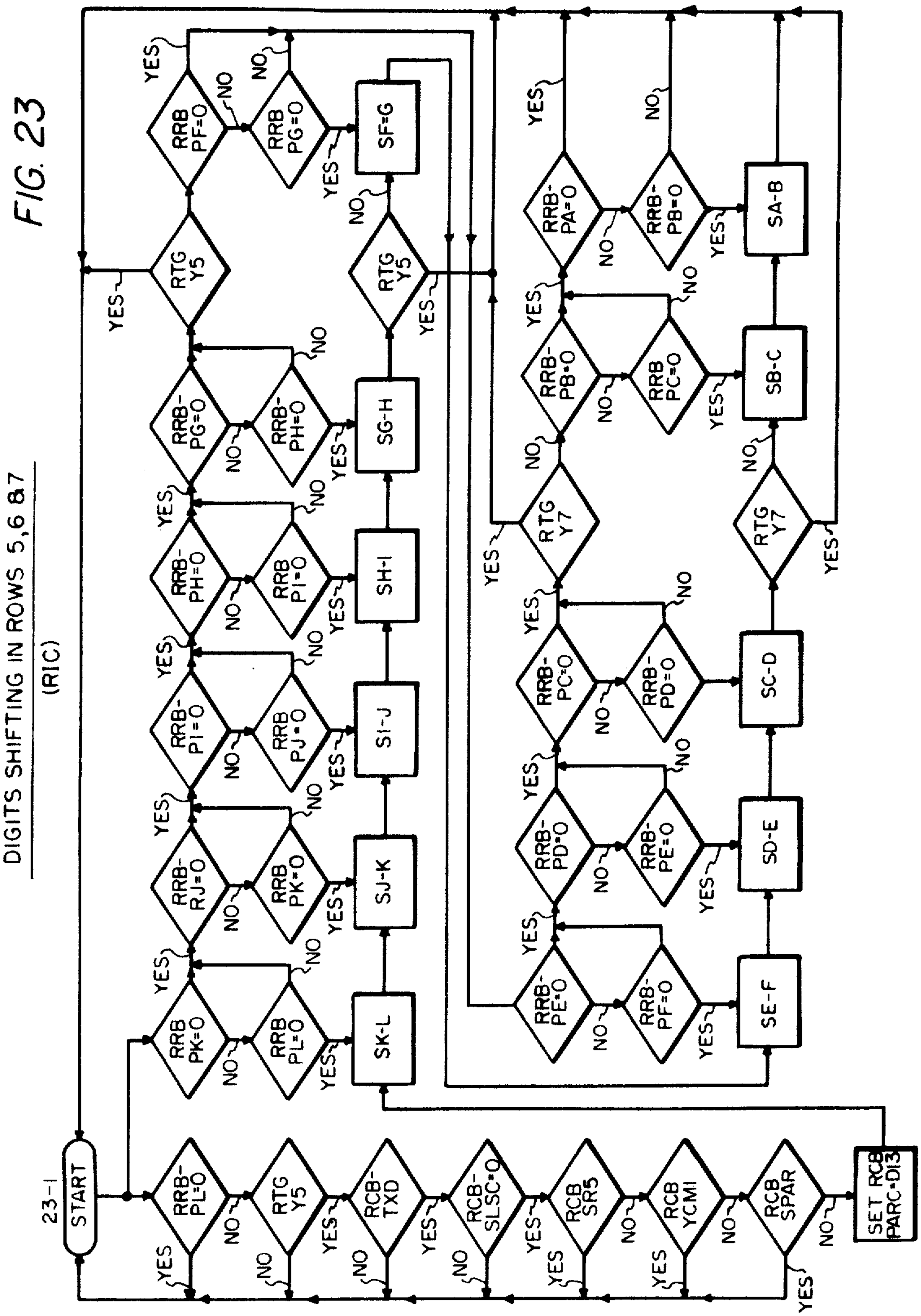
Figure 24:
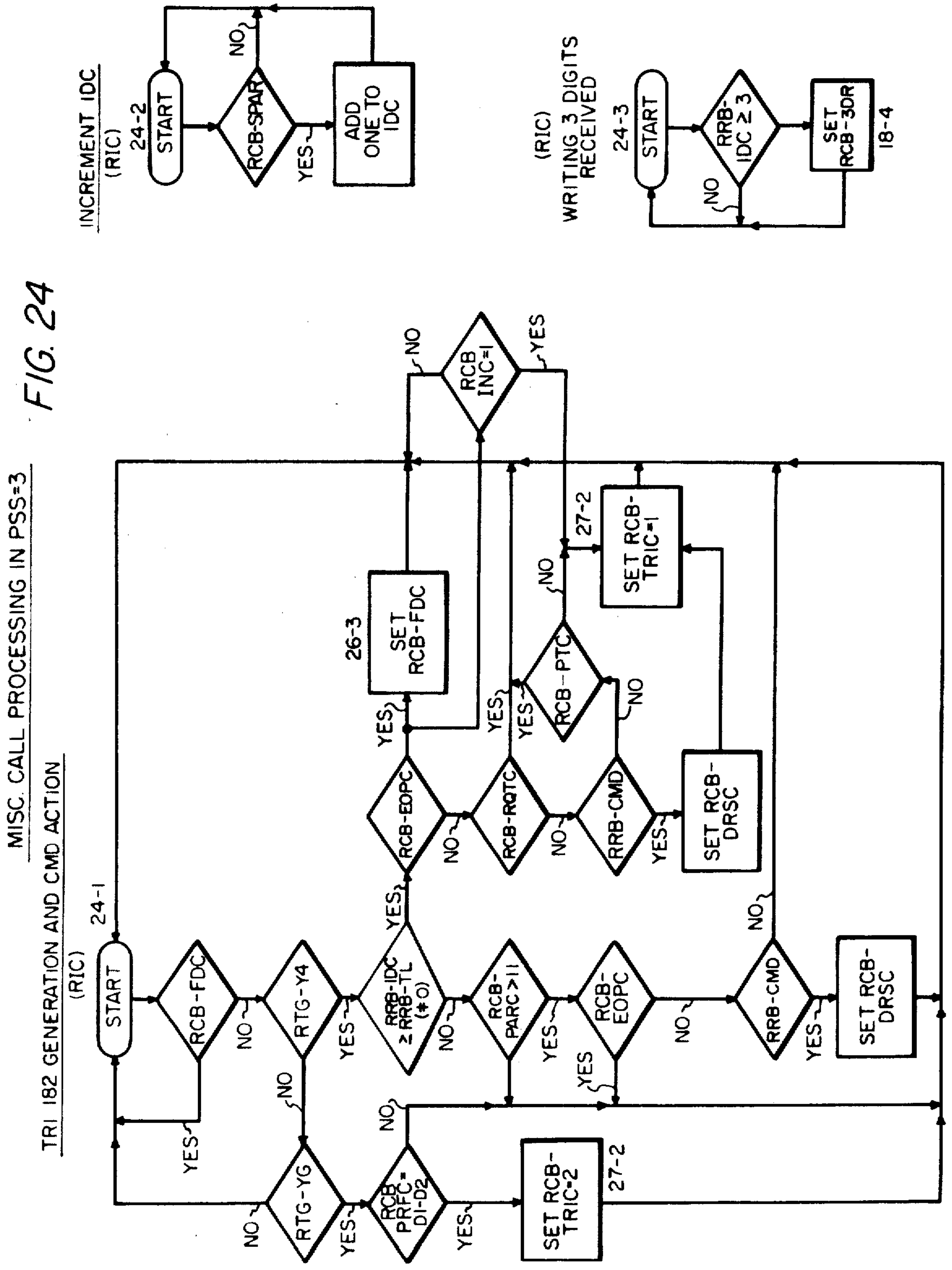
Figure 25:
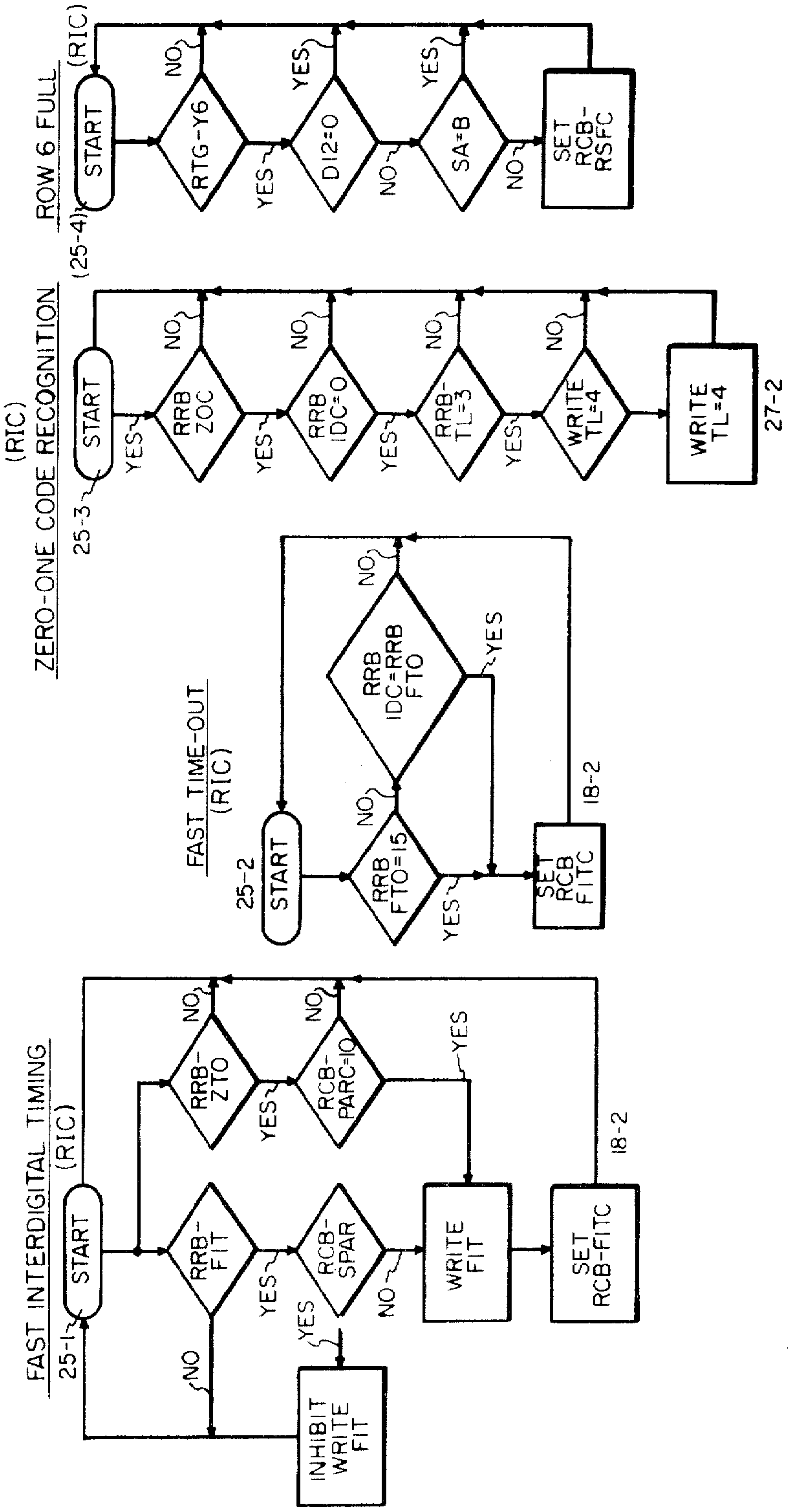

With the digit stored in the carry buffer, it is ready to be loaded into the memory. FIG. 22 shows the pattern for loading. Called number digits are loaded starting in row 6 position L. The signal LPL becomes true in accordance with RIC equation 28 (section K4*b*) when all of the positions in row 6 are empty. Note that a position empty means that all 4 bits are zero, for example the signal RRB-PL=0 is true when the decoding of the 4 bits indicates that they are all zero. Equation LPL true, which in this case appears during sub-time slot Y6, enables the equations ROW5, 6 & - L1 through L4, which auses writing the digit from the carry buffer flip-flops PARC-1 through 4 into position L row 6 of the memory. Similarly RIC equations 15 through 27 cause successive digits to be loaded into positions K through A respectively, namely in the first empty position from the left side of the memory chart.

After twelve digits have been received and row 6 is full, as indicated by $\overline{PA=0}$ the RIC equation RIC-SET-RSFC causes the carry buffer flip-flop RSFC to be set, which during sub-time slot Y9 causes the RPC equation ROW1-F2 to be true to write into bit F2 of row 1 the signal condition RSF (row 6 full). Then in succeeding cycles the carry buffer flip-flop TXD is not set in accordance with the RCB equation SET-TXD. With latch TXD not set the RRC equation SET RCB-SR5 becomes true after another digit has been accumulated and RRC equation 7 is true. The RIC equation 22 now becomes true during sub-time slot Y5 and RIC equations 22 through 28 cause the digits to be loaded starting with position L and proceeding through position G.

When ANI (automatic number identification) calling number digits are being received, the ANI bit G1 word 2B will have been sent as a function of RRC equation 39, which depends on the value SDS=5 having been written by the data processing unit into bits A4, B1, B2 of word 2A. This causes the carry buffer latch YCM1 to be set in accordance with RRC equation SET RCB-YCM1 when equation 7 becomes true on accumulation of a digit. The same conditions cause the carry buffer latch SR5 to be set in response to RRC equation SET RCB-SR5. These conditions cause RIC equation 17 to become true during sub-time slot Y7, and with the RIC equations 17 through 28 cause the loading of the ANI digits into row 7 starting with position L through position C.

On occasion the data processing unit will eliminate one or several digits from the register-sender memory before commanding the register-sender to send them out to a distant office. Generally these will be the first digits received, and will thus leave a hole in the pattern. So each memory cycle, the digit fields (rows 5, 6 & 7) are checked for these holes and are packed if necessary. This is shown on flow chart FIG. 23 which corresponds to RIC equations 4 through 14, along with the RIC outputs to RWT.

For digit packing of the called number where there are more than 12 digits, transferring from row 5 position L to row 6 position A is necessary. The condition RSF sets when row 6 position A has a digit in it and SA-B is false. With the condition shown on the left hand side of chart 23-1, RIC equation 3 becomes true which enables the equations RIC-SET-PAR-1, 2, 4, 8 to cause the digit from position L to be loaded into the carry buffer PARC latches; and at the same time RIC equation 14 becomes true to cause the digit from position K in row 5 to be written into position L and RIC equations 4 through 13 likewise shift the other digits in the row.

Flow chart 24-2 shows the incrementing of IDC (incoming digit counter, bits A1, A2, A3, A4 of word 4A). This counter is incremented whenever the carry buffer latch SPAR is set, the logic being shown by RIC equations ROW4-A1 through A4.

Chart 24-3 shows setting the carry buffer latch 3DR which corresponds to RIC equation RIC-SET-3DR.

Fast timeout (FTO) will be required in situations in which area codes may be any three digits, so that some means of differentiation will be necessary to distinguish between an area code and an office code. In that case the data processing unit will set the FTO field (fast time out, bits B1-4 of word 4A) to 7. When IDC=FTO (7) FIT (fast interdigital timing, bit K4 of word 4B) latch FITC will be set in the carry buffer in accordance with RIC equation RIC-SET-FITC, and fast timing (4 seconds) between digits will occur. This is shown on chart 25-2. Note that FTO can be set to any value 1 through 14.

With FITC set, if another digit is received within four seconds, FITC is cleared and regular PIT (performed interdigital timing, bit G2 of word 2B) is performed.

If 4 seconds do elapse TO (time out) will occur (chart 19-2) which causes TO to be written into word one of memory block 202, but the logic for doing this is not within RCC.

c. If the data processing unit determines that the call being processed should be early outpulsed, (dual tone calling or dial to outgoing dial), EOP (early outpulsing, bit B1 of word 1A) will be set (generally with three digit translation) and the register-sender will proceed to PSS=6 and begin to set up for outpulsing while still receiving digits in PSS=6.

d. Zero or one code recognition is accomplished in accordance with chart 25-3. Field ZOC (bit D1 of word 4A). If the first dialed digit is a zero (10 ) or one, then the totals digit is incremented from TL=3 to TL=4 in accordance with RIC equations ROW4-A1 through A4.

e. Pattern recognition. Certain two-digit patterns can be recognized by the register-sender and will interrupt the data processing unit when detected. The pattern recognition field which is set by the translator in bits E1-4 of word 4A is set into the carry buffer latches PRFC1, 2, 4, 8 during sub-time slot Y4. A strapping field in the RIC unit is connected to recognize specific dialed digits patterns and supply corresponding outputs on leads SL-1 through SL-48. When any one of these signals becomes true the carry buffer latch TRIC2 is set. During sub-time slot Y10 the value TRI=2 is written into memory field D4-E3 of word 2, which indicates to the data processing unit that the pattern has been recognized and the translation interrupt is initiated.

f. If this office is acting as a ticketer or tandem for some other office, ANI digits may be received from that office. If this is so, the data processing unit supplies an SDS (start dial signal, bits A4, B1, B2 of word 2A) with a value SDS=5, indicating ANI start identification (change to off-hook). The chart 19-1, corresponding to RRC equations 39 and 42 causes the fields ASD in bit G4 and ANI in bit G1 of word 2B to be written and the SDS field to be inhibited, along with restarting of timer B, and writing PPR. With ASD true, during sub-time slot Y10 the carry buffer latch JC3 is set, which causes the signal to be supplied to the register junctor to place ground potential on lead C3, which operates a reverse battery relay in the incoming trunk. This is a signal to the distant office that this office is ready to receive their ANI digits.

g. Dual tone (touch) calling receiving processing is shown on chart 20-1. The tone must be present at the receiver for at least 35 milliseconds before the decoded digit is sent via the multiplex circuit RSM and thence to the RCC logic.

While the subscriber has his finger on the button, the digit is being decoded and presented to the common logic circuits.

RRC equation 11 causes the received digit to be placed into the PAR field, (bits I1-4 of word 2B), the bit RDS in G3 to be written, and PIT in bit G2 to be written. The conditions enabling this equation are PSSC=3, MDR=1 which indicates dual tone (touch) calling mode of receiving, $\overline{DR=0}$ indicating that there is a digit being presented from the mutliplex circuits $\overline{RDS}$ indicating that the digit had not previously been stored, and sub-time slot Y2.

As long as the subscriber holds the button down interdigital timing occurs but the digit is not stored.

When the button is released the digit as received from the multiplex will be decoded as zero, which enables RRC equation 12 to inhibit the writing of RDS, to set the carry buffer PARC latches equal to the PAR field, to set the carry buffer latch SPAR, to inhibit writing in the PAR field. RRC equation 11 is effective to start the timer B. Thus the digit is stored in the memory in the same manner as for dial pulse receiving.

If the digit received is decoded as being greater than 11, an interrupt to the data processing unit is sent, with a value TRI=11.

If a mixed subscriber line is being used (rotary and dual tone calling) a dual tone calling receiver is connected and waiting occurs. If dial pulses begin coming in, it is indicated by BP2 being true, there is an inhibit of rewrite of MDR in accordance with RRC equation 14, which also sets the carry buffer latch DRSC, and sets the carry buffer latches TRIC for a value of TRIC=7. The result is that the touch calling receiver is disconnectd and processing proceeds as for dial pulse mode.

Figure 26:
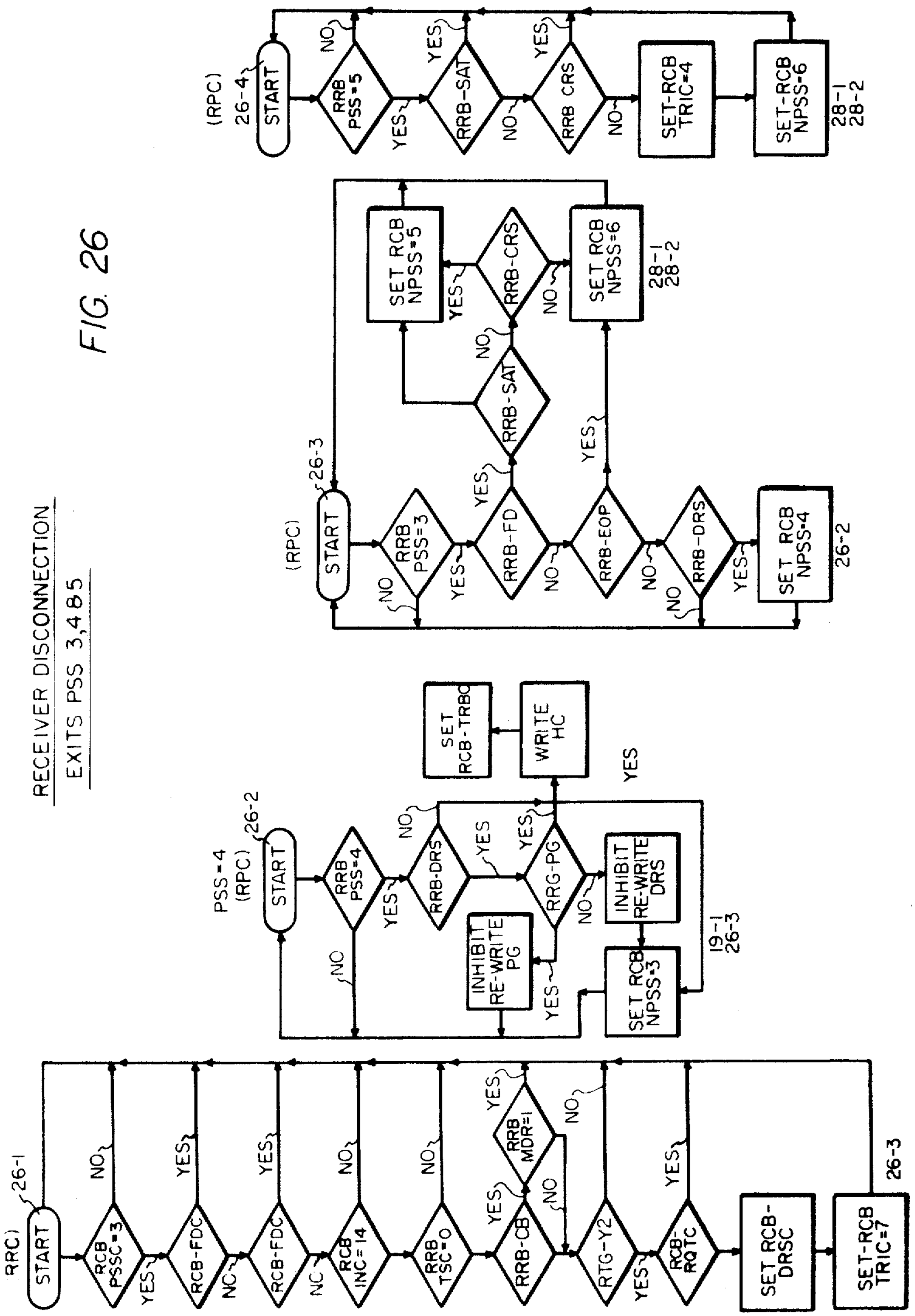
Figure 27:
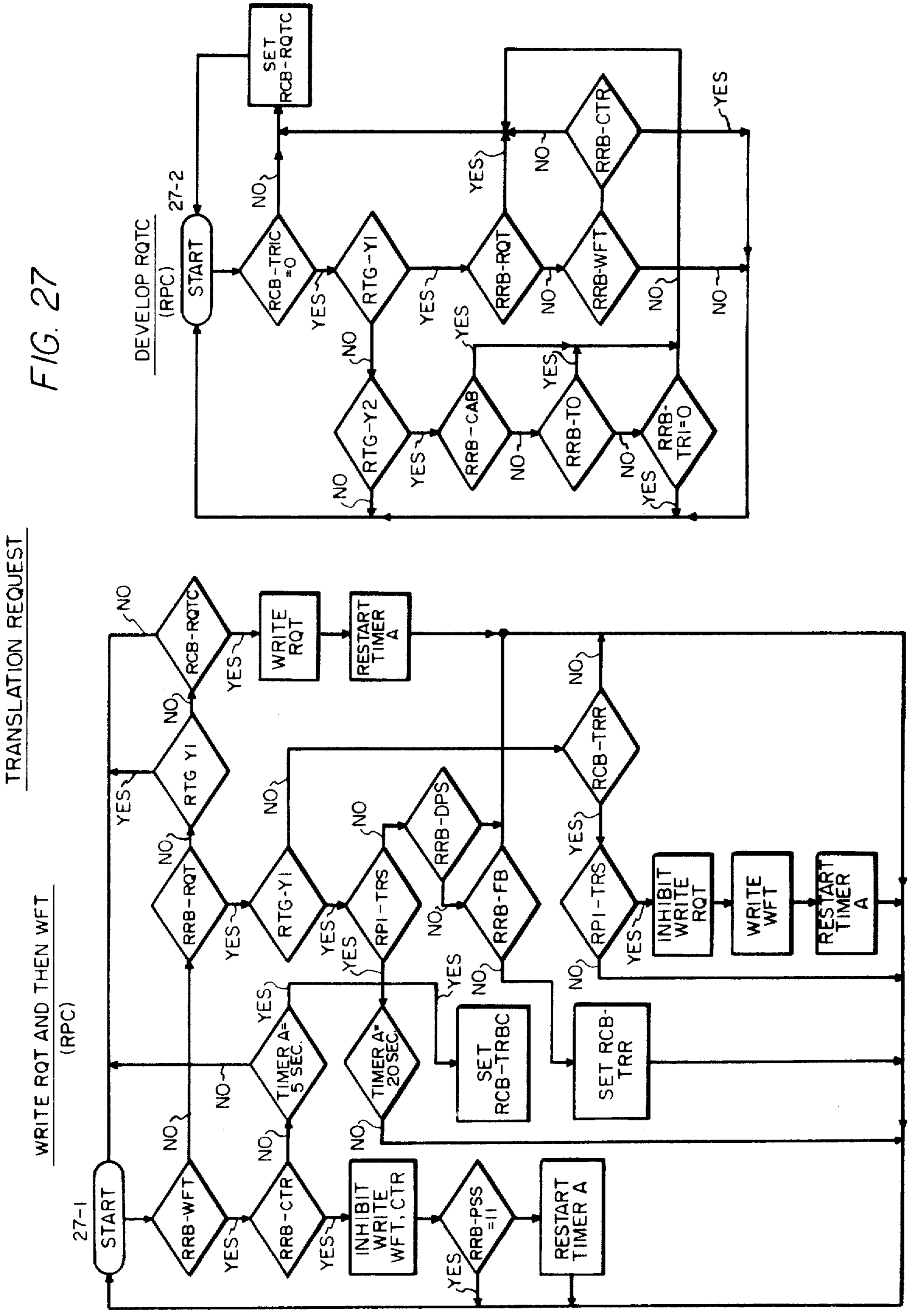

Should the subscriber station equipment be defective and only send one tone or multiple buttons are depressed, no output is supplied from the receiver.

h. MF receiving is processed in accordance with chart 20-2. The processing is the same as for touch calling with the exception that if more than two frequencies or a single frequency is received, error is indicated on the RO lead from the multiplex circuits and a trouble condition is set. MF receiving is indicated in RRC equations 11 and 12 by MDR=2. The trouble condition is indicated by RRC equation 15, in which the RO signal from the multiplex circuits from the MF receiver is designated as RSM-ERC (error-MF receiver) as received from the multiplex circuits.

i. When receiver disconnection is required (after all digits have been received via MF or touch calling, or mixed line with dial pulse coming in, the logic proceeds to the sequence state PSS=4 for the disconnection, as shown in FIG. 26. The equation for proceeding to PSS=4 is RPC equation 25, which causes the advance from PSS=3 when the field DRS (disconnect receiver-sender, bit 13 of word 1B) is true. If the data processing unit supplies IN=14 in field A1-4 of word 1A, this sets the carry buffer latches INC to the same value, and in sub-time slot Y2 the RRC equation 30 will set the carry buffer latch DRSC, and sets the TRIC latches to a value of TRIC=7. This is shown in FIG. 26. Normally receiver disconnection is initiated by a command in the RIC unit.

Also in FIG. 26, once DRS is set in PSS=4, if the pull ground signal PG is present RPC equation 20 is used to clear it. Next in accordance with RPC equation 21 there is a check made for holding on HC and if its value is false then the rewrite of DRS is inhibited and the carry buffer latches for the next sequence state are set to NPSS=3. If the connection is holding by an indication of RSM-HC and HC bit is written and the carry buffer latch TRBC is set in accordance with RPC equation 22.

J. When all digits have been received the data processing unit will set FD (finished dialing, bit B2 of word 1A). If a sender is required the sequence goes to PSS=5, and if one is not required the sequence goes to PSS=6, according to RPC equations 23 and 24.

Translation Requests

Whenever a translation is required from the data processing unit, the sense lines are activated from the register-sender, and information is stored in memory block 202. However, since there is only one block 202 and 192 register junctor blocks, an indicator is necessary to determine if block 202 is in use. This indicator is in the RPI unit in the form of a latch TRS (translation request served).

a. To develop the request, it is necessary to first have an indication of a reson for translation. Chart 27-2 (develop RQTC), which corresponds to RCB equation SET-RQTC along with the RRC equation SET-RQTC. If the TRIC latches in the carry buffer have any decoded value other than zero the latch RQTC is set. If either RQT or WFT in bits H4 and H3 of word 1B are true latch RQTG is set. If either CAB or TO in bits E4 and F1 of word 2A are true latch RQTC is set.

b. As shown on chart 27-1 and RPC equation 29, after the carry buffer latch RQTC is set, then in subtime slot Y9 RQT is written in memory and the timer A is restarted.

With RQT set the TRS latch in the RPI unit is checked to determine whether there is a translation request already there waiting to be served (another register junctor block). If there is, timing takes place. If the request cannot be served within 20 seconds trouble is called.

When the data processing unit serves a translation, a control pulse directive resets the TRS latch which permits latch TRR in the carry buffer to set, as long as there is not a disconnect receiver or sender and the freeze bit is reset, as shown by RPC equation 33.

With latch TRR in the carry buffer set, latch TRS will become set causing RQT in memory bit H4 of word 1B to reset, and WFT in bit H3 of word 1B to set as shown by RPC equation 34. This equation also starts timer A.

With WFT set timing takes place as to how long it takes the data processing unit to serve the request. When the data processing unit has served the translation, it sets CTR in bit B4 of word 1A, which with RPC equation 30 inhibits the writing of WFT. CTR is present only for the one cycle and is not recirculated. Call processing then continues. If the data processing unit does not serve the request within five seconds trouble is called.

Call Processing in PSS=5

Sequence state PSS=5 is used if a sender needs to be connected. At the conclusion of connection RPC equation 27, corresponding to chart 26-4, becomes true to set the carry buffer NPSS latches to a value of NPSS=6, and the carry buffer TRIC latches to a value of TRIC=4.

Call Processing – Terminating and Sending

Figure 28:
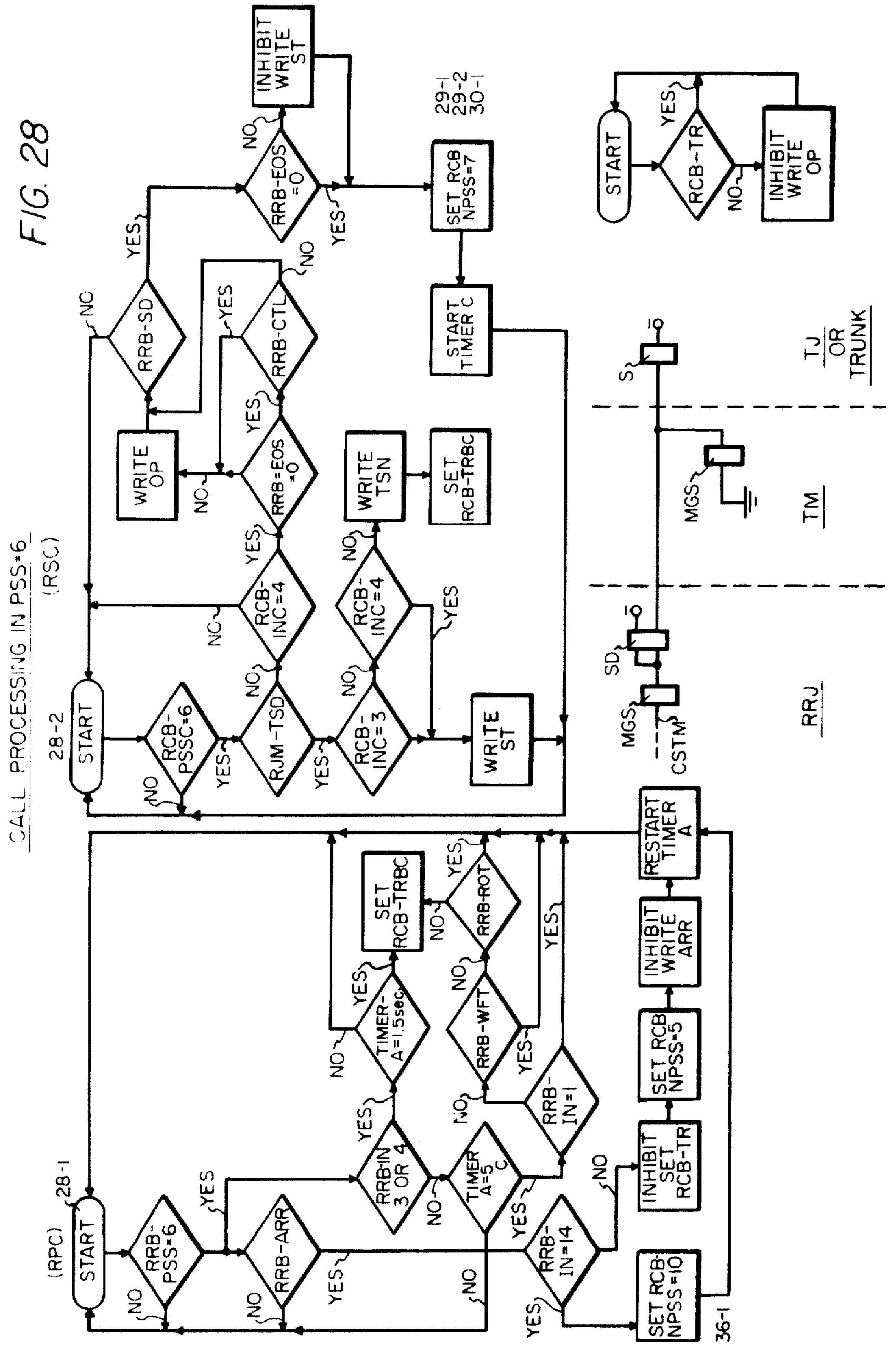

Sequence state PSS=6 is a waiting state. There is a wait for the terminating marker to seize and hold the terminating junctor or trunk, while the register-sender checks to see that this is done. During this time the register-sender also times the terminating marker's overall operation. The carry buffer latch TR is set during subtime slot Y1 of every cycle in which the sequence state has a value of PSS=6 or greater; which via the multiplex circuits and lead TRM causes the transfer relay TR in the register junctor to be operated. Call processing in state PSS=6 is shown in FIG. 28.

a. In state PSS=6 with an instruction of either IN=3 or IN=4, the terminating marker is given 1.5 seconds to finish its operations and the data processing unit to change the IN field. If this time is exceeded then RPC equation 36 is effective to set the carry buffer latch TRBC. (See section D, IN for definitions of values 3 and 4).

b. Should an alternate route be necessary (indicating either a receiver need be connected or disconnected)

the data processing unit sets ARR (bit B3 of word 1A) and depending upon whether IN=14 or not the sequence is changed to PSS=10 to disconnect or PSS=5 to connect, by setting the appropriate carry buffer latches NPSS in accordance with RPC equations 37 and 38.

c. If during sequence state PSS=6 the instruction is not either IN=3 or IN=4 the data processing unit is timed for five seconds before setting the carry buffer latch TRBC in accordance with RPC equation 36.

d. When the terminating marker has established a path through the selection matrix it seizes the S relay of either a terminating junctor or an outgoing trunk by applying ground potential to the ST lead in the selector matrix, which also causes operation of the SD relay in the register junctor. Contacts of relay SD (FIG. 10) supply ground potential to test gate 1011 which supplies a signal on lead TSDM, which via the multiplex circuits supplies signal RJM-TSD. This enables RSC equation 10 to write ST (bit G4 of word 3B). Whenever the signal RJM-TSD is true during sub-time slot Y3 the condition SD is written into bit H1 of word 3B, as shown by RSC equation ROW3-H1. Thus the signal condition SD appears in the register reading buffer as an output of latch H1 one cycle after the condition TSD is detected from the multiplex circuits, so that in effect SD represents the "last look" from the preceding cycle of the condition TSD.

e. Writing ST causes the carry buffer latch CST to be set during sub-time Y11, which via the multiplex circuits supplies a signal on lead CSTM, and in the register junctor (FIG. 10) causes ground potential from relay driver 1005 to be supplied via make contacts of relay TR to the windings of relay SD. When the terminating marker removes the main ground switch pull, there are opposing currents in relay SD of the register junctor and it releases. With the contacts of relay DS released, signal RJM-TSD becomes false.

f. If the data processing unit indicates that the terminating marker is accomplishing the final stages (IN=4) the terminating loop is closed by operating the OP relay in the register junctor. This is accomplished with RSC equation 11 to write OP in bit H4 of word 3B during sub-time slot Y3, which during sub-time slot Y11 causes the carry buffer latch OPC to be set. RSC equation 9 now becomes true to set the carry buffer latches NPSS=7 so as to advance to sequence state PSS=7. If this is an outgoing call RSC equation 46 also inhibits the writing of ST. The outgoing call is indicated by $\overline{\text{EOS}}$=0.

g. As noted above whenever PSS=6, or greater, the transfer relay TR of the register junctor is operated in response to setting the carry buffer latch TR, which disables pulling the sender or receiver path, disconnects dial tones, and allows the return of busy or reorder tones if necessary.

Figure 29:
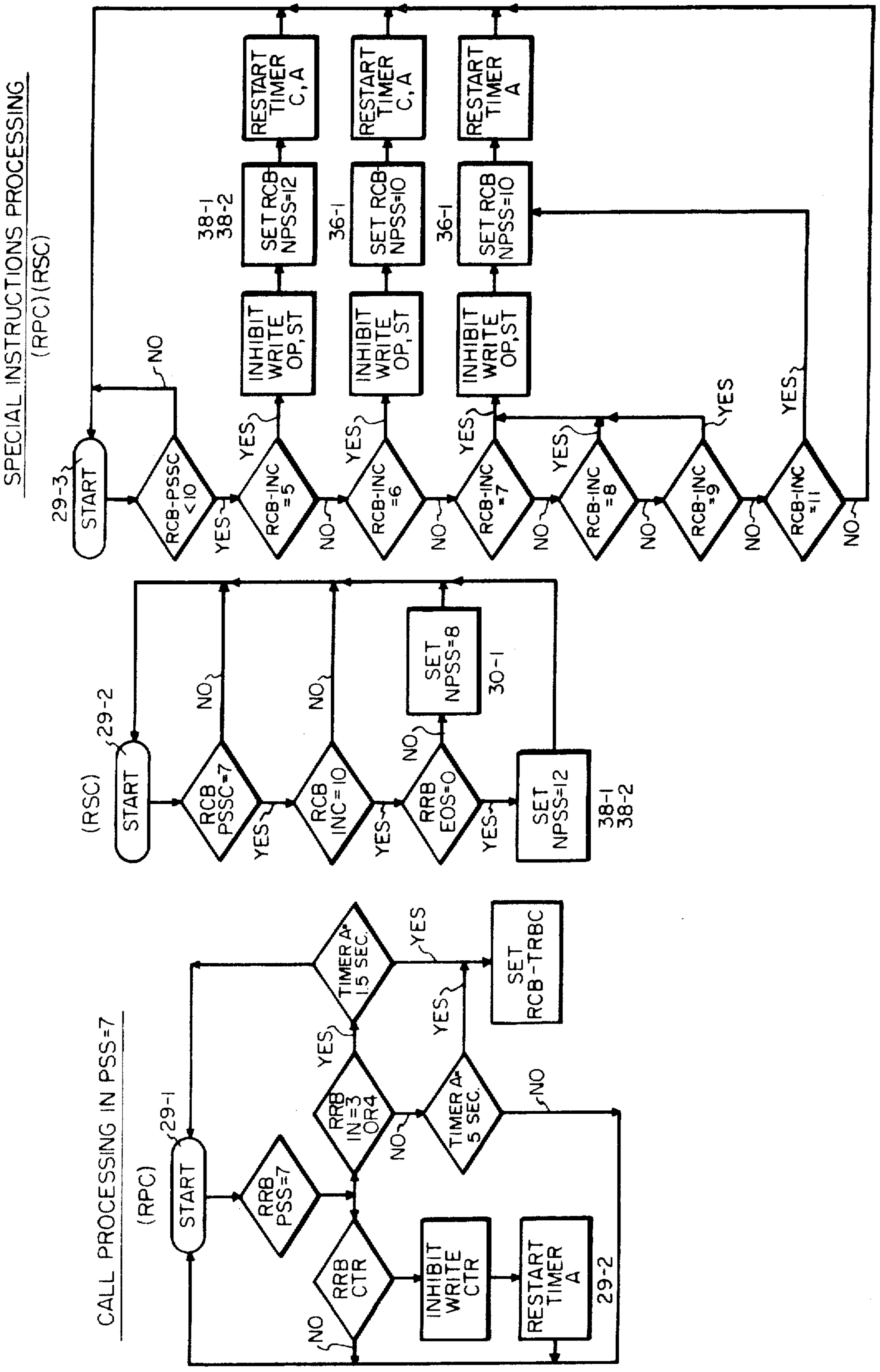

Sequence state PSS=7 is also a waiting state. The register sender has already determined that the terminating marker has completed its portion of the operation, but the register-sender needs confirmation from the data processing unit. This is received in the form of IN=10. The flow charts are shown in FIG. 29. The chart 29-2 and RSC equations 44 and 45 show that if sending is required ($\overline{\text{EOS}}$=0) then proceed to state PSS=8, and otherwise proceed to PSS=12 by setting the carry buffer latches NPSS. The operation is also timed as in state PSS=6. With an instruction of IN=3 or IN=4 the data processing unit is given 1.5 seconds, and with some other instruction (usually IN=0 or 15) 5 seconds are allowed, as shown by RPC equation 36.

Special instructions (IN=5 through IN=9 and IN=11) permit a jump of sequence states from any sequence state less than PSS=10 to PSS=10 or 12. The setting of the carry buffer NPSS latches and restarting of timer A is covered by RPC equations 41 and 42. The inhibiting of OP and ST for the purpose of dropping the terminating path is shown in RSC equations ROW3-G4 and ROW3-H4. The restart of timer C is covered by RSC equation 48. These special instructions are shown in the flow chart 29-3.

Figure 30:
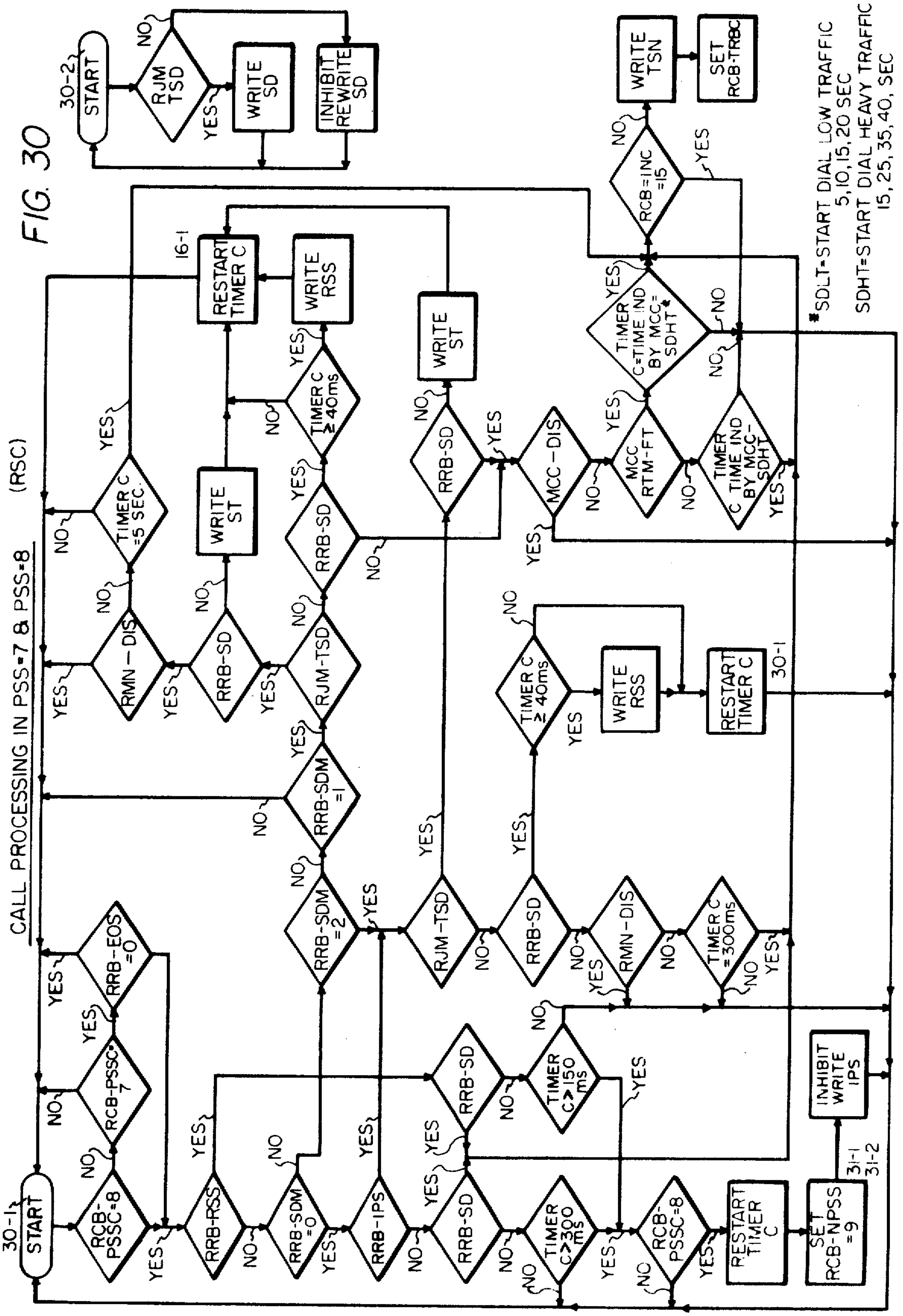

Sequence state PSS=8, shown in FIG. 30 is the state in which the trunk circuit is checked for a start dial signal. This signal is received (if applicable) via the ST lead in the register junctor (from an S relay in the trunk circuit). The data processing unit specifies what signaling is required on the trunk from the terminating class of service COS and supplies the indication via the SDM field (start dial mode, bits C3 and C4 of word 3A). The register-sender is then able to act upon that information.

An indication of SDM=1, wink start, is specified as an off-hook condition of at least 140 milliseconds, but the register-sender is able to detect it if it is at least 40 milliseconds. Normally the trunk circuit, after seizure, is in a state designated as "on-hook" which is repeated to the register junctor as absence of potential on the ST lead so that the SD relay is not operated. Therefore the signal RJM-TSD is not true and likewise the condition SD read from memory bit H1 of row 3B is not true.

In this condition the trunk circuit is timed, and is allowed 5 to 40 seconds to provide the wink start signal depending upon the switches and traffic.

When the distant office goes "off-hook," this is repeated as ground potential on the ST lead to operate the SD relay in the register junctor making the signal RJM-TSD true. At this time the condition SD (corresponding to the condition of TSD in the previous cycle) is still false. Therefore RSC equation 7 becomes true to write ST and restart timer C.

As long as TDS is true the condition SD is written and appears in the register read buffer in the next cycle.

With signal TSD still true (distant office remaining off-hook) and SD true the RMN unit is checked for a disabled time out condition DIS and allowed 5 seconds as shown in RSC equation 39 which causes writing of condition TSN if there is trouble in sending. There should be only a lapse of 200 milliseconds before the distant office goes on-hook again, which makes the signal condition TSD false. With SD still true from the previous cycle, if the off-hook was at least 40 milliseconds the condition RSS (received start dial signal, in bit H3 of word 3B) is written in accordance with RSC equation 8, which also starts timer C. The condition timer C greater than or equal to 40 milliseconds is shown in RSC equation ROW3-H3, by specifying conditions in the L and K fields of row 3.

On the scan in the next cycle the condition SD will be false. After a delay of 150 milliseconds to permit the electro-mechanical equipment to settle down, the sequence state is advanced to PSS=9 by setting the NPSS latches in the carry buffer accordingly in accordance with RSC equation 6 which also starts timer C and inhibits the writing of condition IPS.

With condition SDM=2, stop and start, the distant office has 300 milliseconds to begin signaling.

When the distant office goes off-hook and TSD therefore becomes true, RSC equation 7 is enabled for writing SD and starting timer C.

With SD and TSD true the MCC unit determines timing in accordance with RSC equation 39, the timing being give to 40 seconds.

When the distant office goes on-hook, provided it was off-hook more than 40 milliseconds, RSC equation 8 provides for writing condition RSS and starting the timer C.

After 150 milliseconds the sequence proceeds to PSS=9 by setting the carry buffer latches NPSS in accordance with RSC equation 6, which also inhibits the writing of IPS and starts the timer C.

With the condition SDM=0, there is a wait of 300 milliseconds, then proceed to sequence state PSS=9 in accordance with RSC equation 6. This is the condition for sending to a step-by-step office which does not return any start dial signaling.

Figure 35:
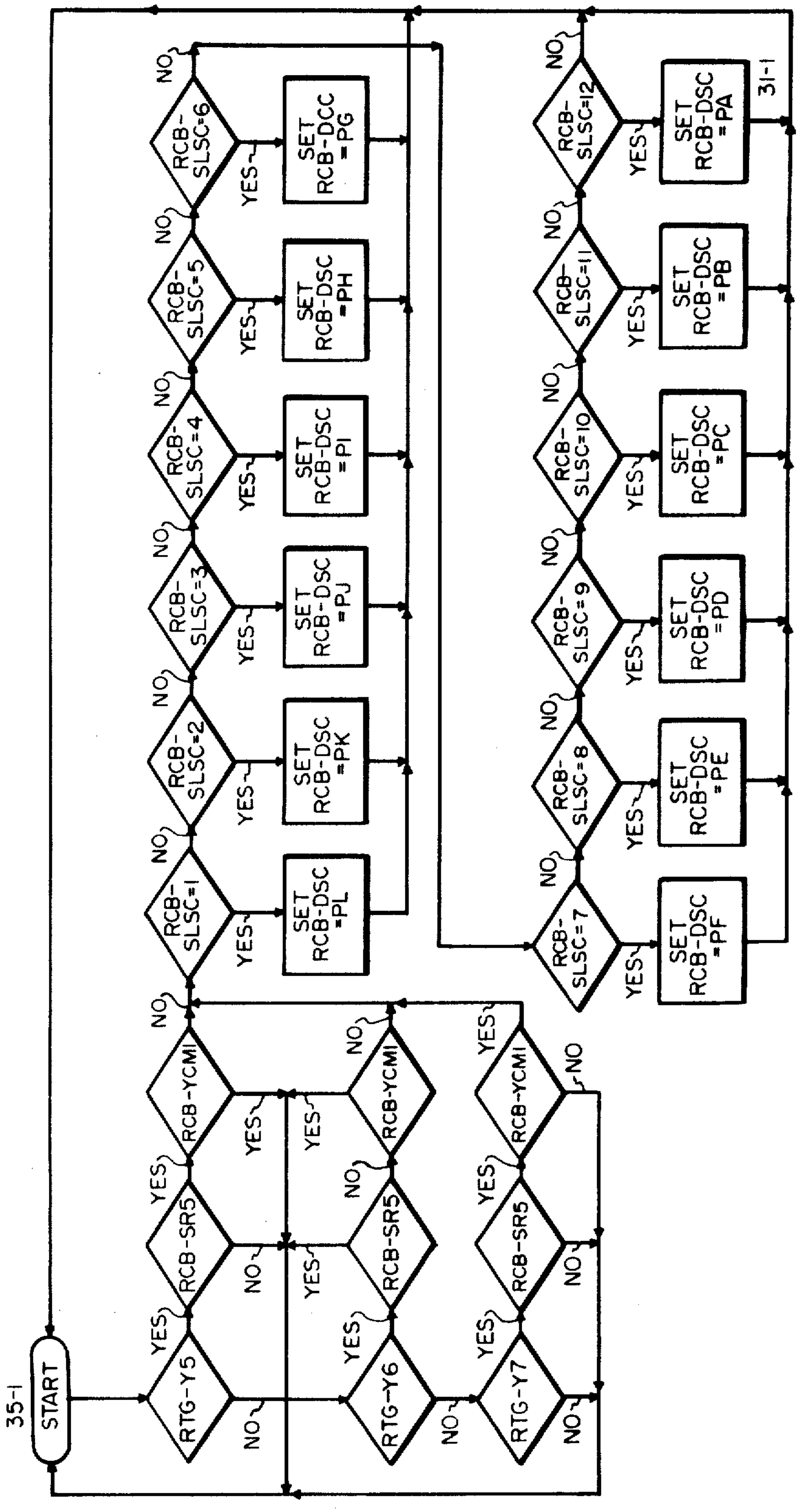
Figure 36:
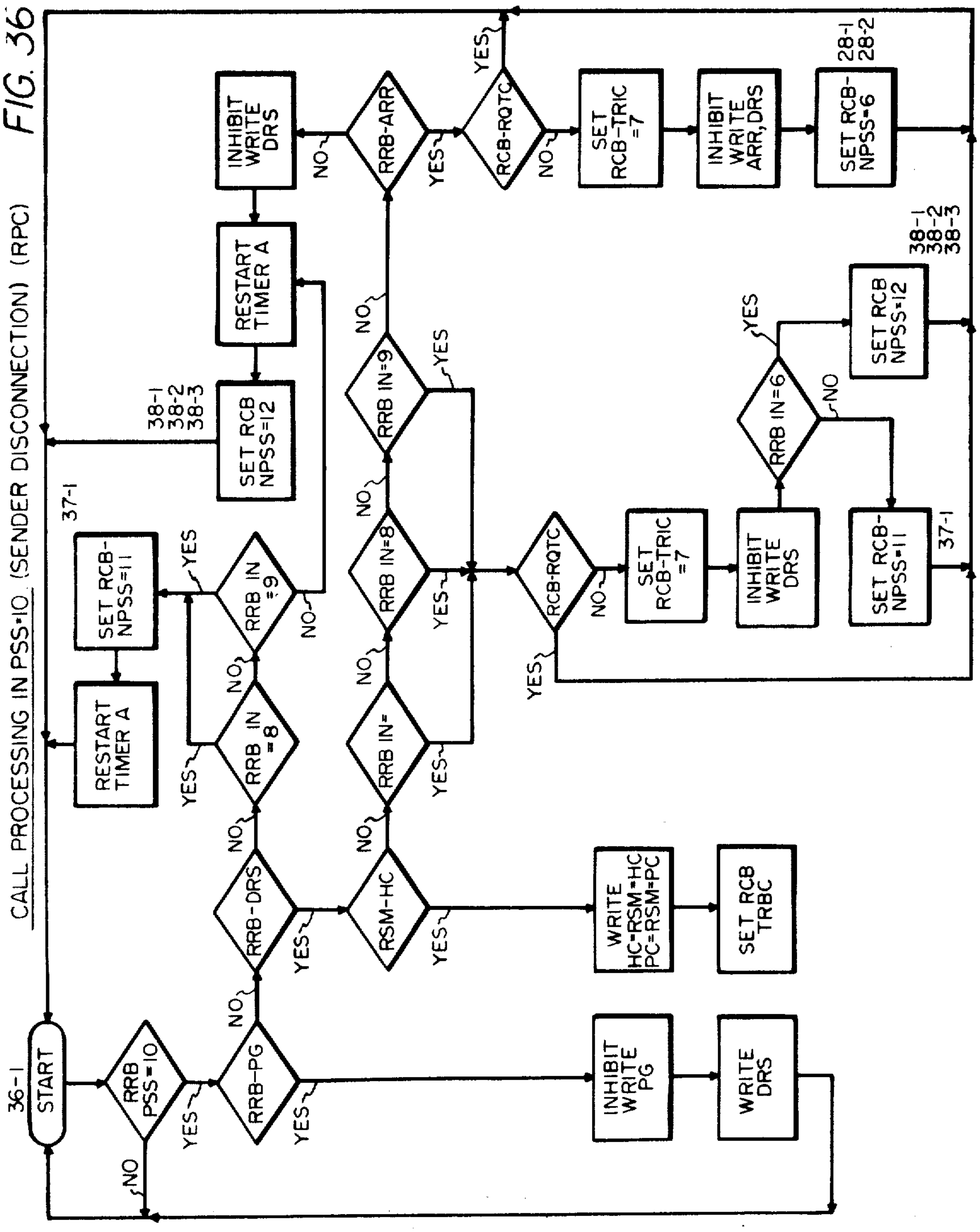
Figure 37:
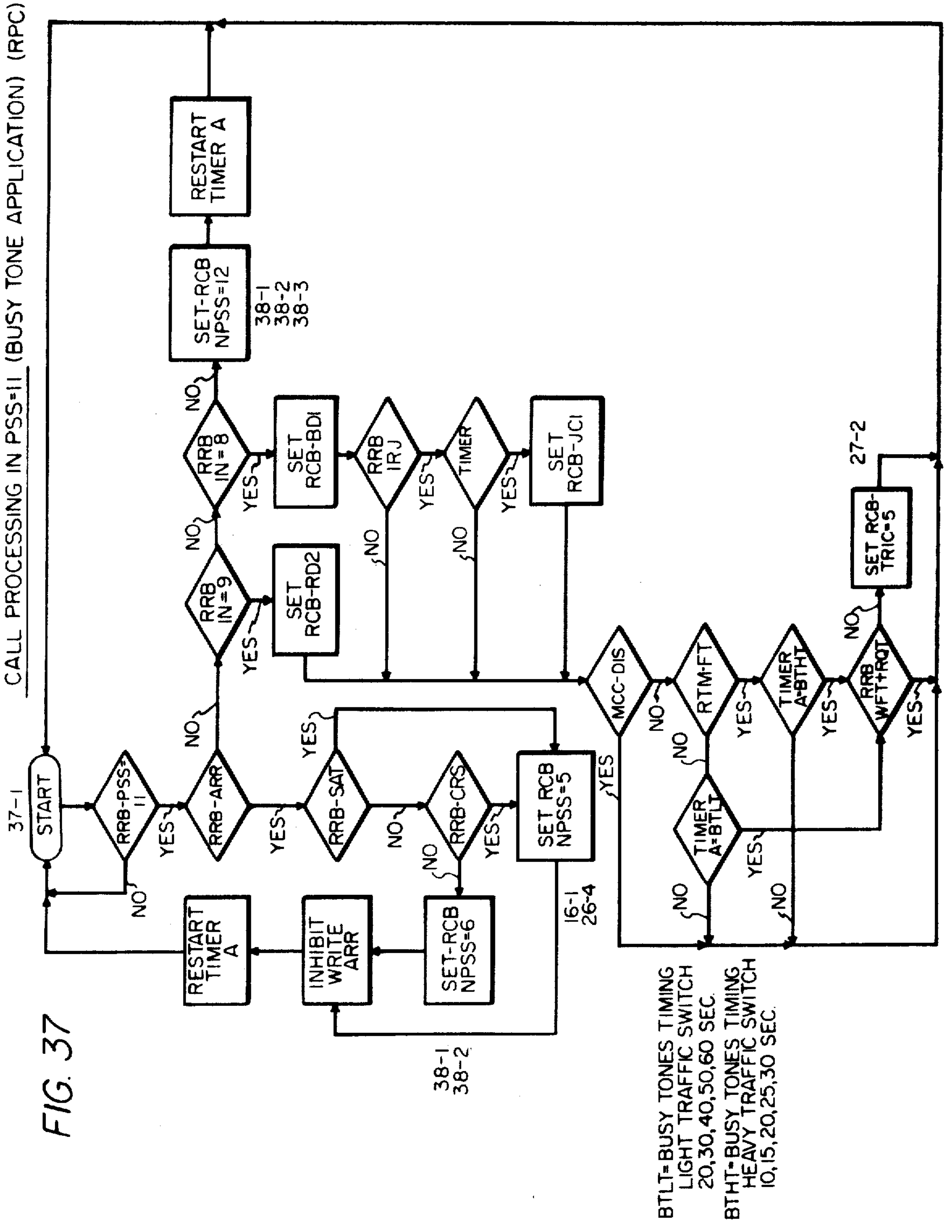
Figure 38:
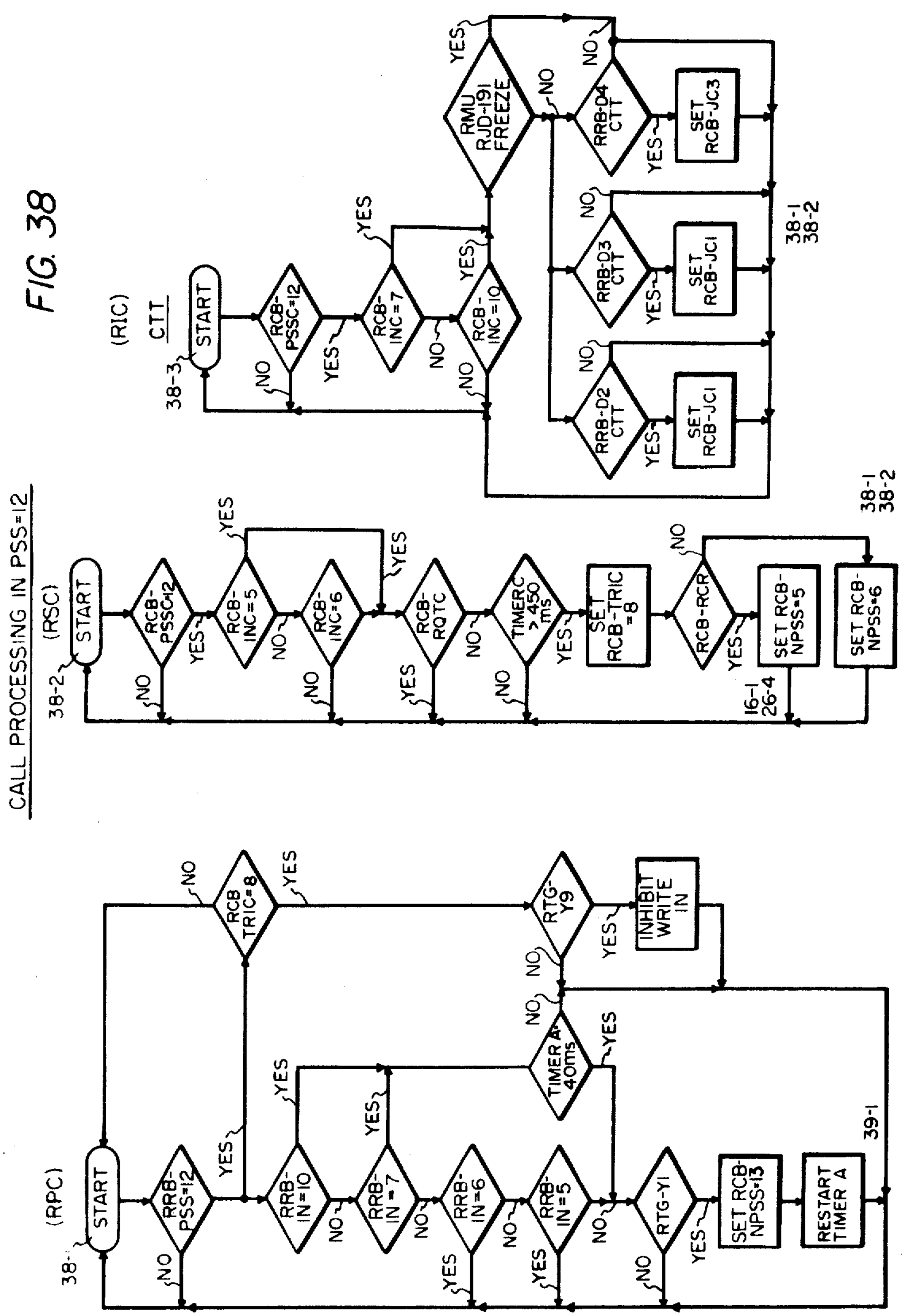

During sequence state PSS=9 the digits are set out on the trunk, whether they be multifrequency or dial pulse or a combination. The digits are sent as specified by the fields SLS, EOS and SKP in word 3A. Call processing in state PSS=9 is shown in FIGS. 31–34 and digit retrieval for sending is shown in FIG. 35.

A normal toll call will require sending of prefix digits (KP and/or routing), called number and calling number (ANI). To accomplish this the data processing unit sets the sender loading sequence state to SLS=0, the end of send field to EOS=3 and the skip field to SKP=0.

The possible actions with SLS=0 are shown in chart 32-1 and RSC equations 19, 20 and 21. All of the possibilities include enabling RSC equation 19, which causes writing CMS=MSI starting timer C, and writing SLS=7.

At this time the digit is retrieved from the storage area and put into the DS field (bits J1-4 of word 3B). The operation is shown on chart 35-1. Whenever a digit is to be loaded into field DS, the RSC equation 12 becomes true. With RSC equation 129 this causes the least significant 4 bits of the SLS field to be loaded into the four carry buffer latches SLSC. Equation RSC 12 also inhibits writing in the DS and PAS fields to clear them. RSC equation 12 in conjunction with equations 128 and 131 also control the setting of the carry buffer latches YCM1 and SR5 respectively during sub-time slot Y3. The prefix digits are loaded from row 5 starting with state SLSC=7. SR5 is set and YCM1 is not set. The equations for loading the digit into the carry buffer latches DSC are given by RIC equations RIC-SET-DSC-1, RIC-SET-DSC-2, RIC-SET-DSC-4, and RIC-SET-DSC-8. For the prefix digits RIC equations 2 is true. The first prefix digit from position F is loaded into the latches DSC at this time.

According to RSC equations 40 and 115 the digit from the carry buffer latches DSC is written into the field DS during sub-time slot Y11.

With CMS=1 for multifrequency sending, the digit from field DS is supplied via the multiplex circuits to the MF sender leads which at the sender are designated MS1M, MS2M, MS4M, and MS8M. There are four latches MFDS-1, MFDS-2, MFDS-4 and MFDS-8 shown on RIS 16 and 18. The 4 bits J1-J4 from the DS field are gated with the signal CMS=1 to the inputs of these latches. The signal CMS=1 is true by logic shown on RIS 20 when RTG SET DS is true, G2 is true and G3 is false. The timing generator supplies the signal RTG-SET-DS during sub-time slot Y11 and X4. The outputs of the four latches are supplied via the multiplex circuits to the MF sender.

With CMS=1, the condition TOP (time on period) is checked. If TOP is not true, according to RSC equation 15 there is a wait of 70 milliseconds and then TOP is written and the counter C is started. The condition TOP is the time on period for sending an MF digit. If the digit being sent during SLS=7 is an eleven (KP) it is left on for 100 milliseconds; and if not it is left on for 70 milliseconds as determined by RSC equation 16 with F1 and F3 from RSC equations 33 and 34. Equation 16 also clears the DS and PAS fields, causes one to be added to the SLS state, and starts the timer C. The addition logic is shown in the RSC equations ROW3-D2 through ROW3-E3.

With SLS=8, the value of the last 4 bits loaded into the carry buffer latches is also SLSC=8, and the next digit as shown in flow chart 35-1 is loaded from position E. This digit is sent in the same manner as the first prefix digit, and in the same manner successive prefix digits are loaded from row 5 up to digit PR6 in position A or until all of the prefix digits have been sent which may be fewer than 6. If after a digit is loaded into the carry buffer latches DSC and is is determined that its value is zero RSC equation 41 advances the sending sequence to SLS=13.

For dial pulse sending as indicated by CMS=0 the first prefix digit from position F of row 5 is loaded first into the carry buffer latches DSC and then into memory field DS in bits J1-4 of row 3B, in the same manner as for multifrequency sending. At this time the condition OP is true and therefore relay OP in the register junctor is operated to close the outgoing loop via leads RT and TT. Note that OP was initially set during state PSS=6. With IPS false (interdigital pulse-sending, bit K1 of word 3B) RSC equation 18 inhibits the writing of OP, starts timer C, and adds one to PAS (pulse accumulator-sending, bits 11-4 of word 3B). After 60 milliseconds RSC equation 17 will cause the writing of OP, and start the timer C. The period during which OP is false is one break interval of a dial pulse digit. Successive break intervals are generated with "one" being added to PAS each time until DS=PAS, at which time RSC equation 17 in addition to writing OP and starting the timer C, also enables equation 101 to write IPS, and equation 120 to add one to SLS. This operation and the interdigital pause timing are shown on chart 30-1, and the interdigital pause timing is covered by RSC equation 30. The condition IDS (interdigital speed for sending, bit C2 of word 3A) determines the time of the interdigital pause. If it is true the total interidigital pause is 300 milliseconds (for sending to common control offices), which is 260 milliseconds from the last restart of the timer; and if IDS=0, interdigital pause is 600 or 700 milliseconds (for sending to S × S offices) as determined by an MCC unit pushbutton or strap.

During the interdigital pause (when DS=PAS) RSC equation 12 also becomes true to set the carry buffer latches SLSC to the value of SLS, following which another digit is loaded first into the carry buffer latches DSC and then into the memory field DS.

Figure 31:
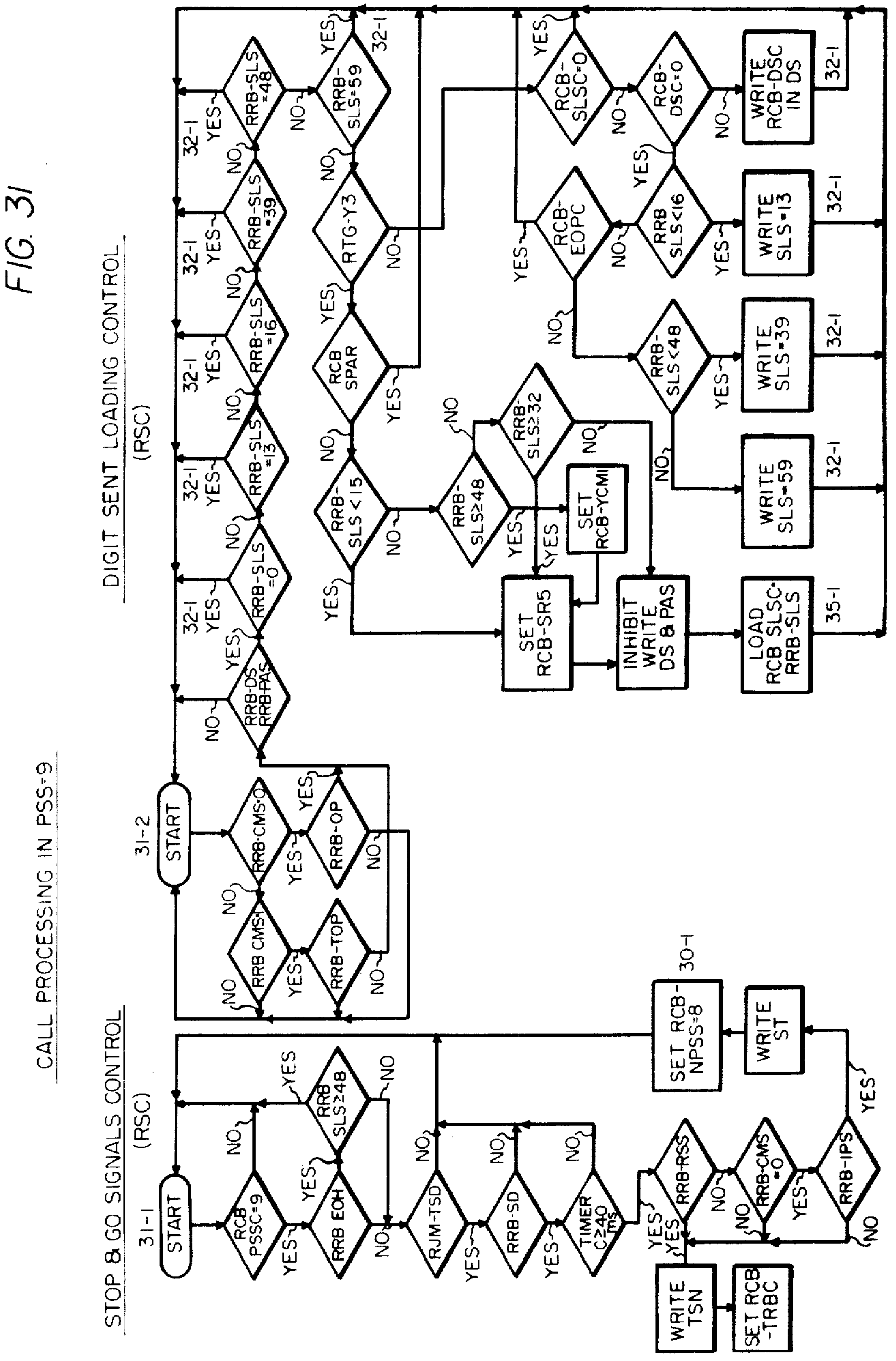

When sending on a stop & go trunk (SDM=0), at any time during an interdigital pause (IPS) stop dial may occur, which operates the SD relay in the register junctor, giving the TSD signal which writes the condition SD so that it appears in the next cycle. After 40 milliseconds of this condition as indicated by timer C, RSC equation 32 is enabled for writing ST and setting the carry buffer NPSS latches to NPSS=8, to thereby return to sequence state PSS=8. At the end of the stop dial when RJM-TSD becomes false with SD still true, RSC equation 8 is enabled for writing RSS and starting timer C. This operation is shown in FIG. 31. Part of the operation is also shown in FIG. 30. RSC equation 6 also becomes true to inhibit the writing of IPS, to start the timer C, and to set the carry buffer latches for NPSS=9 to return to sequence state PSS=9.

During every interdigital pause (IPS), after 20 milliseconds indicated on timer C on a stop & go trunk, condition ST is cleared to accommodate possible reception of a stop dial signal cover by RSC equation 31.

After all of the prefix digits have been sent a blank digit position will usually occur in one of the positions of word 5A. Then on the digit send loading chart 31-2, during sub-time slot Y11 (which is indicated on the chart as $\overline{Y3}$), with the carry buffer latches for the sending sequence state not SLSC=0, and with the carry buffer latches for the digit DSC=0, RSC equation 41 becomes true to write SLS=13.

Figure 32:
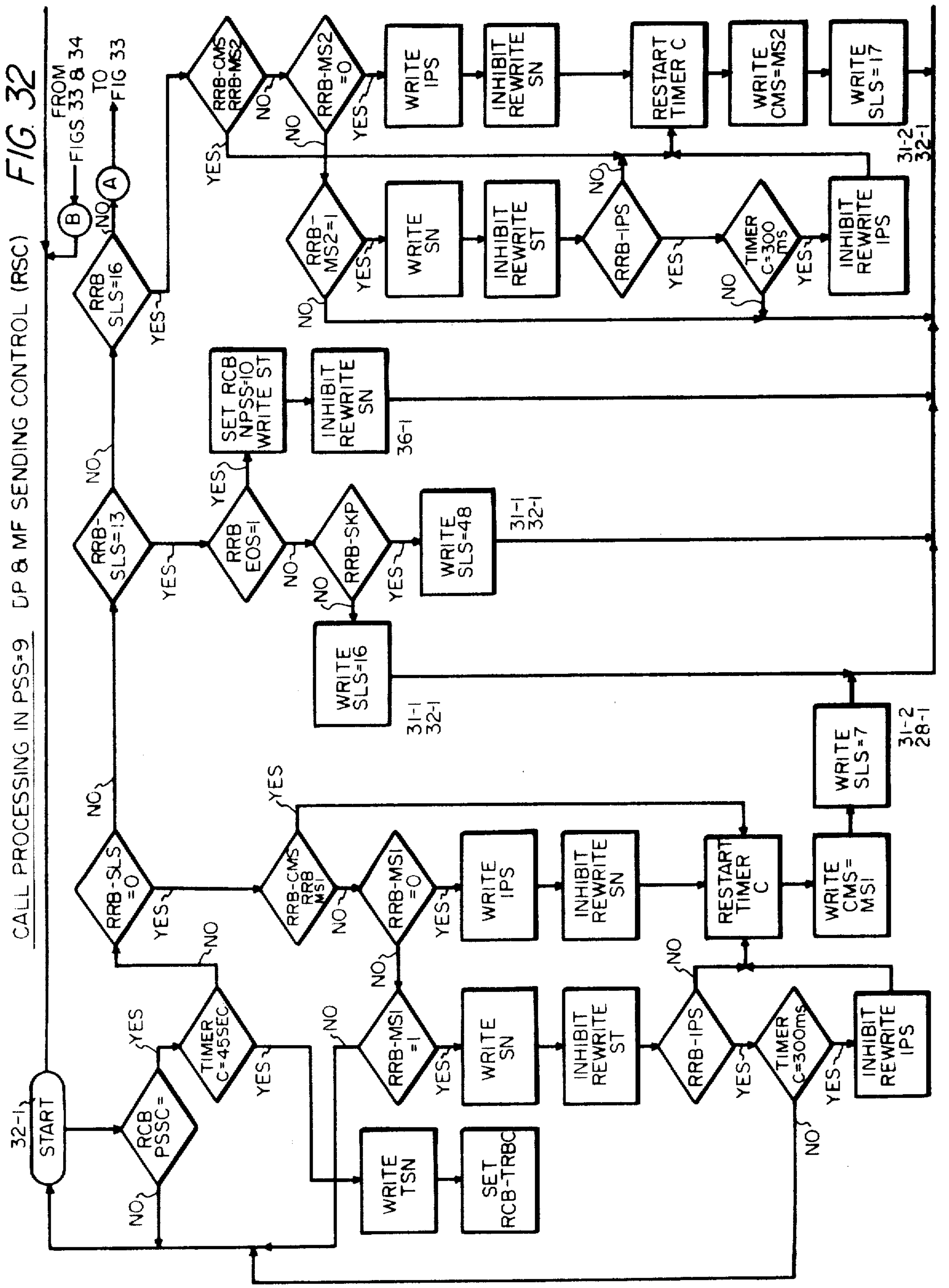

With SLS=13 the EOS and SKP fields are checked for routing. In this case EOS=3 and SKP=0, which enables RSC equation 36 for writing SLS=16, shown in FIG. 32. With SLS=16, the operation is shown in FIG. 32 at the right hand side. The mode of sending is indicated by the field MS2 in bits A3 and A4 of word 3A. If MS2=0, which indicates dial pulse sending for the called digits, RSC equation 23 is effective for writing IPS and inhibit writing SN; while for MS2-1 indicating multifrequency sending, RSC equation 24 is effective to inhibit writing of IPS, to write SN and to inhibit writing ST. With either dial pulse or multifrequency sending, equation 22 is effective to write CMS=MS2, to start the timer C, and to add one to SLS. With SLS=17, the digit retrieval for sending shown in FIG. 35, now is effective for loading digits from row 6. RSC equation 12 is true to set the carry buffer latches SLSC equal to the value of SLS, to inhibit writing DS, and to inhibit writing PAS. For row 6 neither of the carry buffer latches YCM1 or SR5 are set. The four bits loaded into the SLSC latches have the value at this time SLSC=1, corresponding to SLS=17. Therefore the RIC equations for setting the carry buffer latches DSC are effective to load the digit from memory position L of row 6. Then in sub-time slot Y11, RSC equation 40 transfers this digit into the DS field of row 3. The digits are sent in the same manner as described above for the prefix digits.

If there are more than 12 called digits, then after the condition SLS=28, which produces in the carry buffer SLSC=12, for loading the digit from position A of row 6, the logic for adding to SLS is effective in the RSC equations ROW3-D2 through E3 to advance the value to SLS=33. With this value the bit E2 is false and the bit E3 is true so that RSC equation 131 is effective to set the carry buffer latch SR5. Digits are then loaded from row 5 starting with position L.

Figure 33:
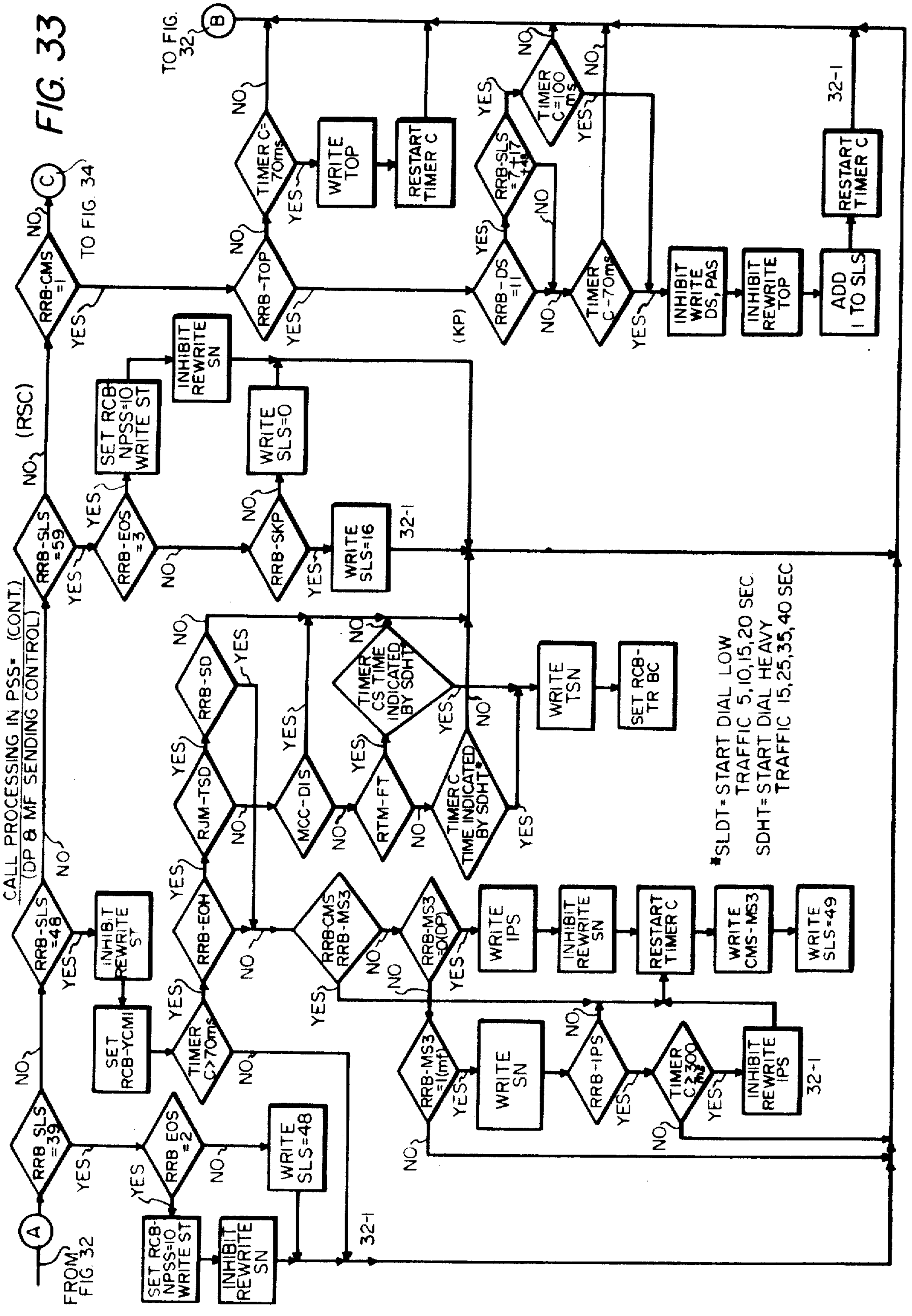
Figure 34:
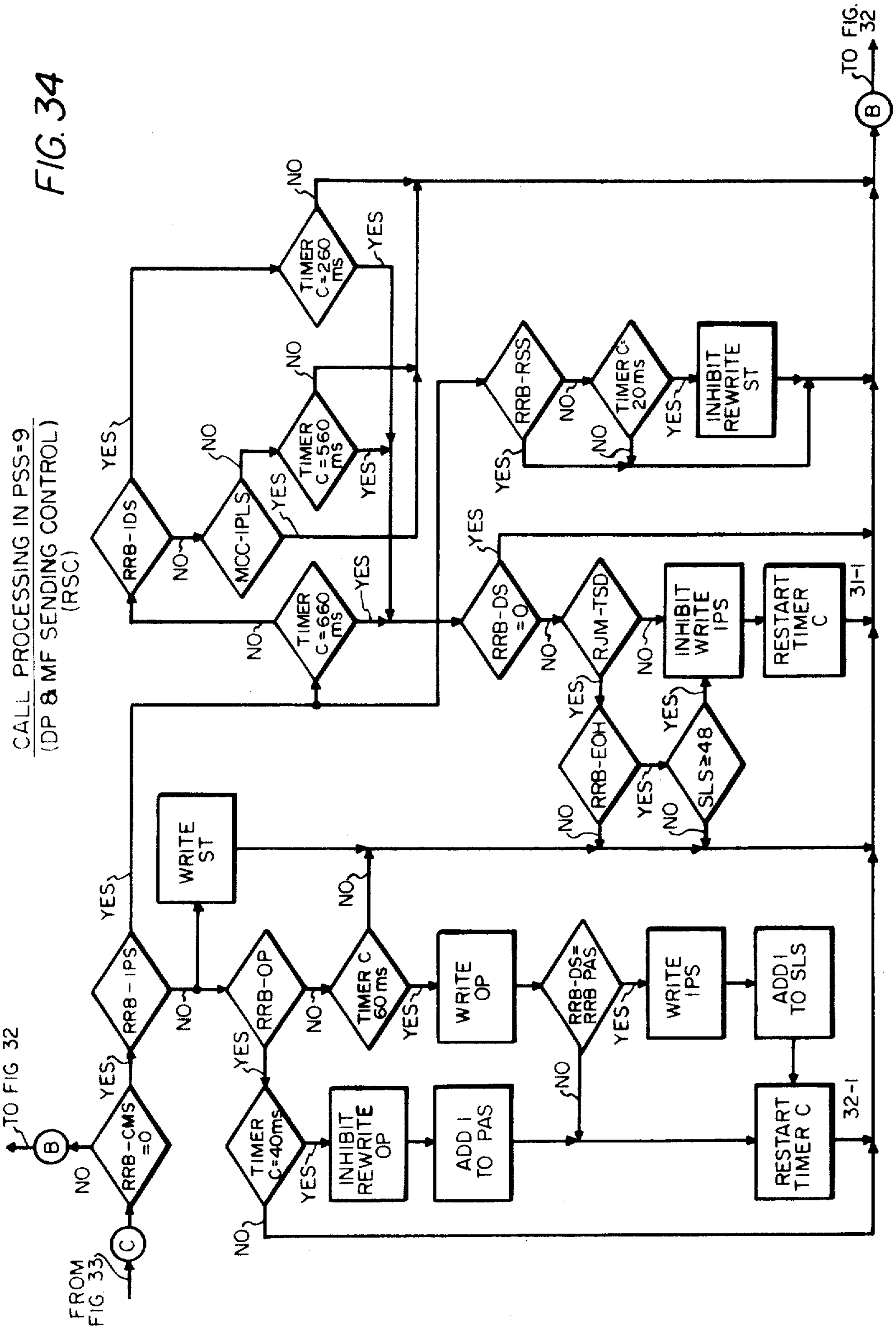

After all of the called digits have been sent and an empty position is encountered either in row 6 or row 5 (SLS<48), RSC equation 42 is effective to write SLS=39. As shown in FIG. 33 with SLS=39 there is a check for EOS=2, which in this case is "no" so RSC equation 37 is effective to write SLS=48. This is the state for the beginning of the sequence for sending the callin number ANI digits.

The operation for SLS=48 is shown in FIG. 33. RSC equation 29 is effective to inhibit writing ST, and to set the carry buffer latch YCM1. RSC equation 25 is effective to write CMS=MS3, to start the timer C, and to add one to SLS. This equation includes a check for the signal condition EOH (except off-hook, but D1 from word 3A) which is a field used by the data processor to instruct the register-sender to wait until the change to off-hook signal (ANI-start identification) received from the distance office before sending the calling numbers. If EOH=1 it is necessary to wait for an off-hook signal, and if EOH=0, off-hook signal is not expected. Thus with EOH=1, it is necessary to look for the signal conditions RJM-TSD and SD indicating that the SD relay in the register junctor is operated. If CMS is not equal to MS3, then if MS3=0 indicating dial pulse sending, RSC equation 27 is effective to write IPS, and to inhibit writing SN, while if MS3-1 indicating multifrequency sending, RSC equation 28 is effective to write SN and inhibit writing IPS.

With SLS=49, the carry buffer latches SLSC are set to SLSC=1. As shown in FIG. 35, with YCM1 and SR5 latches in the carry buffer set during sub-time slot Y6, digits are loaded starting from position L. When an empty position is reached, RSC equation 43 is effective to write SLS=59. With EOS=3, RSC equation 14 is effective to inhibit writing SN, to write ST, and to set the carry buffer latches for NPSS=10 which is shown in FIG. 33.

State PSS=10 is used to disconnect a sender, or touch calling receiver if early outpulsing is in effect. The operation is shown in FIG. 3G.

If the pull ground condition PG in bit 14 of row 1B is true it is inhibited in accordance with RPC equation 43, and the conditions DRS (disconnect receiver or sender in bit 13 of word 1B) is written. In the next cycle with PG not true and DRS true there is a check for condition HC from the sender via the multiplex circuits to see that the hold drops.

If busy tone is required the data processor will supply the instruction IN=8, and if reorder tone is required the instruction is IN=9. If either busy or reorder tone is required the sequence goes to PSS=11; and if not it goes to PSS=12. RPC equation 46 shows a set of conditions to set the carry buffer latches NPSS=12, start timer A, and inhibit the writing of DRS. RPC equation 47 shows conditions for setting the carry buffer latches NPSS=11 and starting timer A.

Once the disconnection is complete, set the carry buffer latches for TRIC=7 with RPC equations 48, 49 or 50. If busy tone or reorder tone is required the equation is RPC 49 to set the carry buffer latches NPSS=11 and to inhibit writing of DRS; if ARR in bit B3 of word 1A is true the equation is RPC 48 to set the carry buffer latches for NPSS=6 which also inhibits writing ARR and inhibits writing DRS; and if none of these the equation is RPC 50 to set the carry buffer latches for NPSS=12 to inhibit writing DRS. ARR is given after busy tone time out of establishment of a terminating path is required, e.g. route to a "permanent" trunk.

In state PSS=11, if ARR is true indicating alternate routing required, the sequence goes to state PSS=5 by setting the carry buffer latches for NPSS=5 if a sender is required in accordance with RPC equation 51; and otherwise it goes to state PSS-6 by setting the carry buffer latches for NPSS=6 indicated by RPC equation 52, and in either case the writing of ARR is inhibited and timer A is started.

If the instruction is IN=8, set the carry buffer latch BD1 in accordance with RPC equation 54. If the busy tone is to be returned to a trunk as indicated by IRJ (incoming register junctor, bit C1 of word 1A) after timer A advances to 50 milliseconds the carry buffer latch JC1 is set for the purpose of completing a transmission path in the trunk to the register junctor, by applying ground to lead C1 in the register junctor.

If reorder tone is required as indicated by instruction IN=9, the carry buffer latch RD2 is set in accordance with RPC equation 55.

After setting either BD1 or RD2 latches in the carry buffer, RPC equation 56 is effective to set the carry buffer latches for TRIC=5, if a time out has occured.

If there is no busy or reorder tone required the sequence passes through state PSS=11 to PSS=12 by setting the carry buffer latches for NPSS=12 and restarting timer A as indicated by RPC equation 53.

State PSS=12 is for cut-thru control and timing before initiating a retrial.

Chart 38-3 shows that with an instruction of IN=7 or IN=10 as set in the carry buffer latches INC, in accordance with the cut-thru type specified by the CTT field in bit positions D2, D3 or D4 of word 4A, one of the carry buffer latches JC1, JC2, or JC3 is set in accordance with the RIC equations which causes ground in the register junctor to be applied to one of the leads C1, C2 or C3 for the required cut-thru type extending to the originating junctor or incoming trunk.

After waiting 40 milliseconds the sequence advances to PSS=13 with an instruction of IN=7 or IN=10, which is the time to permit the relay drivers in the register junctor to operate the relays. The operation is shown on chart 38-1 and RPC equation 58.

With an instruction of IN=5 or IN=6 for retrial (chart 38-2), after waiting 450 milliseconds as indicated by timer C, the carry buffer latches for NPSS=5 or NPSS=6, and the carry buffer latches for TRIC=8 are set in accordance with RSC equation 47, which in conjunction with RSC equation 127 causes the change to state PSS=5 if RCR is true and to state PSS=6 if RCR is not true. Carry buffer latch RCR will have been set if a receiver or sender connection is required. The 450 millisecond delay is to guarantee the outgoing trunk has dropped the terminating path before attempting to establish another one. The instruction TRI=8 informs the data processing unit that retrial timing is complete.

Figure 39:
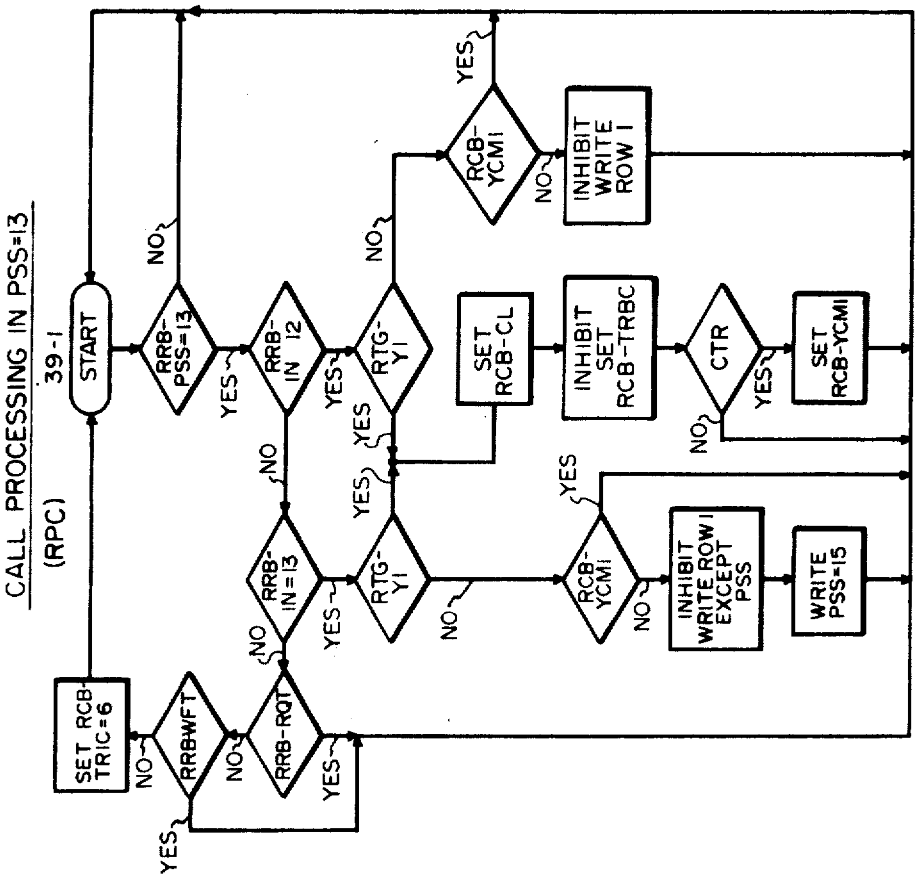

State PSS=13 is the disconnect state, from which the state either returns to PSS=0 for idle, or PSS=15 for off line. This is shown in FIG. 39. If the instructions are not IN=12 or IN=13, and there is no request for translation or waiting for translation, RPC equation 59 sets the carry buffer latches for TRIC=6 which informs the data processing unit that the register sender has disconnected from the network and is ready to clear the memory.

The instruction from the data processor will be IN=12 to clear all rows including 7 and 8, or IN=13 to clear all rows except for writing PSS=15. Initially bit CTR (bit B4 of word 1A) should be true to cause the latch YCM1 to set in accordance with RPC equation 60 at the same time setting latch CL so that rows 7 and 8 along with rows 2–4 may be cleared, and in the subsequent cycle with CTR not true, carry buffer latch CL is set to clear row 1 and the others.

M. SUMMARY FOR MODE CONTROL AND DIGIT STORAGE

The mode control for scanning the rows of the block of memory for each register junctor during its time slot of each cycle may be seen in particular by referring to the register timing generator FIG. 6, the memory map for one register junctor block in FIG. 8, and the register control circuits relating to the carry buffer latch YMC1 in FIG. 13. Each of the 192 register junctors has a similar memory block comprising eight rows, each of which comprises two words of the memory. The first three rows in each block are control rows, e.g., row one for process control, row two for register control, and row three for sender control. The remaining rows may be considered data rows, e.g., row four for miscellaneous information, rows five and six for called number digits, row seven for calling number identification digits, and row eight a spare. During each cycle the register junctors and their memory blocks are scanned in sequence in accordance with the Z generator outputs supplying memory address bits MA4 through MA11 to the memory access circuits, and from decoders 601, 602 and 603 supplying junctor addresses to the register junctor multiplex circuits. During each time slot the rows of he memory block addressed by the Z generator are scanned in accordance with the output of the Y generator. In all modes the first three rows are accessed during sub-time slots Y1, Y2 and Y3, certain data rows are accessed during selected ones of the sub-time slots Y4 through Y8 depending on the mode, and then the three control rows are accessed during sub-time slots Y9, Y10 and Y11. The Y generator supplies memory address bits MA1, MA2 and MA3 to the memory access circuits, and the decode circuits supply the sub-time slot signals Y1 through Y11 to the register control and other circuits. Note that the memory access bits are obtained only from the flip-flops YA, YB and YC; but that the decode circuits in addition use the flip-flop YCM, so that sub-time slots Y1 and Y9 have the same memory address, Y2 and Y10 have the same memory address, and Y3 and Y11 have the same memory address. Access to the two words of a given row depends on the memory address bit MA0 which is produced by the register priority and interrupt circuits of FIG. 4.

Normally, mode A is used for scanning the rows of the memory block, which causes sub-time slots Y7 and Y8 and therefore access to rows 7 and 8 to be skipped. In the Y generator in this mode the counting with flip-flops YA, YB and YC proceeds in a straight binary mode from sub-time slots Y1 through Y6. If this counting sequence were to proceed from Y6 to Y7, flip-flop YA would change from set to reset, flip-flop YB would change from reset to set, and flip-flop YC would remain set. However, the logic is arranged such that coincidence of the mode A and Y6 signals inhibits the setting of flip-flop YB, causes flip-flop YC to be reset, and flip-flop YCM to be set. Therefore the counting has skipped from sub-time slot Y6 to sub-time slot Y9.

In mode B the coincidence of the mode B signal with the signal Y4 causes flip-flop YB to be inhibited from resetting, so that the counting sequence proceeds from Y4 to Y7, thereby causing the scanning of rows 5 and 6 to be skipped. The counting sequence proceeds from Y8 to Y9 by logic which provides that the signal Y8 in coincidence with either the mode B or mode C signals causes flip-flop YCM to be set, while the normal counting sequence causes the flip-flops YA, YB and YC to all be reset. In mode C the counting sequence is also permitted to run straight through from Y1 through Y8 so that all rows are scanned. In all modes the signal Y11 causes flip-flops YB and YCM to be reset while the other flip-flops remain reset, to change the counter to state Y1.

In the call processing for mode A, called number digits may be received or sent and most other call processing functions may be accomplished.

Calling number digits (automatic number identification - ANI) may be received after the called digits on imcoming calls. If this is so, the data processing unit supplies a start dial signal field value of SDS=5. If a receiver is required for the calling digits, the data processing unit will also supply the signal in the SAT field, and supplies signals in the CRS, AOG and SRA fields. After the receiver is connected the SAT and CRS fields are reset by the register-sender logic. Then RRC equation 39 is effective to write the ANI bit, inhibit the write of the SDS field, reset the timer, and write the PPR bit; shown in FIG. 19, chart 19-1. The reverse battery signal to the distant office signifying that this office is ready to receive their ANI digits is given in response to the ASD bit being reversed (depending on whether a wink or delay dial signal is being used, the ASD bit is either set or reset using the carry buffer latch JC3. Received digits in the dial pulse mode are accummulated in the PAR field, and for the dual tone and multifrequency modes they are placed into the PAR field in accordance with RRC equation 11. At the completion of a digit in the dial pulse mode RRC equation 7 becomes true, and at the completion of a digit in the dual tone or multifrequency modes RRC equation 12 becomes true. The completed digit is placed into the carry buffer latches PARC, in accordance with RRC equations 7 for dial pulse mode or 12 for dual tone or multifrequency modes. As shown in FIG. 13 at gate 1321 with the ANI bit true at the same time, the signal RRC-SET-YCM1 causes the carry buffer latch YMC1 to be set, and this same signal also sets the carry buffer latch SR5. This is shown in RRC equations 9 and 13. With latch YMC1 set, scanning mode B is in effect, and as shown in FIG. 22 the digit is stored into row 7 in one of the positions PL through PC, depending on which one is the first empty one to the left as shown in FIG. 8.

For sending, digit retrieval shown in FIG. 35, depends upon the SLS states. Called number digits are sent in states up through SLS 47, and the latch YMC1 remains reset for mode A. With SLS=48, along with processing sequence state PSSC=9, RSC equation 29 shown in FIG. 13 as the output of gate 1335 is effective during sub-time slot Y3 to set the carry buffer latch YCM1. Whenever a digit is ready to be loaded into field DS, the RSC equation 12 becomes true. This causes the least significant 4 bits of the SLS field to be loaded into the carry buffer latches SLSC. RSC equation 12 in conjunction with equations 128 and 131 also controls the setting of the carry buffer latches YCM1 and SR5 respectively during sub-time slot Y3. The setting of latch YMC1 depends on the RRB bits E2 and E3 being both true indicating sequence states SLS=48 through 63. In FIG. 13 the output of gate 1337 is then true to set the carry buffer latch YCM1. Latch SR5 is also set at this time. Therefore scanning mode B becomes effective. During sub-time slot Y7 the RIC equations are effective to load the digits from row 7 as shown in FIG. 35 into the carry buffer latches DSC for subsequent writing into the field DS during sub-time slot Y11. The digit is then outpulses as explained in section L.

At the completion of call processing the disconnect state PSS=13 is entered. RPC equation 59 sets the carry buffer latches for TRIC=6 which informs the data processing unit that the register-sender has disconnected from the network and is ready to clear the memory. The instructions from the data processor will be IN=12 to clear all rows of memory including 7 and 8, or IN=13 to clear all rows except for writing PSS=15. Initially bit CTR is true which in accordance with RPC equation 60, which corresponds to the output of gate 1304 in FIG. 13, sets the carry buffer latch YMC1. Mode B is then effective which causes row 7 and 8 to be scanned and therefore cleared along with the other rows scanned in this mode. As shown by RPC equation 61 the carry buffer latch CL is also then set. The flow charts are shown in FIG. 39. In the next cycle the bit CTR is not true, so that latch YMC1 is not set, and mode A is effective to clear the other rows. Note that rows 2 through 8 are cleared in response to the output of the carry buffer latch CL as shown in FIG. 14, but that for row 1 special inhibit conditions are used as shown in Section K1C.

Thus as described above, the mode control carry buffer latch YMC1 is effective when reset to produce mode A and when set to produce mode B. Mode A is the normal mode used for receiving called digits and other call processing functions. Mode B is used during digit receiving to receive ANI digits, during sending to send ANI digits, and during clear operations to insure that rows 7 and 8 are cleared as well as the other rows.

An additional mode C is controlled by a signal YMC2 from the maintenance circuits, which causes all of the rows to be scanned.

What is claimed is:

1. In a communication switching system have a plurality of register junctors for connection to calling lines to receive call signals;

register apparatus comprising a memory and logic circuits shared on a time division multiplex basis, said memory having sets of storage elements, a plurality of registers individually associated with said register junctors, each register comprising a block with a given number of said sets including at least one control set and at least two data sets, multiplex apparatus coupling the register junctors to the logic circuits, a source of cyclically recurring time slot and sub-time slot pulses, said source coupled to supply time slot and sub-time slot pulses to the memory, said source coupled to supply time slot pulses to the multiplex apparatus, said source coupled to supply sub-time slot pulses to the logic circuits, coupling means between the memory and logic circuits for information signals, forming a multiplex arrangement associating each register with an individual pulse time slot during which the stored information is recirculated and may be selectively modified by processing means of the logic circuits, call signal information being received by the logic circuits via the multiplex apparatus from the register junctors during the associated time slots for storage in the memory;

each data set of each register being individually associated with a sub-time slot, and said control set of each register being associated with a first sub-time slot preceding and a second sub-time slot following the sub-time slots of the data set within the time slots of the register; said multiplexing arrangement being effective to read, process and rewrite the information in a set during each associated sub-time slot;

carry storage means in said logic circuits connected to receive information during particular sub-time slots to control rewrite of sets having subsequent sub-time slots, including rewrite of the control set during its second sub-time slot;

the improvement wherein the logic circuits include scan mode control means having a plurality of mode states, one mode state being effective as determined by the processing means during each time slot of each cycle with the scan mode control means in that state, wherein said source includes scan mode timing means coupled to the scan mode control means to select a sequence of sub-time slots dependent upon the mode state.

2. In a communication switching system, the combination as claimed in claim 1, wherein said scan mode control means comprises at least one mode control bistable device (YMC1) in said carry storage means, and wherein said logic circuits includes means to selectively set the scan mode control means during the first sub-time slot of a control row.

3. In a communication switching system, the combination as claimed in claim 2, wherein each of said sets of storage elements comprises two word stores in the memory, wherein the time slot and sub-time slot pulses constitute a portion of the address for each word store and another memory address bit distinguishes the two word stores and wherein means is effective during each sub-time slot to read the two corresponding words into a read buffer, followed by a processing interval, and then to rewrite both words into their word stores.

4. In a communication switching system, the combination as claimed in claim 2, wherein said mode states include a normal mode state and at least one other mode state, corresponding to first and second states of said mode control bistable device, wherein said scan mode timing means includes means so that said sequence of sub-time slots for the normal mode state includes skipping certain data sub-time slots, and for said one other mode state comprises skipping other data sub-time slots, with the total number of sub-time slots for the normal and one other mode state being equal so that the duration of the time slot is the same.

5. In a communication switching system, the combination as claimed in claim 4, wherein said mode states include a maintenance mode state in which a mode signal is supplied from maintenance circuits to said scan mode timing mean, which includes means responsive thereto to cause it to select a sequence of sub-time slots for that mode state.

6. In a communication switching system, the combination as claimed in claim 5, wherein said scan mode timing means includes means so that the sequence of sub-time slots for the maintenance mode state includes all sub-time slots, whereby the time slot becomes longer than for said normal and one other mode states.

7. In a communication switching system, the combination as claimed in claim 5, wherein the signals processed for the register junctors comprise a plurality of digits, and wherein the processing means includes means to determine the mode state responsive to the type of digits being processed during a time slot of a cycle.

8. In a communication switching system, the combination as claimed in claim 7, wherein for both said normal and one other mode state, there are means for digits to be either received or sent via the register junctor.

9. In a communication switching system, the combination as claimed in claim 8, wherein each said register includes a plurality of control sets, and wherein for each mode state said source includes means so that the sequence of sub-time slots comprises a sequence of all of the first control sub-time slots, followed by data sub-time slots, and then a sequence of all of the second control sub-time slots.

10. In a communication switching system, the combination claimed in claim 9, wherein said control sets for each register comprise a process controller set, a receiving controller set, and a sending controller set;

and said logic circuits include a process controller with means enabled by the two sub-time slot signals for the process controller set, a receiving controller with means enabled by the two sub-time slot signals for the receiving controller set, and a sending controller with means enabled by the two sub-time slot signals for the sending controller set.

11. In a communication switching system, the combination as claimed in claim 10, wherein said digits comprise called number digits in the normal mode state, and calling number digits for automatic number identification in said one other mode state;

with means in the logic circuits using the receiving controller to cause received digits to be stored in memory, and using the sending controller to select digits from memory for sending, effective during either the normal or one other mode state.

12. In a communication switching system, the combination as claimed in claim 11, wherein said system includes a register subsystem and a data processing unit organized for multiprocessing, the register subsystem comprising said register junctors and said register apparatus, and the data processing unit includes means for digit analysis, and data transfer means interconnecting the data processing unit and said register apparatus for reading information from said memory and supplying it to the data processing unit, and for supplying information from the data processing unit and writing it into the memory, so that digital information from the register apparatus may be analyzed by the processing unit, and information resulting from the analysis may be supplied to the register apparatus.

13. In a communication switching system, the combination as claimed in claim 12, wherein information supplied from the data processing unit to the register apparatus and written into said receiving control set includes an automatic number identification instruction indicating that calling number digits are to be received via the associated register junctor, and said processing means of the logic circuits includes means to use this instruction to set the mode control bistable device of the carry storage means for said one other mode, which causes the sub-time slots for called number digits to be skipped, and the sub-time slots for calling number digits to be accessed for storage of received digits.

14. In a communication switching system, the combination as claimed in claim 13, wherein said sending control set includes a plurality of storage elements for a sending sequence state, digits for sending being selected in accordance with the sequence state, some sending sequence states designating called number digits and others designating calling number digits, wherein with the normal mode the scan mode timing means includes means so that sub-time slots for called number digits are selected, and wherein responsive to the sending sequence state being one corresponding to calling number digits, the processing means of the logic circuits includes means to cause the mode control means to be set for said one other state so that sub-time slots for calling number digits are selected.

15. In a communication switching system, the combination as claimed in claim 14, wherein said process controller set includes a plurality of storage elements for storing a processing sequence state, and means in response to a process sequence state indicating that processing of a call has been completed to cause the logic circuits to set the mode control means to said one other state so that the sets of storage elements accessed in said one other mode other than the process control set may be cleared, and the sets accessed during the normal mode are cleared in another cycle to restore the register to an idle processing state.

16. In a communication switching system, the combination as claimed in claim 15, wherein said data sets comprise one set for miscellaneous information, two sets for called number digits, one set for calling number digits, and one spare set, wherein the scan mode timing means includes means responsive to said normal mode to select a sequence of sub-time slots which comprises the three first sub-time slots for the control sets, the sub-time slot for the miscellaneous data set, the two sub-time slots for the called number sets, and the three second sub-time slots for the control sets, and wherein the scan mode timing means includes means responsive to said one other mode to select a sequence of sub-time slots which comprise the three first sub-time slots for the control sets, the sub-time slot for the miscellaneous data set, the sub-time slot for the calling number set, the sub-time slot for the spare set, and the three second sub-time slots for the control sets.

17. In a communication switching system, the combination as claimed in claim 16, wherein each of said sets of storage elements comprises two word stores in the memory, wherein the time slot and sub-time slot pulses constitute a portion of the address for each word store and another memory address bit distinguishes the two word store, and wherein means is effective during each sub-time slot to read the two corresponding words into a read buffer, followed by a processing interval, and then to rewrite both words into their word stores.

18. In a communication switching system, the combination as claimed in claim 17, wherein said mode states include a maintenance mode state in which a mode signal is supplied from maintenance circuits to said scan mode timing means, which includes means responsive thereto to select a sequence of sub-time slots for that mode state comprising the three first sub-time slots for the control sets, followed by the sub-time slots for all of the data sets, and then the three second sub-time slots for the control sets, whereby the time slot becomes longer than for said normal and one other mode states.

19. In a communication switching system, the combination as claimed in claim 2, wherein said sets of storage elements are organized in digit stores each comprising a plurality of storage elements, certain of said digit stores of the data sets being call digit stores having a given order for storage of digits, one value of the setting of the storage elements of each digit stores being designated as empty, means included in said logic circuits responsive to a called digit received at a register junctor being ready for storage to determine the first empty call digit store in said order and means to store said call digit into that call digit store, said determination of an empty position and storage of a called digit therein being effective during the time slot of a single cycle.

20. In a communication switching system, the combination as claimed in claim 19, wherein said means to determine the first empty call digit store comprises logic circuits to select the first call digit store in said given order responsive to all of said certain call digit stores being empty, and otherwise to select a call digit store for which the logic circuits indicate that all succeeding call digit stores in said given order are empty and the preceding call digit store has a digit stored therein.

21. In a communication switching system, the combination as claimed in claim 20, wherein the digits include called number digits, wherein said data sets having call digit stores include two sets at least partly used for called number digits, wherein the sequence of sub-time slots includes a first called number sub-time slot for one of these sets and a second called number sub-time slot for the other of these sets, wherein the order for storage of called digits comprises an order starting in the set having the second called number sub-time slot and then continuing in the set having the first called number sub-time slot, wherein a control set includes a bit for indicating the called set having the second called sub-time slot has digits in all of its call digit stores, and logic means to write in this bit during the second sub-time slot of the control set in response to the called set for the second called sub-time slot having digits stored in all of its call digit stores, said carry storage means including a bistable device which is set during the first sub-time slot of the control set in response to said bit having been set in the preceding cycle, and means responsive to the setting of this bistable device to cause called number digits to be stored in the called set having the first called sub-time slot.

22. In a communication switching system, the combination as claimed in claim 21, wherein said mode states include a normal mode state and at least one other mode state, corresponding to first and second states of said mode control bistable device, wherein said scan mode timing means includes means so that said sequence of time slots for the normal mode state includes skipping certain data sub-time slots and for said one other mode state comprises skipping said first and second called number sub-time slots, with the total number of sub-time slots for the normal and one other mode state being equal so that the duration of the time slot is the same.

23. In a communication switching system, the combination as claimed in claim 22, wherein the called digits processed in said one other mode state are calling number digits for automatic number identification, wherein said processing means includes means which in response to an automatic number identification instruction sets the mode control bistable device of the carry storage means for said one other mode, and also sets another device of the carry storage means, so that the sub-time slots for calling number digits are accessed and received digits are stored in the calling number data set.

24. In a communication switching system, the combination as claimed in claim 23, wherein said system includes a register subsystem and a data processing unit organized for multiprocessing, the register subsystem comprising said register junctors and said register apparatus, and the data processing unit includes means for digit analysis, and data transfer means interconnecting the data processing unit and said register apparatus for reading information from said memory and supplying it to the data processing unit, and for supplying information from the data processing unit and writing it into the memory, so that digital information from the register apparatus may be analyzed by the data processing unit, and information resulting from the analysis may be supplied to the register apparatus;

wherein information supplied from the data processing unit to the register apparatus and written into said memory includes an automatic number identification instruction indicating that calling number digits are to be received via the associated register junctor, and this instruction is used by said logic circuits to set the mode control bistable device of the carry storage means for said one other mode, which causes the sub-time slots for called number digits to be skipped, and the sub-time slots for calling number digits to be accessed for storage of received digits.

25. In a communication switching system, the combination as claimed in claim 24, wherein information supplied from the data processing unit to the register apparatus may include call digits stored into call digit stores, and may also include setting some call digit stores to the empty condition to thereby eliminate those digits, and wherein said logic circuits include shift logic which starting in each cycle supplies a shift command for a call digit store which is effective responsive to the preceding call digit store within said order being empty or the shift command for that preceding store being effective to cause a call digit to be written into said preceding call digit store so that during each cycle a digit or a plurality of adjacent digits may be shifted one position within said order, so that with a number of successive multiplex cycles depending upon the number of adjacent empty positions, the call digits may be packed without empty digit stores between digit stores having digits therein.

26. In a communication switching system, the combination as claimed in claim 25 further including means for selecting call digits from said call digit stores and supplying them to an associated register junctor for sending, wherein a control set includes sending sequence state information for selecting the digit to be sent, called number digits being selected during said normal mode state, and wherein certain of the sending sequence states are for calling number digits and responsive to said states the mode control bistable device in said carry storage means is set to select said one other mode so that the calling number call digit stores are accessed for selecting and sending calling number automatic number identification digits.

27. In a communication switching system having a plurality of register junctors for connection to calling lines to receive call signals;

register apparatus comprising a memory and logic circuits shared on a time division multiplex basis, said memory having storage elements organized in digit stores, each digit store comprising a given number of storage elements for storage of a single digit, one value of the setting of the storage elements of the digit stores being designated as empty, a plurality of registers individually associated with said register junctors, each register comprising a block of a plurality of said digit stores, multiplex apparatus coupling the register junctors to the logic circuits, a source of cyclically recurring pulses supplied to the memory, said source coupled to supply time slot and sub-time slot pulses to the memory, said source coupled to supply time slot pulses to the multiplex apparatus, said source coupled to supply sub-time slot pulses to the logic circuits, coupling means between the memory and logic circuits for information signals, forming a nultiplex arrangement associating each register with an individual pulse time slot during which the stored information is recirculated and may be selectively modified by means of the logic circuits, call signal information being received by the logic circuits via the multiplex apparatus from the register junctors during the associated time slots for storage in the memory;

certain of said digit stores being call digit stores having a given order for storage of digits, means included in said logic circuits responsive to a call digit received at a register junctor being ready for storage to determine the first empty call digit store in said order and means to store said call digit into that call digit store, said determination of an empty position and storage of a call digit therein being effective during the time slot of a single cycle.

28. In a communication switching system, the combination as claimed in claim 27, wherein said system includes a register subsystem and a data processing unit organized for multiprocessing, the register subsystem comprising said register junctors and said register apparatus, and the data processing unit includes means for digit analysis, and data transfer means interconnecting the data processing unit and said register apparatus for reading information from said memory and supplying it to the data processing unit, and for supplying information from the data processing unit and writing it into the memory, so that digital information from the register apparatus may be analyzed by the data processing unit, and information resulting from the analysis may be supplied to the register apparatus;

wherein information supplied from the data processing unit to the register apparatus may include call digits stored into call digit stores, and may also include setting some call digit stores to the empty condition to thereby eliminate those digits, and wherein said logic circuits include shift logic which starting in each cycle supplies a shift command for a call digit store which is effective responsive to the preceding call digit store within said order being empty or the shift command for that receiving store being effective to cause a call digit to be written into said preceding call digit store so that during each cycle a digit or a plurality of adjacent digits may be shifted one position within said order, whereby within a number of sucessive multiplex cycles depending upon the number of adjacent empty positions, the call digits may be packed without empty digit stores between digit stores having digits therein.

29. In a communication switching system, the combination as claimed in claim 28, wherein said block of memory for each register junctor comprises at least one control set and two data sets, each data set comprising a plurality of said digit stores, wherein said time division multiplex arrangements comprises a division of said time slots into sub-time slots, with a first control sub-time slot for access to the control set, first and second data sub-time slots for access to the two said data sets in sequence, and a second control sub-time slot for a repeated access of said control set;

wherein said order for storage of call digits comprises storing digits first in the data set having the second sub-time slot, wherein said control set includes a bit for storage of an indication that the data set having the second sub-time slot is full with digits stored in all of the call digit stores thereof, means to set this bit during the second control time slot responsive to the full condition of the data set having the second sub-time slot, so that it is true during the first sub-time slot for that next time slot in the next cycle, and means responsive to that bit being true to cause received call digits to be stored in the data set having the first sub-time slot;

and wherein said shift logic includes means responsive to said bit indicating the data set having the second sub-time slot being not full and the data set having the first sub-time slot having a digit in its last call store in said order to cause the digit to be shifted from the data set having the first sub-time slot into the said date set having the second sub-time slot.

30. In a communication switching system, the combination as claimed in claim 29, wherein said register apparatus further includes carry storage means which includes devices which may be set during any sub-time slot to retain information for use during subsequent sub-time slots, including a set full indicating device which is set during the second data sub-time slot in response to the corresponding set being full so that the said bit in the control set may be set during the second control sub-time slot, wherein the control set includes a digit buffer store (PAR) in which a digit received via the corresponding register junctor is initially stored, wherein the carry storage means includes a digit buffer store (PARC) which when a digit in the control set buffer store is transferred when it is ready for storage, and then during a data sub-time slot is transferred into one of the call digit stores in accordance with said order of storage;

and wherein said buffer store of the carry storage means is also used during said shift operations of transferring a digit from the data set having the first data sub-time slot into the data set having the seocnd data sub-time slot when the device of the carry storage means indicating the data set having the second sub-time slot full had not been set indicating that that set is not full.

31. Data processing and storage apparatus comprising:

a plurality of junctors for connection to external units from which data signals are received;

digital processing apparatus time shared by said junctors and comprising processing logic, a memory, a timing generator, and multiplex apparatus coupling the register junctors to the processing logic;

said memory comprising a plurality of sets of storage elements, each junctor havieg a register individually associated therewith with an individual block comprising a given number of said sets; coupling means between the memory and the processing logic for information signals;

said timing generator connected to supply cyclically recurring pulses to the multiplex apparatus, to the digital processing apparatus, and to the memory in time slots and sub-time slots, each junctor having an individual time slot during which it is effectively connected via the multiplex apparatus to the digital processing apparatus and its memory block is accessed, each memory set having at least one sub-time slot within a time slot for access thereto for reading the information and after an interval for processing rewriting it;

the processing logic includes scan mode control means having a plurality of mode states, with means that one mode state is effective during each time slot of each cycle with the scan mode control means in that state, wherein said timing generator includes scan mode timing means coupled to the scan mode control means to select a sequence of sub-time slots dependent upon the mode state.

32. Apparatus as claimed in claim 31, wherein said mode states include a normal state and at least one other mode state, wherein said scan mode timing means includes means so that said sequences of sub-time slots for the normal mode state includes skipping certain sub-time slots, and for said one other mode state comprises skipping other data sub-time slots, with the total number of sub-time slots for the normal and one other mode state being equal so that the duration of the time slot is the same.

33. Apparatus as claimed in claim 32, wherein said memory sets include at least one control set and at least two data sets;

each data set of each register being individually associated with one sub-time slot, and said control set of each register being associated with a first sub-time slot preceding and a second sub-time slot following the sub-time slots of the data sets within the time slot of the register;

carry storage means in said processing logic to receive information during particular sub-time slots to control rewrite of sets having subsequent sub-time slots, including rewrite of the control set during its second sub-time slot;

the sets which are skipped during each of said mode states being data sets.

34. Apparatus as claimed in claim 33, wherein there are a plurality of control sets, and the timing generator includes means so that each control set has a first sub-time slot preceding the data sub-time slots and a second sub-time slot following the data sub-time slots.

35. Apparatus as claimed in claim 34, wherein said scan mode timing means includes means so that there is at least one of said data sets which has a sub-time slot which occurs in both the normal mode and said one other mode.

36. Apparatus as claimed in claim 35, wherein said control sets for each register comprise a process controller set, a receiving controller set and a sending controller set;

wherein the information stored in the process controller set includes a processing sequence state, wherein the information stored in the receiving controller set include a digit buffer store for receiving digits from the register junctor, the digit from this buffer store being then stored into the data set, and wherein the information stored in the sending controller set includes a buffer store from which a digit from a data set is placed for use in controlling sending that digit via the register junctor;

and said processing logic includes a process controller, a receiving controller and a sending controller, each having means responsive to signals for the two sub-time slots and information from the corresponding control sets.

37. Apparatus as claimed in claim 36, incorporated in a system comprising a register subsystem and a data processing unit organized for multiprocessing, the register subsystem comprising said junctors and said digital processing apparatus, and the data processing unit including means for digit analysis, the data transfer means interconnecting the data processing unit and said digital processing apparatus for reading information from said memory and supplying it to the data processing unit, and for supplying information from the data processing unit and writing it into the memory, so that digital information from the register apparatus may be analyzed by the data processing unit, and information resulting from the analysis may be supplied to the register apparatus.

38. Apparatus as claimed in claim 36, wherein said mode states include a maintenance mode state in which a mode signal is supplied from maintenance circuits to said scan mode timing means, which includes means responsive thereto to select a sequence of sub-time slots for that mode state.

39. Apparatus as claimed in claim 38, wherein the scan mode timing means includes means to select a sequence of sub-time slots for the maintenance mode state which includes all sub-time slots, whereby the time slot becomes longer than for said normal and one other said mode states.

* * * * *